US006983317B1

(12) United States Patent
Bishop et al.

(10) Patent No.: US 6,983,317 B1
(45) Date of Patent: Jan. 3, 2006

(54) ENTERPRISE MANAGEMENT SYSTEM

(75) Inventors: David A. Bishop, Redmond, WA (US); Kelvin M. Hoover, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 09/586,740

(22) Filed: Jun. 5, 2000

Related U.S. Application Data

(60) Provisional application No. 60/206,014, filed on May 19, 2000, provisional application No. 60/185,443, filed on Feb. 28, 2000.

(51) Int. Cl.
*G06F 15/173* (2006.01)
(52) U.S. Cl. ...................................... 709/223; 709/224
(58) Field of Classification Search ................ 709/223, 709/224
See application file for complete search history.

(56) References Cited

U.S. PATENT DOCUMENTS

| | | | | |
|---|---|---|---|---|
| 5,887,139 | A * | 3/1999 | Madison et al. | 709/223 |
| 6,105,065 | A * | 8/2000 | Rao et al. | 709/224 |
| 6,112,015 | A * | 8/2000 | Planas et al. | 709/223 |
| 6,225,999 | B1 * | 5/2001 | Jain et al. | 345/734 |
| 6,259,448 | B1 * | 7/2001 | McNally et al. | 345/733 |

* cited by examiner

*Primary Examiner*—Valencia Martin-Wallace
*Assistant Examiner*—Scott M. Collins
(74) *Attorney, Agent, or Firm*—Woodcock Washburn LLP

(57) ABSTRACT

A Managed Site (10), a logical network entity, is composed of a number of Sub Sites (20) in a one to many relationship. A Sub Site (20) is a logical component, which is composed of a number of Engines (30). Nodes (40) similarly relates to their Engine (30) in a many to one relationship. A Node (40) is a collection of Managed Elements (ME's) (50) (while being an ME (50) itself), which represent network state information. The subsite (20) consists of the engine (30) connected to server nodes (40). One or more clients (110) are connected to the management engine (30) and access management engine (30) information relating to managed elements (50) including nodes (40). The connected manager engines may communicate with one another so that, for example, in the event of a failure, one of the manager engines remaining on line commences monitoring of manage elements assigned to the failed manager engine. Upon accessing the manager engine (30), the client interface displays relationships among managed elements (50) using meaningful connectors and tree-like structures. In addition to basic managed element state monitoring functionality, the manager engine (30) provides a variety of automated tasks ensuring the health of the network and optimal failure correction in the event of a problem. For example, the manager engine (30) performs root cause analysis utilizing an algorithm tracing through manged element (50) relationships and indicating the source of the failure.

58 Claims, 52 Drawing Sheets

Managed Element Site Model

FIG. 43A

Avalon Master Message List

| Msg # | Object ID | Properties | Description | Node Monitor | DB Rep | State Tracking | EMM | ELM | MEAM | E2E |
|---|---|---|---|---|---|---|---|---|---|---|
| 1 | ME GID | | ME has been added | Sub | | Sub | | | | |
| 2 | ME GID | | ME has been deleted | Sub | | Sub | | | | |
| 3 | ME GID | | ME has been updated | Send | | Sub | | | | |
| 4 | ME GID | | ME has been activated | | | Sub, Send | | | | |
| 5 | ME GID | | ME has been de-activated | | | Sub | | | | |
| 6 | ME GID | state (short) | ME has changed state | | Send | | | | | |
| 7 | Engine GID | ENG_GUID(GID) - The engine GID | Engine has started | | | Sub | Sub | Sub | Sub | Sub |
| 8 | Engine GID | | Engine has stopped | | | | Sub | | | |
| 9 | Engine GID | | Engine has been deleted | | | Sub | | | | |
| 10 | Engine GID | DNS_NAME(string) - Engine DNS name ENG_GUID(GID) - The engine GID | Engine has been evicted | Sub | | | Send, Sub | Sub | Sub | Sub |
| 11 | | | Request replication to start | | | | | | | |
| 12 | | | Replication started | | | | | | | |
| 13 | | | Replication stopped | | | | | | | |
| 14 | ME GID | | Monitoring policy has been updated (this includes determination policy as well) | | | | | | | |
| 15 | Engine GID | | Replication initilization of an engine | | | | | | | |

| # | ID | Parameters | Description | C1 | C2 | C3 | C4 | C5 | C6 |
|---|---|---|---|---|---|---|---|---|---|
| 16 | Engine GID | | Replication initialization has completed | | | | | | |
| 17 | ME GID | engine (GID) | Node has been assigned to engine (property) | Sub | | | | | |
| 18 | ME GID | engine (GID) | Node is being processed by backup engine (property) | Sub, Send | | | | | |
| 19 | ME GID | engine (GID) | Node is being processed by the primary engine (property) | Sub, Send | | | | | |
| 20 | Engine GID | Same as 10 | Engine has failed | Sub | | Sub | | Send | Sub |
| 21 | Engine GID | Same as 10 | Engine has recovered | Sub | | Sub | | Send | Sub |
| 22 | Engine GID | | Start Engine | Sub | | | | Sub | Sub |
| 23 | Engine GID | | Stop Engine | | | | | Sub | Sub |
| 24 | Engine GID | ENG_GUID(GID) – The target engine GID  COMP_ID(string) – any unique identifier  ELECT_TYPE(long) – Site or Subsite  ROLE_TYPE(long) – Master or Backup | Manager is promoted to master role | | Site, Sub | | | Sub | Sub, Send |
| 25 | Engine GID | Same as 24 | Manager is demoted from master role | | Site, Sub | | | Sub | Sub, Send |

FIG. 43C

| | | | | | | | | |
|---|---|---|---|---|---|---|---|---|
| 26 | Engine GID | Same as 24 | ELM Subscription | | Send | | Send | Send |
| 27 | Engine GID | Same as 24 | ELM Acknowledge promotion | | Send | | Send | Sub, Send |
| 28 | Engine GID | COMP_ID(string) – The components unique identifier ELEC_GUID(GID) – Random GUID ELECT_TYPE(long) – Site or Subsite ROLE_TYPE(long) – Master or Backup | ELM Election data. ELM internal use only. | | | | Send | Sub, Send |
| | | | | | | | | Sub, Send |
| 29 | Engine GID | Same as 24 | ELM Acknowledge demotion | | Send | | Send | Sub, Send |

| Icon | Description |
|---|---|
| | Disabled |
| | Running |
| | Warning |
| | Critical |
| | No Information |

| Icon | Description |
|---|---|
| | Display information allow configuration to be altered. |
| | Invoke WMI methods, scripts, jobs, or commands. |

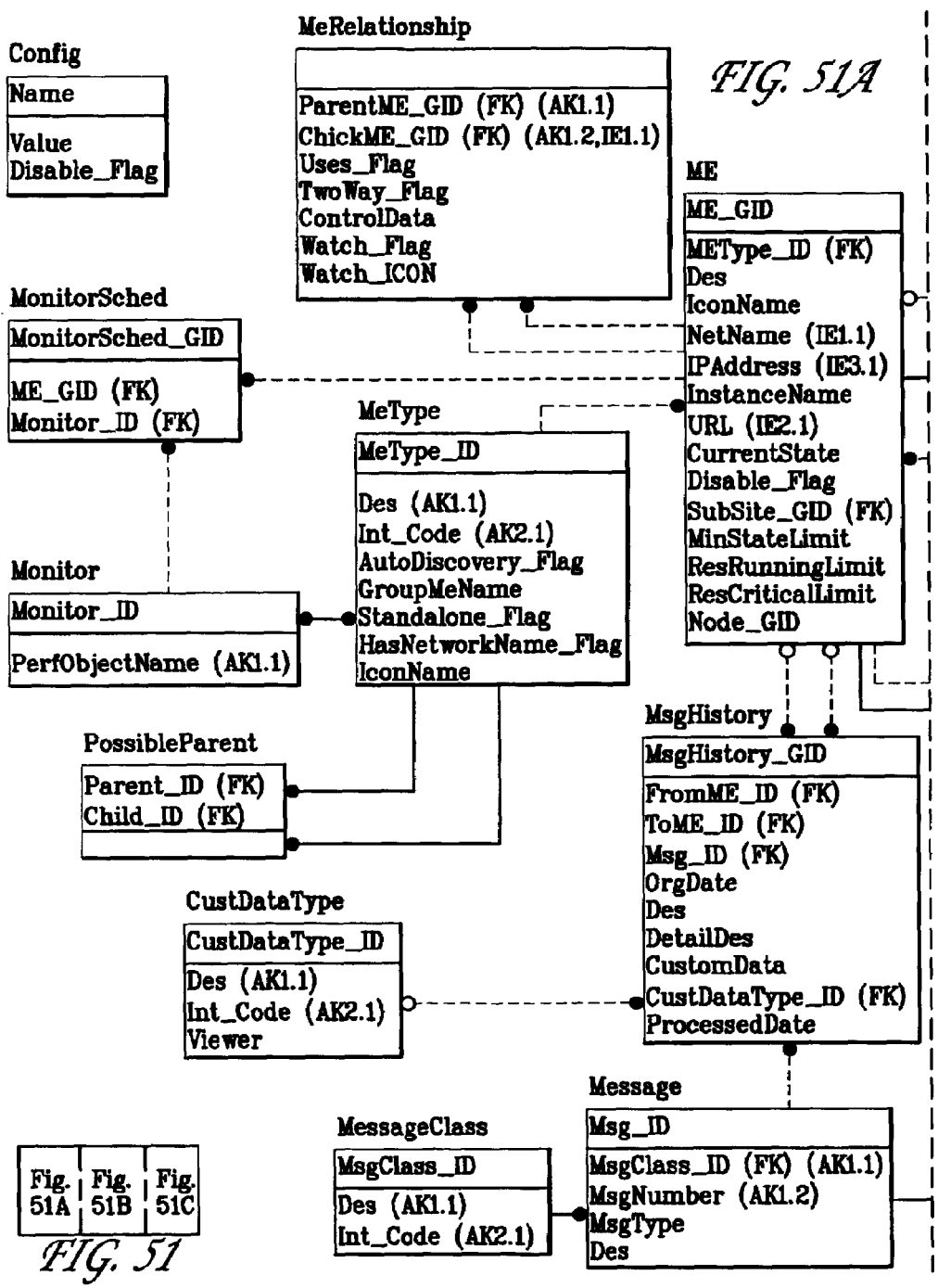

ENTERPRISE MANAGEMENT SYSTEM

RELATED APPLICATIONS

This application claims benefit of U.S. Provisional Application Ser. No. 60/206,014, filed May 19, 2000, entitled "Enterprise Management System" and U.S. Provisional applciation Ser. No. 60/185,443, filed Feb. 28, 2000, entitled "Enterprise Management System."

TECHNICAL FIELD

The present invention relates generally to the field of network management, and more particularly to an elegant system and method for monitoring and controlling large, growing and complex networks.

BACKGROUND OF THE INVENTION

With the use of networks and networking burgeoning, numerous applications requiring communications and access to remote data are being performed more efficiently and in an enhanced manner. Following this trend, many enterprises including banks, insurance companies, airlines and numerous other businesses have become ever more reliant on the timeliness and accuracy of data and applications run on a network.

Despite the productivity benefits arising from this widespread automation of tasks, as applications become more advanced, computer systems, and especially networked computer environments, are becoming ever more complex. The lack of standardization among network protocols, server platforms and individual application software typically remains a stumbling block to enterprise-wide integration of applications and data. When varied applications and services are integrated, component failures and down time often result. Moreover, in complex, integrated network environments, problems are often difficult to determine and the resumption of criticial services may take time, resulting in losses to the enterprise.

In an effort to manage complex network environments, network management systems have been developed by various software/hardware vendors. These conventional management systems are generally characterized as having a topology of a single central managing entity, which controls all the management systems. Centralized management is often implemented with one or more powerful computers that allow access to all components of the managed site, monitor all site nodes, and accept or raise alarms or notifications from such physical nodes. However, a centralized management system that is run from on one or two servers may often experience significant problems. Such systems lack scalability and create performance bottlenecks, thus making the centralized management system unsuitable for managing very large, rapidly expanding sites. Moreover, because a single point of potential failure exists (i.e., the management server), such systems often lack the availability and robustness warranted given the importance of the applications and data typically stored on an enterprise network. Moreover, such conventional network management system are limited in that the focus is often on managing and controlling physical elements (e.g., nodes connected to the management server), rather than the more abstract concepts of interest to users and site administrators (e.g., the health of services, applications). In addition, in the event of error or component failure, the lack of intelligent differentiation amongst software applications and services often makes determining the problems a more difficult task.

In view of the above, there is a need for an improved management system that overcomes the limitations of the prior art. In particular, there is a need for a scalable management system that is capable of managing a large number of servers over a wide geographic area. There is also a need for a management system that is robust, and that provides intelligent, meaningful feedback to the site administrator in the event of failure. The present invention provides a solution to these problems.

SUMMARY OF THE INVENTION

The present invention is directed to a network management system and method performed at a network site that includes a manager engine computer capable of monitoring, storing and acting upon, network state information. The network state information is organized as a series of relationships among managed network elements. The managed network elements may include physical nodes connected to the manger engine, applications, subroutines, services, required data or any other element located or peformed on the network, whether physical or logical in nature. The managed network elements assume one of a set of predefined states, thus indicating an error or the potential for failure arising from a managed element.

The manager engine is connected to a client, which is capable of providing a user with the network state information stored at the manager engine. The manager engine may also be connected to other manager engines, each assigned to monitor respective managed elements, usually including connected physical nodes. The connected manager engines may communicate with one another so that, for example, in the event of a failure, one of the manager engines remaining on line commences monitoring of managed elements assigned to the failed manager engine.

In addition to basic managed element state monitoring functionality, the manager engines may provide users with a variety of automated features ensuring the health of the network and optimal failure correction in the event of a problem. For example, the manager engine may perform root cause analysis utilizing an algorithm tracing through manged element relationships and indicating the source of a failure, whether logical or physical in nature. The engine managers may include audit service functionality, automatically logging network events leading to failure and further facilitating the early detection of any potential errors. Again, the site administrator may have access to such audit information via the client.

Preferably, the client interface displays relationships among managed elements using meaningful connectors and tree-like structures. Such interfaces further enhance error detection and remediation by a site administrator.

Thus, one adavantage of the present invention is that, by distributing management components, it eliminates or reduces performance bottlenecks, single point of failure issues, and allows independent network scaling.

Another advantage of the present invention is that, by facilitating communication among distributed manager components and self assignment of managing tasks by such components in the event of a detected failure, the mangement system achieves enhanced availability and robustness.

Another advantage of the present invention is that, because the basic monitored unit (managed element) may be a logical or software component as well as a physical component, the system can provide more detailed, intelligent information relating to failure events or potential failure events.

Another advantage of the present invention is that it provides an automated audit storage component, thus providing further useful information relating to events potentially leading to problems.

Other advantages of the present invention will become apparent from the more detailed description below.

BRIEF DESCRIPTION OF THE DRAWINGS

FIG. 43 illustrates an exemplary message master list which may be used by a management system in accordance with one aspect of the present invention.

DETAILED DESCRIPTION OF THE INVENTION

The present invention is directed to a single network management system, which allows administrators to monitor and control physical and logical elements (i.e., managed elements) comprising the network. The enterprise manager system may preferably use any of the following technologies: a) DDS (DaVinci Designer Space) version 7.0; b) WMI; c) Enterprise Event Logs; d) Core infrastructure; e) WMI Providers; f) SQL Server; g) IIS; h) Healthmon; i)Win32—Processes; j) Win32—Memory; k) Win32 Network; l) Win32—Disk storage; m) Win32—Hardware; n) Win32—Event Log; o) Win32—Security; p) COM+; q) Active Directory; r) DHCP Server; s) WINS Server; t) DNS Server; u) Job Object; v) SNMP; w) Exchange; x) Terminal Server; and y) Cluster. In addition, the enterprise manager system may preferably incorporate use the following protocols: a) WMI for all management functions (DCOM); b) SNMP for non-MS platforms; c) MMC for client access with Web interfaces using DDS; d) MSDE (SQL Server) for operational and performance data storage; e) MSMQ; f) DCOM; g) Perfmon; h) HTTP (IIS & IE5.x); and i)XML. However, while the invention is described with respect to specific network, server and database architectures, platforms and protocols, it should be understood at the outset that the scope of the present invention is by no means limited to those contexts.

I. Overall Network Architecture

Figure 1:
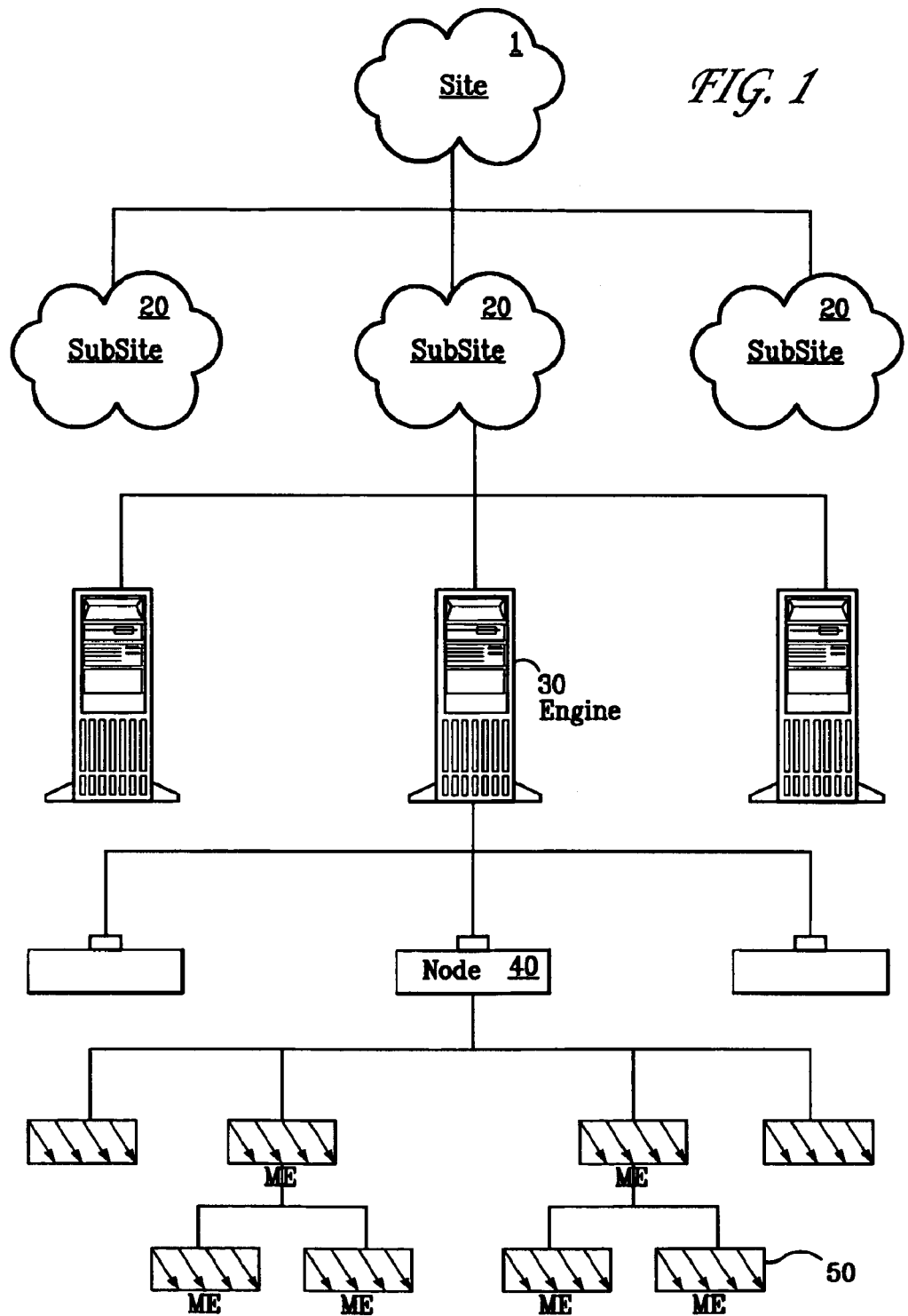
FIG. 1 depicts an overview of a network organized in accordance with an embodiment of the present invention.

FIG. 1 depicts an overview of an organization of a network in which an embodiment of the present invention may be implemented. In particular, the network system illustrated comprises logical and physical components. The top most component is the Managed Site (10), a logical entity, which is composed of a number of Sub Sites (20) in a one to many relationship. A Sub Site (20) is a logical component, which is composed of a number of Engines (30). An Engine (30) is a physical component. It is the channel through which monitoring occurs. An Engine (30) can be in one Sub Site (20)—a one to many relationship. An Engine (30) is the focus point for the monitoring of Managed Elements (50) which belong to a Node (40). An Engine (30) therefore can be thought of as a collection of Nodes (40). A Node (40) is a physical component but from the perspective of certain software components of the Engine (30) to be described later, it is a logical entity that describes the physical one. A Node (40) relates to its Engine (30) in a many to one relationship. A Node (40) is a collection of Managed Elements (50) (while being an Managed Element (50) itself) with the restriction, in the presently illustrated embodiment, that a Node (40) can only be monitored in one Sub Site (20). Thus, in the embodiment illustrated, all Managed Elements (50) relating to a Node (40) must be monitored by the same Sub Site (20). A Node (40) relates to its Managed Elements (50) in a one to many relationship.

II. Overall Subsite Architecture

Figure 2:
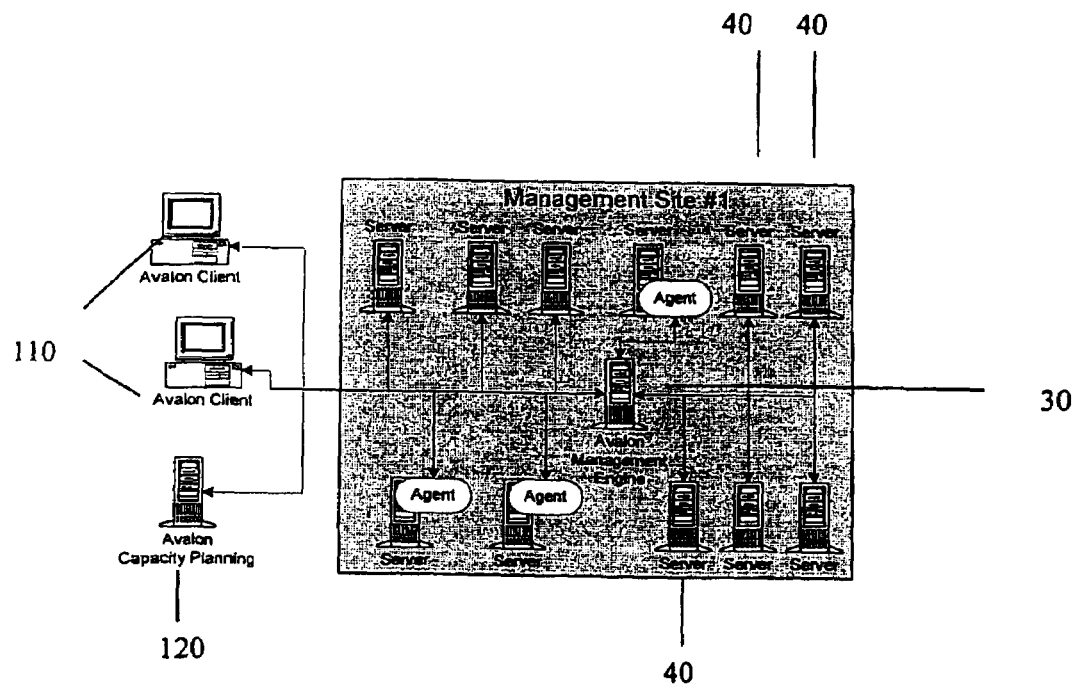
FIG. 2 shows a more detailed illustration of a managed sub site depicted in FIG. 1.

Turning now to FIG. 2, it shows a more detailed illustration of a managed sub site (20) depicted in FIG. 1. In particular, the subsite (20) consists of the engine (30) connected to server nodes (40). One or more clients (110) are connected to the management engine (30) and access management engine (30) information relating to managed elements (50) including nodes (40). The Network client (110) here illustrated is preferably an MMC snap-in application running on a computer. In FIG. 2, two network clients (110) using the services and data of both the Network Management Engine (30) and a Capacity Planning server (120).

Figure 3:
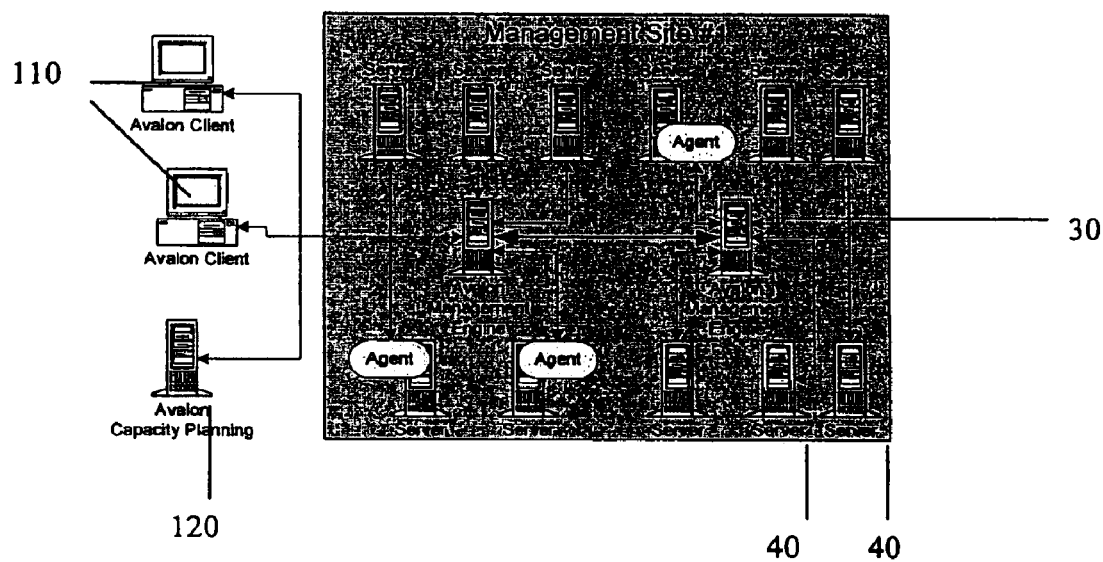
FIG. 3 illustrates a more detailed illustration of a managed subsite depicted in FIG. 1 in which the site is managed by more than one engine.
Figure 4:
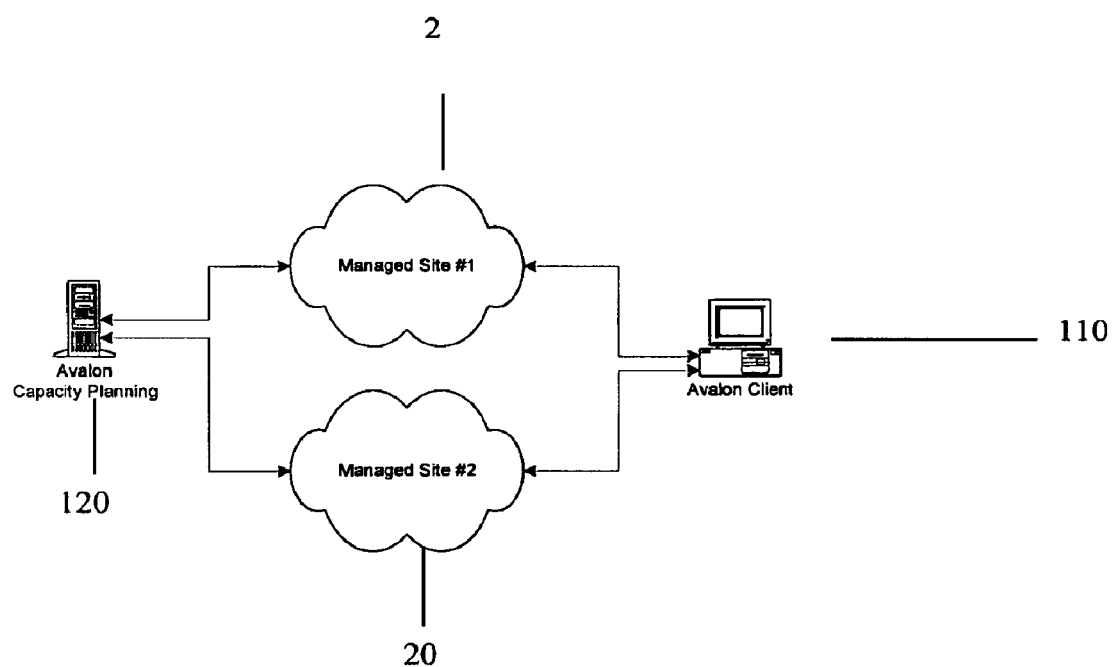
FIG. 4 illustrates two managed subsites depicted in FIG. 1 which are both accessed separately by a single client and capacity planning server.

A management site or subsite (20) is managed by one or many Network Management Engines (30). If there is more then one engine (30) available, the client (110) still only connects to a single engine and therefore will be dealing with one complete set of data and view. It is up to the engines (30) to keep each other up to date and make sure that all the clients have a complete picture of the entire managed site. FIG. 3 illustrates a more detailed illustration of a managed subsite (20) depicted in FIG. 1 in which the site is managed by more than one engine (30). In accordance with one embodiment of the present invention, FIG. 4 illustrates two managed subsites (20) depicted in FIG. 1 which are both accessed separately by a single client (110) and capacity planning server (120).

The manager engines (30) may use Active Directory technology to employ auto discovery for servers and services installed in the enterprise. As an example, an SQL Server node (40) is installed and it registers itself in the Active Directory. The manager engines (30) system will watch for this type of activity and automatically create a new managed element (50) and notify support personnel.

a. Subsite Architecture Detail—Managed Elements

A Management Element ("ME") (50) is a single conceptual management point. ME (50) can represent a wide range of objects, such as: a) a computer or physical node; b) an application; c) a resource grouping; d) an event, error, root cause analysis reference; or e) an external interface with the management site or other point.

In the presently described embodiment, an ME (50) has the following basic information.

| Information | Description and Use |
| --- | --- |
| Display Name | Display name of the ME and is used by clients and reports. |
| GUID | Unique ID used for referencing the specific ME. |
| ME Type | Type of ME (Resource, Base ME, etc . . . ) |
| Parent ME Type | Type of parent that the ME is dependent on like a SQL database must have a parent that is a SQL Server. There can be more than one parent ME type. |
| Interface Object | The ME's interface object that handles and will abstract the management of the element. |
| Properties | Named + Value properties |
| Policies | Instructions on how to execute commands, how to react to specific messages, maximum state propagation, etc . . . |

A Base ME is a well-known (usually pre-described) description of management object that is used to build a management group. These types of elements have management information imported into the system that will allow it to understand how to gain access to the element's information and commands. If the ME is managed by WMI then the imported information will describe what WMI object to use, what events to setup, and what commands to execute.

The following is a list of some base ME's in accordance with various embodiments of the present invention: a) SQL Server; b) SQL Database; c) DHCP Service; d) DNS Service; e) Active Directory Service; f) Domain Server; g) COM+Server; h) File Server; I) Printer Server; j) RAS Server; k) File Share Point.

Figure 5:
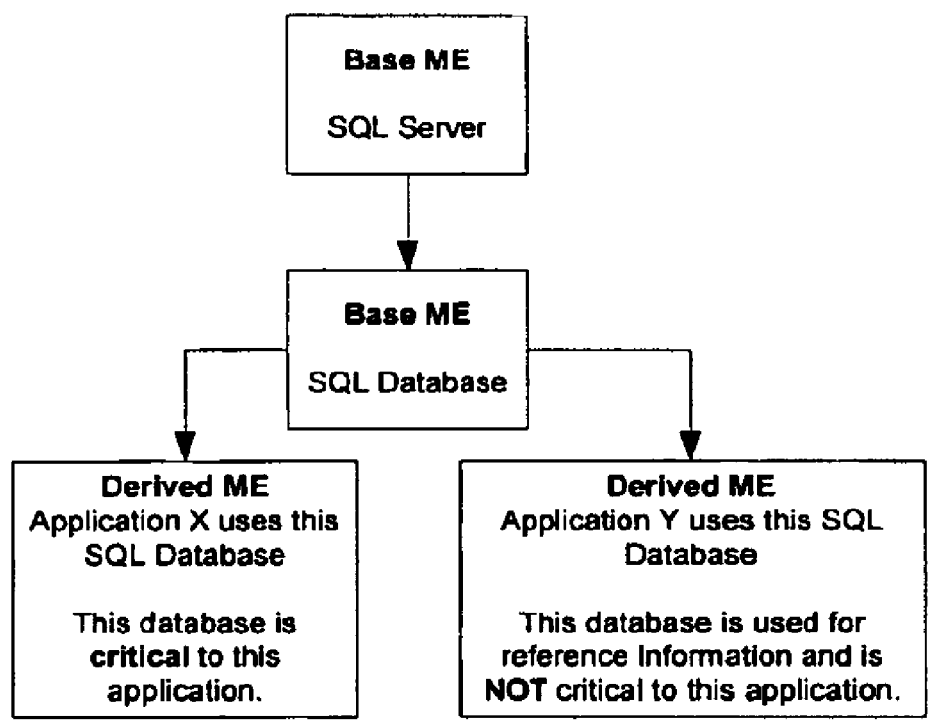
FIG. 5 illustrates how a Derived Managed Element derives or inherits information from a Base ME.

A Derived ME adds additional information to a base ME. It will still reference a specific instance of a Base ME but will provide additional properties and information that is directly related to how the Base ME is being used by the application. FIG. 5 illustrates how a Derived ME derives or inherits information from a Base ME. In that Figure, there are two base MEs, SQL Server and SQL Database. When an application is installed it will create a derived ME that will reference the Base ME. It will also add additional information, properties, and policies that will support the application using the specific resource. In the example illustrated in FIG. 5, there are two applications that are using the same database. One has a critical need and the other just uses its information for reference. If the SQL Server went off line for some reason, in the presently described embodiment, the management system would propagate a "critical" state for application X and a "warning" state for application Y. This type of information will allow support personnel to prioritise their work based on business needs.

An Application ME describes a pre-packaged application that can be executed and will use resources in the managed site. An application ME will reference other MEs that will eventually reference Base MEs like a SQL database. These relationships will describe to the system the topology of what the application and what resources it will need when it is installed.

The following are possible examples of application ME's: a) Congo for ITG; b) SAP; c) CITS (Customer Information Tracking System); and d) Beta Program.

A Resource ME is an element that controls a set of resources that provide the same service. It will contain rules that allow the management system to figure if the redundant resources are above or below a critical level. The following is a list of some types of possible resource ME's: a) Group of SQL Servers; b) Group of DHCP Servers; c) Group of Mail Pumps services; d) Group of Print Servers; and e) Group of File Servers.

A Reference ME is usually a short-lived element that allows the user to drill into management system that describes some type of information that needs to be managed. One use for this type of ME is the result of a root cause analysis. The operator can drill down using this reference to see what the problem is and what resources are being affected. The following is a list of some types of Resource ME's: a) Root Cause Isolation; b) Problem short cut; c) Tracing activity; and d) Job execution.

An External Interface ME is a type of placeholder used in an application diagram that will show where the external interface(s) are located. This will allow the management system to understand at what point does the application impact the user. It is also used to calculate where the implicit state propagation points are. The following are some of the types of External Interface ME's: a) Client application; b) Web application; c) Data message stream; and d) Satellite data fee.

Any ME, service, outside application, etc. can send a message to the management system. Likewise, any service can subscribe to specific messages to extended the management system or add application capabilities. Business Messages are events received by the management system that inform it of business activities. As an example, a process (clock) can send a business message that states the market is open. This message can enable a specific ME, thus informing the management system to start paying attention to a trading system. Likewise a business message that states the market is closed would disable the specific ME.

Here is an example of a Business Message flow:
  Market open → Enable and/or start the trading application and monitoring
  Market close → Disable and/or stop the trading application and monitoring A managed group is a collection of MEs that represents a complete application or service, or a logical subset. In a managed group the MEs must have an operational relationship with each other. This information is used by the management system to figure out how to propagate states to dependent groups or ME.

A ME in the management system will usually have a relationship to one or more MEs. The management engine uses relationship information to perform several activities including root cause analysis.

Basic state propagation rules are based on relationship between MEs. These rules govern how state is propagate from one ME or managed group (collection of ME) to another. The basic premise is that if you correctly model the real relationship of services and resources, the management system can use this information to understand if a service or application is running, or if there is a problem, what is the most likely cause.

Figure 6:
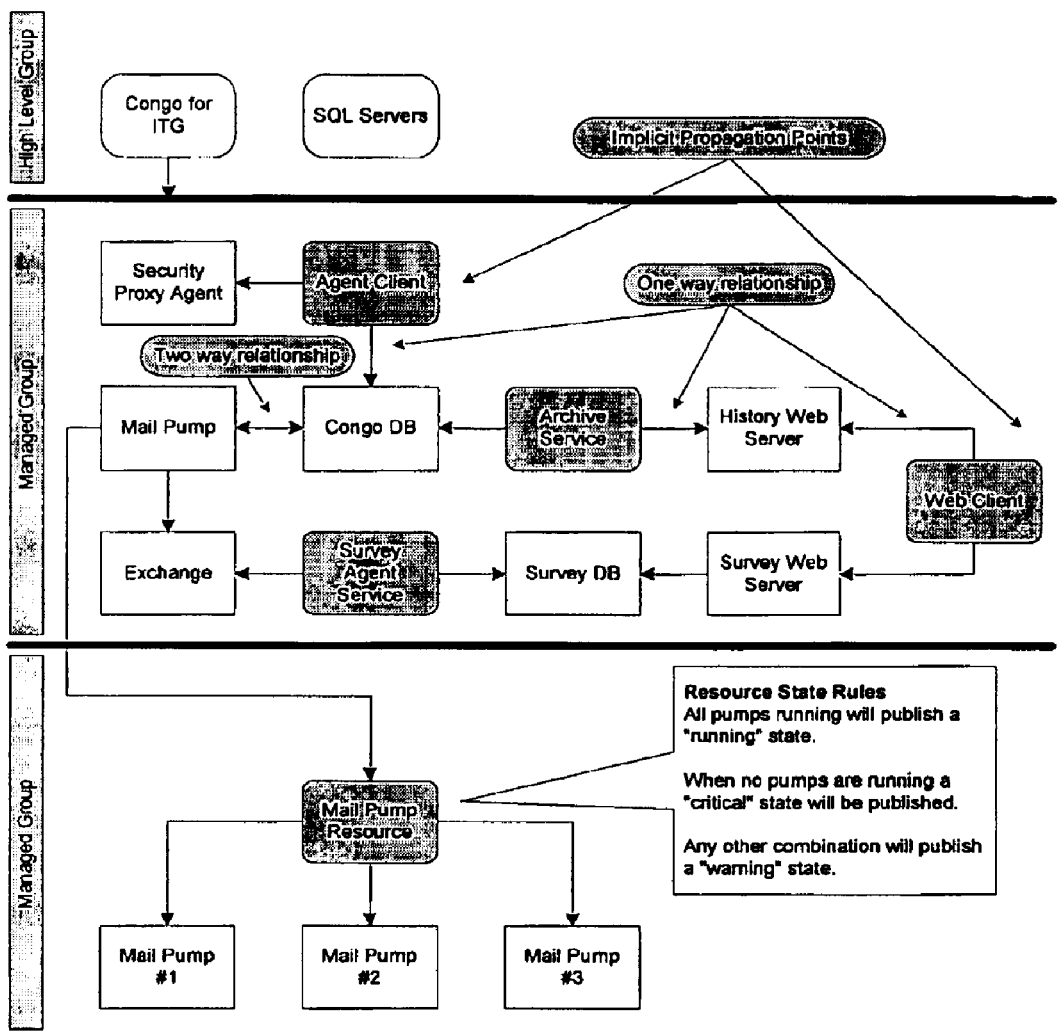
FIG. 6 illusrates an exemplary set of relationships, in the form of state propagation rules, among the Managed Element's depicted in FIG. 1.

FIG. 6 illustrates an exemplary set of relationships, in the form of state propagation rules, among the ME's (50) depicted in FIG. 1. In FIG. 6, the services and resources illustrated belong to the application "Congo for ITG". At the top level is a single ME that represents the application and will display its aggregated status. This ME will also allow the support personnel to issue commands that effect the application.

Implicit State Propagation Point

Implicit state propagation point is a ME that will push its state status for the managed group. In the example illustrated in FIG. 6 there are actual four implicit propagation points, the "Agent Client", "Web Client", "Archive Service", and the "Survey Agent Service". Implicit propagation points are identified by ME's that no other ME's in the group have a dependency on.

One-way Relationship

One-way relationships indicate that the ME is dependent on the related ME in some fashion. This could mean that the ME uses the other ME's services or that it receives data from the ME. In other words, the ME that is dependent on another ME cannot operate without the other ME running. Likewise, the other ME can operate without the other ME running.

Two-way Relationship

Two-way relationships indicate that the MEs are dependent on each other and neither ME can operate effectively without the other.

Explicit State Propagation Point

A resource ME can be used to provide an explicit propagation point that can have policies that control what state to publish. In the above example the "Mail Pump Resource" ME has three rules or policies. The policy requires that all mail pumps must be operating in order to publish a "running" state. If none of the mail pumps were operating, it would publish a "critical" state. Any other combination would publish a "warning" state.

The resulting state would be pushed up to the "Mail Pump" ME in the middle layer, which in turn would push its state to the application ME at the top level.

It is possible to perform root cause analysis using the ME relationship information. This would allow the engine to figure out what is the primary cause of the problem based on the messages that the management system is receiving or generating.

In the above FIG. 6 the "Congo for ITG" application uses two SQL databases but it does not really show which SQL server these database reside on. The management system would have another model, which would group the SQL, database together based on SQL Server. Using both sets of information it is possible to figure out the dependencies.

If a specific SQL Server fails and it provides the database services that several applications are using, each application that it supports and the SQL Server itself would generate "critical" messages. Using the application's information and the SQL Server resource group, the management engine would see that the common point is the SQL Server and would create a Reference ME. The reference ME would point to the SQL Server which is the problem and would also provide links to the resources that are being affected.

Also since the management system understand the ME's relationships, the operator could drill down and research all the applications that the SQL Server was affecting.

To effectively manage an application and services, the system must understand what its structure is, where the components or services are located, and what each is dependent on. There are at least two ways to collect this required information and both way are preferably supported.

With respect to the first way, profiles are like templates that provide all the structure information but do not specify the resource identifiers. The profile would state that the application requires two databases, and maybe the required database name, but it would not specify the server name. When the application is installed the management system would require the support personnel to fill in the blanks before it could effectively manage the application.

Profiles specify several pieces of information beside structure. The following is a list of some of the information that can be specified: a) Application structure (types of resources and servers, dependencies, etc; b) ME specific information (base ME, messages to look out for and how they effect the state rating (error, events, application msg, etc)); c) Reactive Policies (react to msg and execute jobs or scripts); d) Configuration Policies; e) Monitoring Policies (how to detect healthy running state); f) Proactive Policies (jobs or scripts that watch the health of the system); and g) Business critical rating for the application—how important is the application.

The support personnel can also use the management tools to interactively setup the application structure and policies.

The management system should preferably support backup and resource capabilities. In addition it should also preferably support import and export of specific application or resources.

With respect to the second way, the management system can also dump state of some or all of its MEs to provide a base set of information. Message histories can then be used to analyze the system as a whole as the management site supports the application and users.

Preferably, clients will provide several management views and tools that will help the support personnel to organize their activities.

Job Status and Alert Display

A job status and alert display post current problems like a down server along with who is working on it, what is its problem, and what is the ETA.

Alert View

The console can come with some pre-configured management views like a view that will only display current problems. Root cause analysis will create a temporary ME that point to the problem and which will be displayed in the alert view.

b. Subsite Architecture Detail—Client i. Client Overview

Client Installation

In the presently described embodiment, the client can be installed on all versions of Win2K, but not on NT 4.0 or Win9x. The MSI will install the following client components (it is assume that OLEDB for SQL is already be present with the OS): (1) MMC snap-in; (2) Network's Active X components; and (3) DDS components.

Client Components

ME ICON Control

This control provides the user interface for each type of ME. State icons are displayed in the lower left of the ME icon.

MMC Snap-In

In the presently described embodiment, the snap-in integrates the Network system into the MMC framework. Again in the presently described embodiment, it provides the UI and admin features for the Network system. The MMC Snap-In application preferably features: a) support DDS control; b) provide a wizard for adding an Engine and Interrogate the Active Directory for potential Management engines; c) provide a wizard for removing an Engine; d) provide a wizard for adding a ME object via a template or known topology requirement and interrogate the Active Directory for potential resources such as SQL Server; e) provide a wizard for creating a group; f) provide a wizard that allows the user to add ME to a group; g) provide support for the 5 primary views in right pane—Large ICON, Small ICON, List, Detail, and DDS (dependency); h) provide features that allow the user to describe use dependencies; i) provide support for application template support; j) provide a wizard for importing and exporting ME information; k) provide a wizard for managing properties for each ME; and 1) provide a wizard to setup monitoring policies for a ME.

Preferably the following views are supported: a) Managed Groups; b) Virtual views based on ME relationship (required and uses); c) Dynamic Groups based on a SQL query; d) problem display—ME that are critical or warning, root cause analysis result; e) trouble ticket interface (incident); f) ME Properties with query wizard; g) ME History with query wizard; h) System tracing (debug control) view; i) System message view; and j) SLA Reporting.

Client Interface

In the present described embodiment, there are basically two client interfaces to the Network Management system. There is the WMI object interface and the graphical UI presented in MMC and IE.

MMC

The MMC presents a graphical depiction of the MEs and their state. The top level of the MMC scope will list the managed views. The right pane will display the ME icons, which is really an interactive control that provide the interface to the management elements. These ME icons will immediately show the user what the aggregated status is and provide an interface to the properties, aggregated views, and commands.

Figure 44:
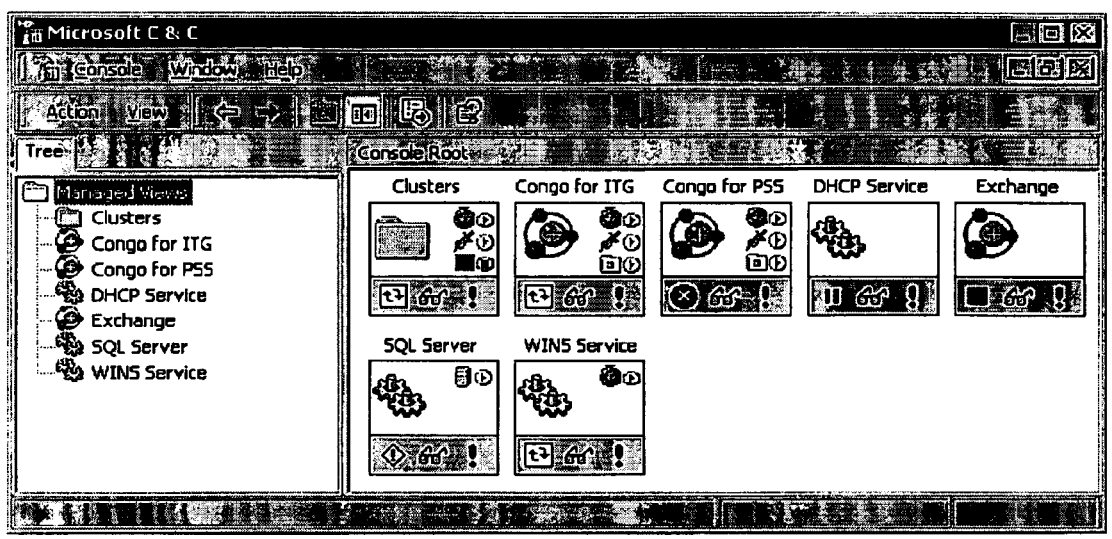
FIG. 44 illustrates an exemplary interface used by the client component shown in FIG. 2 in accordance with one aspect of the present invention.

FIG. 44 illustrates an exemplary interface which may be used in a client component in accordance with one aspect of the present invention. For example, FIG. 44 displays in the right pane is showing two different types of MEs, resource and application. All of the ME's represents managed groups.

| ME | Type |
|---|---|
| Clusters | Resource |
| Congo for ITG | Application |
| Congo for PSS | Application |
| DHCP | Resource |
| Exchange | Application |
| SQL Server | Resource |
| WINS Service | Resource |

Drill Down

In the above display the user can immediately see the overall operational status of all the managed elements (ME). If one of the icons shows a problem the operator can drill down to show what managed elements are contributing to the problem.

In the above example there is two applications listed, "Congo for ITG" and "Congo for PSS". While these are the same application there are two instances installed, with each using their own IT resources. Double clicking or executing the drill down command will cause the console to display the children of the virtual ME.

Figure 45:
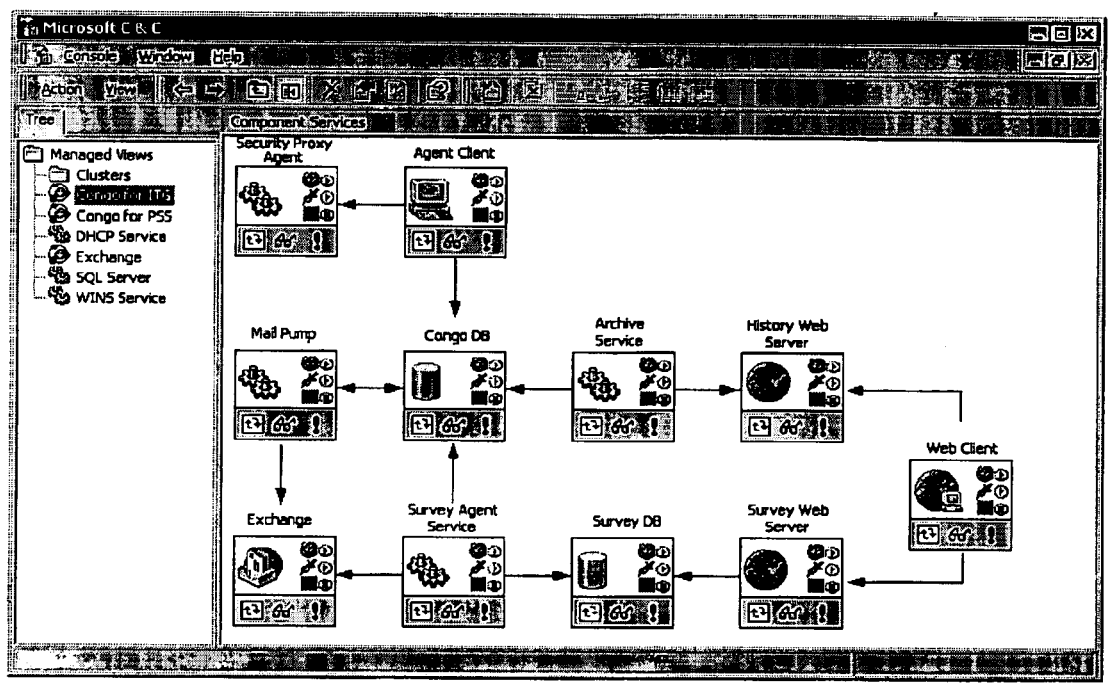
FIG. 45 illustrates a user interface used by the client component shown in FIG. 2 in accordance with one embodiment of the present invention.

FIG. 45 illustrates a user interface which may be used in a client component in accordance with one embodiment of the present invention. As illustrated in FIG. 45, Network System will show the elements that make up the "Congo for ITG" application. Along with the icons, the console may also display the relationships that each ME has with other ME(s). In come cases two MEs can have a relationship with each other that really indicates information flow. Note that in the example the "Mail Pump" icon has a one to one relationship with the "Congo DB". This is telling the management system that the application cannot run unless these two resources are up and running.

This application will also support multiple instances of specific services like the "Mail Pump". Specifically this application has three types of service that can have multiple instances. Drilling down again shows the dependency structure and allows the operator to interact each managed element.

Figure 46:
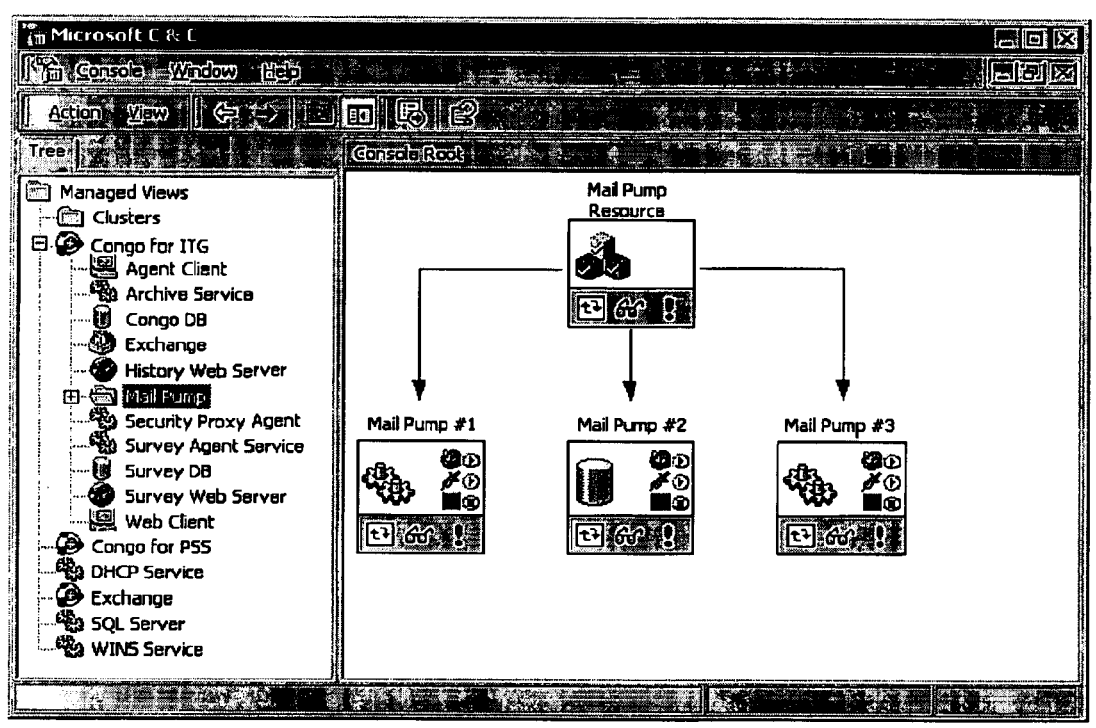
FIG. 46 illustrates an exemplary user interface used by the client component shown in FIG. 2 in accordance with one embodiment of the present invention.

FIG. 46 illustrates an exemplary user interface which may be used in a client component in accordance with one embodiment of the present invention. As illustrated in FIG. 46, client station is showing a resource ME that controls how the mail pump services as a group are managed.

ME Icon Layout

Figures 47, 48, 49:
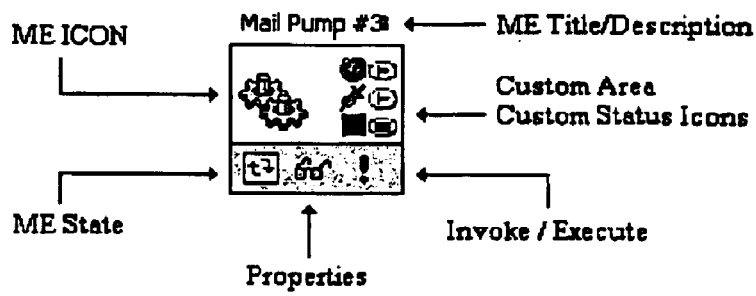
FIG. 47 illustrates the information conveyed by an Managed Element icon in accordance with one aspect of the present invention.
FIG. 48 illustrates possible Managed Element state icons in accordanc with one aspect of the present invention.
FIG. 49 illustrates possible action icons.

FIG. 47 illustrates the information conveyed by the ME icon in the present embodiment. State icons are displayed in the lower left of the ME icon. Possible state icons are illustrated in FIG. 48. Action icons let the user quickly inquire, change a configuration, or invoke a command or WMI method. Possible Action icons are illustrated in FIG. 49.

Resource ME

The top icon in the "Mail Pump" display above is another example of a virtual ME that is configured to understand several operational parameters. Some of these rules control how the management system propagates health state (running, warning, and critical). Some of the potential rules are outlined as follows: a) how many healthy resources are required to show this resource as running; b) how many healthy resources are required to support basic functionality (this is used to figure out if the resource is critical or a warning state should be propagated).

ME Properties

When an operator execute the property ▓ icon, the ME's properties are displayed. The MMC console can do several things based on the ME configuration stored in the management database, e.g.: a) display a dialog box that displays and may allow the user to modify the ME properties; b) dialog boxes can be tabbed as well as implemented as wizards; or c) display a Web page that basically acts like a dialog box.

There are several ways to allow the operator to see the properties, change configurations, and issues commands. The MMC console can display ME's properties using standard dialog boxes and other techniques. Some of these possibilities are listed as follows: a) launch standard MS MMC console passing the target information; b) launch a windows executable passing the target information on the command line; c) launch a MMC console passing the target information on the command line; d) display an OLE property page dialog box; e) display a generic WMI property page control; f) open a command window (cmd or telnet) to the target server; or g) open a web page for the target.

Web Page Properties

There are several advantages to using Web technology as the primary interface for managed element's properties including: a) server based support will result in a smaller client footprint; b) broadens the number of people that can extend the Network Management System (this is primarily due to the fact that the hardest issue to adding a new managed element is creating the management interface); and c) easier to update and maintain because of the web update technologies.

Aggregated Displays

An aggregated display will allow the support personnel to see information from several sources, displayed in a single control or window.

The following are standard aggregation displays. Each type of display is control by a profile that will allow for filtering and specifying targets.

| Type | Description |
|---|---|
| CPU Utilization | The CPU utilization would display all the CPU |
| Event | Display the events for all supporting services and |
| Object Type | Display performance or event counters for any |

ME Execute

A floating menu is displayed when the operator clicks on the ▓ icon. Any type of execution command including scripts can be hooked up to this icon. Even though the user can change configuration using the properties icon, the commands available through execute icon can be also executed on all the children of the ME.

In the above example for the "Congo for ITG" application, it would be possible to create scripts for each ME that would start and stop each service. The operator can then chain these commands together using the dependency information. When the operator execute the "start" command on the top ME icon, all the children icon will also get their "start" command executed in the order specified by the dependences and other configuration information.

Management Consoles

The management console usually provides the primary interface with user for the management system. Consoles communicate with management servers via standard protocol (WMI). Management consoles may be responsible for: a) logging in and authenticating users (network support personnel, administrators, etc. . . . ); b) providing access to all management servers and functions; and c) provide response back to the user, display current status of management elements, etc.

Network Client

The Network client support is composed of three parts, a MMC snap-in application, API (scriptable) interface, and applets. There is no imposed limit to the number of Network clients that the management system can support.

MMC Snap-in Application

MMC snap-in is a root object that provides a graphical UI interface for managing the enterprise. This snap-in will use the API interface and along with the ME applets will provide the primary UI interface for Network.

API Interface

All Network services should preferably present a management and data interface. All management interfaces should be provided by implementing a WMI provider. Approaching the requirement this way will also provide customers with the documentation of the management objects (schema, WMI object browser, etc. . . . ), infrastructure support, and scriptable interface. Where every possible, all data interfaces should preferably be provided by a WMI provider (High Performance Interface). Where this is not practical the interfaces should be Automation COM objects.

Graphical Interface

Graphical interface can present a large amount of information and in some cases are easier to use the non-graphical interaction. Graphical interface can be, for example, a Web page, custom control, or custom application.

ii. Client—Managed Element Control Component

The primary responsibility of the Managed Element Component in the presently described embodiment of the present invention is to display graphically the state of the Managed Element, to provide user interfaces for activating/invoking actions and to modify the properties of the control.

Figure 50:
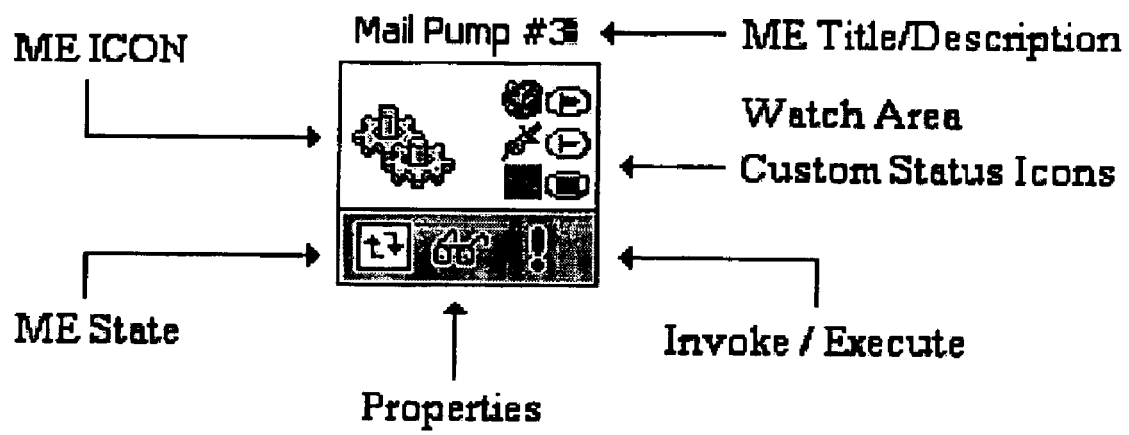
FIG. 50 illustrates an exemplary Managed Element icon.

For the purposes of illustrating an embodiment of the present invention, the icons for the command are assumed to be fixed. The command will be referenced by an id which will have a predefined icon name which can not be changed by the user. In this embodiemnt, this is a single COM component that will be used in DDS The Managed Element Control Component is primarily responsible for graphically representing the state of the element and to provide user interfaces for setting and viewing the properties. It also should provide a user interface for activating or invoking action commands for the control. It should provide an interface to the aggregated view which will be used to display the custom status icons. FIG. 50 illustrates an exemplary ME icon.

The following items represent in the present described embodiment an ME: a) ME Title/Description (each ME has a title which will be displayed on the top of the icon); b) ME ICON (each ME type will have its own icon so that it can be easily identified). Users can select any image to represent the element, there are a few ways this can be achieved, the control can maintain a list of images and the icon can be selected at any time and it can be remembered, the other icons for State, Properties and custom icon can also be stored; and c) ME State (each ME can be in one of five possible states). The state of an ME is displayed as an icon at the bottom left corner of the control. The table illustrated in FIG. 48, lists possible values and corresponding icons.

ME Properties

This is a button and so when the user left mouse clicks on it, it will send an event to the container to show a user interface to manipulate the properties.

ME Action

This is represented by an icon and when the user right clicks on it the control will display a list of commands in a drop-down menu. The user can select an item in the menu and it will generate an event to the container/client. The menu can have separator items in between commands.

Interfaces

The ME Element will provide two interfaces in the presently described embodiment. The first interface is used to set/read the properties of the component. The state of the control can be get/set. Other properties are read only properties which will be used by the container and they do not need an user interface. The interface may have methods to Add, Remove commands in the commands drop down list. It should be possible to set, command text, id and icon for the menu item. This interface may also have methods to get the count of commands and get command by an index.

The second interface in the presently described embodiment is a connection point interface which will send events to the container so that it can be processed by the container. This interface may send an event when one of the following happens: a) any Keyboard Event; b) the user right mouse clicks on the Action Icon; c) the user selects a command from the action menu; d) the user double clicks on the control; e) the user right mouse clicks on the top portion of the control (to generate context sensitive menus by the owner.)

Component Interface

The owner of the process uses this interface to set/get the properties, to add, remove commands in the commands drop down list, to get the count of available commands and get a command by an index.

The following are possible classes and methods associated with the Managed Elemement Control Component.

Class INetworkMEControl
{
  public:
  //Methods
//Properties
  BSTR m_strMEIconName;
  UINT m_nCustomIcon1;
  UINT m_nCustomIcon2;
  UINT m_nCustomIcon3;
  BSTR m_strMETitle;
  Short m_nMEState;

HRESULT AddCommand(BSTR strCommandText, short nCommandId, BSTR strIconName);
HRESULT RemoveCommand(BSTR strCommandText);
HRESULT GetCommandsCount(short &nCount);
HRESULT GetCommandByIndex(short nIndex, BSTR &strCommandText);
Private:
HRESULT OnDrawAdvanced (ATL_DRAWINFO &di);
}

Note that to support property change notifications derive this control using the IPropertyNotifySink interface.

Property: m_strMEIconName Type BSTR

This property can be used to set the icon name of the control.

Property: m_nMECustomIcon1 Type UINT

This property can be used to set the icon used to set the first custom icon.

Property: m_nMECustomIcon2 Type UINT

This property can be used to set the icon used to set the second custom icon.

Property: m_nMECustomIcon3 Type UINT

This property can be used to set the icon used to set the third custom icon.

Property: m_strMETitle Type BSTR

This property can be used to set the title of the ME.

Property: m_nMEState Type short

This property can be used to set the state of the ME.

Method: HRESULT AddCommand

This method can be used to add a command to the drop down list of commands in the control.

RESULT AddCommand (BSTR strCommandText, short nCommandId, BSTR strIconName);

| Parameter | Description |
|---|---|
| Return | HRESULT |
| StrCommandTe | Command Text |
| NcommandId | Position of the command in the menu |
| StrIconName | Name of the icon to denote the menu command |

Method: HRESULT RemoveCommand

This method can be used to remove a command from the drop down list of commands in the control.

HRESULT RemoveCommand(short nIindex);

| Parameter | Description |
|---|---|
| Return | HRESULT |
| Nindex | Command Index |

Method: HRESULT GetCommandsCount

This method will can be used to get the count of active commands added to the menu.

HRESULT GetCommandsCount(short &nCount);

| Parameter | Description |
|---|---|
| Return | HRESULT |
| Ncount | This will return the count of commands available |

Method: HRESULT GetCommandByIndex

This method can be used to retrieve a command from the list of active commands in the control using an index.

HRESULT GetCommandByIndex (short nIndex, BSTR &strCommandText);

| Parameter | Description |
|---|---|
| Return | HRESULT |
| Nindex | Index of the command in the commands list |
| StrCommandText | The command text of the retrieved command |

Connection Point Support Interface

This interface can be used to fire events to the owner of the component when one of the following happens: a) a Key is pressed; b) a RightMouse Click on the Action Icon; c) a Click on the menu item in the commands list; d) double Click on the Control; d) RightMouse Click on the top portion of the control. The following is sample code which may be associated with the connection point interface.

Class INetworkMEEvent
{
  public:
  void Fire_OnKeyPressed(long wParam, long lParam);
  void Fire_OnRightClick( );
  void Fire_OnCommandInvoked(short nCommandId);
  void Fire_DoubleClick( );
}

Method: Fire_OnKeyPressed

| Parameter | Description |
|---|---|
| Return | Void |
| Wparam | Wparam of the message |
| Lparam | Lparam of the message |

Method: Fire_OnRightClick

This event can be generated only when the user right clicks mouse on the top portion of the control. This can be used by the container to show context sensitive menu

| Parameter | Description |
|---|---|
| Return | Void |

Method: Fire_OnCommandInvoked

This is an event method which can be used to fire an event to the owner of the component. This will fire OnCommandInvoked method on the owner when the user selects a command from the command list

| Parameter | Description |
| --- | --- |
| Return | Void |
| NcommandId | Command id to show the command invoked | c. Subsite Architecture Detail—Capacity Planning Server

In the presently described embodiment of the invention, a Capacity Planning service may may consume the performance data that has been collected (real time or stored) and may provide analysis and planning capabilities. This service may also generate reports based on schedules. Capacity Palnning Servers (220) are illustrated in FIGS. 2–4.

d. Subsite Architecture Detail—Manager Engine i. Manager Engine Overview

Management engines are the workhorses of the management system. A management engine may communicate with its managed nodes (Windows NT Servers, Cisco routers, and other network equipment) through proprietary or standard protocols like WMI or SNMP. In the presently described embodiment, management engines are responsible for: a) accepting, filtering, correlating events and information from managed nodes in its jurisdiction or managed site; b) gathering, storing, and analyzing performance information; c) updating and maintaining configuration parameters on managed elements; d) supporting automated and reactive tasks; e) support remote and local agents for managing nodes; f) provide a complete, relationship view of the managed site nodes, services, and resources; g) querying on demand the resources of the managed resource for their current configuration, state, and performance data; h) provide a means of configuring and fine-tuning the resources of the managed element; i) monitoring the resources and receiving unsolicited notifications and events from management elements; j) Support for a virtual management element with policies; k) Management Policy enforcement; and l) Complex job execution.

Network Management Engine

The management engine is a service or a set of services that provide the core capability to job management (policies), collect performance information, monitoring, react to problems, manage enterprise resources, and provide a platform for enhancing and extending management capabilities.

Figure 7:
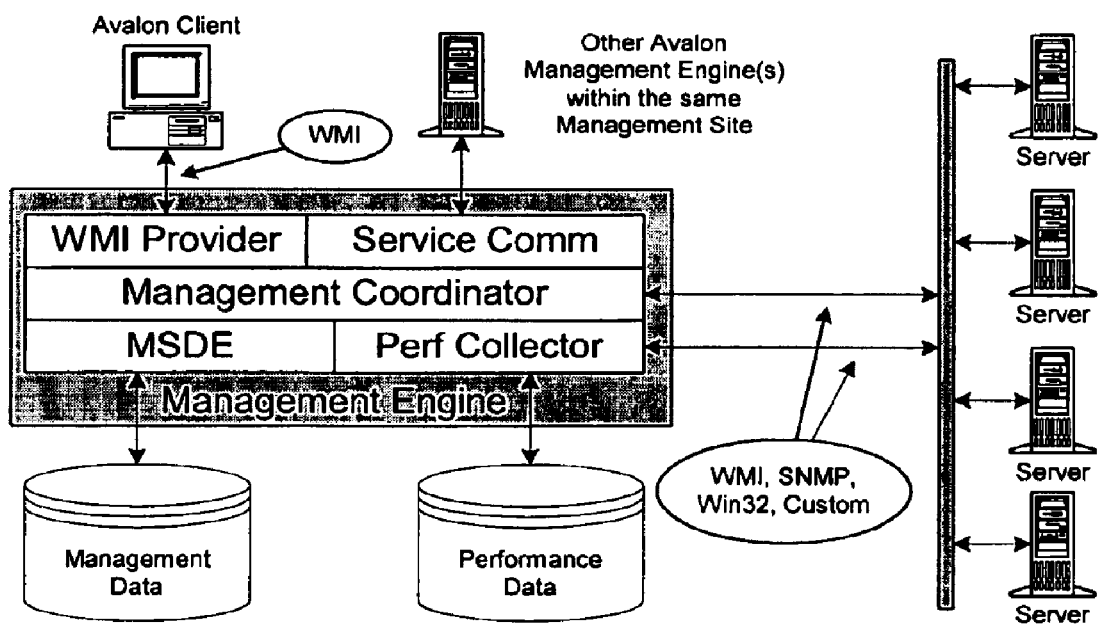
FIG. 7 depicts services provided by the manager engines depicted in FIG. 1.

The Network Management Engine is really a set of services that provides the following capabilities: a) Client interface (WMI Provider)—Provides the COM object interfaces for all management functions; b) Messaging infrastructure (MSMQ) for communicating between Management Engines; c) Management coordinator (COM+Service); d) Performance collector; e) Management database (MSDE-SQL Server); and f) Performance database (MSDE and/or custom format). FIG. 7 depicts the services provided by the manager engines (30) depicted in FIG. 1.

WMI Provider

The WMI Provider is the primary API interface to the Network Management system. All clients may use its WMI schema to interact and extract information from the Managed Site.

Service Comm (Communication)

This module may handle the communication of messages between Network Management Engine services. This will may be COM+asynchronous object, or MSMQ queue, or some other type of guarantee message delivery system.

MSDE

Microsoft Data Engine—SQL Server 8.0 may be used for the database engine.

Perf Collector

The Performance Collector is a module that is responsible for collecting performance information from multiple targets. Performance information is stored in a performance database that is accessible to the Capacity Planning Service and other type of clients.

Management Data

The Management Data is a database the stores all of the ME objects, their properties, policies, relationships, etc. Some ME objects can be owned by other Network Management Engines but each Engine will still have a copy.

Performance Data

The Performance Data is a database that stores the result of performance collection activities. The data will be broken up into two types, active and historical.

Managed Coordinator

The Management Coordinator module may implements the bulk of the management features.

Figure 8:
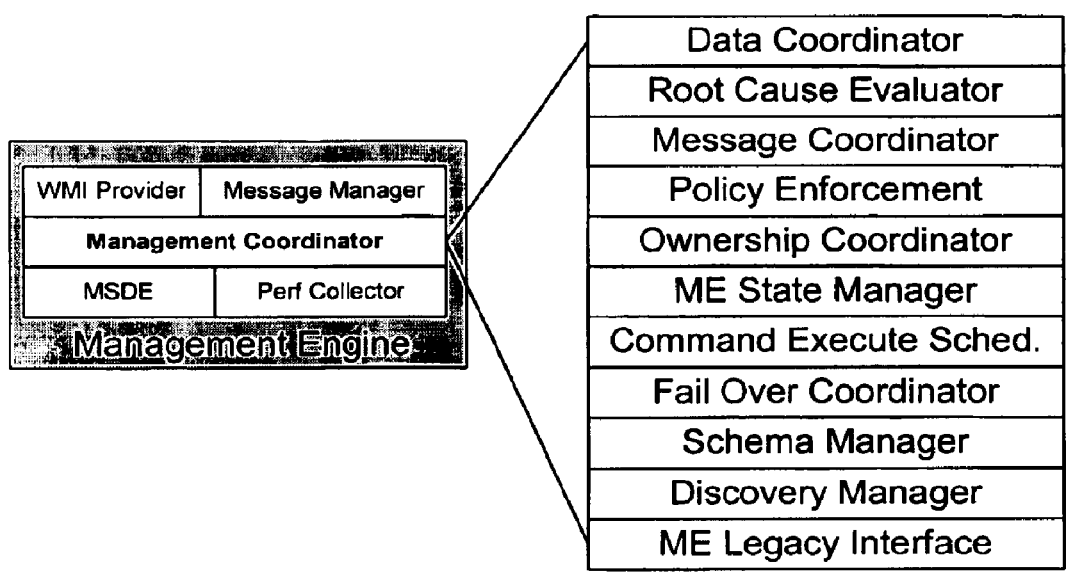
FIG. 8 shows in greater detail the components of the management coordinator service illustrated in FIG. 7 in greater detail.

FIG. 8 shows the components of the management coordinator service illustrated in FIG. 7 in greater detail. The following table also lists those components in the presently described embodiment.

| Function | Description |
| --- | --- |
| Data Coordinator | The Data Coordinator is responsible for presenting and maintaining the management site's data. It may have an understanding of which Management Server own which Management Element's data. Using this information it will query or update the appropriate management database. |
| Root Cause Evaluator | The Root Cause Evaluator will try to figure out where the real problem resides. It will use the dependency information for the Managed Elements and cross-reference this to the problem events that are being received. If it is successful it will create additional objects (ME) and/or events that will point to the specific problems thus allowing support personnel drill into the details. |
| Message Coordinator | The Message Coordinator will act like a traffic manager for messages that it will receive and route to the appropriate services or clients. It basically acts as a distributor for publishers and subscribers of messages. For example if an Network client want to see the events from a specific SQL Server, the event coordinator will make sure that the WMI provider for that service will publishes the events. Another example of an event is when a client changes a property of a ME, the Data Coordinator will sent update events to all Network Management Engines so they can update their stores as well. This module will also coordinate message received from agents working on managed nodes. |
| Policy Enforcement | The Policy Enforcement will understand how to react to specific events like a SQL Server goes offline. A policy can also create a ME or events that can invoke other policies. In the long run we should be looking at completely using WMI policy system or adding fuzzy-logic capabilities. |

-continued

| Function | Description |
|---|---|
| Ownership Coordinator | Each ME is will be owned by a specific Network Management Engine associated with the management site. Also if there is more than one engine in the management site, each ME will also be assigned to another management engine to act as the backup owner.<br>By assigning each ME to a primary and backup management engine, the Network system can provide high availability in case of an engine failure or ease the transition of removing an engine from the managed site.<br>As Network Management Engines are added or subtracted from a managed site, the Ownership Coordinator will be reassigned these ownerships to the remaining management engines. This process allows the workload to be distributed among all the active management engines. |
| ME State Manager | The ME State Manager will store and managed the current status of all MEs owned by the management engine. This module will interpret the policies that tell it how to set the appropriate state for a specific ME. MEs that have parents will also propagate its slate to them. When a state is changed it will send events that can be displayed on the Network Client or kick off other policy. |
| Command Execute Scheduler | The Command Execute Scheduler will handle the execution of a command remotely or via an Network Agent. Each command can be designed to execute via an Network Agent installed on the target platform or it can execute the command/script locally on the Network Managed Engine's server. These commands are usually invoked by other messages, events, policies, or properties/command execute for the ME. |
| Management Services Coordinator | The Management Service Coordinator will monitor the active state between each Network Management Engine. When a new Network Management Engine is enlisted into a Management Site, this service will manage the load balancing work that is necessary to share the load equally with other services. It will also monitor the state of the managed services. If a service stops for whatever reason, either manually or automatically the service will be removed from the Managed Site. The ME that is currently owns will be reassigned to remaining Network Managed Engine. |
| Schema Manager | The Schema Manger will accept or produce text and/or XML schemas that describe the managed structures. This information includes describing what makes up a ME, what are the necessary conditions for each state, the resources that the ME depends on, policies, etc . . . |
| Discovery Manager | The Discovery Manager is responsible watching and adding new computers based on discovery policies like "add new SQL Server to this managed group". |
| ME Legacy Interface | If an element that needs to be managed is not WMI enabled then it must have a COM object that provides its management interface. There is one component interface for every type of managed component that is not WMI enabled. |

The primary interface for managing elements is WMI. This allows the management infrastructure to use schemas (WMI and Network) to describe the component's properties and how to do specific activities.

An element can be a server, a service on a server, or application specific. Elements can be grouped or related to other elements to form a specific picture of a managed element.

For components that are not WMI enabled, i.e. systems that don't provide WMI providers, components can be managed via ME Legacy Interface objects. These classes are COM objects and implemented a predefined interface that can be used by the engine to manage the element.

The Network Management Engine is designed to manage MEs in a site either remotely or with a resident agent. If the workload becomes too great the customer can add another Network Management Engine server to the Managed Site. Likewise, in the presently described embodiment, when an Network Management Engine fails, the remaining engines will mark it off line and reassign its responsibilities.

In the presently described embodiment, when the new Network Management Engine registers itself with the Managed Site's data residing in Active Directory, it will retrieve a list of other management engines that currently support the management site. With this information it will contact the other engines and begins several processes. The Ownership Manager will start assigning active ME to its self until the workload is balanced.

The Data Coordinator will also start to build the new management database with data from the other management engines. When this process is done the new management database will have a complete copy of the entire management configuration and supporting data. The only exception is the performance data will not be replicated. The Data Coordinator will accept instructions from the Ownership Manager that will allow it to prioritize its work so that active MEs can be assigned to the new engine as soon as possible. When an Network Management Engine is removed from the Management Site the Ownership Managers of the other engines will reassign the active ME to rebalance the workload.

High availability of the management system is achieved by providing the ability for the management engines to fail over management responsibilities to the remaining management engines. When an Network Management Engine fails, the remaining engines, based on ME's backup assignment, will now process the MEs that are currently assigned to the failed engine. The Ownership Managers will then begin their work to reassign MEs to primary and backup management engines with the goal of rebalancing the workload.

The clients of the Network Management Engine use WMI to configure and retrieve management information. The Network Management Engine will have a WMI provider that will supply the core interface between the engine and its clients.

The Network Management system must support a SDK that allows $3^{rd}$ parties and customer to extend its capabilities.

Managed Element Interface

In the presently described embodiment, all components managed by the Network Management Engine are managed through ME Legacy or the standard WMI Component Interface. The following lists possible requirements for adding a new management element to the Network system: a) create a WMI provider and MOF or create a COM object that implements the ME Legacy Interface; b) create a Management Element profile that describes the command, property page implementer; and c) Execute Com objects or scripts.

Installing a Manager Engine in the Network

This section will cover all the primary installation scenarios for the Network. It will show the process flows and outline the messages and how the maanger engine components interact. For engine installtion, the MSI will setup and install the following (it is assume that "OLEDB for SQL Server" is installed by the SQL's MSI or already be present with the OS): (1) MSDE or SQL Server standard (Network will use its own instance of SQL of shipping schedules work out); (2) Network service executable; and (3) Network service's COM components (WMI consumer, Message Switch, ME Assignment, etc.) Next, during insatllation the MSI attaches the Network's database and starts the Network's service.

This section will detail the start up process for the Network service. (See the detail design for the individual components for a review of the startup process) First, the service control manager starts the Network' service based on settings or a net start command. The Network service shell then creates and call "Init" on the following components in specific order listed: (1) Message Switch component; (2) A Database state update component; (3) Database replication manager component; (4) Engine to Engine component; (5) State Tracking component; (6) WMI Consumer component; (7) Job Processing component; (8) Auto Discovery component; and (9) WMI Provider Proxy component.

Engine Components

During engine installation, all components with the exception of the Message Switch will register with the Message Switch on which message they need to subscribe to.

Database State Update Component

This component subscribes to all messages that notify ME state changes. It creates a database connection to the Network database.

Engine to Engine Component

This component reads in the current engine list from the database and connect to MSMQ queues. It will also create an input queue so that it can receive messages. In addition it will retrieve the current Management Site Configuration Version and compare it with what its last record number is. If the number does not match the component will place the engine in an off-line mode. This will then require the support personnel to start the engine as if it was new (see WMI Consumer component discussed below).

State Tracking Component

This component reads the ME parent and child relationships from the database including the current ME state. This component will need to retrieve the state information again for MEs that are not owned by this engine to cover the whole that is created by the SQL replication update cycle. (Note: The database may need to be modified to record the date when the ME was last updated). All MEs that are owned by this engine have their state set to unknown. This component sends a single message to all engines that all of this engine's MEs are in an unknown state. (When the WMI Consumer is started up it will send out new messages regarding the new states of the ME, thus updating the system).

WMI Consumer Component

This component reads the database regarding the monitoring policies for all the ME's assigned to this engine. When a new engine is added to the Management Site several steps, set forth below, must be completed in order (The state-tracking component will be used to track the various states associated with adding an Network engine for the UI): (1) Install the Network service on a computer in the sub site (the installation process should ask for the Management Site and sub site's name, which is posted to the Active Directory); (2)using the Network snap-in wizard to enroll an engine, the user informs the system to add the engine (it should also be possible to do this at installation time); (3) the wizard executes a command that sends out a message to start the Network service (MSG=Start Engine); (4) DB Replication Manager receives this message and starts the process of initializing the new engine's database; (5)when the DB Replication Manager has completed the initialization of the new engine's database it sends out a message that the engine has been started (MSG=Engine is running); (6) the Engine-to-Engine component receives this message and setup a queue for communication; (7) the Engine Monitoring component then receives this message and adds the engine to its list of system to watch for heartbeats; and (8) the ME Assignment component also receives this message and starts load-balancing process.

Figure 13:
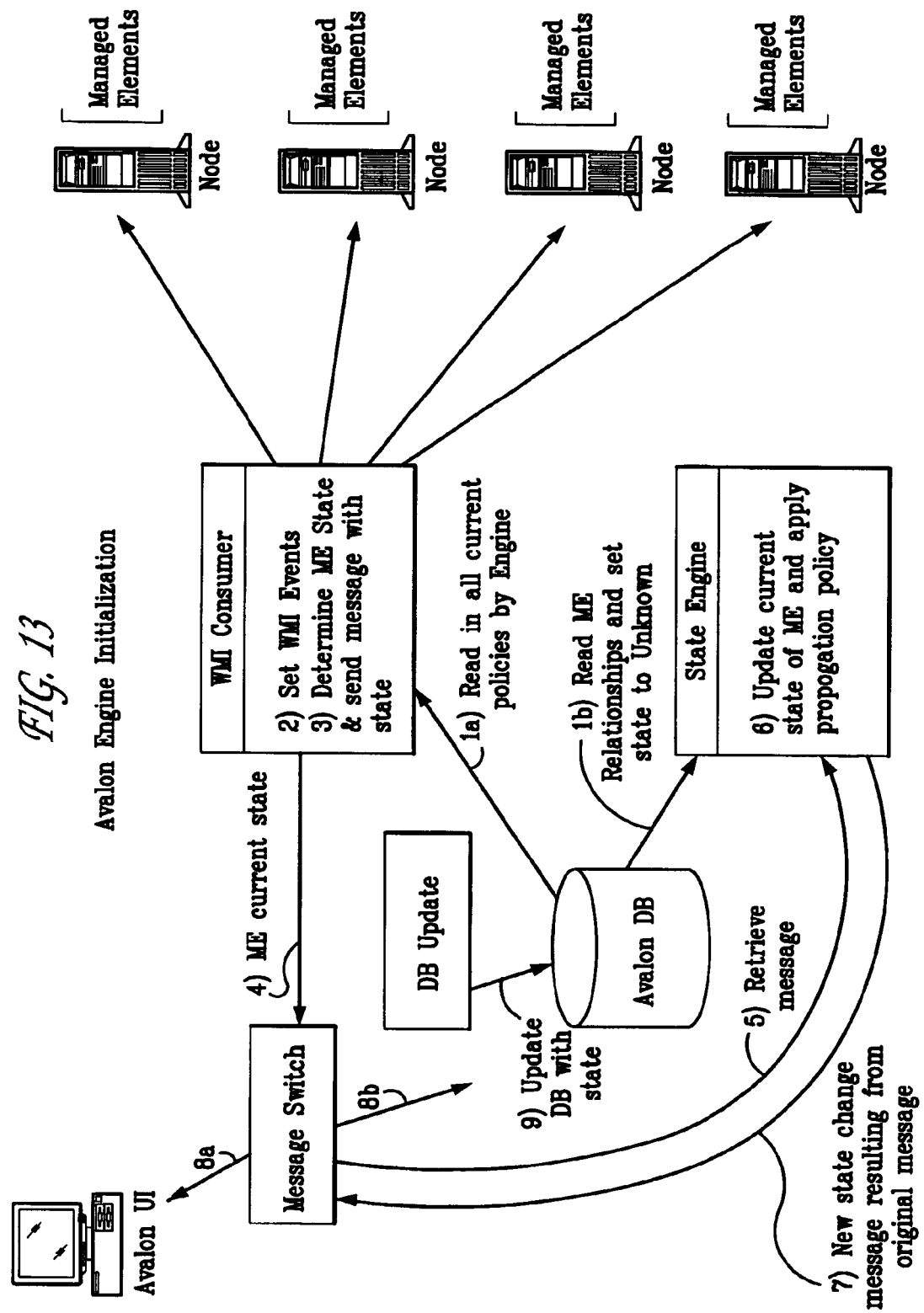
FIG. 13 shows a process of initilization of the mangement engines depicted in FIG. 1 in accordance with one embodiment of the present invention.

The overall interacton of the above described components during engine installation is shown in FIG. 13, which depicts manager engine installation steps in acordance with an embodiment of the present invention. Such steps are described in the table below.

| Step | Description |
|---|---|
| 1a | The WMI Consumer will read in all the determination and monitoring policies for all MEs that are owned by this engine. ME assignments are made based on ME affinity to its node. |
| 1b | The State Tracking engine will read in all the ME and their relationships for the entire managed site. For MEs that it does not own it will also read in the current ME state. All of the Mes that this engine owns will have their ME state set to unknown. |
| 2 | The WMI Consumer will setup all WMI event syncs to receive state changes based on the ME's monitoring policies. |
| 3 | The WMI Consumer will use the ME's state determination policy to figure out the initial state. |
| 4 | The ME determined state will is sent to the message switch. |
| 5 | The message switch sends the initial ME state message to the State Tracking component. |
| 6 | The State-Tracking component will update its internal store with this information. Other ME states could be changed based on state propagation policies. |
| 7 | New state changes messages will be sent to the Message Switch. |
| 8a | The client will be notified of any ME state changes for MEs that is has registered for. |
| 8b | The Database Update component will receive the same state change message. |
| 9 | The Database Update component will update the database with the new state. This information is replicated out to all the other Management engines. |

Manager Engine Operation in the Event an ME State Change is Received

Figure 14:
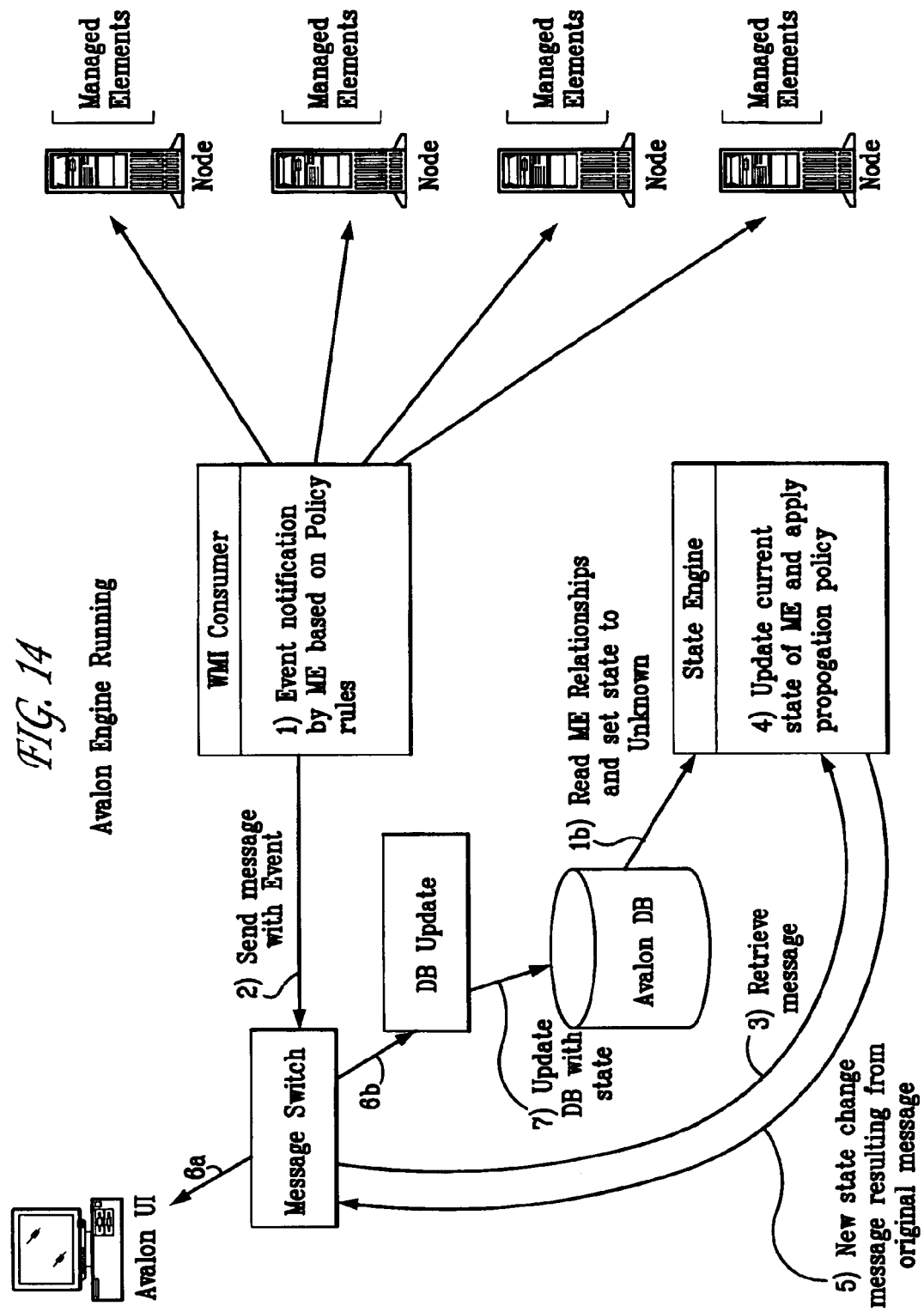
FIG. 14 shows a process performed by an engine shown in FIG. 1 upon notification of an event by an Managed Element.
Figure 40:
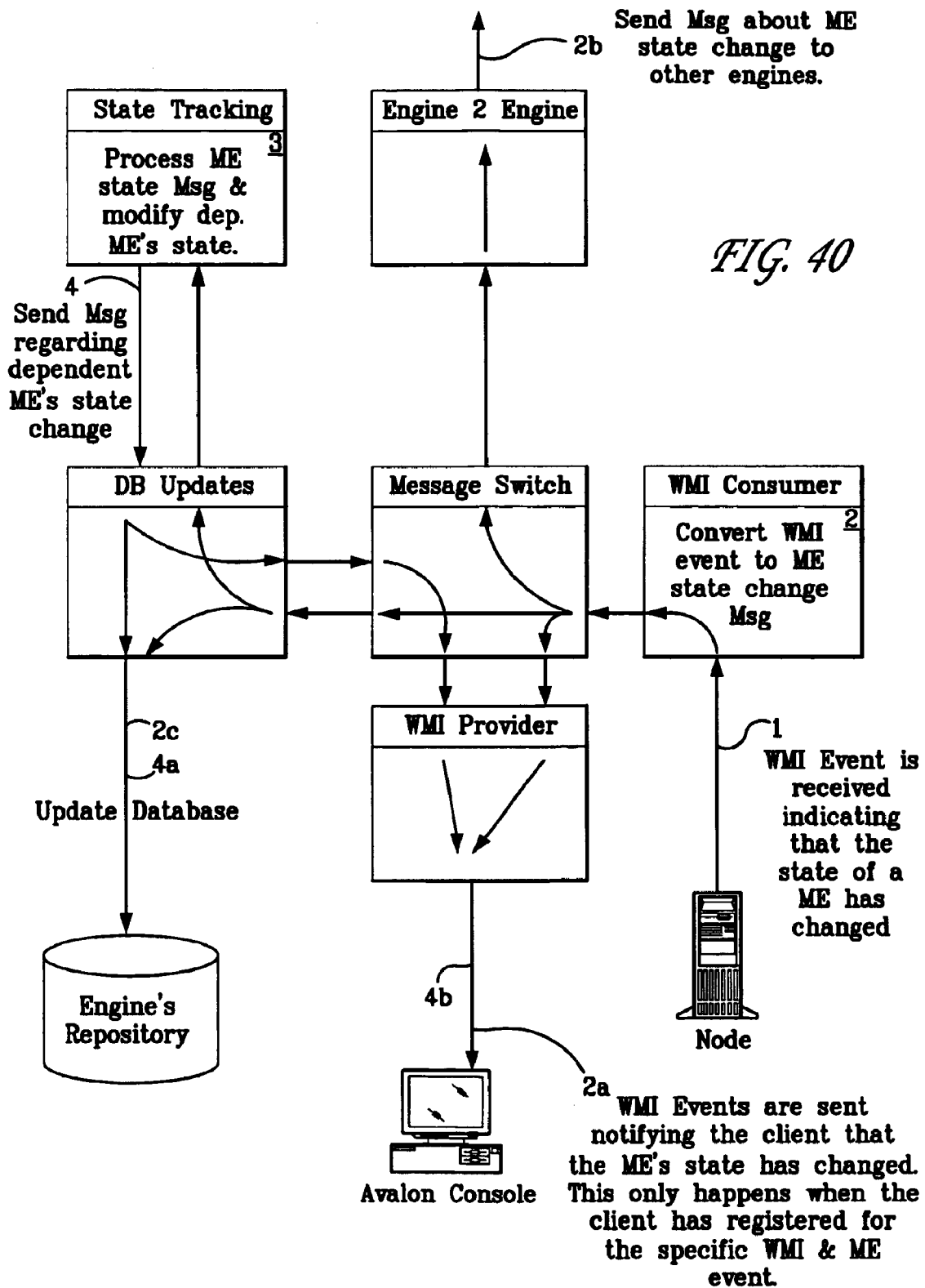
FIG. 40 depicts the processing of an Managed Element state change event in accordance with one embodiment of the present invention.

A primary function of manager engines during operation is to notify the client (i.e., user) of stat changes. As noted above, when the WMI Consumer receives its assignments, it will implement the WMI monitor policies for each WMI and then use the determination policy to calculate the current ME state. Once this has been accomplished the WMI consumer waits for events to tell it that a ME's state has changed. FIGS. 14 and 40 depict the processing of an ME event in accordance with one embodiment of the present invention. Such proccesing is described in the table below.

| Step | Description |
|---|---|
| 1 | A WMI event is received by the WMI Consumer indicating a change in the ME's state. |
| 2 | The WMI Consumer generates a state change message for the ME. |
| 2a | The client is notified of this state change via the WMI provider if it has registered for this event. |
| 2b | The ME state change message is broadcasted to all Management engines |
| 2c | The Engine's repository is updated regarding the ME event change. |
| 3 | The State Tracking component receive the ME state change message and processes dependent MEs based on state propagation policy. |
| 4 | A ME state change message is generated for each dependent ME that had its state changed because of the original event. |

-continued

| Step | Description |
|---|---|
| 4a | The Engine's repository is updated regarding the dependent MEs state changes. |
| 4b | The client is notified of the new state changes via the WMI provider if it has registered for this event. |

It is required that all Management engines have the same ME state information and repository. The SQL Merge replication system will keep the repositories update to date but the state engines must receive and process the primary ME state change messages.

As depicted in FIG. 14, the Management engine that owns the physical node will detect the original ME state change, at which point the WMI Consumer component will change the WMI event into an Network Message stating the current ME state is running, warning, or critical. This message is broadcasted to all Management engines in the Managed Site.

Figure 41:
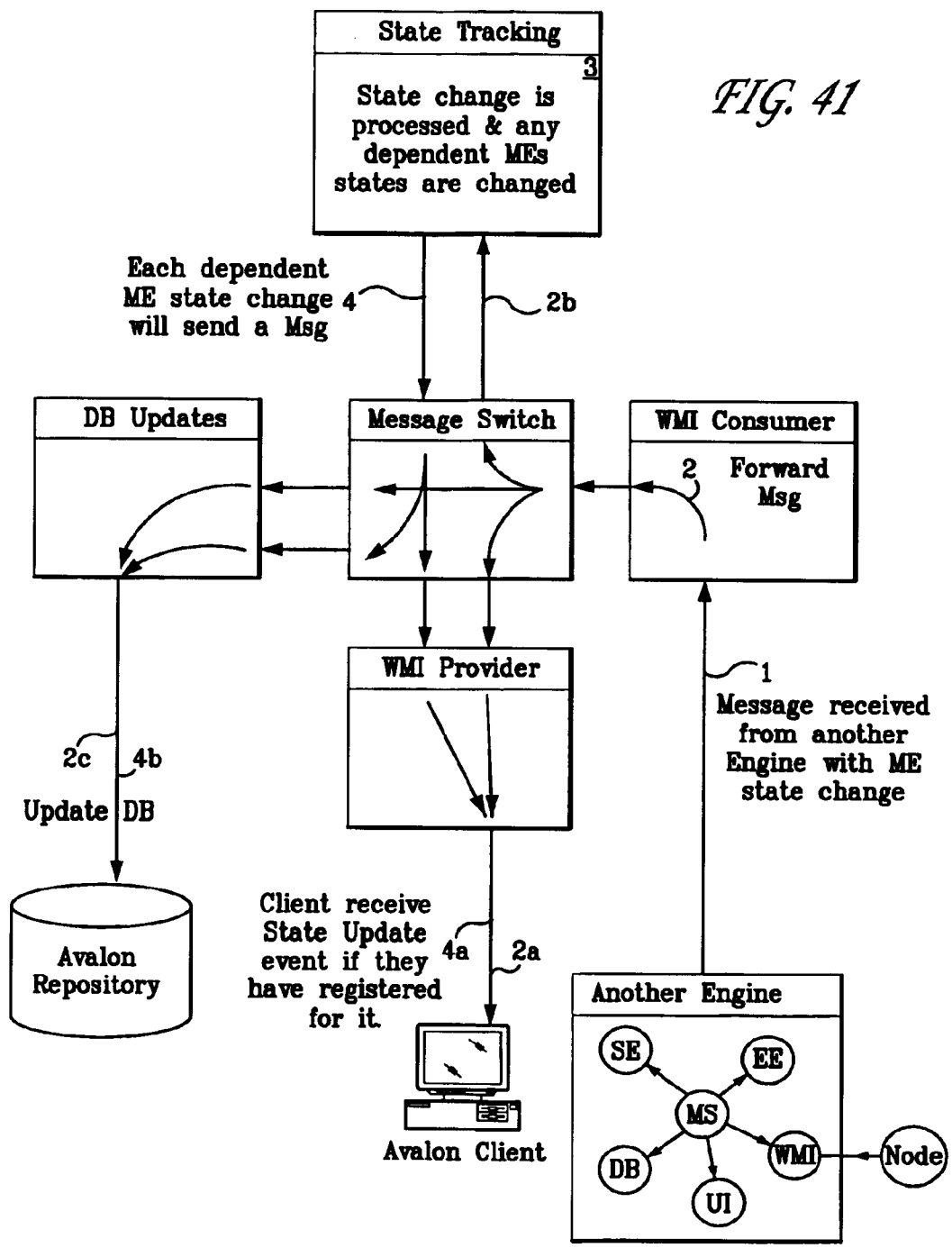
FIG. 41 depicts a method of processing a foreign state change event in accordance with one embodiment of the present invention.
Figure 42:
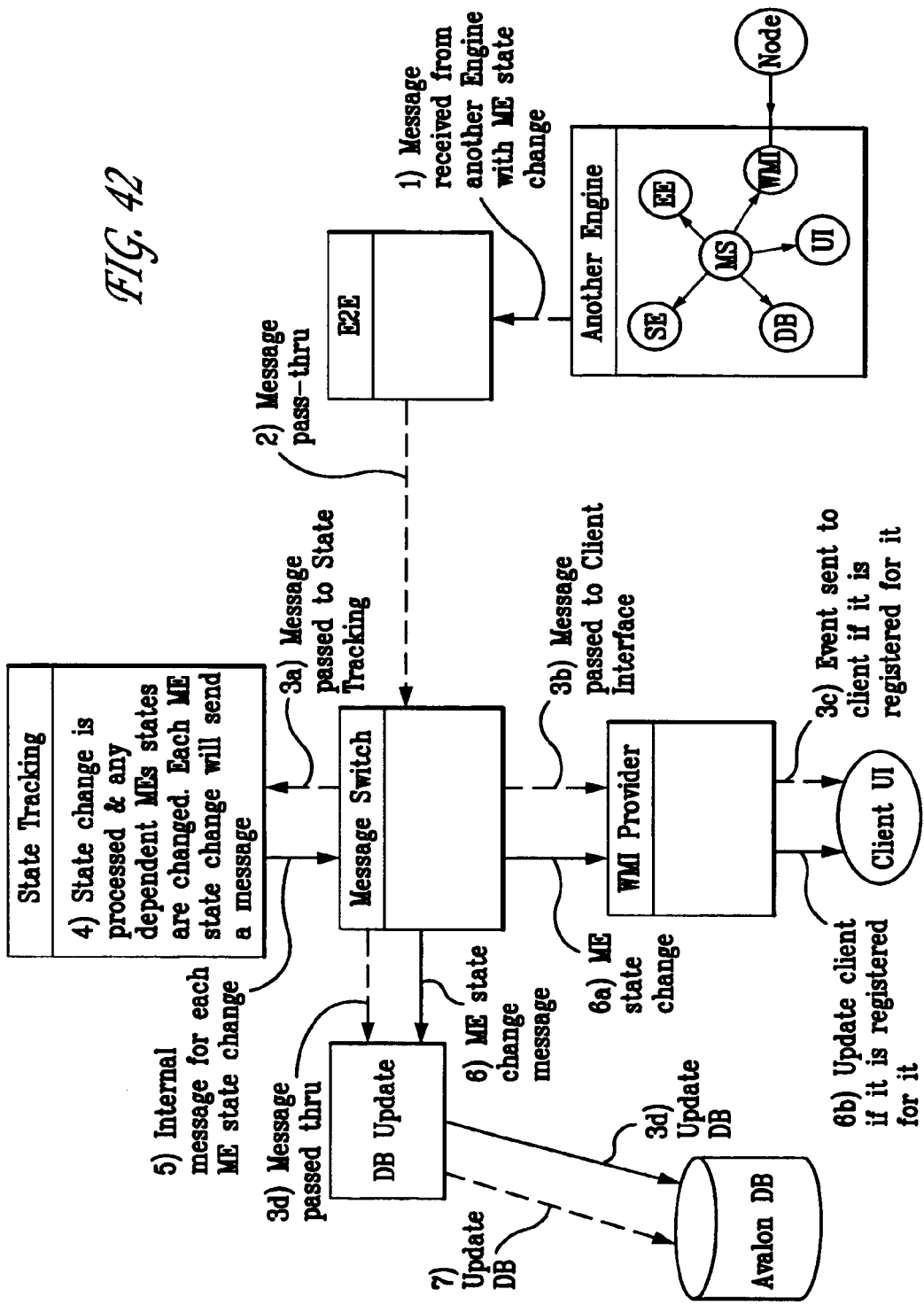
FIG. 42 depicts a state diagram showing steps performed in response to an ME state change event in accordance with one embodiment of the present invention.

Apart from notification of state changes appicable to ME's which a given manager engine is assigned, the monitor engine may also receive and act upon state changes applicable to other ME's as well. FIGS. 41 and 42 depicts a method of processing a foreign state change (i.e., a state change notification from another engine) in accordance with one embodiment of the present invention.

| Step | Description |
|---|---|
| 1 | Another engine detects the ME state change and send a ME state change message to all the Management engines. |
| 2 | State change message is received from another engine and is forward to the message switch. |
| 2a | All the Network Clients are notified of the ME state change. |
| 2b | The state change message is received by the State Tracking component. |
| 2c | The Network Repository is updated regarding the ME state change received from the other engine. |
| 3 | The State Tracking component will process ME state change and change the dependent ME's state based on propagation policies. |
| 4 | Additional ME state change messages are created based on the dependent ME states. |
| 4a | All the Network Clients are notified of the ME state change for the dependent Mes. |
| 4b | The Network Repository is updated regarding the ME state change for the dependent MEs. |

Thus far, what has been described with respect to typical manager engine response to ME state changes involves simple notification of the client/user. This allows the user/administrator to remedy any problems eveidenced by the satet change. However, the maneer engine is also preferably capable of exeucuting its own remdial schemas. In particiular, the management engine can execute a custom COM object or a script defined in the relevant ME's profile.

The following are examples of how powerful the job schemas can be. The two key attributes are the ability to execute command in parallel and the ability to wait for external messages to complete the job.

Storage Capacity Management

A job can be written to manage a storage folder if a capacity message is received when a physical drive is nearing its capacity. The job would clear out temporary files and backup others. When the files have been backed it will then delete then these files.

Figure 9:
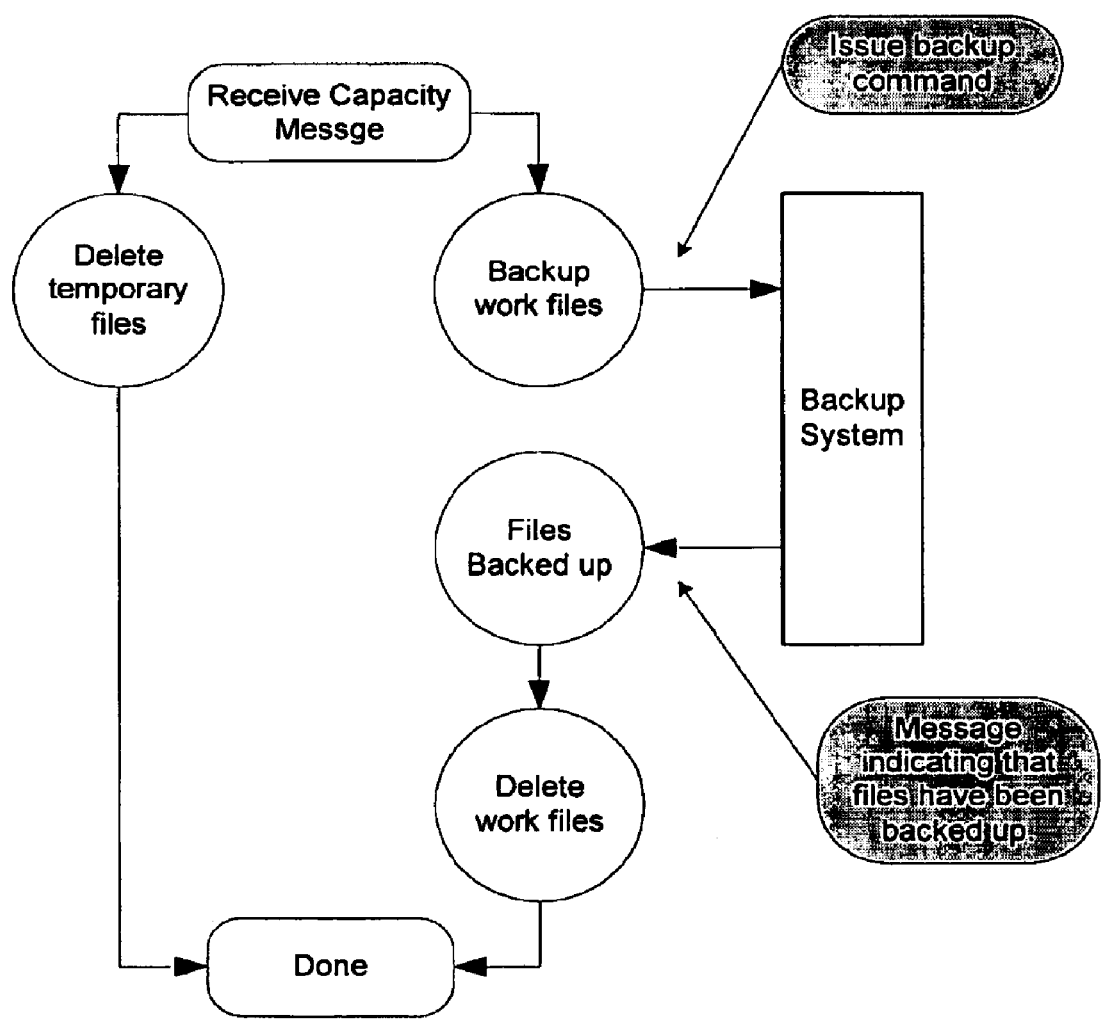
FIG. 9 depicts a storage capacity management job schema associated with a managed element in accordance with an embodiment of the present invention.

FIG. 9 depicts a storage capacity management job schema associated with an a managed element in accordance with an embodiment of the present invention.

Printer Problem

Figure 10:
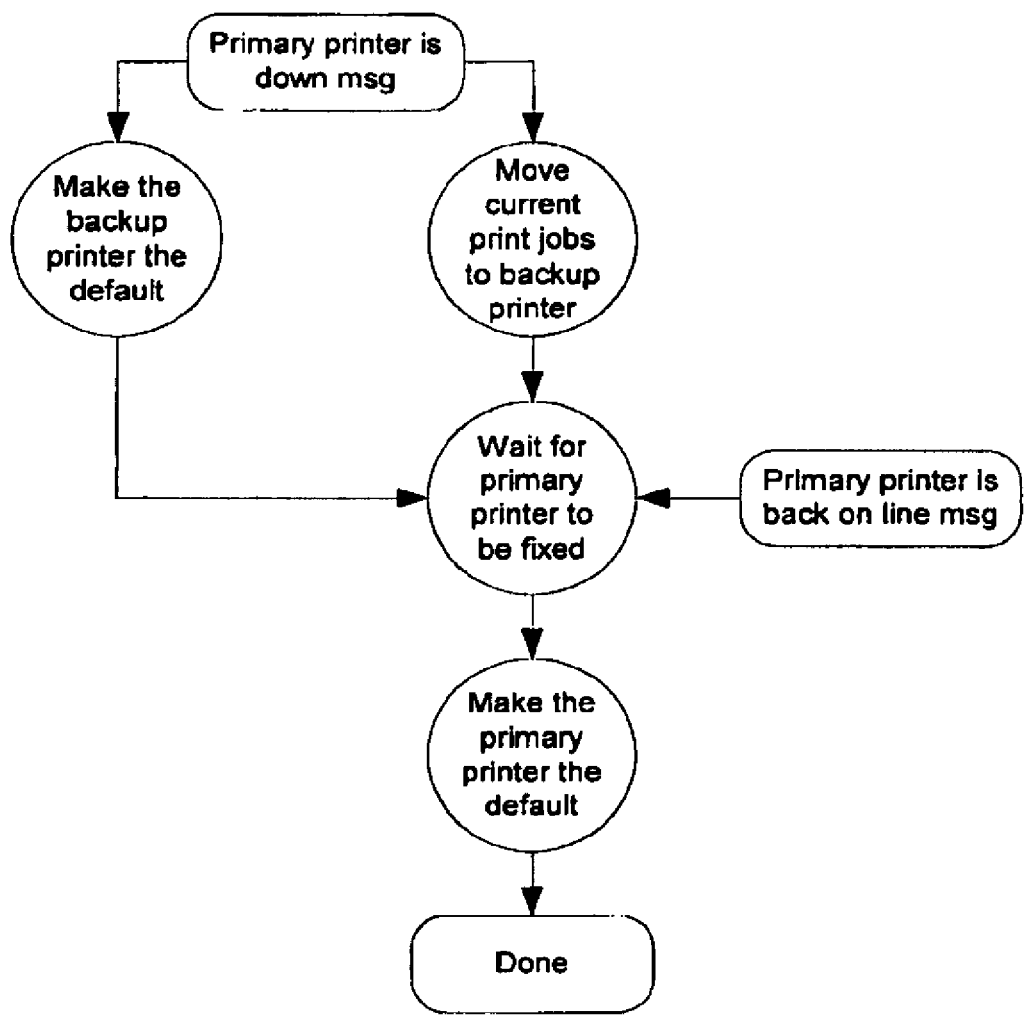
FIG. 10 depicts a printer problem schema associated with a managed element in accordance with an embodiment of the present invention.

A printer is critical to a line of business application. If the printer or print server fails the management system can be programmed to make corrective actions automatically. In the below example the job will make the backup printer the default, move the current print jobs to the backup printer, wait for the primary printer to come back on line, and then make it the default again. In this case, all the operational staff needs to deal with is fixing the printer problem. FIG. 10 depicts a printer problem schema associated with a managed element in accordance with an embodiment of the present invention.

Service Problem

Figure 11:
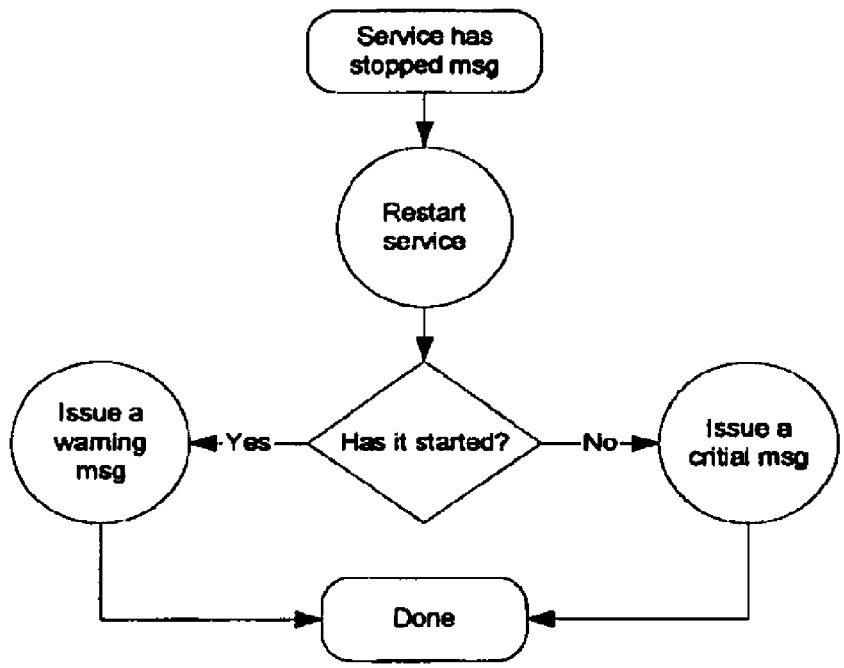
FIG. 11 depicts a service problem schema associated with a managed element in accordance with one embodiment of the present invention.

A stopped service has been detected by the management system. The support staff have programmed a job that will attempt restart this service. If it is successful, the system generates a "warning" message. If not, the job will generate a "critical" message. FIG. 11 depicts a service problem schema associated with a managed element in accordance with one embodiment of the present invention.

Diagnostic Help

Another key advantage of message processing is that the support staff can build a simple job that tells the management system to take some automatic action to help debug an application.

Figure 12:
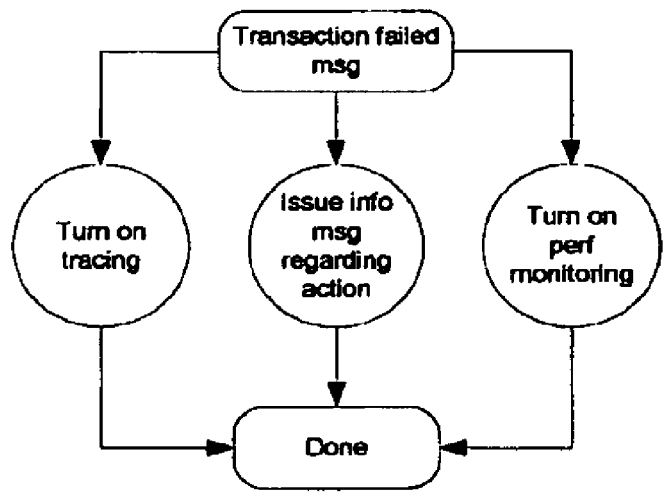
FIG. 12 depicts a diagnostic help schema associated with a managed element in accordance with one embodiment of the present invention.

FIG. 12 depicts a diagnostic help schema associated with a manged element in accordance with one embodiment of the present invention. In the scenario depicted in FIG. 12, a message is received that indicates that a transaction has failed. As it happens this type of failure is intermittent and hard to reproduce. The support personnel set up a job that will turn on detail performance monitoring and system tracing at the first sign of a transaction problem.

Manager Engine Components Description

Engine-to-Engine Communication

The Engine-to-Engine Communication sub system of a managed engine in the presently described embodiment, has responsibility for establishing, routing, and maintaining communication links between all Network servers. It provides an interface for external COM objects to send and receive messages that are broadcasted to the engine community. This communication infrastructure should be implemented using MSMQ node-to-node configuration. This manager should insure that all engines receive the same message. This might require using DTC and transactional processing capability of MSMQ. The interface should support asynchronous notification of messages received. It should keep a list of all active engines and provide services for synchronizing this list. The Engine-to-Engine component provides primary support for ME state changes, fail over notification, configuration changes, ME assignments, etc.

Thus, in the present described embodiment, this component is responsible for handling communication between engines via MSMQ queues. This component's responsibilities are as follows: signup with the message switch to receive all messages that is required to be broadcasted to all engines in the Managed Site; manage the MSMQ queue connections to each engine in the Managed Site; support the ability to send a message to a specific engine; send message that indicate communication failures with an engine. This should be treated as an engine failure and may result in the eviction of an engine.

ME Assignment Manager

In the presently described embodiment, this manager is responsible for handling the ME assignments for primary and backup. The assignment manager should be elected for a sub site. It should make ME primary assignments first and send message to all engines in the sub site. It should make the backup ME assignments based on n−1 and send this message to all engines in the sub site. It should preferably only assign up to 3 servers for backups. In the presently described embodiment, a physical node can only be associated with a single sub site.

Thus, the ME Assignment manager is required to implement the load-balancing feature for the Network systemin the presently described embodiment. This component's responsibilities are as follows: provide an election process for promoting a server as the primary assignment manager; the primary assignment manager must monitor the load on each engine by sub site and make correction accordingly; assign MEs to engines for primary and backup roles based on sub site; respond to message of new engines.

Respond to message of engine failures; send message to engines when assignments are executed; and update database with assignments and version information.

Engine Database Replication Manager

In the presently described embodiment, this manager is responsible for handling and insuring that all changes to the Network's database are replicated to all the other engine's databases. It should preferably feature: self-configuration for publisher and subscribers with a backup publisher; monitoring of replication state and services; automatic reaction capabilities to fix any problems, which would include having a backup for the publisher; and support for adding or removing engines.

The manager should support database maintenance activities (backup, DBCC, etc.) for the engine(s) and publication databases and any other information required to support replication. The database support should include using MSDE with an instance called "Network" and should be treated as an internal resource and not available to other application.

Engine Monitoring Manager

In the presently described embodiment, each engine should provide a heartbeat message that is sent to all other engines based on management site configured value. This heartbeat should be sent via IP data gram and control by a policy stored in the management database configuration. The engine monitoring manager provides an interface that allows external COM objects to receive notifications that indicate an engine that has failed based on policy.

Thus, the Engine Monitoring component is responsible for monitoring the health of the Management engines in the sub site in the presently described embodiment. This component must also be aware of engine health policies that effect when an engine is marked off line and when it will be evicted from the sub site. This component's responsibilities are as follows: keep a complete list of Management engines based on sub site; listen for heartbeats from engines in a sub site; send a message when an engine has violated the off line policy; send a message when an engine has violated the eviction policy; this will cause the engine to be removed from its monitoring list; and respond to engine add and remove messages1; and manage the Management Site Configuration Version number.

Events and Tracing

The above managers must use a single trace log system and post significant event information to the NT event log. The trace system must support the capability to increase or decease the amount of detail while the system is up and running.

Interface Support Requirement

The above managers should provide information to the "State Machine" regarding state and Engine-to-Engine communication messages.

COM Object Interface Requirement

Each COM object in the Management engine must support the system object interface that allows the controlling system to control or provide information necessary to run the system as a whole.

The system interface should support the following: initialization of the COM object; shut down of the COM object; pause and Continue of the COM object's services; and COM Object's configuration is stored in the registry HKEY_LOCAL_MACHINE. Management Site configuration should be retrieved from the management's database.

There are several COM components that are required for the Management engine. Each component supports a INetworkControl interface in the presently described embodiment.

Network Service Executable

This is an executable for the Management engine and will provide the primary interface between it and the OS. This component's responsibilities in the presently described embodiment are as follows: handle the initialization of all the server's components when the service is started; manage the pause process; handle the shutdown process for the service.

DB Replication Control

The DB replication control is responsible for managing the SQL replication process in the presently described embodiment. This component's responsibilities are as follows: initialize new Engine's database (snap shot, adding it to the subscriber, etc); removing an engine from the publisher database; monitoring the health of the SQL replication (replication failures are treated as engine failures); support an election process for deciding which server will provide the publisher database and which server will provide the backup publisher database; monitor the health of the publisher database; keep the backup publisher database in sync with the primary; and provide the facilities to promote the backup publisher database to the primary role.

WMI Provider Proxy

In the presently described embodiment, this provides the proxy interface for the WMI Provider for the Management engine. This component may be required where the WMI provider will be in the Win Management address space. The component's responsibilities are as follows: provide an interface for sending messages; provide an interface for receiving debug messages; provide an interface for receiving system message via the message switch.

WMI Consumer

This is the primary monitoring component in the presently described embodiment. It reads the monitoring policies from the Network database and interacts with WMI on the target computers for the supported ME. This component's responsibilities are as follows: read ME policies from the Network database and setup the WMI events; respond to Engine failures message and instantiate WMI events where it is assigned as a backup; respond to Engine recover messages and remove its backup monitoring of ME; convert WMI events into state messages; and respond to ME Assignment messages and create/destroy WMI events.

Message Switch

The message switch is responsible to route message from one component to others in the presently described embodiment. The client must register for the messages they wish to receive and they will notify them when the message is received via a callback COM class. It will also provide queue services so that the clients do not need to respond immediately. This component's responsibilities are as follows: support for clients to register to receive messages; support for asynchronous message notification via callback; support for client queued messages via reference to primary queue; support for sending messages; support for retrieving and peeking of messages for a client.

State Tracking

The state-tracking component is responsible for tracking each active ME's state in the presently described embodiment. It will also track the state of an object but will not propagate its state to parents. This component's responsibilities are as follows: map out the dependent relationship between ME objects, parents (dependent of) and children (dependents); support ME state propagation model and policies; signup to receive ME state change messages; send ME state change messages when ME states are changed because of propagation; understand ME ownership so it can determine when to send state change messages; support non-ME objects that are not a ME but support some type of state without state propagation; support special ME that represent engines so that they can be monitored.

ME Database State Update

This component will receive messages and update the Network database accordingly in the presently described embodiment. The following messages will be subscribed to: ME state change; Engine failure; results of elections of components promoted to sub site managers.

Job Processing

This component will start jobs on the Management engine or on the target computer based on the job specifications in the presently described embodiment. These jobs are in response to messages that have been mapped out in the Network database.

Election Manager

The election manager will provide the communication coordination and election process for promoting a specific component to a manager role in the presently described embodiment. All assignments are based on sub site relationships.

| Roles | Description |
| --- | --- |
| ME Assignment Manager | Controls the ME assignments for a sub site. This process implements the load balancing and fail over feature for Network. |
| DB Replication Primary | This is the role that identifies the server that will provide the primary SQL replication publisher's database. |
| DB Replication Backup | This is the role that identifies the server that will provide the SQL replication's backup database. |

This component's responsibilities are as follows: a) internal track which server is the providing a manager role for the sub site; b) respond to engine failure messages by holding an election for the roles that the failed engine was providing; and c) for each role there can be suitable candidates that will be detailed in the Network database.

ii. Manager Engine—Database Design

The database design should fulfill the following requirements in the presently described embodiment: only the Network Management Engine or other specific services will access this database (no outside client will have access and the database will be treated as an internal resource); the database must store the complete set of information required by the management engine (the engine should not need to reference any other storage of information. See the following table regarding the information required.); support engine-to-engine synchronization and coordination of the database's information; and supports technical features required to provide scalability and high availability.

Required Information in the presently described embodiment is as follows:

| Object | Description |
| --- | --- |
| ME | Managed Element - This is the element object that Network can identify. There are several types of MEs (Server, SQL Server, database, file share, etc . . . ) |
| ME Relationships | MEs can have three types of relationships.Group to ME<br>ME to Group<br>ME to ME (uses or requires) |
| Configuration | System configuration information like what sub site is the default. |
| ME Type | Describes the types of ME like Adv-Server, SQL Server, Group, Database, etc . . . |
| Possible Parents | Each type of ME may require a parent like SQL Server is required to run on a server of some type. This information allows the system to understand what are the possible parent types if any is required. |
| Sub Site | Provides a list of sub sites that are available. |
| Management Engines | Provides a list of engines that are enlisted in the managed site. |
| Management Engines assigned to Sub Sites | Provides a cross reference of which engines are assigned to support which sub sites. An engine can support more than one sub site. |
| ME assigned to Sub Sites | Allows the engine to understand which sub site the ME is assigned. A ME can only be assigned to one sub site. |
| Assignments of ME to Engines | The assignment of ME to engines provides the information necessary to implement high availability. These assignments are broken down into two types.<br>Primary<br>Backup with priority<br>There is only one engine assigned to an ME as the primary. There can be multiple engines assigned to an ME based on priority. |
| Command List | Each ME can have a set of associated commands that can be invoked by operators or scripts. |
| Job | Stores the instructions on how to invoke a set of instructions be it either a script or executable. There are also standard environment variables that can be specified. |
| Monitor | Provides a list of performance objects that can be monitored based on a schedule. |
| Messages | Provides a list of messages by class, routing information, and message history. |
| Trouble Ticket | A simple list of what to be one, who it is assigned to, and if done, when. This can be used to post enterprise wide notification of work in progress. |

-continued

| Object | Description |
|---|---|
| Security | Security is integrated into the Network to permit and control users in creating groups, ME, jobs, schedules, and defining roles. User can be grouped into security groups, which can be applied to object in the same way as a user. |
| Properties | Many objects in the database can have many properties. These properties can be used to help manage a ME, sub site, engine, etc . . . |
| Schedules | Provides schedule information for when commands are available, when ME should be active, when to record performance information, etc . . . |
| Policy | Several objects in the database can have policies associated with them. Examples of these policies are monitor, state propagation, etc . . . |

Figure 15:
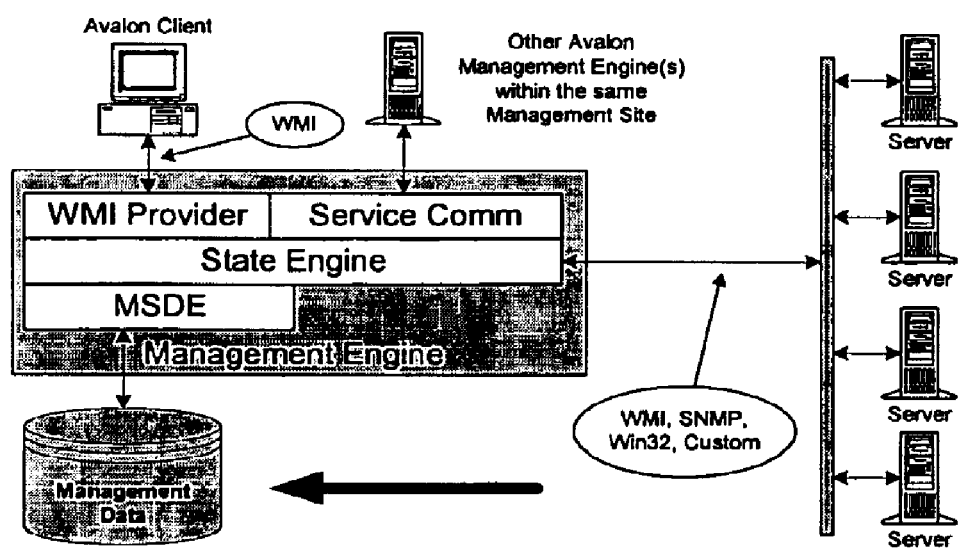
FIG. 15 depicts a manager engine (30) depicted in FIG. 1 with a database component incorporated in the management engine (30).
Figure 16:
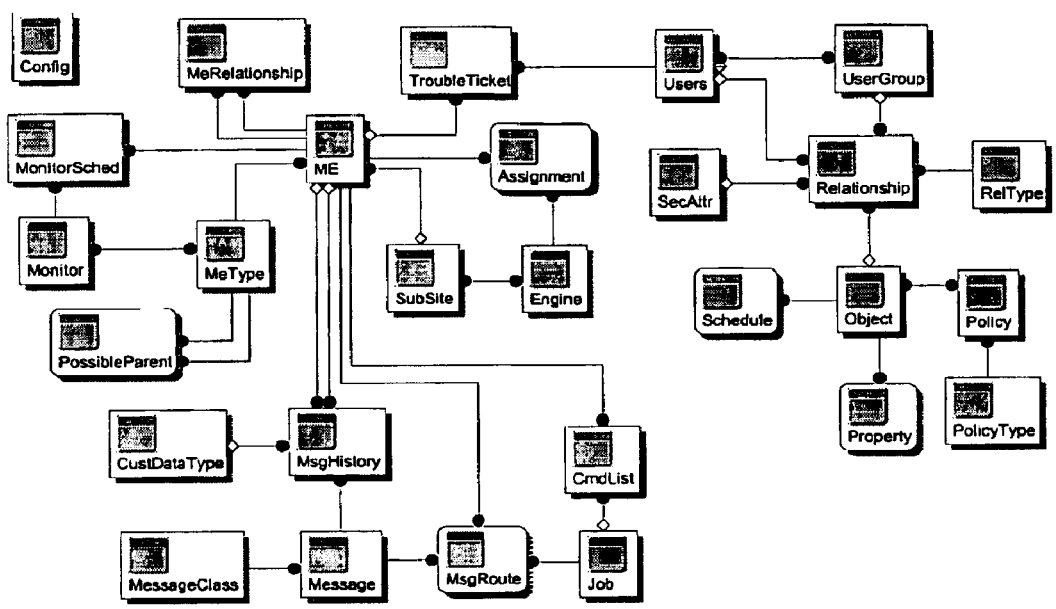
FIG. 16 is an exemplary overview of a database schema of the database shown in FIG. 15.
Figure 51B:
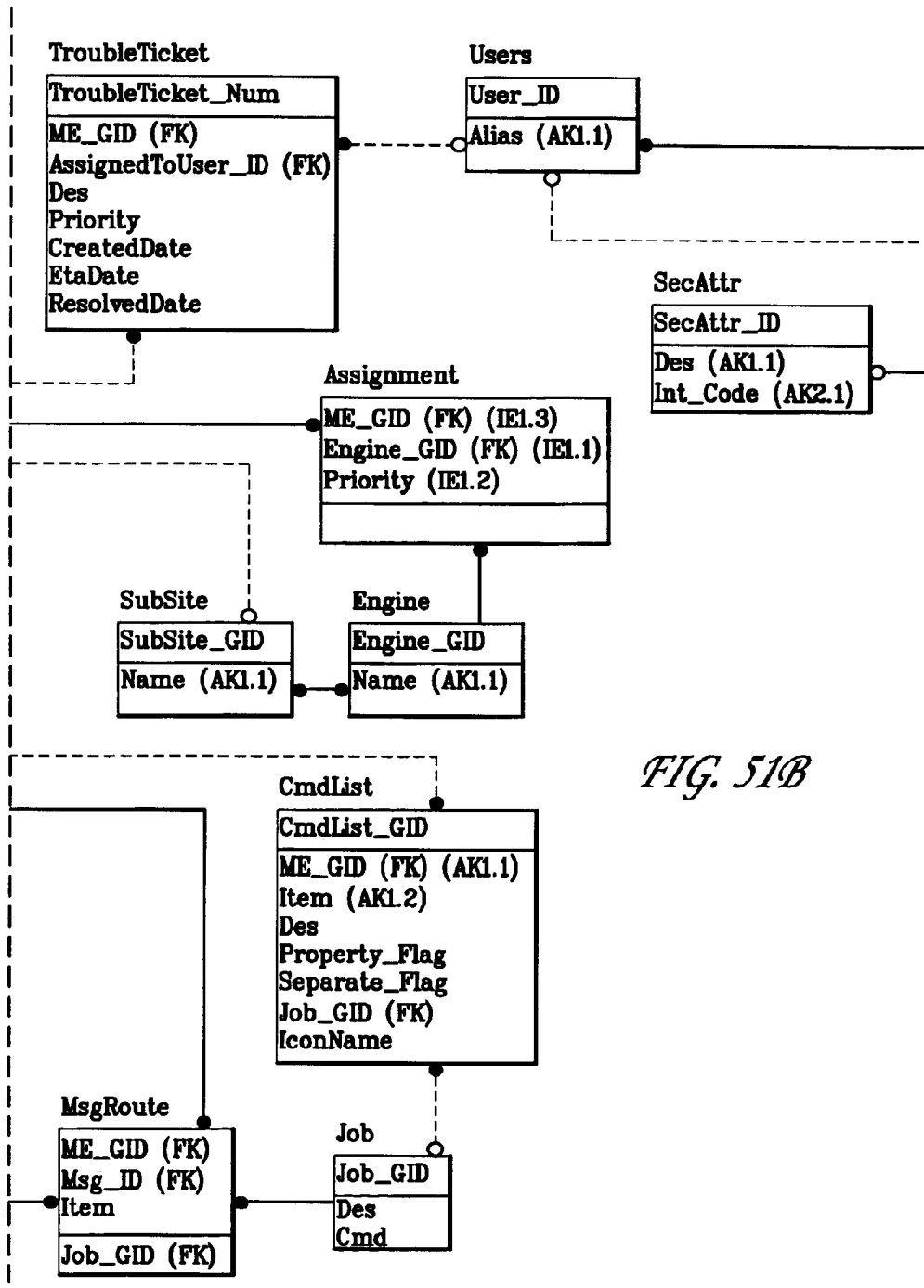
FIG. 51 is an exemplary overview of a manager engine database schema in accordance with an embodiment of the present invention.
Figure 51C:
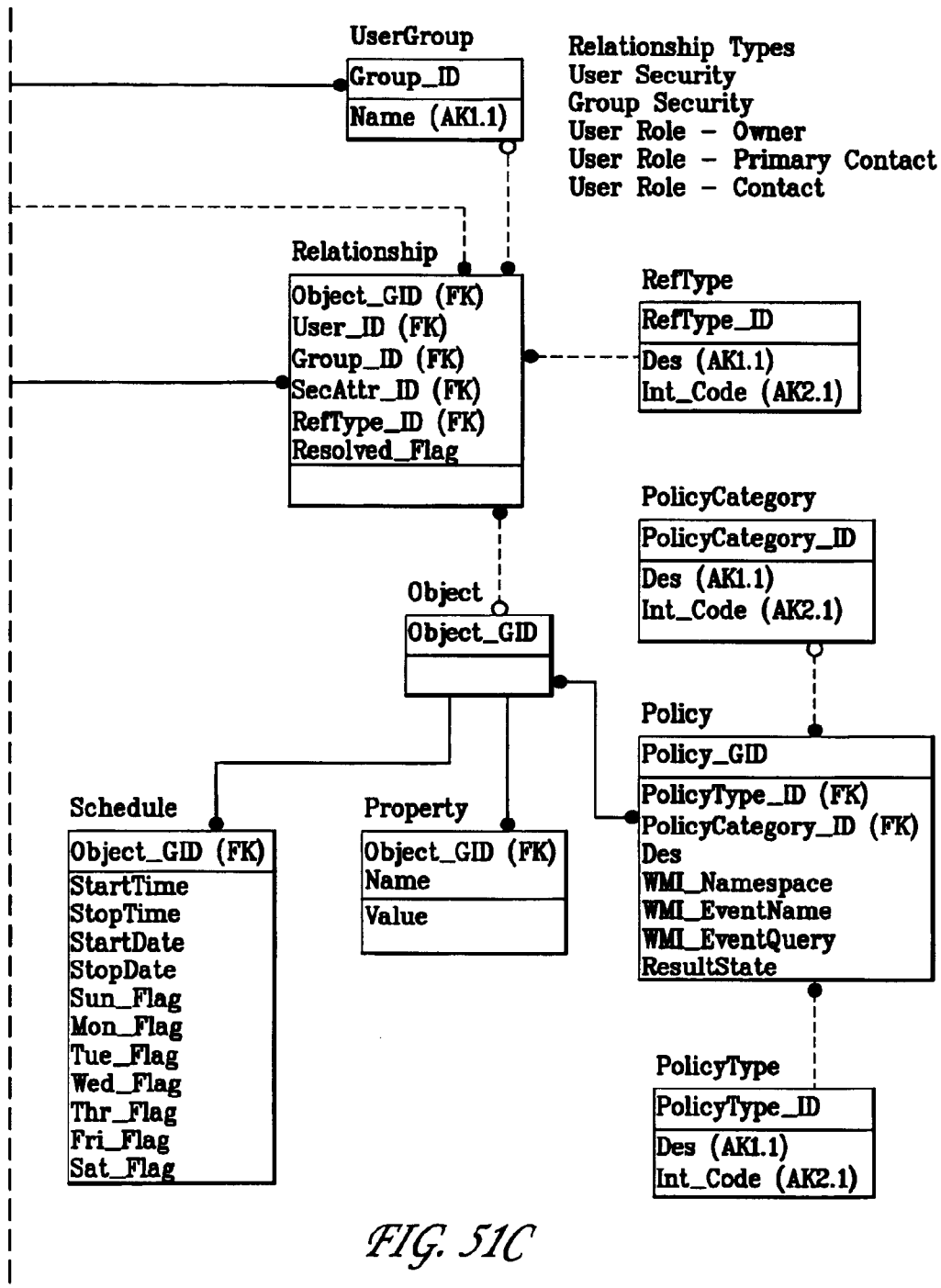

FIG. 15 depicts a manager engine (30) depicted in FIG. 1 with a database component. FIGS. 16 and 51 are exemplary overviews of database schemas. Below the figures are explained.

ME Role

The basic object in the Network system is the ME. Likewise the ME table is one of the primary tables and is used to represent all MEs including groups. Each ME is strongly typed and must have a reference to a ME Type row in the MeType table.

ME Relationship

There are two basic relationships that a ME can have with other MEs. A group ME can have zero, one, or many children ME. These ME can be any type including another group ME. A physical, resource, or virtual ME can have one of two relationship types, uses and depend upon. A use relationship indicates that the parent ME uses the child ME. A dependent relationship indicates that the parent and the child ME depend on each other. A problem with one ME will affect the other.

ME Types

Each ME is typed and based on this information the management system applies specific rules. It is also used to inform the user how the resources work with each other.

| Description | Internal Code |
|---|---|
| Windows Cluster | WINCLUSTER |
| Windows Workstation | WINWORKSTATION |
| Windows Server | WINSERVER |
| Windows Advance Server | WINADVSERVER |
| Windows Data Center | WINDATACENTER |
| SQL Server | SQLSERVER |
| Group | GROUP |

Possible Parents

Each ME type can require a parent. The following table will list the possible parents for each ME Type. If there is a listing for a ME type then one of the parents is required. The values in the columns are the internal code for ME Types.

| Type | Possible Parent |
|---|---|
| WINADVSERVER | WINCLUSTER |
| WINDATACENTER | WINCLUSTER |
| SQLSERVER | WINWORKSTATION |

-continued

| Type | Possible Parent |
|---|---|
| SQLSERVER | WINSERVER |
| SQLSERVER | WINADVSERVER |
| SQLSERVER | WINDATACENTER |

Configurations

There is a table in the Network database that is used to store specific operational parameters such as the default sub site.

| Name | Value | Description |
|---|---|---|
| Enabled | Y | Indicates that the Network database is enabled and can be used by an Engine. |
| Default SubSite | Primary | Specify the default sub site to use when adding an active ME and not sub site is specified. |

Default Groups

The database load scripts add the following default groups that are associated with ME type for auto discovery: SQL Server Group; Windows Workstation Group; Windows Server Group; Windows Advance Server Group; Windows Data Center Group; and Windows Cluster Group.

Messages

The database load scripts will create message for the Network name space.

Message Class

| Description | Internal Code |
|---|---|
| Microsoft | MS |

Message

| Class | Msg Number | Msg Type | Description |
|---|---|---|---|
| MS | 1 | 0 | ME Running |
| MS | 2 | 0 | ME Warning |
| MS | 3 | 0 | ME Critical |
| MS | 4 | 0 | ME Paused |
| MS | 5 | 0 | ME No information |

Security

The database is loaded with security roles and attributes. These are standard values that are used by the engine and snap-in to understand what and who can do what.

User Roles

User roles can define what the user or group can do and are based on the following. They can also provide additional information that is used for support purposes.

| Description | Internal Code |
|---|---|
| User Security | USER |
| Group Security | GROUP |
| User Role - Owner | UR-OWNER |
| User Role - Primary Contact | UR-PRI-CONTACT |
| User Role - Contact | UR-CONTACT |

Security Attributes

Security attributes describe what action can be done on an object in the database.

| Description | Internal Code |
|---|---|
| Read Access | READ |
| Write Access | Write |
| Full Control | FULL |
| Destroy | DESTROY |
| Execute | EXECUTE |

Policies

There are two default types of policies that are setup by the build scripts for the Network database. These are Monitor and State. Monitor specifies what is the WMI command to execute to monitor the object and state indicates what is the highest ME state the propagated.

Database Tables

Standard Columns

There are several columns used in the database schema that have a standard meaning.

| Column Type | Description |
|---|---|
| _ID | Any column name ending with "_ID" indicates that this is the unique ID that will represent a single row in the table.<br>This column is usually an integer with the property of "identity". This property tells the SQL Server to create a new ID for every new row. |
| _GID | Any column ending with "_GID" indicates that this is the unique ID column that will represent a row in the table.<br>This column is a "uniqueidentifier" SQL type that stores GUID (Global Unique Identifier). This type if ID is guaranteed to be unique in any database. These types of ID are used by the Network system to support using multiple databases and the multi-mastering requirement. |
| _Flag | Any column ending with "_Flag" indicates that the column will only accept NULL, "Y", or "N".<br>Usually there is a default rule associated with the column that forces its value to be "Y" or "N". |
| Int_Code | This name stands for "Internal Code". This code is used by the Network system to identify specific rows in the table. This allows the description column to be store the text is required by the customer. |
| Des | User supplied description for the object or row. |

Data Types

The table and store procedure scripts all reference custom data types and these are defined as follows. Although the table definitions that follow do not specify their data types based on these custom data types, the database build scripts do.

| Data Type | SQL Data Type | NULL Rule |
|---|---|---|
| DES_Type | Nvarchar(60) | NOT NULL |
| Flag | Nvarchar(1) | NULL |
| GUID_ID | Uniqueidentifier | NOT NULL |
| ID | Int | NULL |
| IntCode_Type | Nvarchar(30) | NOT NULL |
| IntNum | Int | NULL |
| IP_Type | Nvarchar(20) | NULL |
| Name_Type | Nvarchar(60) | NOT NULL |
| OBJECT_ID | Uniqueidentifier | NOT NULL |
| TextData | Nvarchar(3000) | NULL |
| URL_Type | Nvarchar(200) | NULL |

Tables

The following tables are defined in the logical model of the Network database. The tables required to implement the many to many relationship are not specified here but do exist in the ER Win model and the build scripts.

Table: ME

The ME table stores all information regarding a ME. ME can represent anything physical or virtual like a group or the result of a root cause analysis.

| Column Name | Data Type | Null Option | PK | FK |
|---|---|---|---|---|
| CurrentState | Int | NULL | No | No |
| Des | Nvarchar(60) | NOT NULL | No | No |
| Disable_Flag | Nvarchar(1) | NULL | No | No |
| IconName | Nvarchar(60) | NULL | No | No |
| InstanceName | Nvarchar(60) | NULL | No | No |
| IPAddress | Nvarchar(20) | NULL | No | No |
| ME_GID | Uniqueidentifier | NOT NULL | Yes | No |
| MeType_ID | Int | NOT NULL | No | Yes |
| NetName | Nvarchar(60) | NULL | No | No |
| SubSite_GID | Uniqueidentifier | NULL | No | Yes |
| URL | Nvarchar(200) | NULL | No | No |

Current State

Current state is a numeric value that describes what the system thinks about the ME. This column is only valid for active ME.

| Value | Description |
|---|---|
| 0 | Paused |
| 1 | No information |
| 2 | Critical |
| 3 | Warning |
| 4 | Running |

Disable Flag

The disable flag indicates that this ME is not currently in operation.

Icon Name

The name of the icon to be displayed in the ME is stored here.

Instance Name

There are services like SQL Server that can have multiple instances. Each instance is named and must be know to the Network Management Engine.

IP Address

If the ME represents a computer that has an IP address it value is stored here. This is only used for statically allocated address and is not useful for computers that use the DHCP service.

MeType_ID

A foreign key that references a row in the MeType table. This creates a strong type for each ME.

Net Name

Used to store the network name for MEs that represent a computer on the network. It can also be used in a cluster ME to store the network name of the cluster.

SubSite_GID

References the sub site that the ME is assigned to. This will force the engines to only assign the ME to engines that are supporting the sub site.

URL

This is the friendly unique name for a ME. It is usually created by the database's stored procedures based on what type of ME is being created, e.g. a SQL Server hosted on a computer named "DB1" would be "DB1.SqlServer".

Table: MeRelationship

The ME Relationship stores the parent and child relationships for all ME. It also provides the storage for relationship type, watch window, and control data for displaying the ME in the DDS surface.

| Column Name | Data Type | Null Option | PK | FK |
| --- | --- | --- | --- | --- |
| ChildME_GID | Uniqueidentifier | NOT NULL | No | Yes |
| ControlData | Nvarchar(3000) | NULL | No | No |
| ParentME_GID | Uniqueidentifier | NOT NULL | No | Yes |
| TwoWay_Flag | Nvarchar(1) | NULL | No | No |
| Uses_Flag | Nvarchar(1) | NULL | No | No |
| Watch_Flag | Nvarchar(1) | NULL | No | No |
| Watch_ICON | Int | NULL | No | No |

Parent ME GID

This column will store the parent's ME GID.

Child ME GID

This column will store the child's ME GID. A parent can have multiple children.

Control Data

This column is used by the Network MMC snap-in to store display specific information for the ME. An example is that the parent ME is a group and each relationship to the children store the current position in this field.

Two Way Flag

This flag indicates that the ME to ME relationship is really two way. A problem with one ME will affect the other.

Uses Flag

This flag indicates that the parent uses the child instead of depends on relationship.

Watch Icon

If the child ME is to be display in the watch panel, this field will store the icon's name. This is usually a smaller version of the ME icon.

Watch Flag

This flag indicates that the child is to be displayed in the parent's ME control.

Table: METype

The ME Type table list all the possible types of MEs and provide the system requirement of strongly typing all ME in the system. This table is preloaded when the database is created can be added to as needed.

| Column Name | Data Type | Null Option | PK | FK |
| --- | --- | --- | --- | --- |
| AutoDiscovery_Flag | Nvarchar(1) | NULL | No | No |
| Des | Nvarchar(60) | NOT NULL | No | No |
| GroupMeName | Nvarchar(60) | NULL | No | No |
| Int_Code | Nvarchar(30) | NOT NULL | No | No |
| MeType_ID | Int | IDENTITY | Yes | No |

Auto Discovery Flag

This flag indicates to the engine to setup with the Active Directory to be notified when a new server of this type is added.

Group ME Name

This field stores the name of the ME group that will be used when a new ME type is discovered. If no group is listed the "unassigned" group will be used.

Table: PossibleParent

The possible parent table provide the information that states what ME can be a parent of another ME. It links a ME type to other ME types. If there is no relationship to another ME type then the ME can be independent of other ME like a group. If there is a listing in the possible parent table for a ME type then the ME associated with the type must have a parent of the given ME type.

| Column Name | Data Type | Null Option | PK | FK |
| --- | --- | --- | --- | --- |
| Child_ID | Int | NOT NULL | Yes | Yes |
| Parent_ID | Int | NOT NULL | Yes | Yes |

Table: SubSite

The sub site table list all the sub sites that the managed site supports. Sub sites are associated with MEs and engines. This allows the installed engines to perform load balancing and fall over assignments.

| Column Name | Data Type | Null Option | PK | FK |
| --- | --- | --- | --- | --- |
| Name | Nvarchar(60) | NOT NULL | No | No |
| SubSite_GID | Uniqueidentifier | NOT NULL | Yes | No |

Name

This column stores the name of the sub site. This can be unique in the management site.

Table: Engine

The engine table stores all the Network Management Engines that support the Management site. These can further be grouped by sub site.

| Column Name | Data Type | Null Option | PK | FK |
| --- | --- | --- | --- | --- |
| Engine_GID | Uniqueidentifier | NOT NULL | Yes | No |
| Name | Nvarchar(60) | NOT NULL | No | No |

Name

This column stores the name of the Network Management Engine. This value must be unique in the management site.

Table: Assignment

The assignment table stores the relationship between the ME and the Engine. This information is used to provide the engine the information about which ME is assigned to which engine and what type of an assignment it is. Each active ME is has a primary assignment to an engine. It also has engines assigned to it as backups. Up to 3 backup engines can be assigned to an ME and the priority value is used to indicate the role. A priority value of 0 will represent the primary assignment and higher numbers will represent the backup. Backup assignments are priorities so that the system can handle up to 3 engine failures.

| Column | Data Type | NULL Rule | PK | FK |
|---|---|---|---|---|
| Engine_GID | Uniqueidentifier | NOT NULL | Yes | Yes |
| ME_GID | Uniqueidentifier | NOT NULL | Yes | Yes |
| Priority | Int | NOT NULL | Yes | No |

Priority

This column specifies the assignment priority.

| Value | Description |
|---|---|
| 0 | Primary |
| 1 | First backup assignment |
| n | The n$^{th}$ backup assignment |

Table: CmdList

The command list table stores the command(s) for each ME. It also includes display ordering, icon name, and separator indicator.

| Column Name | Data Type | Null Option | PK | FK |
|---|---|---|---|---|
| CmdList_GID | Uniqueidentifier | NOT NULL | Yes | No |
| Des | Nvarchar(60) | NOT NULL | No | No |
| IconName | Nvarchar(60) | NULL | No | No |
| Item | Int | NOT NULL | No | No |
| Job_GID | Uniqueidentifier | NULL | No | Yes |
| ME_ID | Uniqueidentifier | NOT NULL | No | Yes |
| Property_Flag | Nvarchar(1) | NULL | No | No |
| Separate_Flag | Nvarchar(1) | NULL | No | No |

Icon Name

This column stores the name of the icon to be used when the commands are listed for the user by the snap-in.

Item

This field is used to control the order of commands to be listed by the snap-in.

Separate Flag

This flag indicates that a separation line is to be displayed when the snap-in list the commands.

Property Flag

Table: Job

The job table stores the actual job commands in script or command line form. Jobs are associated with "CmdList" or messages. A message can invoke a job, which can also send additional messages.

| Column Name | Data Type | Null Option | PK | FK |
|---|---|---|---|---|
| Cmd | Nvarchar(3000) | NULL | No | No |
| Des | Nvarchar(60) | NOT NULL | No | No |
| Job_GID | Uniqueidentifier | NOT NULL | Yes | No |

Cmd

This column is used to store the text representing of the command to execute for the job. This can be a script or a command line program that is to be invoked by the snap-in.

Table: MessageClass

The message class table store the message types listed in the message master table. This table is actually used to provide multiple name space so that message numbers and descriptions of different systems can co-exist in the Network database.

| Column Name | Data Type | Null Option | PK | FK |
|---|---|---|---|---|
| Des | Nvarchar(60) | NOT NULL | No | No |
| Int_Code | Nvarchar(30) | NOT NULL | No | No |
| MsgClass_ID | Int | IDENTITY | Yes | No |

Table: Message

The message table stores the message reference information of all the messages that the system can send or receive. This table is used as a master reference to map the message routing and provide support for the message history table.

| Column Name | Data Type | Null Option | PK | FK |
|---|---|---|---|---|
| Des | Nvarchar(60) | NOT NULL | No | No |
| Msg_ID | Int | IDENTITY | Yes | No |
| MsgClass_ID | Int | NOT NULL | No | Yes |
| MsgNumber | Int | NOT NULL | No | No |
| MsgType | Int | NOT NULL | No | No |

Message Number

The message number column stores the message or event number based on the message class.

Message Type

The message type column describes the type of message, warning, error, or informational.

Table: MsgRoute

The message route table stores the different paths a message can take with the system. It maps what happens when a message is received from a ME and what message or actions (jobs) should be invoked.

| Column Name | Data Type | Null Option | PK | FK |
|---|---|---|---|---|
| Item | Int | NOT NULL | Yes | No |
| Job_GID | Uniqueidentifier | NOT NULL | No | Yes |
| ME_ID | Uniqueidentifier | NOT NULL | Yes | Yes |
| Msg_ID | Int | NOT NULL | Yes | Yes |

Item

The item column value is used to order the message routing invocations.

Table: MsgHistory

The message history table stores all the messages that have been processed by the system for each ME. The data in this table must be retired based on a schedule to prevent the database from getting too big. This history is only valuable for a limited time and should not be kept for over a month.

| Column Name | Data Type | Null Option | PK | FK |
|---|---|---|---|---|
| CustDataType_ID | Int | NOT NULL | No | Yes |
| CustomData | Ntext | NULL | No | No |
| Des | Nvarchar(60) | NOT NULL | No | No |
| DetailDes | Nvarchar(3000) | NULL | No | No |
| FromME_ID | Uniqueidentifier | NULL | No | Yes |
| Msg_ID | Int | NOT NULL | No | Yes |
| MsgHistory_GID | Uniqueidentifier | NOT NULL | Yes | No |
| OrgDate | Datetime | NULL | No | No |
| ProcessedDate | Datetime | NULL | No | No |
| ToME_ID | Uniqueidentifier | NULL | No | Yes |

Custom Data

The custom data column stores custom data from the message if there is any. The custom data type will reference the viewer that can be used to decode the message.

Detail Description

The detail description will provide a textual description that can be reported on or displayed in the snap-in.

Organ Date

The organ date will record the date when the message was first received by the Network system.

Processed Date

The processed date column stores the date when the Network processes the message. This is usually done when the message is processed by the message routing system.

To ME ID

This column will reference the ME that the message is directed to.

From ME ID

This column will reference the ME that generated the message. This value could be NULL if the message was externally generated.

Table: CustDataType

The Custom Data Type table describes the viewer to be used when displaying the data stored in the message history table.

| Column Name | Data Type | Null Option | PK | FK |
|---|---|---|---|---|
| CustDataType_ID | Int | IDENTITY | Yes | No |
| Int_Code | Nvarchar(30) | NOT NULL | No | No |
| Viewer | Nvarchar(3000) | NULL | No | No |

Viewer

This column provide the snap-in and reporting systems on what type of viewer can be used to decode the custom data field in the message table.

Table: Monitor

The monitor table lists all the performance monitor objects available to the performance collector. It also provides a reference to the system to allow the monitor schedules to be created and maintained.

| Column Name | Data Type | Null Option | PK | FK |
|---|---|---|---|---|
| Monitor_ID | Int | IDENTITY | Yes | No |
| PerfObjectName | Nvarchar(60) | NOT NULL | No | No |

Performance Object Name

This column details the performance object that can be monitored by the performance collector.

Table: MonitorSched

The monitor schedule table is used to create a unique ID and a relationship between the ME and a monitor object. The unique ID is required to provide a reference to a schedule that is associated with the object table.

| Column Name | Data Type | Null Option | PK | FK |
|---|---|---|---|---|
| ME_ID | Uniqueidentifier | NOT NULL | No | Yes |
| MonitorSched_GID | Uniqueidentifier | NOT NULL | Yes | No |

Table: Object

The Network database is broken into two sections. One section is designed as a classic relationship model between information. The second part is designed to provide an object model that allows policies, properties, and security to be associated with any uniquely identified piece of information in the database.

Triggers on tables that require this object support added and remove rows for each row in their respective tables.

| Column Name | Data Type | Null Option | PK | FK |
|---|---|---|---|---|
| Object_GID | Uniqueidentifier | NOT NULL | Yes | No |

Table: UserGroup

The user group table stores the current groups and is associated with n users.

| Column Name | Data Type | Null Option | PK | FK |
|---|---|---|---|---|
| Group_ID | Int | IDENTITY | Yes | No |
| Name | Nvarchar(60) | NOT NULL | No | No |

Name

This column details the name of the user group. The value must be unique for the management site.

Table: Users

The user table stores the users that are allow to interact with the Network system. User can be associated with objects with security attributes or associated with a user group.

| Column Name | Data Type | Null Option | PK | FK |
|---|---|---|---|---|
| Alias | Nvarchar(60) | NOT NULL | No | No |
| User_ID | Int | IDENTITY | Yes | No |

Alias

This column stores the alias for the user. This value must be unique for the management site.

Table: Config

The configuration table stores database and system configuration based on name+value.

| Column | Data Type | NULL Rule | PK | FK |
|---|---|---|---|---|
| Disable_Flag | Nvarchar(1) | NULL | No | No |
| Name | Nvarchar(60) | NOT NULL | Yes | No |
| Value | Nvarchar(3000) | NULL | No | No |

Name

The value in this column will provide the name of the configuration.

Value

This column stores the value for the configuration defined by the name.

Table: Policy

The policy table stores policy information for objects in the database. These policies are strongly typed.

| Column Name | Data Type | Null Option | PK | FK |
|---|---|---|---|---|
| Data | Nvarchar(3000) | NOT NULL | No | No |
| Des | Nvarchar(60) | NOT NULL | No | No |
| Policy_GID | Uniqueidentifier | NOT NULL | Yes | No |
| PolicyType_ID | Int | NOT NULL | No | Yes |

Data

The data in this column is used by the Management engine to setup the WMI command for implementing a policy or internal process.

Table: PolicyType

The policy type table provides the type information for all policies associated with objects like ME in the database.

| Column Name | Data Type | Null Option | PK | FK |
|---|---|---|---|---|
| Des | Nvarchar(60) | NOT NULL | No | No |
| Int_Code | Nvarchar(30) | NOT NULL | No | No |
| PolicyType_ID | Int | IDENTITY | Yes | No |

Table: Property

The property table list the name+value properties for a given object. Like policies there are several ME that can have properties.

| | | | | |
|---|---|---|---|---|
| Name | Nvarchar(60) | NOT NULL | Yes | No |
| Object_GID | Uniqueidentifier | NOT NULL | Yes | Yes |
| Value | Nvarchar(3000) | NULL | No | No |

Name

This column stores the name of the property.

Value

This column stores the value for the named property.

Table: Relationship

The relationship table details the relationships between user, user groups and object with security attributes. Security attributes are usually read, write, destroy, and execute.

| Column Name | Data Type | Null Option | PK | FK |
|---|---|---|---|---|
| Group_ID | Int | NOT NULL | Yes | Yes |
| Object_GID | Uniqueidentifier | NOT NULL | Yes | Yes |
| RelType_ID | Int | NOT NULL | Yes | Yes |
| Resolved_Flag | Nvarchar(1) | NOT NULL | Yes | No |
| SecAttr_ID | Int | NOT NULL | Yes | Yes |
| User_ID | Int | NOT NULL | Yes | Yes |

Resolved Flag

This flag is used to indicate that the security profile is a generated one to improve the performance of the system.

Table: RelType

The relationship type table describes the type of relationships object can have with users or user groups. These types are treated like roles where the user or group can perform specific function(s).

| Column Name | Data Type | Null Option | PK | FK |
|---|---|---|---|---|
| Des | Nvarchar(60) | NOT NULL | No | No |
| Int_Code | Nvarchar(30) | NOT NULL | No | No |
| RelType_ID | Int | IDENTITY | Yes | No |

Table: Schedule

The schedule table details the schedules for a given object. This schedule provides weekly setting with start and stop times.

| Column Name | Data Type | Null Option | PK | FK |
|---|---|---|---|---|
| Fri_Flag | Nvarchar(1) | NULL | No | No |
| Mon_Flag | Nvarchar(1) | NULL | No | No |
| Object_GID | Uniqueidentifier | NOT NULL | Yes | Yes |
| Sat_Flag | Nvarchar(1) | NULL | No | No |
| StartDate | Nvarchar(1) | NOT NULL | No | No |
| StartTime | Datetime | NOT NULL | No | No |
| StopDate | Nvarchar(1) | NOT NULL | No | No |
| StopTime | Datetime | NOT NULL | No | No |
| Sun_Flag | Nvarchar(1) | NULL | No | No |
| Thr_Flag | Nvarchar(1) | NULL | No | No |
| Tue_Flag | Nvarchar(1) | NULL | No | No |
| Wed_Flag | Nvarchar(1) | NULL | No | No |

Start & Stop Date
    These dates define when the schedule is active. The values are inclusive.

Start & Stop Time
    These time fields define when the schedule is active and the values are inclusive.

Sun->Sat Flags
    These flags indicate which day the schedule is active.

Table: SecAttr
    The security attribute table details the types of security the system supports. Currently it is read, write, destroy, and execute.

| Column Name | Data Type | Null Option | PK | FK |
|---|---|---|---|---|
| Des | Nvarchar(60) | NOT NULL | No | No |
| Int_Code | Nvarchar(30) | NOT NULL | No | No |
| SecAttr_ID | Int | IDENTITY | Yes | No |

Table: TroubleTicket
    The trouble ticket table stores all the current and completed work requests the system or support personnel make. It is intended that this sub system not be used if Network is integrated with a customer trouble ticketing system. This table is also used in the current work display to show what outstanding work is being done and when it will be completed.

| Column Name | Data Type | Null Option | PK | FK |
|---|---|---|---|---|
| AssignedToUser_I | Int | NOT NULL | No | Yes |
| CreatedDate | Datetime | NOT NULL | No | No |
| Des | Nvarchar(60) | NOT NULL | No | No |
| EtaDate | Datetime | NULL | No | No |
| ME_ID | Uniqueidentifier | NULL | No | Yes |
| Priority | Int | NULL | No | No |
| ResolvedDate | Datetime | NULL | No | No |
| TroubleTicketNum | Uniqueidentifier | NOT NULL | Yes | No |

Created Date
    This column store the date when the trouble ticket was created.

ETA Date
    This column may store the estimated date when the trouble will be fixed.

Priority
    The priority filed store a value that indicates how important the work ticket is. The higher the number is, the higher the priority.

Resolved Date
    This column stores the date when the ticket is resolved and closed.

Stored Procedures

Parameter Table
    This section details the stored procedures that support the Network database. Included is information about the parameters and what the stored procedure is used for. The following describes the information provided for each stored procedures.

Parameter
    The parameter name is listed and when the SP is executed an "@" symbol should be prefixed. e.g. AddGroup @DES='Group Name', @URL='URL name' The parameters to the "AddGroup" SP are DES and URL.

Data Type
    See the data type definition table above.

Default
    This column will list the default value if any that will be used if the parameter is not specified.

Required (Req)
    This column will detail if the parameter is required and must be specified when the stored procedure is called.

Linked
    The linked column will display the name of the parameter, which can be specified instead if the information is not available in the specific format. This is normally used when the ID of a row can be supplied by another type of key. For example a specific ME can be referenced by its ID or URL. The SP can accept either of these values but not both. If both parameters are specified the ID is only used.

Stored Procedures
    The following procedures are currently used as a primary interface to the Network database.

Add Group
    The stored procedure "AddGroup" is used to add a group to the database.

| Parameter | Data Type | Default | Req | Linked |
|---|---|---|---|---|
| DES | DES_Type, | | Yes | |
| URL | URL_Type | NULL | | |
| PARENT_GID | GUID_ID | NULL | | PARENT_URL |
| PARENT_URL | URL_Type | NULL | | PARENT_GID |

Description (DES)
    The description parameter is used to name the group and will be displayed in the snap-in.

URL
    This is a unique name for the group and if this parameter is not specified the value specified in the "DES" parameter will be used.

Parent (GID or URL)
    These parameters allow the option of linking the new group to a parent ME.

Add ME
    The stored proce1dure "AddMe" is used to add a new ME to the database.

| Parameter | Data Type | Default | Req | Linked |
|---|---|---|---|---|
| METYPE | IntCode_Type, | | Yes | |
| DES | DES_Type, | | Yes | |
| ICONNAME | Name_Type | NULL | | |
| NETNAME | Name_Type | NULL | | |
| INSTANCENAME | Name_Type | NULL | | |
| URL | URL_Type | NULL | | |

ME Type (METYPE)

This parameter requires the ME type for the new ME. See the default values listed in the next section.

Description (DES)

This parameter is used to provide a description of the ME and will be displayed in the snap-in.

ICON Name (ICONNAME)

This parameter is used to supply the name of the ICON to be displayed by the snap-in ME control. If no value is specified then a default ICON will be displayed.

Network Name (NETNAME)

Use this parameter to specify the network name of the server if the ME represents a physical node that can be resolved via a DSN or WINS. ME types for servers and workstation will require this information.

Instance Name (INSTANCENAME)

Several services like SQL Server can have multiple instances running on a server. This value is used to specifically address a specific instance. If this value is NULL then the default instance is assumed.

URL

This parameter supplies a unique name for the ME. If this value is NULL then the ME cannot be looked up via a URL code and must be referenced by its ID.

Add ME Child

The stored procedure "AddMeChild" creates a relationship between a parent ME and a child. It also allows specific properties to be created for the relationship.

| Parameter | Data Type | Default | Req | Linked |
|---|---|---|---|---|
| PARENT_URL | URL_Type | NULL | | PARENT_GID |
| PARENT_GID | GUID_ID | NULL | | PARENT_URL |
| CHILD_URL | URL_Type | NULL | | CHILD_GID |
| CHILD_GID | GUID_ID | NULL | | CHILD_URL |
| USES_FLAG | FLAG | "N" | | |
| TWOWAY_FLAG | FLAG | "N" | | |

Parent(PARENT_URL or PARENT_GID)

Use either of these parameters to specify the parent ME of the relationship. One or the other is required in the present embodiment.

Child (CHILD_URL or CHILD_GID)

Use either of these parameters to specify the child ME of the relationship. One or the other is required.

Uses Flag (USES_FLAG)

This parameter specifies that parent is dependent on the child based on resources.

Two Way Flag

This parameter is used to indicate that the relationship is two way, the parent and child depend on each other. This is to mean that if one of the ME has a problem it will affect the other.

Add Server

The stored procedure "AddServer" is used to add a server ME to the database.

| Parameter | Data Type | Default | Req | Linked |
|---|---|---|---|---|
| NETNAME | NAME_Type, | | Yes | |
| DES | DES_Type | NULL | | |
| SVRTYPE | IntCode_Type, | | Yes | |
| SUBSITE | NAME_TYPE | NULL | | |
| GROUP | URL_Type | NULL | | |

Network Name (NETNAME)

This parameter may be used to specify the network name of the server.

Description (DES)

This parameter may provide the description for the server. If a description is not specified the network name is used.

Server Type (SVRTYPE)

Specify the internal code for the ME Type for the server. See the next section for a list of internal codes.

Sub Site (SUBSITE)

If the server is to be associated with a sub site that is not the default, its name can be specified.

Group

If the server is to be associated with a ME group then its URL can be specified.

Add SQL Server

The stored procedure "AddSqlServer" is used to add a reference to a SQL server to the database. If the server that is host the SQL server is not present in the database then it too will be added.

| Parameter | Data Type | Default | Req | Linked |
|---|---|---|---|---|
| NETNAME | NAME_Type, | | Yes | |
| DES | DES_Type, | | Yes | |
| SVRTYPE | IntCode_Type | NULL | | |
| SUBSITE | NAME_TYPE | NULL | | |
| INSTANCE | NAME_TYPE | NULL | | |
| GROUP | URL_Type | NULL | | |

Network Name (NETNAME)

Use this parameter to specify the network name of the server.

Description (DES)

This parameter will provide the description for the server. If a description is not specified the network name is used.

Server Type (SVRTYPE)

Specify the internal code for the ME Type for the server. See the next section for a list of internal codes.

Sub Site (SUBSITE)

If the server is to be associated with a sub site that is not the default, its name can be specified.

Instance

There can be multiple instance of SQL Server running on the same computer. The instance name can be specified if the reference is not the default.

Group

If the server is to be associated with a ME group then its URL can be specified.

Add Sub Site

The stored procedure "AddSubSite" is used to add a sub site to the database. Each sub site name must be unique in the management site which is basically the database.

| Parameter | Data Type | Default | Req | Linked |
|---|---|---|---|---|
| NAME | NAME Type | | Yes | |

Name

This parameter is used to specify the name of the new sub site. It must be unique in the management site.

Assign ME to a Group

The stored procedure "AssignMeToGroup" will assign a ME to another ME, which is a group type.

| Parameter | Data Type | Default | Req | Linked |
|---|---|---|---|---|
| ME URL | URL Type | NULL | | ME GID |
| ME GID | GUID ID | NULL | | ME URL |
| GROUP URL | URL Type | NULL | | GROUP GID |
| GROUP GID | GUID ID | NULL | | GROUP URL |

The paramters are the following:

ME (ME_URL or ME_GID)

Specifies the ME that is to be assigned to the group.

Group (GROUP_URL or GROUP_GID)

Specifies the Group ME that represents the group that the ME is to be added as a child.

Assign Server to Sub Site

The stored procedure "AssignServerToSubSite" will assign a ME that is of a server type to a sub site. This SP is normal used internal by other SP and should not be execute directly.

| Parameter | Data Type | Default | Req | Linked |
|---|---|---|---|---|
| SERVER GID | GUID ID, | | Yes | |
| SUBSITE | NAME Type | NULL | | |

Server ID (SERVER_GID)

This parameter is used to specify the server ME that is to be assigned to the sub site.

Sub Site (SUBSITE)

This parameter is used to specify the name of the sub site that the server ME is to be assigned to. If this parameter is not specified then the ME is assigned to the default sub site.

Is Group

The stored procedure "IsGroup" is used to test to see if the referenced ME is of a group type. This is normal used by other stored procedures and should not be called directly.

| Parameter | Data Type | Default | Req | Linked |
|---|---|---|---|---|
| GROUP GID | GUID ID, | | Yes | |
| RAISE | int | NULL | | |

Group ID (GROUP_GID)

Specify the group ME ID that is to be tested.

Raise

This flag is used to indicate to the stored procedure to raise an exception "RAISERRROR" if the ME is not of the group type.

Return

This store procedure uses the "RETURN" function to return the test state. The value 0 indicates that the ME is not a group while the value of 1 indicates it is a group.

List ME Children

The stored procedure "ListMeChildren" will list the MEs that are children to the specified ME.

| Parameter | Data Type | Default | Req | Linked |
|---|---|---|---|---|
| ME URL | URL Type | NULL | | ME GID |
| ME GID | GUID ID | NULL | | ME URL |

ME(ME_URL or ME_GID)

These parameters are used to specify the parent ME's reference. One or the other parameter must be specified.

Output

The following table describes the output of this stored procedure.

| Column | Description |
|---|---|
| Type Int Code | ME Type's internal code |
| Des | ME's description |
| IconName | ME's icon name |
| NetName | ME's network name |
| InstanceName | ME's instance name |
| URL | ME's URL |
| CurrrentState | ME's current state value |
| Disable Flag | Indicates if the ME is active |
| Watch Flag | Indicates that the child should appear in the parent's |
| Watch ICON | This ICON should be used in the parent's ME |
| ControlData | The ME's control data for the relationship |

List ME Per Group

The stored procedure "ListMePerGroup" will enumerate the ME associated with a group ME.

| Parameter | Data Type | Default | Req | Linked |
|---|---|---|---|---|
| GROUP URL | URL Type | NULL | | GROUP GID |
| GROUP GID | GUID ID | NULL | | GROUP URL |

Group (GROUP_URL or GROUP_GID)

These parameters are used to identify the group to be reported on. One of these parameters must be specified.

Output

The following table describes the output of this stored procedure.

| Column | Description |
| --- | --- |
| ME GID | ME'sID |
| Type Int Code | ME's type internal code |
| Des | ME's description |
| IconName | ME's ICON name |
| NetName | ME's network name |
| InstanceName | ME's instance name |
| URL | ME's URL |
| CurrentState | ME's current state value |
| Disable Flag | Indicates if the ME is currently active |
| ControlData | The ME's control data for the relationship |

List Top Groups

The stored procedure "ListTopGroups" will enumerate the group MEs that have no parent and therefore are the top groups. There are no parameters for this stored procedure.

Output

The following table describes the output of this stored procedure.

| Column | Description |
| --- | --- |
| ME GID | ME's ID |
| Des | ME's description |
| URL | ME's URL |
| IconName | ME's ICON name |
| CurrentState | ME's current state value |
| Disable Flag | Indicates if the ME is currently active |

List Unassigned MEs

The stored procedure "ListUnassignedME" will return a list of ME that are not associated with any groups. There are no parameters for this stored procedure.

Output

The following table describes the output of this stored procedure.

| Column | Description |
| --- | --- |
| ME GID | ME's ID |
| Des | ME's description |
| URL | ME's URL |
| IconName | ME's ICON name |
| InstanceName | ME's instance name |
| Type Int Code | ME's type internal code |

Locate ME ID

The stored procedure "LocateMeID" is used by internal stored procedures to return the ME ID if the ME's URL is specified. To make the consumer stored procedures simple this stored procedure will accept both ID and URL and will return the current information.

| Parameter | Data Type | Default | Req | Linked |
| --- | --- | --- | --- | --- |
| ME URL | URL Type | NULL | | ME GID |
| ME GID | GUID ID | | Yes | ME URL |

ME (ME_URL or ME_GID)

These parameters are used to specify the parent ME's reference. One or the other parameter must be specified. The ME_GID must have the "OUTPUT" modifier so that the ID can be returned to the calling stored procedure.

Set Configuration

The stored procedure "SetConfig" will add or change current configuration for the Network database.

| Parameter | Data Type | Default | Req | Linked |
| --- | --- | --- | --- | --- |
| Name | NAME Type | | Yes | |
| Value | TextData | | Yes | |

Name

This parameter is used to specify the name of the configuration and must be unique. If the name already exists in the config table the value will be updated.

Value

This parameter specifies the value to be stored for the named configuration.

Set ME Control Data

The stored procedure "SetMeControlData" is used to update existing control data for a ME to ME relationship. This SP is designed to be used by the snap-in to update the its control data for the ME control.

| Parameter | Date Type | Default | Req | Linked |
| --- | --- | --- | --- | --- |
| GROUP URL | URL Type | NULL | | GROUP URL |
| GROUP GID | GUID ID | NULL | | GROUP URL |
| ME URL | URL Type | NULL | | ME GID |
| ME GID | GUID ID | NULL | | ME URL |
| CONTROLDATA | TextData | | Yes | |

Group (GROUP_URL or GROUP_GID)

This parameter Specify the Group ME that represents the group.

ME (ME_URL or ME_GID)

This paramter specifies the ME that the control data is to be updated.

Control Data (CONTROLDATA)

This parameter specifies the control data for the ME to ME relationship.

iii. Manager Engine—Database Replication Manager

Figure 28:
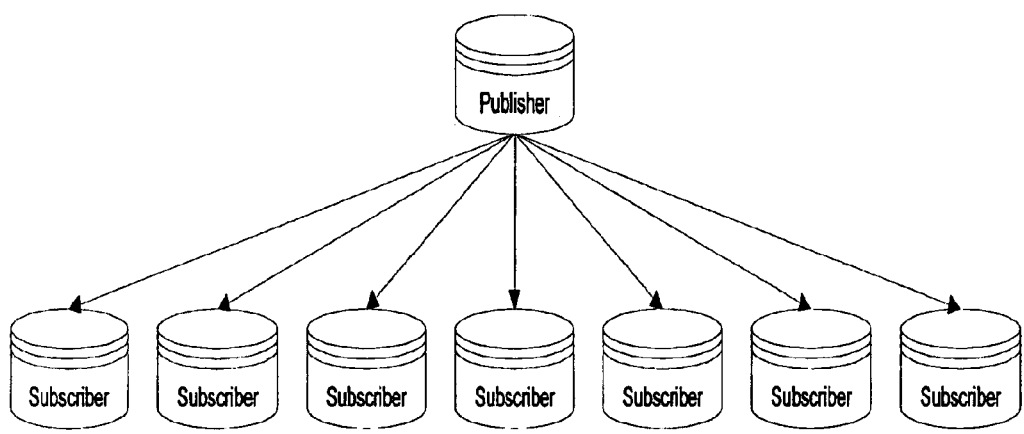
FIG. 28 depicts an overview of the operation of the database replication manager component of the manager engine depicted n FIG. 1.

FIG. 28 is an overview of the operation of the database replication manager in the present embodiment. The database replication manager must keep all data within the Network databases synchronised across all engines within a site. A site may span only a single domain forest (unless suitable trusts can be established outside of the tree). This will be achieved using a single publisher/subscriber, multiple subscriber model as shown above. The data publisher should resolve all data conflicts. Replication is a background task that occurs automatically. It can also be directly requested by other parts of the Management engine.

In the presently described embodiment, the replication manager has the following requirements and dependencies: a list of all Management engines within a site is required to maintain replication subscriptions and publications; replication can only transmit a maximum of 6000 bytes per row; for replication to succeed, a domain account will have to be used as the SQL Server Agent service account; and conflict resolution will be based on the "first wins" principal.

In the presently described embodiment, backup publishers are specified in a similar way to ME assignment backups. Each backup publisher will create a snapshot of the database. The first backup publisher will update this snapshot at regular but infrequent intervals (once per day). All subscribers will use pull subscriptions.

In the presently described embodiment, the replication manager will create the following dependencies on itself: a public interface to start, stop and pause replication (INetworkControl); a message class and set of messages that are sent via the message switch (the messages will include notifications that replication has started, stopped and (potentially) a percentage complete).

Figure 29:
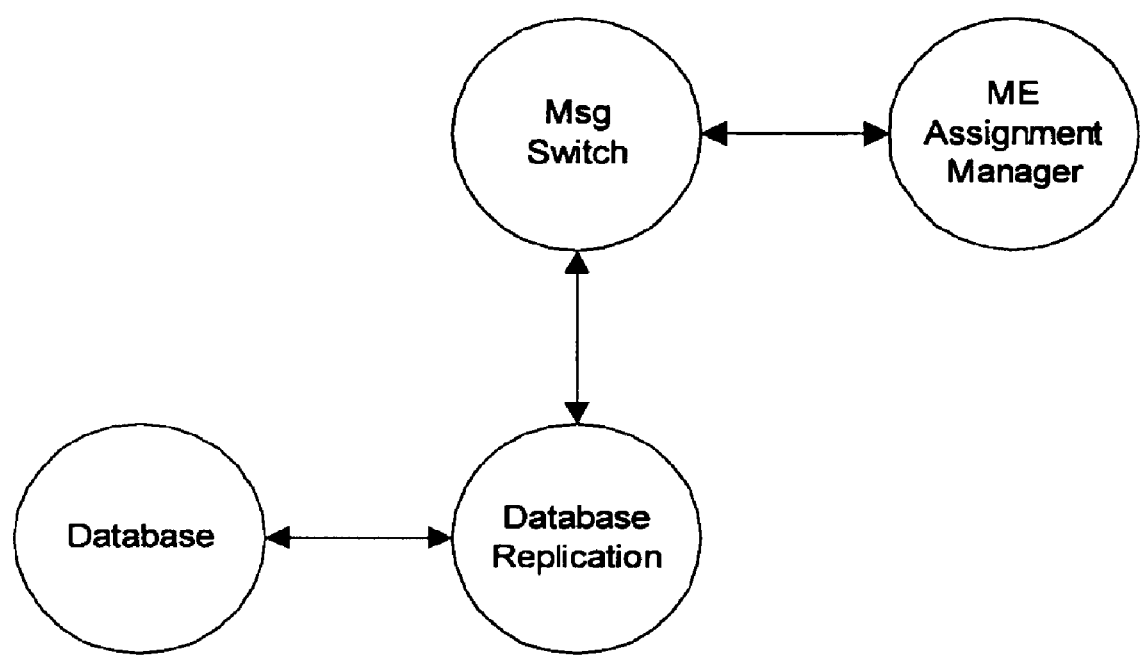
FIG. 29 illustrates the interaction between the data replication manager and the message switch component.

FIG. 29 illustrates the interaction between the data replication manager and the message switch component in the presently described embodiment. As shown in FIG. 29, all information required by or sent from the Database Replication component will be transmitted via the Message Switch component.

The component is initialised via the INetworkControl interface. Control of replication is handled by the SQL Server Merge ActiveX control. Initialisation of the publication and subscriptions are handled by stored procedures. Below are classes and methods which may be associated with such procedures.

class INetworkControl
{
   HRESULT Init(void);
   HRESULT Term(void);
   HRESULT Pause(BOOL fTrue);
};

Method: Init

The "Init" method is used to initialise the Database Replication component. It may include the following steps: 1) retrieve the database connection string from the registry; 2) detect SQL Server is started and SQL Server agent is using a domain account. Start the SQL services if necessary; 3) create local callback class; 4) create an instance of MsgSwitchCommand; 5) register callback class; 6) register for message switch messages merge replication ActiveX control; 7) create IDispatch class implementing merge replication events and register; 8) create thread proc Listener; 9) create thread proc Replicate; and 10) create a timer.

Received Messages

| Msg | Description |
| --- | --- |
| 8 | Engine has stopped |
| 9 | Engine has been deleted |
| 10 | Engine has been evicted |
| 11 | Request replication to start |
| 20 | Engine has failed |
| 21 | Engine has recovered |

Transmitted Messages

| Msg | Description |
| --- | --- |
| 7 | Engine has started |
| 12 | Replication has started |
| 13 | Replication has stopped |
| 15 | Initialisation has started |
| 16 | Initialisation has stopped |

Method: Term

The "Term" method is used to shut down replication in the present1 described embodiment. It may include the following steps: 1) destroy the timer; 2) signal a Stop Listening event; 3) wait for the Listener thread to stop, or terminate it; 4) signal a Stop Replication event; 5) wait for the Replicate thread to stop, otherwise terminate the thread; 6) Release the MsgSwitchCommand instance.; and 7) release the Merge Replication ActiveX control.

Method: Pause

This method may include the following steps: 1) If the flag=TRUE and currently running: destroy the timer and suspend the Listener thread; 2) If the flag=FALSE and currently paused: create the timer and resume the Listener thread.

Callback Interface

The call back interface method raises an internal event that is caught on a private thread. Below is code which may be associated with this method.

Interface IMsgRegisterCallback
{
   HRESULT Notify( );
};

Method: Status

This method logs any errors that occur during replication.

Method: Notify

This method may consist of two steps: 1) increment the number of messages waiting counter; and 2) signal the MsgWaiting event.

Private Methods

Method: Listener (Thread)

This method may consist of the following steps: 1) wait for Stop Listening or MsgWaiting events; 2) If the event raised is Stop Listening, then close the thread; 3) if the event raised is a MsgWaiting event, retrieve all outstanding messages from the message switch and process them in turn; 4) if the engine has stopped, been deleted, evicted or failed, call RemoveEngine with the engine GUID and the message type; 5) if the engine has recovered or started, call AddEngine with the engine GUID; 6) if the message details a new publisher/backup publisher list, call ChangePublisher with the list details; and 7) if the message requests replication to start raise the Start Replication event then decrement the message waiting counter by the number of messages read (if nonzero, resume reading messages) otherwise resume waiting for events.

Method: RemoveEngine

This method may consist of the following steps: 1) If the engine that has been evicted or failed is ourselves: log an error and call Pause with the flag=TRUE; 2)If the engine that has been deleted is ourselves: unsubscribe from the publisher (if not ourselves)—SP DropMCCSubscription and drop the replication—SP DropMCCReplication; 3)if the engine to be removed is the publisher/a backup publisher: the existing primary backup publisher becomes the new publisher, send the resulting publisher/backup publisher list to all engines; and request an election of a new backup publisher; 4) if the engine has been deleted (not stopped/failed/evicted) and we are currently the designated publisher: unsubscribe the engine SP DropMCCSubscriber; and method: AddEngine; 5)if the engine is ourselves: subscribe to the publisher (this may fail as the publisher may not have enabled us yet) and SP AddMCCSubscription; 6)if we are the publisher or the only known engine (first engine): allow the engine as a subscriber—SP AddMCCSubscriber; and 7) if there is no publisher, enable the publication—SP AddMCCReplication, create the initial snapshot and send the list of publisher/backup publishers to the new engine.

Method: ChangePublisher

This method may have the following steps: 1)if the publisher has changed/was not previously known and is not this engine: unsubscribe any existing subscription (SP DropMCCSubscription), drop any existing replication (if previously a publisher/backup) (SP DropMCCReplication), subscribe to the publisher (SP AddMCCSubscription), and update the publisher/backup publisher list within the database; if the publisher has changed/was not previously known and is this engine: ensure the publication is present (SP AddMCCReplication), ensure the initial snapshot is available, and update the publisher/backup publisher list within the database.

Method: Replicate (thread)

This method may include the following steps: 1) wait for the Stop Replicate and Start Replicate events; 2)if the Stop Replicate event is signalled, exit the thread; if the Start Replicate event is signalled, retrieve the location of the publisher from the database (added by the installation program or already in existence); and 4) if the database location is known or can be assumed (NetworkDB), then a remote query against any existing engine will reveal a publisher's locatio; 5)send a Replication Started or Initialisation Started (if this is the first time replication has been run since the service started) message to the message switch component; 6)start replication; 7)send a Replication Stopped or Initialisation Stopped message to the message switch; and 8)if this is the first time replication has completed successfully since the service started, send an Engine Started message to all engines via the message switch.

Messages

The table below lists the messages that will be serviced by the Database Replication component. No additional properties are required for the messages.

| Message Number | Object ID | Description | Sent To |
|---|---|---|---|
| 7 | Engine GID | Engine started. | Site |
| 11 | | Start replication. | Local |
| 12 | | Replication has started. | Local |
| 13 | | Replication has stopped. | Local |
| 15 | Engine GID | Initialisation started. | Local |
| 16 | Engine GID | Initialisation stopped. | Local |
| ? | | Announce publisher changes | Site |
| ? | | One or more errors have occurred (Replication failed). | Local |

Replication Database Tables

Replication Articles Table

This table lists all articles that must be replicated. Any local tables (e.g. replication tables and local configuration information) are not listed within this table.

Replication Control Table

This table lists all the publisher and backup publishers.

Security Requirements

A domain account is required for the SQL Server agent to run under. If Windo1ws NT integrated security is used, this account can also log into the Network database.

A method for backing up and restoring the Network database is required as well as a method to perform general database management. Potentially an MMC snap-in is required if MSDE is to be used.

Process Flow for the Replication Manager

Figure 30:
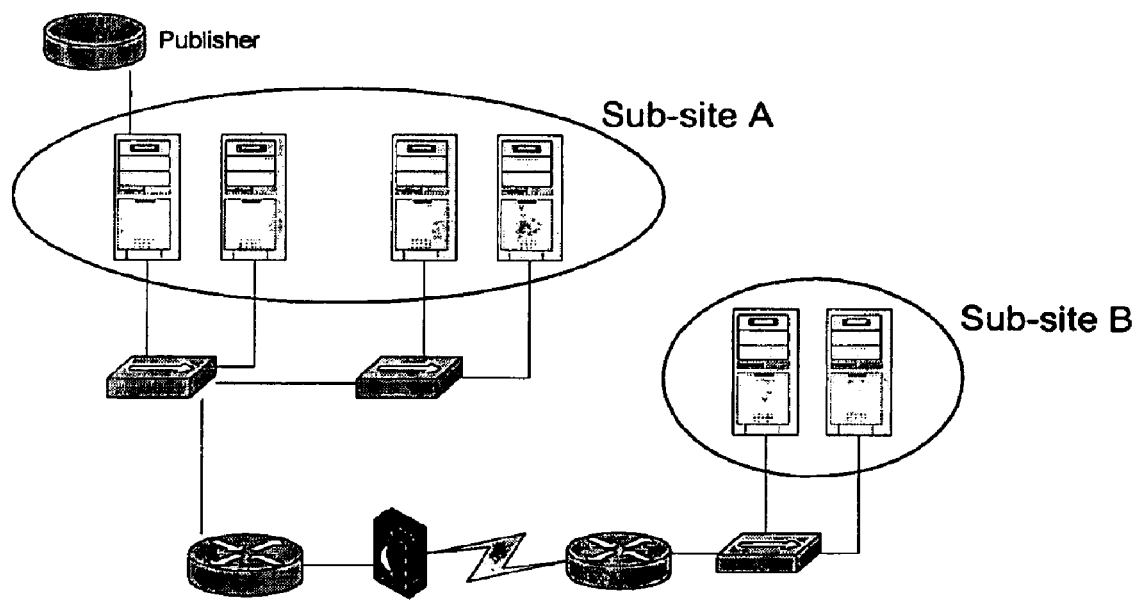
FIG. 30 shows a network topology illustrating a replication manager schema in accordance with one embodiment of the present invention.

FIG. 30 shows a network topology illustrating a replication manager schema.

Overview of Process Flow when the Engine is Installed.

First, an engine is added to the sub-site and the location of the publisher is either specified during installation or retrieved from the active directory along with a list of all engines currently within the site.

Next, if subscriptions are not anonymous, a remote query is performed against the publisher by the new engine to enable the engine as a subscriber. Once enabled, the new engine subscribes to the publisher and starts merge replication.

Next, if the database has not been initialised before, the initial snapshot is sent to the new engine. All changes that have occurred since the snapshot was taken are also transmitted.

Next, if the database contains existing data that is older than the allowed retention period (currently 7 days), the database is reinitialised as above. Any existing data modifications will be lost. Otherwise, if the database contains existing data that is not older than the allowed retention period and the publisher has not changed, all changes are merged with the publisher.

Replication Manager Process Flow when a New Engine Appears

Briefly, the engine should already be subscribed. If there are less than three backup publishers, an election is held and the engine enabled as a backup publisher. Replication Manager Process Flow When an engine stops or is deleted.

Briefly, the publisher will remove the engine's subscription from within its database. If the engine was assigned as a backup to the publisher, a new backup engine will be elected.

Replication Manager Process Flow when an Engine Fails

The publisher will not remove the engine's subscription until the subscription has expired. If the publisher does not fail, the failed engine can be merged successfully within the allowed subscription expiry period (currently 7 days). A scheduled job can be used to clean up dated subscriptions (this may be provided by SQL Server 2000?).

Publisher Processes

Publisher Process Flow Where the publisher/distributor fails

In this situation, in the presently described embodiment, it is not possible for merge replication to take place across any of the boxes as all changes pass via the central publisher.

The primary backup publisher will re-establish all subscriptions and push down the initial snapshot plus changes.

Publisher Creation Process Flow

A single publisher is created within the site. All other engines within the site must subscribe to this publisher. A backup publisher, also a subscriber to the main publisher, is also defined. All databases are loosely consistent. In a presently described embodiment and preferred embodiment, the exact implementation will be as defined by SQL Server 2000. Publisher/backup publisher selection is done via the election manager, but should also be user specifiable.

Process Flow in the Event of Publisher Conflicts (More than One Publisher)

Briefly, if more than one publisher exists, one publisher must stand down and be overwritten. The decision on which publisher wins will be made by the election component. Once elected, the publisher announces itself. Existing subscriptions are unchanged. However, all subscriptions to the other publisher and the other publisher itself drop replication and subscribe to the elected publisher. These engines are all receive reinitialised.

Process Flow for Scheduling Replication Updates

Modification of any rows within the database will be cached within the distributors and sent at regular intervals (user-definable). The granularity on this is one minute if SQL Server 7.0 is used for the scheduling—awaiting SQL Server 2000. If a separate timer is used, it may be possible to further reduce the delay between each automatic replication. Additionally, SQL Server 2000 supports remote pull agents—further information required. A second schedule defaulting to one hour (arbitrary figure, exact implementation may vary) is used to maintain an updated copy of the initial snapshot on the publisher.

Database Processes

Database schema updates Process Flow.

In a preferred embodiment, database schema processes are implemented in accordance with SQL Server 2000.

SQL Server Service Packs Process Flow

Any changes made to Merge Replication will have some effect on Network. This should not break the system, but will probably require the engine to stop for an unspecified period of time—this should not cause the engine to request the initial snapshot again assuming the engine is stopped gracefully (and not just unplugged).

Modifications to Stored Procedures Process Flow

In a preferred embodiment, modifications to stored procedures are accomplished via Microsoft SQL Server 2000. All Stored Procedure updates will either be packaged with the merge replication, in a separate snapshot or inside of a separate table. If a snapshot is used, a check of the snapshot must be made each time merge replication occurs. If a table is used, the Stored Procedure's within the table must be dropped and recreated when changes occur.

Network Failure Process Flow

Failures within the network structure can cause sub-site and/or site fragmentation. Resolution of the subsequent multiple master and multiple publisher scenario is resolved using the election manager. The 'losing' site is overwritten.

iv. Manager Engine—Managed Element Assignment Manager

The Managed Element Assignment Manager ("MEAM") is responsible for the control of the monitoring configuration of Managed Elements ("ME's"). The Managed Element Assignment Manager does this by the dynamic assignment of an ME to a Monitoring Engine. In doing this it has two functions: implementing High Availability (HA) by the use of Fail Over (FO) through the technique of assigning standby engines to monitor an Managed Element (ME); and Dynamic Load Balancing (DLB) through run time reassignment of the primary and standby monitors (engines). Below are Manager Engine components required for proper functioning of the MEAM in accordance with an embodiment of the present invention.

Engine Monitoring Manager—EMM

The MEAM requires the list of operational Monitoring Engines in the system. The EMM maintains and publishes this list along with change events for new and deleted, running and shutdown Monitoring Engines.

Database Replication Manager—DBRM

The MEAM must be informed of the commencement/completion of a local replication event.

Election Manager—ELM—

The ELM is responsible for the holding of elections on the behalf of other components. The MEAM requires election on a SubSite basis and must therefore send the ELM a message on startup to inform it of the MEAM's requirements. The ELM will send the MEAM a promotion/demotion message on the event of it being elected or deposed.

In addition, for MEAM of the presently described embodiment to function properly, all of the following configuration items must be stored in the Network database table "Config" as Name/Value pairs.

Allowable % Deviation ($\Delta$) Item

| Name | Default Value |
|---|---|
| TideMark | 5 |

This is the figure within which deviation from the mean engine load is allowed without being considered as either excess load or spare capacity and therefore subject to load balancing. The deviation above the mean is called the High Tide Mark (HTM) and the deviation below the mean is called the Low Tide Mark (LTM).

Maximum % Deviation ($\Gamma$) Item

| Name | Default Value |
|---|---|
| WaterMark | 15 |

This is the figure within which deviation from the mean engine load is allowed if no corresponding capacity is detected (outside of the allowable deviation). For example take the situation where the allowable deviation ($\Delta$) is set to 5% and the maximum deviation ($\Gamma$) is set to 20%. There are 10 engines running at 46% (all within the allowable deviation) but one engine is running at 69%. Is it worth rebalancing the whole system? By the above scenario the answer is no. If a load balance operation were to execute it would detect 19% excess capacity on one engine, but no spare capacity to move it to. This figure will determine when to force a full load balance. A full load balance is one where all engines loads are taken into account. By reducing the maximum deviation to 10% the above scenario would force a full load balance. The deviation above the mean is called the High Water Mark (HWM) and deviation below the mean is called the Low Water Mark (LWM).

Transfer Block Count (T) Item

| Name | Default Value |
|---|---|
| MaxTransferBlockCount | 0 |

When a load balance has been calculated and is ready for execution there will be a number of transfers of assignments between the same machines. Preferably, these are not executed one at a time. The process would be slow and consume maximal amounts of network traffic in setting each connection up and tearing it down again. There will also be the possibility of engines running on the other side of slow lines (modems etc). It therefore makes sense to optimise this process as much as possible. At the other end of the extreme there may be situations where one engine has 100's of ME's to handover. Preferably, these ME's are not sent all at once. An optimisation of each engine will configure each engine such that it transfers multiple blocks at a time up to the transfer block count T.

Start Up

On start up the MEAM is dependant on having the engine in an active state. This may be dependant on one or several factors but the EMM or the DBRM will notify those concerned of the state change ("Engine Running"). When the MEAM detects that the local engine has gone into active state it is ready to start assuming its membership of its assigned sub-site. At this stage the MEAM will become quiescent.

Promotion

It is not until it receives an election "Promotion to Master" message (from the ELM) that the MEAM becomes active. It must then initialise itself as necessary and upon success notify the ELM of its acceptance of the post. Below the the elected (ie., active) MEAM is described.

Demotion

It is only the elected Master MEAM that can be sent a "Demotion from Master" message. This would then require the MEAM to abandon all processing and become quiescent, listening only for a "Promotion to Master" message (from the ELM). In the presently described embodiment, upon successful demotion the MEAM must notify the ELM of its acceptance of its deposition from the post.

An ME is activated (monitored) by a client, when that client assigns it a Sub Site. This change is made on the ME table by assigning ME.SubSite_GID to a known Sub Site in the SubSite table. Through WMI (and the local message switch component) the MEAM will detect this change of status as an ME Add and assign up to four monitors in the presently described embodiment: Primary, Backup1, Backup2, Backup3 depending on the number of engines in the Sub Site. The choice of which engine is assigned to which role is made on the basis of current load. This will facilitate load balancing on the addition of an ME. The MEAM will then save these assignments to the DB which will then, through the mechanism of replication, be passed to all other engines.

An ME is de-activated or deleted, by a client when that client deletes it via the MMC snap in application, or by natural causes when a transitory monitor job ends (such as a print job). In either case the ME is removed from the system by either deleting it entirely or by removing its Sub Site association. This is done by setting ME.SubSite_GID=NULL. In either case the MEAM will detect this though a WMI notification from the Message Switch component and where necessary do any clean up (such as assignments). The MEAM will then save this change to the DB, which will then, through the mechanism of replication, be passed to all other engines.

An engine is added in the sme way it is started. When a new engine is starts up it will announce itself to the Network world that is its Managed Site. This is really the collection of Sub Sites the Network database is aware of. It will instigate a refresh of its local database via replication and when that has completed the engine will be marked as "Engine is Running". At this point the engine will be fully capable of taking an active part in the Sub Sites it has been assigned to. The Master will take the follwong actions: load balance.

When an engine is stopped, naturally of abnormally, the EMM will eventually mark the engine as evicted. The action is the same. It disappears from the community. The community is notified of this by each engine's EMM whereby three actions will occur on the Master: Fail Over, Assignment Refresh and Load Balance.

If the engine being deleted is this engine then immediate termination of all community activity is required. The local EMM will soon stop sending heartbeats and all other engines will take the same action as for the Engine Stopped situation. The MEAM must take whatever housekeeping activities are necessary and cease responding to any events that may still come from the system. When an Engine is deleted the following actions are taken: Step responding to System Events and Do Housekeeping and Clean Up.

Replication Start: The MEAM will pause when "Replication Start" message is received.

Replication End is the "Engine is Running" message. The MEAM will start or continue if paused when this message is received.

The Load Balance Algorithm

The Master MEAM in the affected Sub Site must recalculate each engine in the Sub Site's load and evenly distribute the assignments. This must be done as efficiently as possible to minimise the impact of any changes. Thus wherever possible the first choice from a re-assignment should be the Backup 1.

The Assignment Refresh Algorithm

For all ME's for this Sub Site, the algorithm finds replacement backups to fill the missing entries.

The Fail Over Algorithm

For each ME for which the failed engine(s) were the primary engine, make Backup 1 the primary engine and upgrade all other backups (B2->B1, B3->B2).

The design of the MEAM hinges on the configuration decisions it makes. As such the algorithms and rules it uses to make these decisions are core to its design. Thus, below are decribed some load environment parameters which are defined to optimise the MEAM in a presently preferred embodiment of the present ivention.

The Mean or Average engine load (AV) of a Sub Site is given by that Sub Sites total commitment divided by the number of active engines in the Sub Site.

$$AV = \frac{\sum_{1}^{x=N} E_x \cdot P \cdot \text{Count}}{N}$$

where

N is the number of engines in this Sub Site.
E is an Engine
P is an Engines Primary ME List The Low Tide Mark ("LTM") is given by the Sub Site AV—Δ% where Δ is a configurable value TBD. AV is calculated from the total ME count in a Sub Site/Engine count in a Sub Site. In particular, in the presently described embodiment, LTM is defined as $$LTM = \left(1 - \frac{\Delta}{100}\right)\frac{\sum_{1}^{x=N} E_x \cdot P \cdot \text{Count}}{N}$$

where

Δ is the allowable percentage difference from the mean before an engine can be called out of band. In the case of the low tide mark it is the percentage from the mean below which an engine is defined to have spare capacity.
N is the number of engines in this Sub Site.
E is an Engine
P is an Engines Primary ME List The High Tide Mark ("HTM") is given by the Sub Site AV—Δ% where Δ is a configurable value TBD. AV is calculated from the total ME count in a Sub Site/Engine count in a Sub Site. In particular, in the presently described embodiment, HTM is defined as:

$$HTM = \left(1 + \frac{\Delta}{100}\right)\frac{\sum_{1}^{x=N} E_x \cdot P \cdot \text{Count}}{N}$$

where

Δ is the allowable percentage difference from the mean before an engine can be called out of band. In the case of the high tide mark it is the percentage from the mean above which an engine is defined to have excess load.
N is the number of engines in this Sub Site.
E is an Engine
P is an Engines Primary ME List The Low Water Mark("LWM") is given by the Sub Site AV—Γ% where Γ is a configurable value TBD. AV is calculated from the total ME count in a Sub Site/Engine count in a Sub Site. In particular, the LWM of the presently described embodiment is defined as $$LWM = \left(1 - \frac{\Gamma}{100}\right)\frac{\sum_{1}^{x=N} E_x \cdot P \cdot \text{Count}}{N}$$

where

Γ is the allowable percentage difference from the mean before an engine can be called out of limits. In the case of the low water mark it is the percentage from the mean below which an engine is defined to have spare capacity that must be utilised.
N is the number of engines in this Sub Site.
E is an Engine
P is an Engines Primary ME List The High Water Mark ("HWM") is given by the Sub Site AV—Γ% where Γ is a configurable value TBD. AV is calculated from the total ME count in a Sub Site/Engine count in a Sub Site. In particular, in the presently described embodiment, the HWM is defined as $$HWM = \left(1 + \frac{\Gamma}{100}\right)\frac{\sum_{1}^{x=N} E_x \cdot P \cdot \text{Count}}{N}$$

where

Γ is the allowable percentage difference from the mean before an engine can be called out of limits. In the case of the high tide mark it is the percentage from the mean above which an engine is defined to have excess load that must be distributed to other less utilised engines.
N is the number of engines in this Sub Site.
E is an Engine
P is an Engines Primary ME List MEAM Component Procedures ME Add procedure With respect to the ME Add procedure, when a client adds a new, or activates an unmonitored ME by assigning it to a Sub Site the MEAM Master in the Sub Site it has been added to will receive notification of the event. At this stage it has no assignments other than Sub Site and the MEAM Master is then responsible for assigning P, B1, B2 and B3 (notwithstanding the fact that there might not be sufficient engines to fully support all possible assignments). It will then save the assignment to the local database. Replication will take care of synchronising the rest of the community.

The following is pseudocode for the ME Add procedure:

```
//
// This algorithm is run from the Master.
//
MEAdd(ME)
BEGIN
Build Engines list from Sub Site this ME has been added
If Engines.Count>0
Sort Engines on Engines.P.Count in ASC
ME.P=Engines.Item(0)
Engines.Remove(0)
EndIf Engines.Count>0
Sort Engines on Engines.B1.Count in ASC
```

```
ME.B 1=Engines.Item(0)
Engines.Remove(0)
Endif
If Engines.Count>0
Sort Engines on Engines.B2.Count in ASC
ME.B2=Engines.Item(0)
Engines.Remove(0)
Endif
If Engines.Count>0
Sort Engines on Engines.B3.Count in ASC
ME.B3=Engines.Item(0)
Engines.Remove(0)
Endif
Save to database
END
```

ME Delete Procedure

With respect to the ME Delete procedure, when a client deletes or de-activates an monitored ME by removing it from a Sub Site one or more engines in the Sub Site it has been deleted from will receive notification of the event. If the engine receiving the notification is not the primary P then it must notify the assigned primary of the deletion. This might mean the target gets multiple messages to the same effect. Maybe the target also got the original event. One way or the other it gets notified of the deletion event and must delete all entries from the local database. Replication will take care of synchronising the rest of the community. Due however to the fact that all other engines are subservient and inactive with respect to the ME it means there will be no merge contention at the subscriber(s). It may however be necessary to notify the engine assigned to B1 of the deletion if B1's are to passively monitor Me's. Should the deletion cause the local engine primary count for this Sub Site to fall below the Low Tide Mark the MEAM must send a message to all of the other MEAM's in the Sub Site to execute a Load Balance.

The following is Pseudocode for the MD Delete procedure.

```
//
// This algorithm is run from the MEAM Master
//
MEDelete(ME)
BEGIN
PrimaryEngine=ME.P
Set ME.P=NULL
Set ME.B I=NULL
Set ME.B2=NULL
Set ME.B3=NULL
Save to database
If Engines.Item("PrimaryEngine").P.Count<LWM
LoadBalanceSubSite(ThisSubSite)
Else If Engines.Item("PrimaryEngine").P.Count<LTM
LoadBalanceSubSite(ThisSubSite)
Endif
END
```

Engine Added Procedure

With respect to the Engine Added Procedure, it is the same as the Engine Started procedure in the presently described emboidment. See the Engine Started Procedure below.

Engine Deleted Procedure

With respect to the Engine Deleted Procedure, the following is pseudocode for the procedure.
// Called when an engine or engines deleted message is received.

```
// This algorithm is run from the MEAM Master
//
OnEngineDeleted(DeletedEngines)
BEGIN
// If NULL !=DeletedEngines.Item(ThisEngine)
    // We've been deleted
    //
    Stop MEAM by calling IAvalaonControl->Term( );
    Endif
END
```

Engine Started PROCEDURE

The following is pseudocode for the Engine Started Procedure

```
// Called by startup code on local machine and by EngineAdded and EngineStarted
// handlers. It presumes also that local handlers are also in
// effect
OnEngineStart(StartedEngine)
BEGIN
    If StartedEngine==ThisEngine
        WaitFor(EngineActiveEvent)
    Endif
    LoadBalanceSubSite(ThisSubSite)
END
```

Engine Stopped Procedure

The following is pseudocode for the Engine Stopped procedure.

```
//
// Only have consider other engines here
//
OnEngineStopped(DeadEngines)
BEGIN
    //
    // Fail Over
    //
    FailOver(DeadEngines)
    //
    // Reassignment
    //
    RegenerateAssignments(DeadEngines)
    //
    // Load Balance
    //
    LoadBalanceSubSite(ThisSubSite)
END
```

Failover Procedure

With respect to the Failover Procedure, when one or more engines fail (i.e., exceed the eviction time limit) two things must happen. All of the failed engine(s) ME's must be failed over to the backups (i.e., these are the engines that tool over monitoring when the engine originally went off line). This moves the assignment chain up leaving one, or more, if multiple engines went down, empty slots at the end. Of course if two engines go down the situation can (and will) arise where both the primary and the backup are unavailable. In this situation the first available backup must take over as primary and move the chain below it (if any) upwards.

The followng is pseudocode for the failovre procedure:

```
//
// This algorithm is run by the MEAM Master
//
FailOver(DeadEngines)
BEGIN
    For each DeadEngine in DeadEngines
        CheckMEsAndFailOver(DeadEngine, DeadEngines)
    Next
END
```

```
CheckMEsAndFailOver(DeadEngine, DeadEngines)
BEGIN
    For each ME in DeadEngine.MEs
        //
        // We know the primary is dead
        //
        ME.P=NULL
        //
        // Check the backups
        //
        If NULL !=DeadEngines.Item(ME.B1)
            ME.B1=NULL
        Endif
        If NULL !=DeadEngines.Item(ME.B2)
            ME.B2=NULL
        Endif
        If NULL !=DeadEngines.Item(ME.B3)
            ME.B3=NULL
        Endif
        Move all engines in assignment chain up to close gaps
        Save to database
    Next
END
```

Assignment Regeneration Procedure

The second thing that must happen when one or more engines go down is regeneration of the assignment chain. All engines ME's where the failed engine(s) are in the assignment chain must be fixed from the available pool of engines without producing duplicates and be done in a way that produces a balanced fix.

The following is pseudocode for the assignment regeneration procedure:

```
//
// This algorithm is run by the MEAM Master
//
RegenerateAssignments(DeadEngines)
BEGIN
    For each DeadEngine in DeadEngines
        ValidateAndFixMEsFromFailedEngine(ThisSubSite)
    Next
END
ValidateAndFixMEsFromFailedEngine (SubSite)
BEGIN
Build List of Engines by PME count in ASC order for
    SubSite
//
// Build list of Me's that have one or more missing assignments
//
Build List of BrokenMEs sorted by highest missing assignment priority and ME_GID for this SubSite
//
// Calculate mean engine load . . . do some basic load
    assignment optimisation
// this calculation is based on ALL Me's in the SubSite
    including those of
// the dead engine
//
AV=Total ME Count for this SubSite/Running Engine Count
    for this SubSite
//
// Optimal assignment is all we attempt to do here . . . not
    load balance
//
For each Me in BrokenMEs
Engines.Refresh
    If No ME.Primary
        Sort Engines by Engine.P.Count in ASC order
        ME.Primary=Engines.Item(0)
        Increment ME.Primary.P.Count
        Engines.Remove(0)
    Endif
    If No ME.B1 and Engines.Count>1
        Sort Engines by Engine.B1.Count in ASC order
        ME.Backup1=Engines.Item(0)
        Increment ME.Backup 1.B1 Count
        Engines.Remove(0)
    Endif
    If No ME.B2 and Running Engine Count>2
        Sort Engines by Engine.B2.Count in ASC order
        ME.Backup2=Engines.Item(0)
        Increment ME.Backup2.B2.Count
        Engines.Remove(0)
    Endif
    If No ME.B3 and Running Engine Count>3
        Sort Engines by Engine.B3.Count in ASC order
        ME.Backup3=Engines.Item(0)
        Increment ME.Backup3.B3.Count
        Engines.Remove(0)
    Endif
Next
UpdateDB with BrokenMEs now fixed
//
// The SE might already be monitoring these
//
END
```

Load Balancing Procedure

Figure 17:
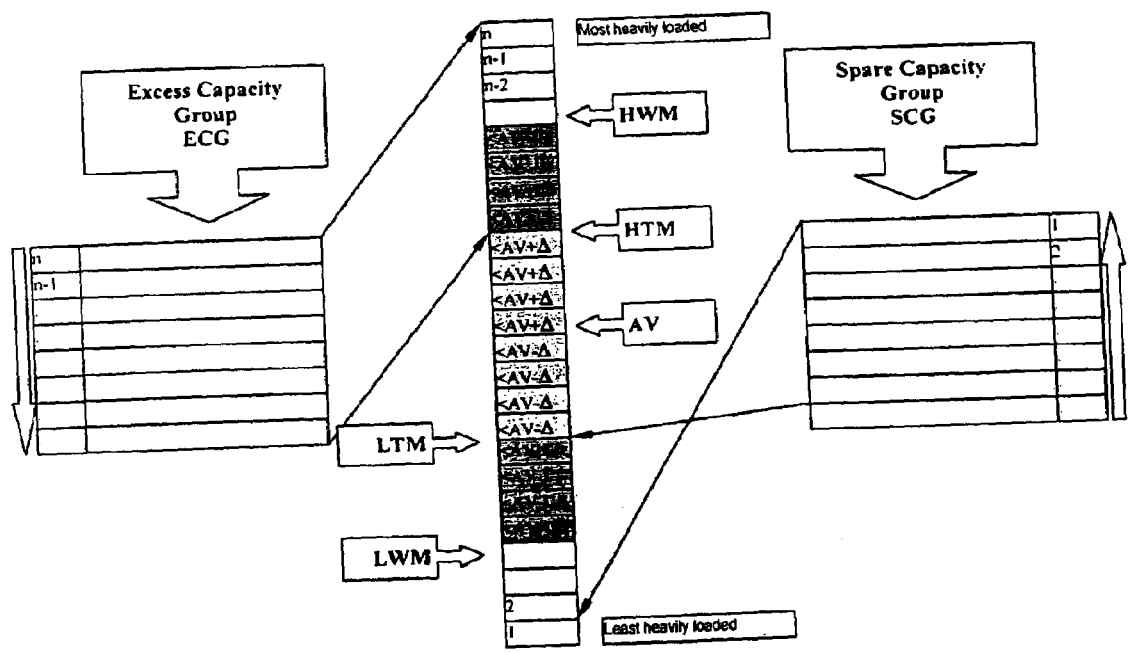
FIG. 17 depicts load balancing variables used by a Managed Element Assignment Manager component of a Manager Engine shown in FIG. 1.

Load balancing is an activity that can arise from a number of reasons. Those reasons can be due to engine or ME events that unbalance the engine load across the SubSite. FIG. 17 depicts load balancing variables which may be used by the Managed Element Assignment Managre component of the Manager Engine of the presently described embodiment of the invention.

A load balance operation is carried out when a system (Sub Site) has become loaded in such a fashion that one or more machines (engines) are either under or over stressed. To define what this means we need a number of variables that an algorithm can use to determine what actions (if any) to take. These have been defined above.

In a preferred embodiment, the load balancing algorithm described below is implemented. This particular algorithm makes the following assumptions and rules: First, there is a band around a Sub Sites mean load where load balancing would not be cost effective. This band is called the tidemark (low tidemark LTM and high tidemark HTM). If the engines whose load is within this band were to be included in the load balance the effect on their load would probably be minimal. The load balance algorithm excludes these from the balance. The bandwidth will be configurable. This rule does leave a small hole in that a Sub Site with 11 engines 10 of which are within the tidemark whose level is set at 5% (say) could leave the remaining engine running at 100% with no spare to distribute it to or 0% with no excess to load it from. As such there is a limit to the inequality outside of which a full load balance must be done with all engines in a Sub Site involved. This is band is called the watermark (low watermark LWM and high watermark HWM).

In the presently described load balancing algorithm, for the particular Sub Site all engines must do the following:

First, calculate the Sub Site mean engine load. That is, for each engine in this Sub Site get the total ME count it is primary for. That is its total load. The AV is given by the Sub Site total divided by the number of engines in the Sub Site. This will be the ultimate balance figure for all engines although there may be very small differences due to odd numbers but nothing significant. If the Sub Site maximum and minimum engine loads are within the HWM and LWM then discard all engines where the engine load is within the HTM and LTM.

Next, sort the engines into two lists: Engines whose load is greater than the AV and engines whose load is less than the average. All of the remaining engines will fit into one of these two categories (an engine cannot have excess and spare at the same time).

Next, sort the engines in the greater than average list, descending, on primary ME count. These will be called the FROM's. Sort the engines in the less than average list, ascending, on primary ME count. These will be called the TO's.

What we now have is the pre-rquisite for the load balance operation for a subsite—the remaining engines that have spare capacity active in the operation. If there are no engines with spare capacity—there will be no load balance (this must be an optimal load balance as opposed to a full one where there are no engines between the LTM and the LWM). This situation only arises if total engines excess load is less than the allowable tidemark for all of the other engines.

The optimisation of the algorithm is to find as many Backup 1 (B1) to Primary(P) reassignments as possible. It may be a requirement that all engines also monitor their B1 assignments to speed up fail over. The MEAM Master must now calculate the optimal transfer blocks from a FROM to a TO. It will do this by walking the two lists—crab wise. If the FROM block is larger than the remaining TO capacity it will create a transfer block the size of the TO spare capacity. If the FROM block is smaller than the remaining TO capacity it will create a transfer block equal to the FROM excess. A Transfer block is a collection of ME's that is being reassigned from the one primary to another (that optimally should have been the backup). And so on down the two lists till all of the excess has been assigned to the spare. Once this is done the MEAM Master can save the operation to the Database.

Given a total of N engines in a Sub Site using this algorithm the maximum number of engine to engine rearrangements in a load balance is given by (N−1) where each rearrangement defines a transfer of 1 or more ME's from one engine to another.

Figure 18:
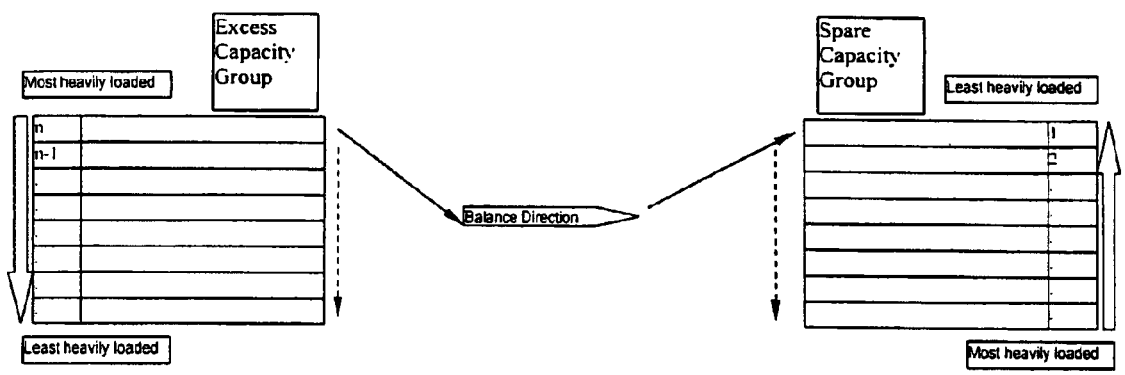
FIG. 18 depicts a transfer calculation algorithm used by the Managed Element Assignment Manager Component of a Manager Engine shown in FIG. 1.

Turning now to FIG. 18 it depicts a transfer calculation algorithm used by the Managed Element Assignment Manager Component of the Manager Engine in accordance with load balancing algorithm as described above. The following is pseudocode for the load balancing algorithm.

```
PSEUDOCODE
//
// Load Balance Algorithm:
//
// SSEG is the subsite engine group
//
// ECG is the Excess Capacity Group List
// e is the count of engines in the ECG
// SCG is the Spare Capacity Group List
// s is the count of engines in the SCG
//
// TL is the Transfer List where each item is a Transfer item
// TI is a Transfer item where TI is a list of ME's, Engine From (EF) and Engine To (ET)
// T is the count of transfers.
//
// NOTE: given a total of N engines in a Sub Site using this algorithm the maximum T is given by (N − 1)
// where each T defines a transfer of 1 or more ME's from one engine to another.
//
LoadBalanceSubSite( SubSite )
BEGIN
For each Engine in SubSite.Engines
        TOTALOAD += Engine.MEs.Count
    Next
    AV = TOTALOAD/SubSite.Engines.Count
    HTM = AV * (1 + Δ)
    LTM = AV * (1 − Δ)
    HWM = AV * (1 + Γ)
    LWM = AV * (1 − Γ)
//
// Check engine load ranges
//
EMax = SubSite.Engines maximum ME count/TOTALOAD
EMin = SubSite.Engines minimum ME count/TOTALOAD
If EMax < HWM AND EMin> LWM
//
// Discard all engines whose load is between the
// LTM and the HTM
//
        For each Engine in SubSite.Engines
            If LTM <= Engine.MEs.Count <= HTM
        //
        // Discard it
        //          SubSite.Engines.Remove( Engine )
            Endif
```

```
            Next
        Endif
        //
        // Build ECG and ESG lists - noting an engine cannot be in both lists
        //
        For each Engine in SubSite.Engines
            If Engine.MEs.Count > AV
                Add to ECG
            Else
                Add to ESG
            Endif
        Next
        //
        // Crabwise walk the two lists calculating the transfer
        // block size
        //
        For SCG = 1 to s and ECG = 1 to e
            Create TI and ET = ESG(s) and EF = ECG(e)
            //
            // Compute block (e) on the ECG with block (s) on the SCG
            //
            SpareCount = AV - ESG(s).MEs.count
            ExcessCount = ECG(e).P.Count - AV
            TI.MEs = GetBestMEsForTransfer( SubSite, ECG(e), SCG(s),
MIN( SpareCount, ExcessCount ) )
            If TI.MEs.Count > 0
                TL.Add TI
            Endif
            If ExcessCount > SpareCount
                //
                // Excess > Spare
                // Next spare if we transferred the max across
                //
                Increment s
            Else If ExcessCount == SpareCount
                //
                // Excess == Spare
                // Next Excess and Spare if we transferred exactly
                //
                Increment e and s
            Else
                //
                // Excess < Spare
                // Next excess if transferred less than the max
                //
                Increment e
            Endif
        Loop
VERSION 1: Trickle balance
        While there are some blocks left to transfer
            Start transaction
            Take up to N blocks update from an EF
            Update DB
            On error Rollback Transaction
        Loop
VERSION 2: Block balance
        Start transaction
        Take all blocks from TL
        Update DB
        On error Rollback Transaction
END
//
// This algorithm finds as many ME's for transfer that already have the
// TO engine as Backup1 as possible moves them from the FROM to the TO
// keeps a copy for return
//
// This is an algorithm and therefore does not include checks or error handling
//
MEs GetBestMEsForTransfer( SubSite, From, To, Count )
BEGIN
        //
        // This would be implemented in a much more sophisticated manner
        //
        For each ME in From.MEs
            If ME.Backup1 = To.Name
                Move to MEs
            Endif
            If MEs.Count >= Count
                break
```

-continued

```
            Endif
        Next
        If MEs.Count < Count
            //
            // Only up to the min of capacity left and capacity available -
            //
            Move (Count - MEs.Count) items from From.MEs to MEs
        Endif
        Copy MEs to To.MEs
        FixAssignmentsOnTransferedMEs( MEs, To)
        Return MEs
END
//
// Rearrages assignments
// This is an algorithm and therefore does not include checks or error handling
//
FixAssignmentsOnTransferedMEs( MEs, To )
BEGIN
    For each ME in MEs
        If ME.B1 == To
            //
            // Wont have to tear down monitors if B1's are to
            // backup monitor
            //
            ME.B1 = ME.P
        Else If ME.B2 == To
            ME.B2 = ME.P
        Else If ME.B3 == To
            ME.B3 = ME.P
        Endif
        ME.P = To
    Next
END
MEAM Assignment Packages
```

Figure 19:
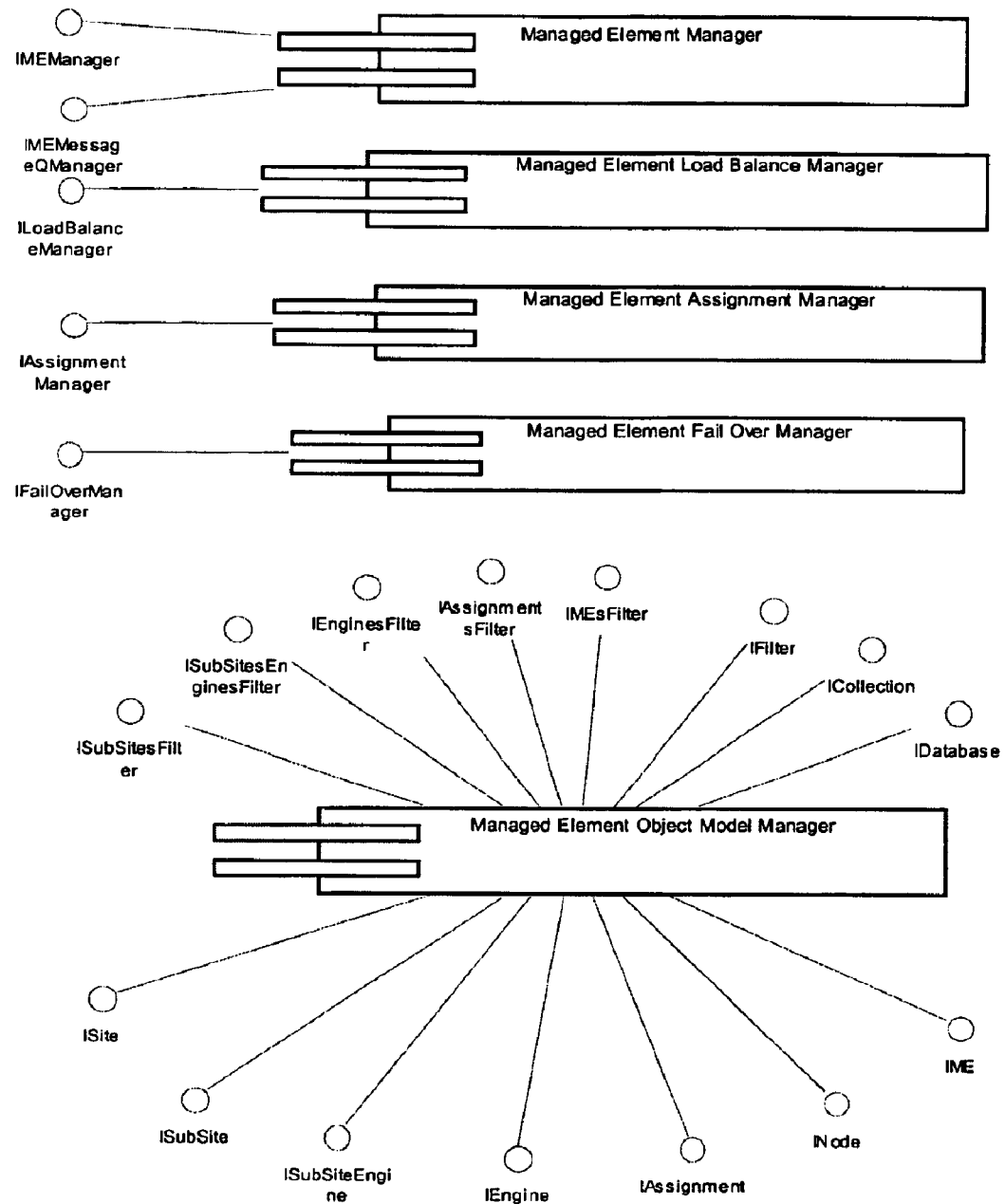
FIG. 19 depicts Managed Element Assignment Manager Packages.

Turning now to FIG. 19, it depicts Managed Element Assignment Manager Packages. The Managed Element Assignment Manager component of the presently described embodiment consists of 5 packages or modules. Each of these is implemented as a separate COM component with a set of internal interfaces (not necessarily COM) and a set of external COM interfaces. Wherever possible COM interfaces will be custom, dual interfaces only being supported where absolutely necessary.

MEAM Class Structure

Figure 20:
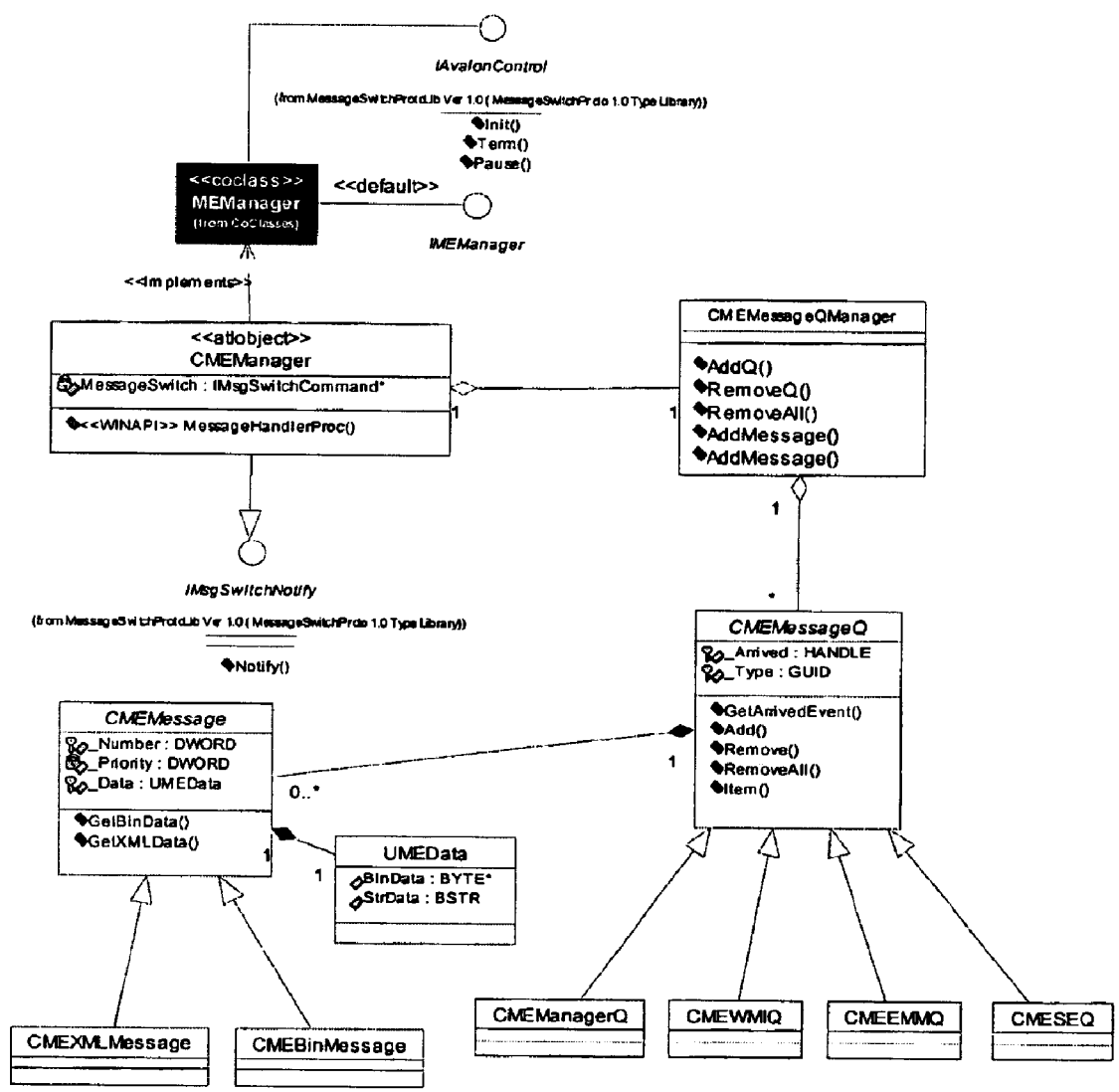
FIG. 20 depicts the Managed Element Manager class structure.

Turning now to FIG. 20, it depicts the Managed Element Manager class structure. The file name is BodMem.dll in a windows based system. It is top level controller component of the Managed Element section. It performs the following: 1) initialisation; 2) termination and cleanup; 3) control of system logic—i.e. what to do when an engine disappears, an ME is added etc.; 4) detection of system events i.e. reception of Message Switch messages; and 5) decision making in respect of state analysis i.e. Engine events outweigh ME events when both exist.

The following are MEAM classes:

CMEManager

Derived from CComObjectRootEx<CComMultiThreadModel>, CComCoClass<CMEManager, &CLSID_MEManager>, IMEManager, INetworkControl, IMsgSwitchNotify, IError-Info.

Private Properties

IMsgSwitchCommand* _MessageSwitch

Instance of the Message Switch class.

The MEAM sends the following messages:

| Msg # | To | Msg | Description |
|---|---|---|---|
|  | ELM | Acknowledge | Promotion to or demotion from Master |

CMEMessageQManager& _MessageQManager
  Instance of the CMEMessageQManager class.

CMEMessageQ& _ElmQ
  Instance of the CMEMessageQ that is specialised for ELM messages.

CMEMessageQ& _WmiQ
  Instance of the CMEMessageQ that is specialised for WMI messages.

CMEMessageQ& _EmmQ
  Instance of the CMEMessageQ that is specialised for EMM messages.

CMEMessageQ& _DbRepQ
  Instance of the CMEMessageQ that is specialised for DbRep messages.

Public Methods

Static DWORD WINAPI CMEManager::MessageHandlerProc (LPVOID Data)

| Parameter | Description |
|---|---|
| Return | 0 if successful
system HRESULT on error |

-continued

| Parameter | Description |
|---|---|
| Data | Data passed to CreateThread( ) function - will be the this pointer of the CMEManager object. |

System thread process function passed to the CreateThread( ) function call in the Init( ) method. This method is the main processing point for the Managed Element Assignment Manager. It makes decisions regarding ME assignments based on the data collected by the Notify method.

NOTE: No exceptions are thrown from this method

HRESULT INetworkControl::Init (DWORD Phase)

| Parameter | Description |
|---|---|
| Return | S_OK if successful<br>System HRESULT on error. |
| Phase | The initialisation phase |

This method is called to initialise the MEAM. This method must create all internal resources such as the relevant internal queues by calling the CMEMessageQManager::AddQ( ) method for each queue type required.

| Exceptions | Description |
|---|---|
| _com_error | With system HRESULT on error |

HRESULT INetworkControl::Term (DWORD Phase)

| Parameter | Description |
|---|---|
| Return | S_OK if successful |
| Phase | The de-initialisation phase |

Thi smethod is called to terminate the MEAM.

| Exceptions | Description |
|---|---|
| _com_error | With system HRESULT on error |

HRESULT INetworkControl::Pause (BOOL fTrue)

| Parameter | Description |
|---|---|
| Return | S_OK if successfulSystem HRESULT on error. |
| Ftrue | If TRUE causes the system to halt. All methods will return S_FALSE.If FALSE causes the system to resume if "Paused". |

This method is Called to pause or resume the MEAM.

| Exceptions | Description |
|---|---|
| _com_error | With system HRESULT on error |

This method will suspend the thread function and so should be called with care. If the system is paused while other activity is allowed to occur that could invalidate the MEAM's state the MEAM will need to do a restart.

HRESULT IMsgSwitchNotify::Notify ( )

| Parameter | Description |
|---|---|
| Return | S_OK if successful<br>System HRESULT on error. |

This method is called by the Message Switch to notify the MEAM of an event it has registered for. NOTE: No exceptions are thrown from this method. The MEAM subscribes to the following messages:

| Msg # | From | Msg Description | Action |
|---|---|---|---|
| | ELM | Promote to Master | Initialise to be Master for SubSite |
| | ELM | Demote from Master | Terminate Master status and release all resources and processing and enter quiescent state listening only for promotion. |
| | WMI | AddME | Calculate target engine and send it a MEAM.AddME message. |
| | WMI | DeleteME | Calculate target engine and send it a MEAM.DeleteME message. |
| | WMI | EngineAdded | Wait till engine is in the Active state (replication ended) if this engine. Else ignore |
| | WMI | EngineDeleted | |
| | EMM | EngineStarted | Causes Load Balancing. |
| | EMM | EngineStopped | Causes Fail Over, ReAssignment and Load Balancing. |
| | DBRM | Replication Start | |
| | DBRM | ReplicationEnd | |

This method is responsible for retrieving a message from the Message Switch and placing it in the correct internal queue. It does this by calling the CMEMessageQManager::AddQ( ).

CMEMessageQ

Protected Attributes of the class:

HANDLE __Arrived

Event Handle signalled when a new message has arrived.

GUID __Type

Type of queue. This is equivalent to the Message Type GUID.

Public Operations of the Class:

HANDLE GetArrivedEvent ( )

| Parameter | Description |
| --- | --- |
| Return | Handle of event to be signalled when a new message arrives. |

CMEMessage* Add ( )

| Parameter | Description |
| --- | --- |
| Return | New CMEMessage object pointer or NULL on error |

This method adds the created object to its internal queue.

CMEMessage* Remove (long Item)

| Parameter | Description |
| --- | --- |
| Return | CMEMessage object pointer at specified offset or NULL on error. |
| Item | Offset of request item. |

This method removes the specified object from its internal queue.

void RemoveAll ( )

This method removes all items from its internal queue.

long Count ( )

| Parameter | Description |
| --- | --- |
| Return | The count of items in the queue. |

CMEMessage* Item (Long Item)

| Parameter | Description |
| --- | --- |
| Return | CMEMessage object pointer at specified offset or NULL on error. |
| Item | Offset of request item. |

This method does not remove the specified object from its internal queue.

Managed Element Failover Class

Figure 21:
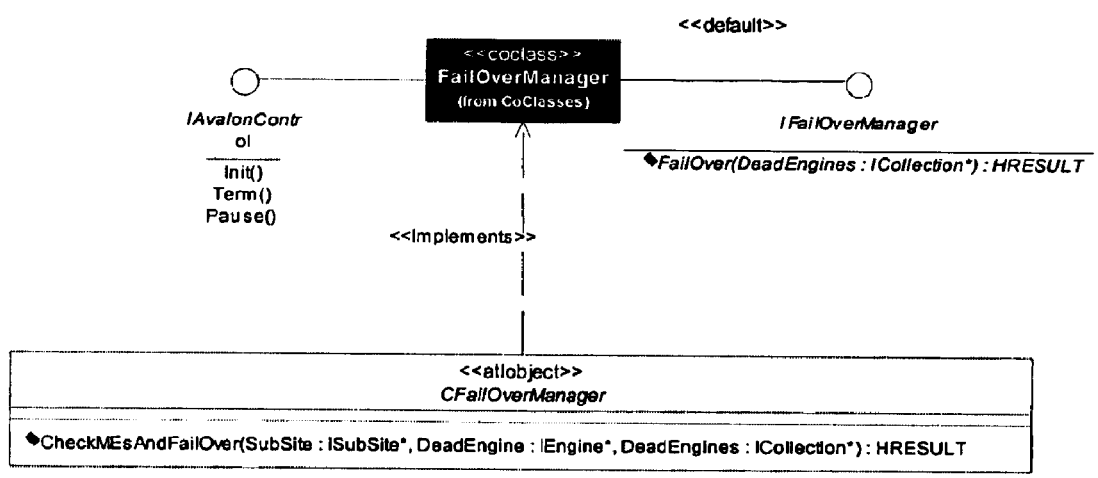
FIG. 21 shows the structure of the Managed Element Fail Over Manager class of the Managed Element Assignment Manager component of the Manager Engine.

Turning now to FIG. 21 it shows the structure of the Managed Element Fail Over Manager class of the Managed Element Assignment Manager component of the Manager Engine. The file name is can be BodMeFo.dll in a Windows Based system. It is the second level component encapsulating all of the fail over functionality. Its responsibilities inlcude: 1) Autonomous operation; 2) Promotion and activation of ME backup engines to primary status; 3) Validation and Integrity checking for promoted engines with respect to ME's to insure no inconsistency exists in the respective ME's assignments; 4) Notification of promoted primaries of new status; and 5) Database updates of changes. Specific Classes include the following.

CFailOverManager

This class is derived from CComObjectRootEx<CComMultiThreadModel>, CComCoClass<CFailOverManager, &CLSID_FailOverManagerr>, IFailOverManager, INetworkControl, and IerrorInfo.

Public Operations of the Class

HRESULT CheckMEsAndFailOver (ISubSite* SubSite, IEngine* DeadEngine, ICollection* DeadEngines)

| Parameter | Description |
| --- | --- |
| Return | S_OK if successful |
| SubSite | Pointer to the SubSite object for the SubSite to be referenced in the |
| DeadEngine | Pointer to the DeadEngine object to be failed over. |
| DeadEngines | Pointer to the Collection of dead engines. |

| Parameter | Description |
| --- | --- |
| com_error | With system HRESULT on error |

HRESULT IFailOverManager::FailOver (ICollection* DeadEngines)

| Parameter | Description |
| --- | --- |
| Return | S_OK if successful<br>System HRESULT on error. |
| DeadEngines | Pointer to the dead engines to fail over. |

| Exceptions | Description |
| --- | --- |
| com_error | With system HRESULT on error |

HRESULT INetworkControl::Init ( )

| Parameter | Description |
| --- | --- |
| Return | S_OK if successful |

This method is Called to initialise the Fail Over Manager.

| Exceptions | Description |
| --- | --- |
| com_error | With system HRESULT on error |

HRESULT INetworkControl::Term ( )

| Parameter | Description |
|---|---|
| Return | S_OK if successful |

This method is called to terminate the Fail Over Manager.

| Exceptions | Description |
|---|---|
| com_error | With system HRESULT on error |

HRESULT INetworkControl::Pause (BOOL fTrue)

| Parameter | Description |
|---|---|
| Return | S_OK if successful System HRESULT on error. |
| Ftrue | If TRUE causes the system to halt. All methods will return S_FALSE. If FALSE causes the system to resume if "Paused". |

This method is called to pause or resume the Fail Over Manager.

| Exceptions | Description |
|---|---|
| com_error | With system HRESULT on error |

The MEAM Class

Figure 22:
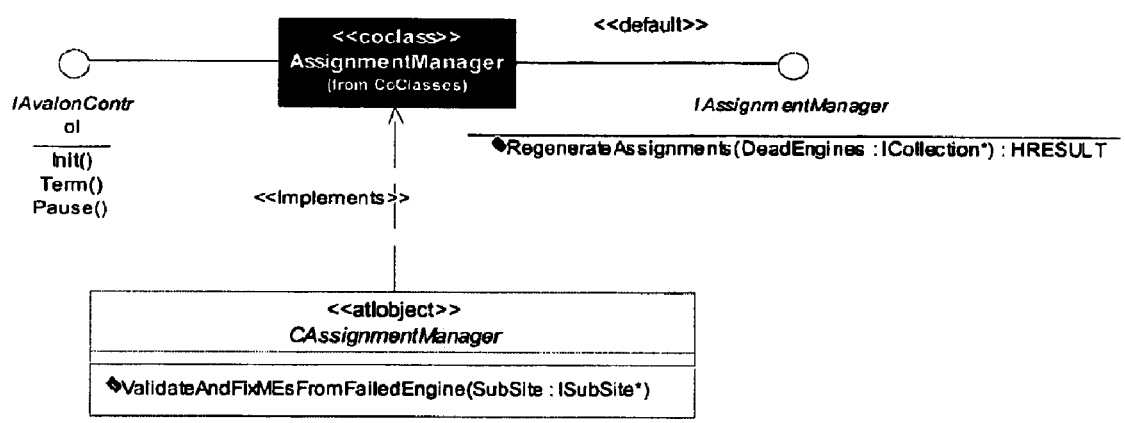
FIG. 22 shows the structure of the Managed Element Assignment Manager class.

Turning now to FIG. 22, it shows the structure of the Managed Element Assignmen Manager class. The file nameis BodMeam.dll in a Wondows based system. It is as second level component encapsulating all of the addition, deletion and repair of ME's. Its responsibilities include: 1) autonomous operation; 2) assignment of monitoring engines to ME's; 3) notification of primaries of new status; and 4) database updates of changes. Specific classes include the following.

CAssignmentManager

This class is derived from CComObjectRootEx<CComMultiThreadModel>, CComCoClass<CAssignmentManager, &CLSID_AssignmentManager>, IAssignmentManager, and InetworkControl.

Public Operations of the Class:
void ValidateAndFixMEsFromFailedEngine (ISubSite* SubSite)

| Parameter | Description |
|---|---|
| Return | S_OK if successful System HRESULT on error. |
| SubSite | Pointer to the SubSite object for the SubSite to be referenced in the reassignment. |

| Exceptions | Description |
|---|---|
| com_error | With system HRESULT on error |

HRESULT IAssignmentManager::RegenerateAssignments (ICollection* DeadEngines)

| Parameter | Description |
|---|---|
| Return | S_OK if successful |
| DeadEngines | Pointer to the dead engines to regenerate assignments from. |

| Exceptions | Description |
|---|---|
| com_error | With system HRESULT on error |

HRESULT INetworkControl::Init ( )

| Parameter | Description |
|---|---|
| Return | S_OK if successful |

Thi smethod is called to initialise the Managed Element Assignment Manager.

| Exceptions | Description |
|---|---|
| com_error | With system HRESULT on error |

HRESULT INetworkControl::Term ( )

| Parameter | Description |
|---|---|
| Return | S_OK if successful |

This method is called to terminate the Managed Element Assignment Manager.

| Exceptions | Description |
|---|---|
| com_error | With system HRESULT on error |

HRESULT INetworkControl::Pause (BOOL fTrue)

| Paramete | Description |
|---|---|
| Return | S_OK if successful |
| Ftrue | If TRUE causes the system to halt. All methods will return |

This method is called to pause or resume the Managed Element Assignment Manager.

| Exceptions | Description |
|---|---|
| com_error | With system HRESULT on error |

Managed Element Load Balance Manager Class

Figure 23:
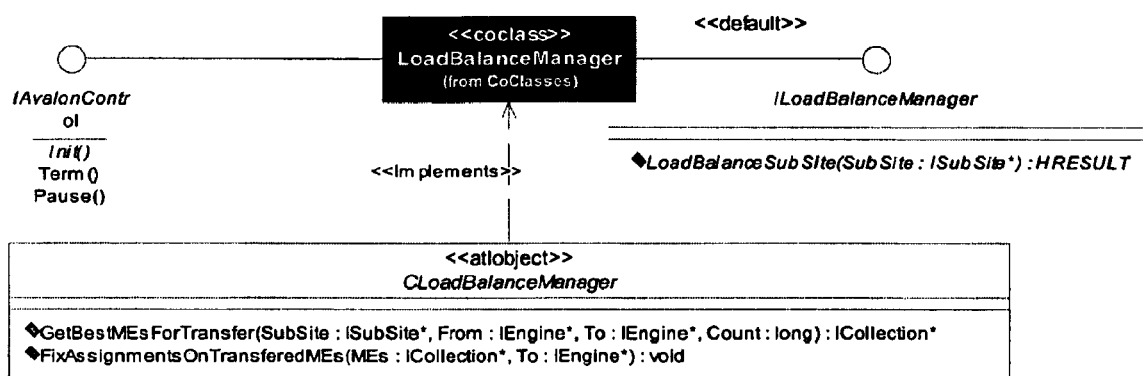
FIG. 23 depicts the structure of the Managed Element Load Balance Manager class.
Figure 24:
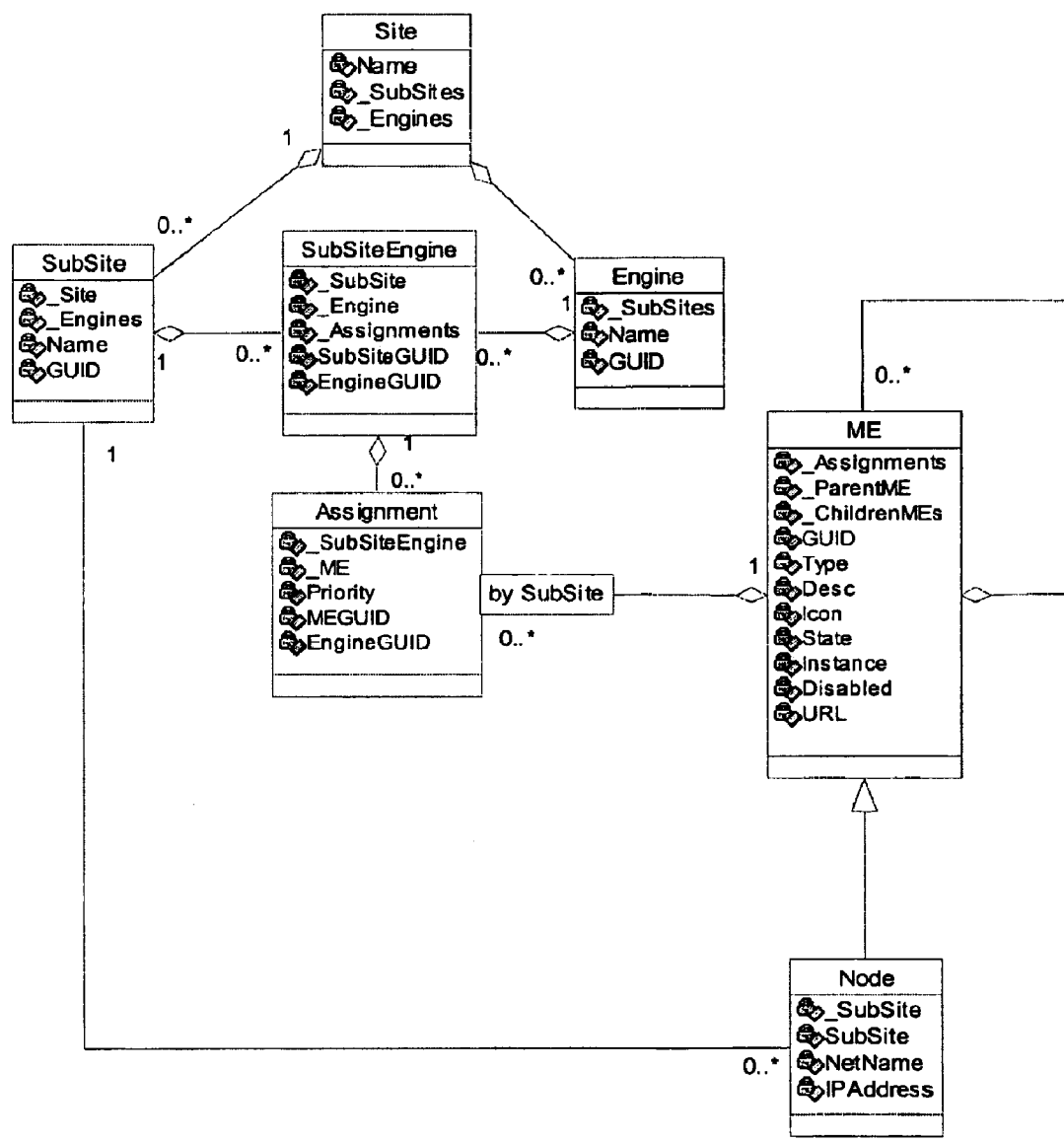
FIGS. 24–27 depict portions of a database schema used by the Managed Element Assignment Manager component of the Manager Engine.
Figure 25:
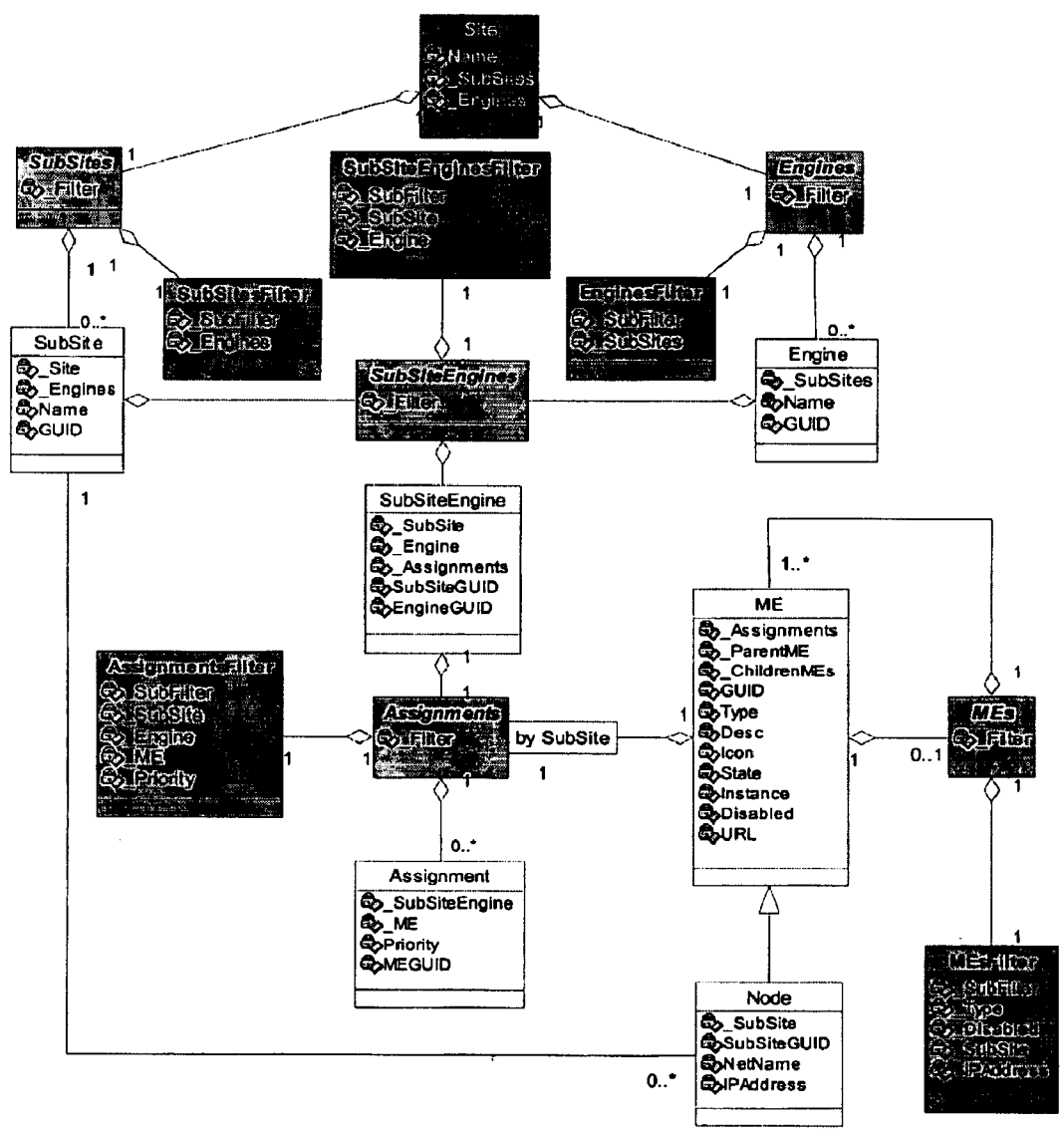
Figure 26:
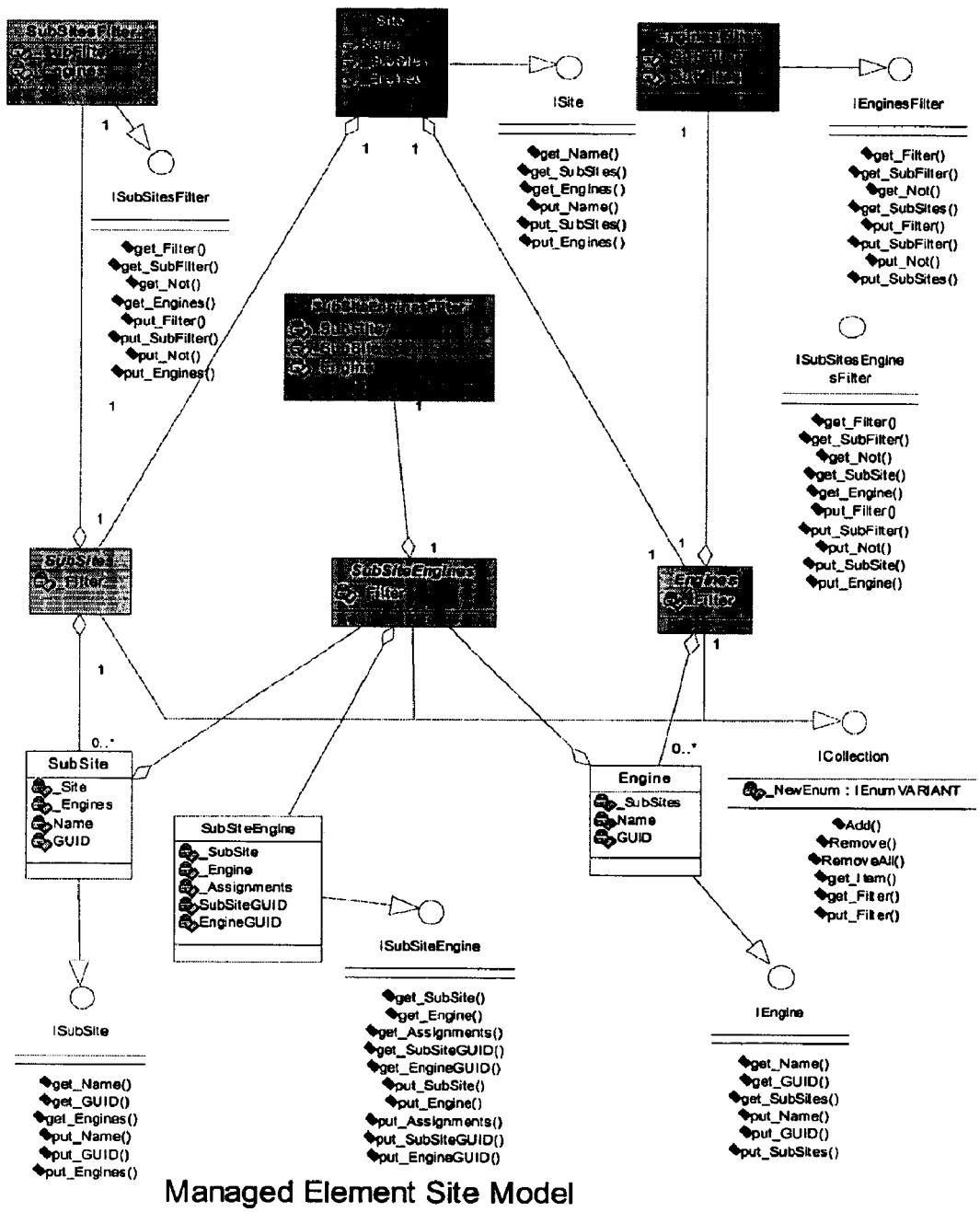
Figure 27:
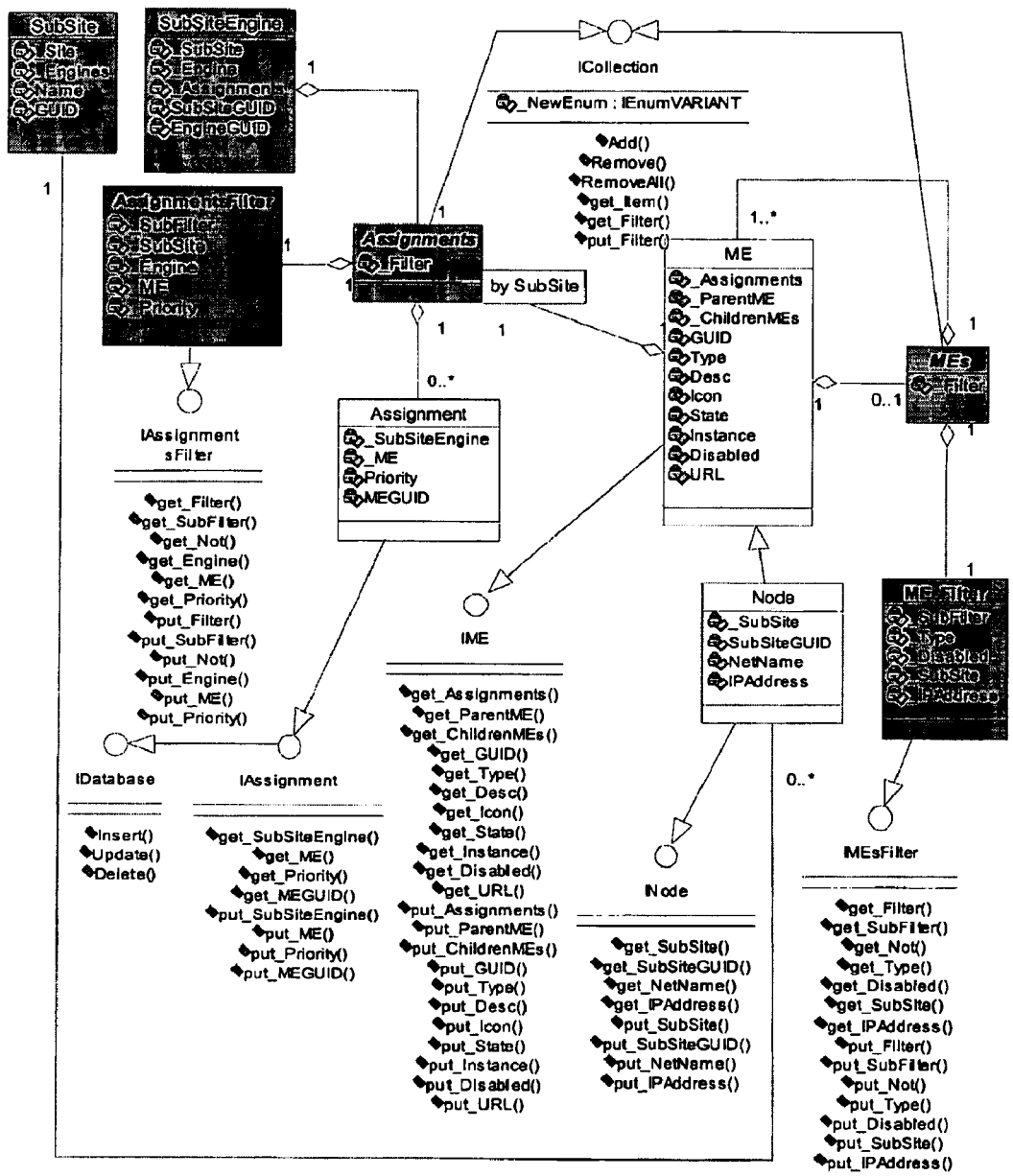

Turning now to FIG. 23, it depicts the structure of the Manged Element Load Balance Manager class. The file name is BodMeLb.dll in a Windows based system. It is the second level component encapsulating all of the functionality required to load balance the Bodiam system. Its' responsibilities include: 1) Autonomous operation; 2) Even distribution of ME monitoring across engines in a Sub Site; 3) Inclusion of neighbouring Sub Site commitments in calculating an engines real load; 4) Notification of primaries of new status; and 5) Database updates of changes. Specific classes include th following.

CLoadBalanceManager

This class is derived from CComObjectRootEx<CComMultiThreadModel>, CComCoClass<CLoadBalanceManager, &CLSID_LoadBalanceManager>, LoadBalanceManager, and InetworkControl.

Public Operations of this Class

ICollection* GetBestMEsForTransfer (ISubSite* SubSite, IEngine* From, IEngine* To, long Count)

| Parameter | Description |
|---|---|
| Return | Pointer to a ICollection of MEs NULL on error. |
| SubSite | Pointer to the SubSite object for the SubSite to be referenced in the reassignment. |
| From | Pointer to the Engine relinquishing its primary status. |
| To | Pointer to the Engine being assigned the new primary status. |
| Count | Count of ME's to transfer. |

| Exceptions | Description |
|---|---|
| com_error | With system HRESULT on error | void FixAssignmentsOn TransferedMEs (ICollection* MEs, IEngine* To)

| Parameter | Description |
|---|---|
| Return | None. |
| Mes | Pointer to an ICollection of ME's that require their assignments rearranged. |
| To | Pointer to the Engine being assigned the new primary status. |

| Exceptions | Description |
|---|---|
| com_error | With system HRESULT on error |

HRESULT LoadBalanceManager::LoadBalanceSubSite (ISubSite* SubSite)

| Parameter | Description |
|---|---|
| Return | S_OK if successful |
| SubSite | Pointer to the SubSite to load balance. |

| Exceptions | Description |
|---|---|
| com_error | With system HRESULT on error |

HRESULT INetworkControl::Init ( )

| Parameter | Description |
|---|---|
| Return | S_OK if successful<br>System HRESULT on error. |

This method is called to initialise the Load Balance Manager.

| Exceptions | Description |
|---|---|
| com_error | With system HRESULT on error |

HRESULT INetworkControl::Term ( )

| Parameter | Description |
|---|---|
| Return | S_OK if successful<br>System HRESULT on error. |

This method is called to terminate the Load Balance Manager.

| Exceptions | Description |
|---|---|
| com_error | With system HRESULT on error |

HRESULT INetworkControl::Pause (BOOL fTrue)

| Parameter | Description |
|---|---|
| Return | S_OK if successful<br>System HRESULT on error. |
| Ftrue | If TRUE causes the system to halt. All methods will return S_FALSE. If FALSE causes the system to resume if "Paused". |

This method is called to pause or resume the Load Balance Manager.

| Exceptions | Description |
|---|---|
| com_error | With system HRESULT on error |

With respect to the Managed Element object model, the file name in a Windows based system is BodMeObj.dll (see Managed Element description above). It is a third level component encapsulating the Object Model. Its responsibilities include: 1) Maintain object model; and 2) Implement access functions, methods and classes for traversal, filtering and persistence. The Managed Element Object Model consists of three types of components: 1) Collections; 2) Filters; and 3) Data objects. Collections are containers of Data objects. A Collection has a Filter object so as to facilitate the access of specific types of Data objects. A Data object has a logical or physical relation to the Network system.

MEAM Database Use

FIGS. 24–27 depict portions of a database schema usd by the Managed Element Assignment Manager component of the Manager Engine.

Interfaces

All Data object interfaces put_methods are only called during initialisation of the object and are not callable by clients.

Isite Class

This is the top level object. This is the only creatable object in this module, thus ensuring the correct and complete initialisation of all child objects.

Public Operations of the Class:

HRESULT get_Name (BSTR* Name)

| Parameter | Description |
|---|---|
| Return | S_OK |
| Name | Pointer to a BSTR to receive the Site Name |

HRESULT get_SubSites (ICollection** SubSites)

| Parameter | Description |
|---|---|
| Return | S_OK |
| SubSites | Pointer to the Site's SubSite collection pointer. |

HRESULT get_Engines (ICollection** Engines)

| Parameter | Description |
|---|---|
| Return | S_OK |
| Engines | Pointer to a Site's Engines collection pointer to receive this Site's Engine collection. |

HRESULT put_Name (BSTR Name)

| Parameter | Description |
|---|---|
| Return | S_OK |
| Name | Name of the Site. |

HRESULT put_SubSites (ICollection* SubSites)

| Parameter | Description |
|---|---|
| Return | S_OK |
| SubSites | Pointer to the Site's SubSite collection. |

HRESULT put_Engines (ICollection* Engines)

| Parameter | Description |
|---|---|
| Return | S_OK |
| Engines | Pointer to the Site's Engines collection. |

IsubSite Class

Public Operations of the Class

HRESULT get_Name (BSTR* Name)

| Parameter | Description |
|---|---|
| Return | S_OK |
| Name | Pointer to a BSTR to receive the SubSite name. |

HRESULT get_GUID (BSTR* GUID)

| Parameter | Description |
|---|---|
| Return | S_OK |
| GUID | Pointer to a BSTR to receive the SubSite GUID. |

HRESULT get_Engines (ICollection** Engines)

| Parameter | Description |
|---|---|
| Return | S_OK |
| Engines | Pointer to a SubSite's Engines collection pointer to receive this SubSite's |

HRESULT put_Name (BSTR Name)

| Parameter | Description |
|---|---|
| Return | S_OK |
| Name | Name of the SubSite. |

HRESULT put_GUID (BSTR GUID)

| Parameter | Description |
|---|---|
| Return | S_OK |
| GUID | GUID of the SubSite. |

HRESULT put_Engines (ICollection* Engines)

| Parameter | Description |
|---|---|
| Return | S_OK |
| Engines | Pointer to the SubSite's Engines collection. |

Iengine Class

Public Operations of the Class

HRESULT get_Name (BSTR* Name)

| Parameter | Description |
|---|---|
| Return | S_OK |
| Name | Pointer to a BSTR to receive the Engine name. | get_GUID (BSTR* GUID)

| Parameter | Description |
|---|---|
| Return | S_OK |
| GUID | Pointer to a BSTR to receive the Engine GUID. |

HRESULT get_SubSites (ICollection** SubSites)

| Parameter | Description |
|---|---|
| Return | S_OK |
| SubSites | Pointer to an Engine's SubSites collection pointer to receive this Engine's Subsites collection. |

HRESULT put_Name (BSTR Name)

| Parameter | Description |
|---|---|
| Return | S_OK |
| Name | Name of the Engine. |

HRESULT put_GUID (BSTR GUID)

| Parameter | Description |
|---|---|
| Return | S_OK |
| GUID | GUID of the Engine. |

HRESULT put SubSites (ICollection* SubSites)

| Parameter | Description |
|---|---|
| Return | S_OK |
| SubSites | Pointer to the Engine's SubSites collection. |

IsubSiteEngine Class

The SubSiteEngine class is an intersection class for an Engine to SubSite connection. As such there can be one to many of these intersections for both SubSite's and Engine's. Each instance represents one such intersection. It is just such an intersection to which Managed Elements (ME's) are assigned Engines.

Public Operations of the Class:

HRESULT get_SubSite (ISubSite** SubSite)

| Parameter | Description |
|---|---|
| Return | S_OK |
| SubSite | Pointer to a SubSite object pointer to receive this SubSiteEngine's SubSite object pointer for this Intersection. |

HRESULT get_Engine (IEngine** Engine)

| Parameter | Description |
|---|---|
| Return | S_OK |
| Engine | Pointer to a Engine object pointer to receive this SubSiteEngine's Engine object pointer for this Intersection. |

HRESULT get_Assignments (ICollection** Assignments)

| Parameter | Description |
|---|---|
| Return | S_OK |
| Assignments | Pointer to an Assignments collection pointer to receive this SubSiteEngine's Assignements collection pointer for this Intersection. |

HRESULT get_SubSiteGUID (BSTR* SubSiteGUID)

| Parameter | Description |
|---|---|
| Return | S_OK |
| SubSiteGUID | Pointer to a BSTR to receive the SubSite GUID for this Intersection. |

HRESULT get_EngineGUID (BSTR* EngineGUID)

| Parameter | Description |
|---|---|
| Return | S_OK |
| EngineGUID | Pointer to a BSTR to receive the Engine GUID for this Intersection. |

HRESULT put_SubSite (ISubSite* SubSite)

| Parameter | Description |
|---|---|
| Return | S_OK |
| SubSite | Pointer to the SubSite obect for this intersection. |

HRESULT put_Engine (IEngine* Engine)

| Parameter | Description |
|---|---|
| Return | S_OK |
| Engine | Pointer to the Engine object for this intersection. |

HRESULT put_Assignments (ICollection* Assignments)

| Parameter | Description |
|---|---|
| Return | S_OK |
| Assignments | Pointer to the Assignments collection for this intersection. |

HRESULT put_SubSiteGUID (BSTR SubSiteGUID)

| Parameter | Description |
|---|---|
| Return | S_OK |
| SubSiteGUID | GUID of the Subsite for this intersection. |

HRESULT put_EngineGUID (BSTR EngineGUID)

| Parameter | Description |
|---|---|
| Return | S_OK |
| EngineGUID | GUID of the Engine for this intersection. |

Iassignment Class

Public Operations of the Class:

HRESULT get_SubSiteEngine (ISubSiteEngine** SubSiteEngine)

| Parameter | Description |
|---|---|
| Return | S_OK |
| SubSiteEngine | Pointer to a SubSiteEngine object pointer to receive the parent SubSiteEngine object pointer. |

HRESULT get_ME (IME** ME)

| Parameter | Description |
|---|---|
| Return | S_OK |
| ME | Pointer to an ME object pointer to receive this assignments ME object pointer. |

HRESULT get_Priority (long* Priority)

| Parameter | Description |
|---|---|
| Return | S_OK |
| Priority | Pointer to a long to receive the Priority for this assignment. |

HRESULT get_MEGUID (BSTR* MEGUID)

| Parameter | Description |
|---|---|
| Return | S_OK |
| EngineGUID | Pointer to a BSTR to receive the MEGUID relating to this assignment. |

HRESULT put_SubSiteEngine (ISubSiteEngine* SubSiteEngine)

| Parameter | Description |
|---|---|
| Return | S_OK |
| SubSiteEngine | Pointer to the SubSiteEngine object. |

HRESULT put_ME (IME* ME)

| Parameter | Description |
|---|---|
| Return | S_OK |
| ME | Pointer to the ME object pointer. |

HRESULT put_Priority (long Priority)

| Parameter | Description |
|---|---|
| Return | S_OK |
| Priority | Priority of this assignment. |

HRESULT put_MEGUID (BSTR MEGUID)

| Parameter | Description |
|---|---|
| Return | S_OK |
| MEGUID | GUID of the ME relating to this assignment. |

IME Class

Public Operations Class

HRESULT get_Assignments (ICollection** Assignments)

| Parameter | Description |
|---|---|
| Return | S_OK |
| Assignments | Pointer to an Assignments collection pointer to receive this ME's Assignements collection pointer. |

HRESULT get_ParentME (IME** ParentME)

| Parameter | Description |
|---|---|
| Return | S_OK if this object has a parent |
|  | S_FALSE if this object is a root object and therefore parentless. |
| ParentME | Pointer to an ME object pointer to receive this objects paremt ME object pointer or NULL if this is a top = level object. |

HRESULT get_ChildrenMEs (ICollection** ChildrenMEs)

| Parameter | Description |
|---|---|
| Return | S_OK if this object has children ME's |
|  | S_FALSE if this object is a leaf node and therefore childless. |
| ChildrenMEs | Pointer to an ME collection pointer to receive this ME's ME children collection pointer. |

HRESULT get_LGUID (BSTR* GUID)

| Parameter | Description |
|---|---|
| Return | S_OK |
| GUID | Pointer to a BSTR to receive the GUID of this ME. |

HRESULT get_Type (BSTR* Type)

| Parameter | Description |
|---|---|
| Return | S_OK |
| Type | Pointer to a BSTR to receive the GUID of this ME Type. |

HRESULT get_Desc (BSTR* Desc)

| Parameter | Description |
|---|---|
| Return | S_OK if a description exists |
|  | S_FALSE if no description exists. |
| Desc | Pointer to a BSTR to receive the description of this ME or NULL. |

HRESULT get_Icon (BSTR* Icon)

| Parameter | Description |
|---|---|
| Return | S_OK if a description exists |
|  | S_FALSE if no description exists. |
| Icon | Pointer to a BSTR to receive the icon name of this ME or NULL. |

HRESULT get_State (long* State)

| Parameter | Description |
|---|---|
| Return | S_OK |
| State | Pointer to a long to receive this ME's state. |

HRESULT get_Instance (BSTR* Instance)

| Parameter | Description |
|---|---|
| Return | S_OK |
| Instance | Pointer to a BSTR to receive the instance name of this ME. |

HRESULT get_Disabled (BOOL* Disabled)

| Parameter | Description |
|---|---|
| Return | S_OK |
| Disabled | Pointer to a Boolean to receive this ME's disabled indication. |

HRESULT get_URL (BSTR* URL)

| Parameter | Description |
|---|---|
| Return | S_OK if a URL exists |
|  | S_FALSE if no URL exists for this ME |
| URL | Pointer to a BSTR to receive the URL of this ME or NULL. |

HRESULT put_Assignments (ICollection* Assignments)

| Parameter | Description |
|---|---|
| Return | S_OK |
| Assignments | Pointer to this ME's assignments collection. |

HRESULT put_ParentME (IME* ParentME)

| Parameter | Description |
|---|---|
| Return | S_OK |
| ParentME | Pointer to this ME's parent ME if one exists. |

HRESULT put_ChildrenMEs (ICollection* ChildrenMEs)

| Parameter | Description |
|---|---|
| Return | S_OK |
| ChildrenMEs | Pointer to this ME's children ME collection if one exists. |

HRESULT put_GUID (BSTR GUID)

| Parameter | Description |
| --- | --- |
| Return | S_OK |
| GUID | GUID of this ME. |

HRESULT put_Type (BSTR Type)

| Parameter | Description |
| --- | --- |
| Return | S_OK |
| Type | GUID of this ME's Type. |

HRESULT put_Desc (BSTR Desc)

| Parameter | Description |
| --- | --- |
| Return | S_OK |
| Desc | The description for this ME. |

HRESULT put_Icon (BSTR Icon)

| Parameter | Description |
| --- | --- |
| Return | S_OK |
| Icon | Icon name representing this ME. |

HRESULT put_State (long State)

| Parameter | Description |
| --- | --- |
| Return | S_OK |
| State | The state of this ME. |

HRESULT put_Instance (BSTR Instance)

| Parameter | Description |
| --- | --- |
| Return | S_OK |
| Instance | Instance name of this ME. |

HRESULT put_Disabled (BOOL Disabled)

| Parameter | Description |
| --- | --- |
| Return | S_OK |
| Disabled | Active/Inactive flag. |

HRESULT put_URL (BSTR URL)

| Parameter | Description |
| --- | --- |
| Return | S_OK |
| URL | The URL of this ME. |

Node Class

This class is derived from the IME class.

Public Operations of the Class

HRESULT get_SubSite (ISubSite** SubSite)

| Parameter | Description |
| --- | --- |
| Return | S_OK if this node has been assigned to a SubSite<br>S_FALSE if this Node has no SubSite assignment. |
| SubSite | Pointer to a SubSite object pointer to receive this Node's SubSite object pointer if one exists or NULL. |

HRESULT get_SubSiteGUID (BSTR* SubSiteGUID)

| Parameter | Description |
| --- | --- |
| Return | S_OK if this node has been assigned to a SubSite<br>S_FALSE if this Node has no SubSite assignment. |
| SubSiteGUID | Pointer to a BSTR to receive this Node's SubSiteGUID if one exists or NULL. |

HRESULT get_NetName (BSTR* NetName)

| Parameter | Description |
| --- | --- |
| Return | S_OK if this Node has a network name<br>S_FALSE if this Node has no network name. |
| NetName | Pointer to a BSTR to receive this Node's network name or NULL. |

HRESULT get_IPAddress (BSTR* IPAddress)

| Parameter | Description |
| --- | --- |
| Return | S_OK if this Node has an IP address |
| IPAddress | Pointer to a BSTR to receive this Node's IP address if one |

HRESULT put_SubSite (ISubSite* SubSite)

| Parameter | Description |
| --- | --- |
| Return | S_OK |
| SubSite | Pointer to the SubSite object for this Node. |

HRESULT put_SubSiteGUID (BSTR SubSiteGUID)

| Parameter | Description |
|---|---|
| Return | S_OK |
| SubSiteGUID | GUID of this Node's SubSite. |

HRESULT put_NetName (BSTR NetName)

| Parameter | Description |
|---|---|
| Return | S_OK |
| NetName | Network name of this Node. |

HRESULT put_IPAddress (BSTR IPAddress)

| Parameter | Description |
|---|---|
| Return | S_OK |
| IPAddress | IP address of this ME. |

Icollection Classes

This Interface is one that is specialised by each collection class. As such this description presumes each item is of type ICollectableObject. ICollectableObject will of course be specialised for each collection class. This interface has as an internal property a filter object for the collection. This description presumes the filter is of type ICollectionFilter. The ICollectionFilter interface will of course be specialised for each collection class.

Private Attributes of the Classes:
IEnum VARIANT _NewEnum

Public Operations of the Classes

HRESULT Add ([out,retval] ICollectableObject** Item)

| Parameter | Description |
|---|---|
| Return | S_OK if successful<br>System HRESULT on error |
| Item | Pointer to a CollectableObject pointer to receive the newly created object's pointer. This object has already been added to the internal collection. |

| Exceptions | Description |
|---|---|
| com_error | With system HRESULT on error |

HRESULT Remove ([in] VARIANT Index, [out, retval] ICollectableObject** Item)

| Parameter | Description |
|---|---|
| Return | S_OK if successful<br>S_FALSE if not found<br>System HRESULT on other error. |
| Item | Pointer to a CollectableObject pointer to receive the removed object's pointer or NULL. |

| Exceptions | Description |
|---|---|
| com error | With system HRESULT on error |

HRESULT RemoveAll ( )

| Parameter | Description |
|---|---|
| Return | S_OK |

HRESULT get_Item ([in] VARIANT Index, [out, retval] ICollectableObject** Item)

| Parameter | Description |
|---|---|
| Return | S_OK if successful<br>S_FALSE if not found<br>System HRESULT on other error. |
| Item | Pointer to a CollectableObject pointer to receive the requested object's pointer or NULL. |

| Exceptions | Description |
|---|---|
| com error | With system HRESULT on error |

HRESULT get_Filter ([out, retval] ICollectionFilter** Filter)

| Parameter | Description |
|---|---|
| Return | S_OK if successful<br>System HRESULT on other error. |
| Filter | Pointer a CollectionFilter object pointer to receive the collection filter objects pointer. |

| Exceptions | Description |
|---|---|
| com error | With system HRESULT on error |

HRESULT put_Filter ([in] ICollectionFilter* Filter)

| Parameter | Description |
|---|---|
| Return | S_OK if successful<br>System HRESULT on other error. |
| Filter | Pointer a CollectionFilter object. If this value is NULL the internal filter is switched off. This can allow two collection to filter on the same parameters. |

| Exceptions | Description |
|---|---|
| com error | With system HRESULT on error |

Ifilter Class

Public Operations of the Class:

HRESULT get_Filter ([out, retval] BOOL* Filter)

| Parameter | Description |
|---|---|
| Return | S_OK |
| Filter | Pointer to a Boolean to receive the Filter objects current state: TRUE - Filtering; FALSE - Not filtering. |

HRESULT get_SubFilter ([out,retval] BOOL* SubFilter)

Sub filtering is the ability to filter on a previous filter results. This allows composite filters to be supported.

| Parameter | Description |
|---|---|
| Return | S_OK |
| Filter | Pointer to a Boolean to receive the Filter objects current SubFiltering state: TRUE - SubFiltering; FALSE - Not Subfiltering. |

HRESULT get_Not ([out, retval] BOOL* Not)

Inverse filtering is the ability to filter on non-matching parameters.

| Param: | Description |
|---|---|
| Return | S_OK |
| Not | Pointer to a Boolean to receive the Filter objects current filter type: TRUE - Inverse Filtering; FALSE - Not inverse filtering. |

HRESULT put_Filter ([in] BOOL Filter)

| Parameter | Description |
|---|---|
| Return | S_OK |
| Filter | State to set the filter object to: TRUE - Filtering; FALSE - Not filtering. |

HRESULT put_SubFilter ([in] BOOL SubFilter)

| Parameter | Description |
|---|---|
| Return | S_OK |
| SubFilter | State to set the filter object's SubFilter state to: TRUE - Sub Filtering; |

HRESULT put_Not ([in] BOOL Not)

| Parameter | Description |
|---|---|
| Return | S_OK |
| SubFilter | State to set the filter object's Not state to: TRUE - Inverse Filtering; FALSE - Not inverse filtering. |

Public Specialised Operations of the Class:

The following two operation pairs will represent any get/set property pairs for which a filter object supports filtering. When a value is set this automatically sets filtering on.

HRESULT get_AProperty ([out, retval] AProperty* Property)

| Parameter | Description |
|---|---|
| Return | S_OK if successful<br>S_FALSE if filtering is off. |
| Property | Pointer to a property to receive the current setting for that property. If filtering is off this will be NULL. |

HRESULT put_AProperty ([in] AProperty Property)

| Parameter | Description |
|---|---|
| Return | S_OK |
| Property | Property to filter on. This set filtering on if currently off. | v. Manger Engine—Enterprise Audit System Component

The purpose of the Enterprise Audit System component of the manager engine is to provide a facility that will record and publish auditing or logged information for its registered servers. These servers can be COM objects or executables that require a tracing capability that can be turned on or off and increase the detail levels.

As used in this section, the "EAS client" refers to software that interfaces with the EAS system to configure and/or view audit data. Similarly, the "EAS provider" refers to software that provides audit data.

The EAS system component prferably has the following features: It acts as a central log for all audit providers; it provides the capability to filter out data at the lowest level; it allows the EAS clients to modify the EAS configuration locally or remotely; it allows EAS clients can to view audit log data locally or remotely; it allows EAS clients to receive live feed of audit log data locally or remotely; it allowsEAS providers to be individual selected and allows their audit detail to be controlled; it allowsEAS providers to be self-installable; it works such that there is alow impact on EAS providers (monitored code); it is easy to implement; and it supports custom data in the audit log with installable viewers.

The critical success factor for the EAS component of the presently described emboidment is the ability to use a central log for all EAS providers and the ability to view already recorded or view live audit data remotely. The primary purpose of the EAS component is to allow support personnel the ability to see what is going on with the Management engines. The audit log data should preferably provide the information necessary to remotely debug a engine or the ability to send these traces to Network support staff.

Figure 31:
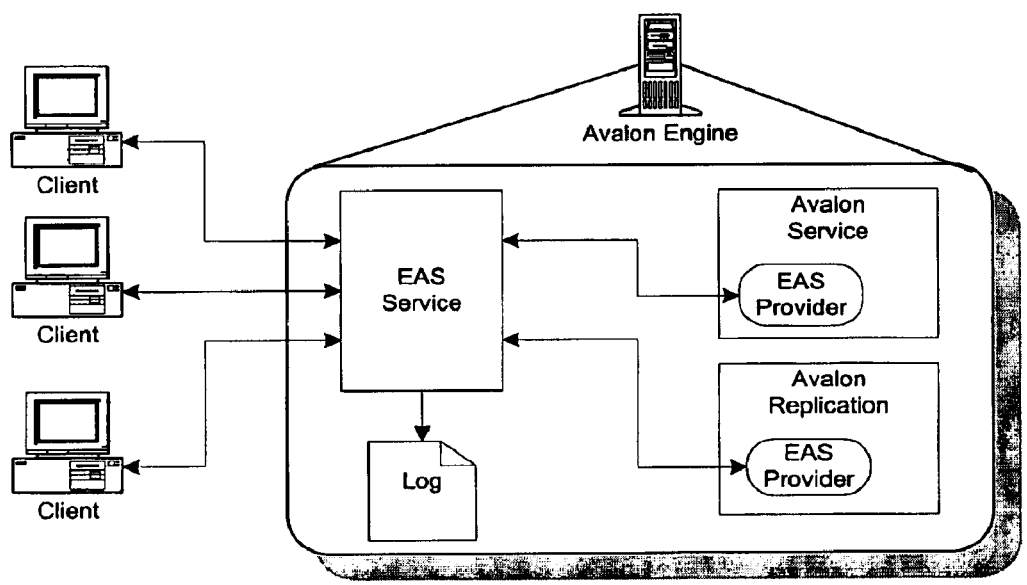
FIG. 31 shows the Enterprise Audit System software component on the Manager Engine component shown in FIG. 1.

More specfiically, the EAS provides a central auditing logging system that all Network components can subscribe. In the presently described emboidment, it provides the ability for clients to remotely control and view the audit log data FIG. 31 shows an EAS software component on a Managed Engine in accordance wirth an embodiment of the present invention.

EAS Providers

The EAS Providers provide the interface between the monitored code and the EAS service. Note also that the Network Service, Network Replication Service, and the EAS Service are all in their own process.

That is, in the Network there are two services, the primary engine used to maintain the Network system (the Network Service) and the Network Replication service, which is used to insure that the Network's local database is up to date.

Figure 32:
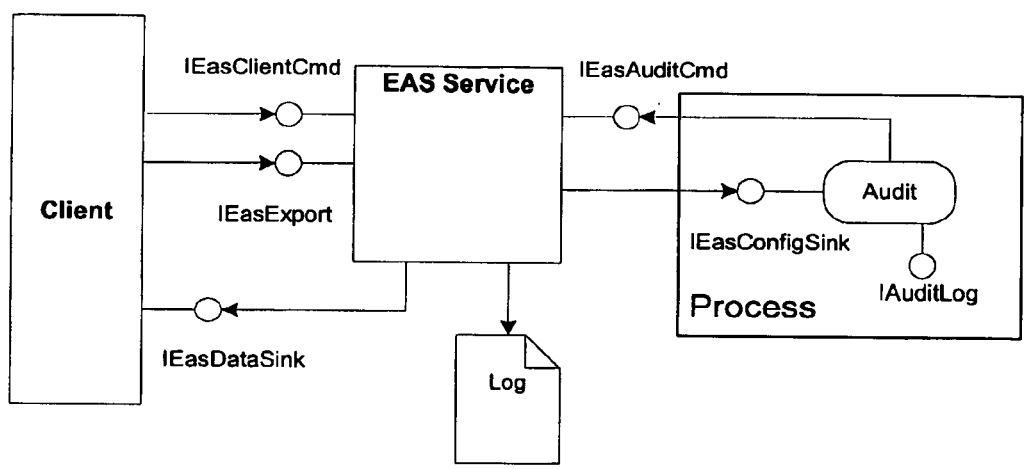
FIG. 32 depicts three components comprising the Enterprise Audit System Component in accordanc with one emboidment of the present invention.

The EAS Service by contrast will provide the central collection point for all EAS providers on the computer. It will manage the log file and provide the client interface to the information contained in it or the live feeds. It is also responsible for maintaining the configuration as notifying the EAS providers when there is a change. FIG. 32 depicts three components comprising the Enterprise Audit System Component: the EAS Client, the EAS Provider and the EAS Service component (i.e, processes) that function to define the interaction between the client and provider.

Client Component

The client can be any executable (GUI or CMD) that uses the EAS's client interfaces and requires access to the audit data or configuration.

EAS Service Component

The central NT service is responsible for handling both the clients and the EAS providers.

Audit (EAS Provider) Component

Each process will use the Audit COM component that will provide the interface to the EAS Service. This is the EAS provider.

Figure 33:
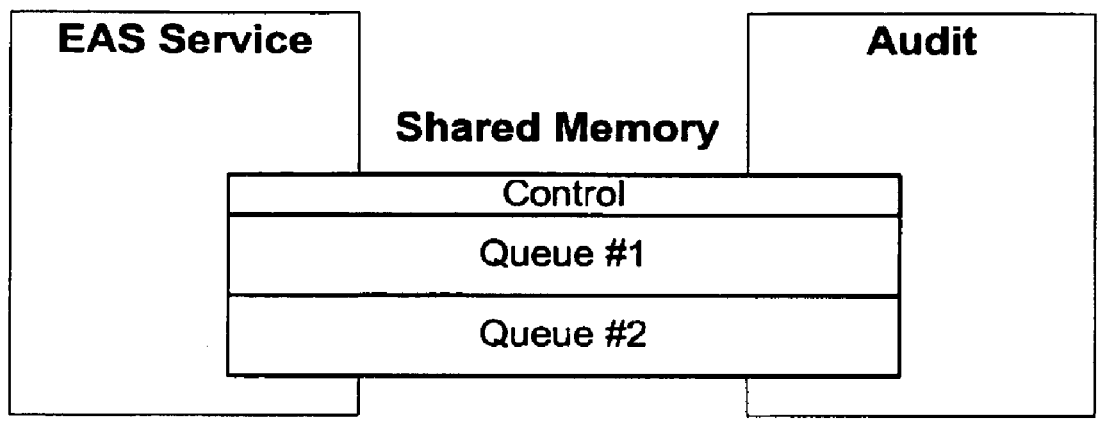
FIG. 33 depicts the method of fast marshalling used in the Enterprise Audit System Component depicted in FIG. 31 in accordanc with one embodiment of the present invention.

The communication between the EAS provider (Audit) and the EAS system must be very fast and as close to asynchronous as possible. To achieve this both the EAS Service and the Audit component preferably use a shared memory buffer to implement two flat queues. FIG. 33 depicts the method of fast marhsalling using two queues as used in the Enterprise Audit System component presently described.

The trick to these fast queues is to allow the EAS service to own of the queues at all times. When it is finished processing the messages in the queue it trades ownership of the queue with the EAS providers and continues processing.

EAS Process Flows

Again, Eas service acts as the interface between the EAS Audit clients, EAS Viewer Clients and the log file. EAS Service creates the shared memory, setups the control information, allocate an OS mutex object under the name "Network_EAS_Mutex", and allocate an OS event object under the name "Network_EAS_Event". Any EAS provider (Audit) that is started also subscribes to the share memory and also creates its reference to the OS's mutex and event.

When it is time for the EAS provider to write a log record to the queue it will first lock the mutex, read the control header to find out what queue to write to, write the log record, release the mutex, and single the event. The EAS Server will see the signal, lock the mutex, switch the buffers, release the mutex, and process the log records in the queue. Because the EAS Server has switch the queue, the clients are not blocked.

The efficiency of this system is gained because the EAS Providers (Audit) is not competing with the EAS system in retrieving the audit records. Additional performance is gained because the queues are just records added to the end of the current stack. There is no memory allocation, etc. . . . , the system just finds the end and adds the next record.

Format for Queue Control Header

| Variable | Description |
| --- | --- |
| BYTE InputQueue | 0 = Use the first queue as the input (EAS Providers), 1 = use the second queue to input new audit logs |
| DWORD nQSize | Size in bytes of a queue |
| BYTE *pQ0Addr | Address for the first queue |
| BYTE *pQ1Addr | Address of the second queue |
| BYTE *pQBase | Address of the base of the input queue |
| BYTE *pQWrite | Address to begin writing the audit log |

EAS Log File Specification

The Log file is managed by the EAS service. There is only one log file per machine. This file is reused upon startup of the EAS service.

Header Format of the Log File

In the presently described embodiment, the Log file utilizes the following member variables: "Max Count" (Maximum number of records in the log); "Current Count" (Current number of records in the log); "Top Record"(Next record position); and "Bottom Record" (First record).

Record Format for EAS Log File Records

| Field | Data Type | Description |
| --- | --- | --- |
| Marker | BYTE[2] | Marker for begining of record |
| CRC32 | DWORD | Records CRC value |
| Size | DWORD | Size of record (total) |
| Version | DWORD | Record format version # |
| Service | WCHAR[X] | Service name, NULL terminated |
| Routine | WCHAR[X] | Routine name, NULL terminated |
| ThreadID | DWORD | ID of the thread |
| CorrelateID | DWORD | Customized correlation ID |
| Year | WORD | Time - Year |
| Month | BYTE | Time - Month |
| Day | BYTE | Time - Day |
| Hour | BYTE | Time - Hour |
| Min | BYTE | Time - Minute |
| Second | BYTE | Time - Second |
| Milli | WORD | Time - Milliseconds |
| Level | BYTE | Detail level (1–3) (Note #1) |
| WarningType | BYTE | Warning type (1–3) (Note #1) |
| Des | WCHAR[X] | Description of audit, NULL |
| CustSize | WORD | Custom data size |
| CustType | WCHAR[40] | Custom data type (GUID) |
| CustData | BYTE[X] | Custom data |

Note that in the above table, the number "1" designates "Normal," "2" signifies a "Warning," and "3" signifies an "Error."

EAS Interface Classes

The following are the interface classes for the EAS Service, EAS Client, and EAS Provider (Audit) of the presently described embodiment of the present invention, aong wioth associated pseudocode. All interfaces have a return data type of HRESULT.

IeasAuditCmd (EAS Service interface)
{
    // These are configuration interfaces only.
    RegisterService([in] BSTR Name, [in] BSTR Description);
    UnregisterService([in] BSTR Name);
    // Client interfaces
    put_ServiceName([in] BSTR Name);
    RegisterConfigSink([in] IEasConfigSink *ptr);
    get_Level([out, rtnval] short *Level);
};

IeasClientCmd (EAS Service Interface)
{
    RegisterDataSink([in] IEasDataSink *ptr);
    get_ProviderCount([out, rtnval] short *Count);
    ProviderInfo([in] short Index, [out] BSTR *Name, [out] short *Level);
    ProviderLevel([in] short Index, [out] short *Level);
    get_LiveFeed([out, rtnval] BOOL On);
    put_LiveFeed([in] BOOL On);
    get_MaxLogSize([out, rtnval] long *Size);
    put_MaxLogSize([in] long Size);
    get_LogFilePath([out, rtnval] BSTR *LogFilePath);
    put_LogFilePath([in] BSTR LogFilePath);
    get_DefaultLevelOfDetail([out, rtnval] short *LOD);
    put_DefaultLevelOfDetail([in] short LOD);
};

IeasExport (EAS Service Interface)
{
    GetData([in] long Handle, [out] Variant *ptr);
    GetNextRow([in] long Handle, [out] Variant *ptr);
    get_Count([out, rtnval] long *Rows);
};

The [out] Variants will contain SafeArrays.

IeasConfigSink (EAS Provider Interface)
{
    Notify([in] short Level);
};

IeasDataSink (EAS Client Interface)
{
    Data([in] Variant Data);
    NewProvider([in] BSTR Provider, [in] short Action);
};

Here, the Variant Data will contain a SafeArray.

| Action | Description |
| --- | --- |
| 0 | Add |
| 1 | Level Change |

EAS Clients

These are the applications which are EAS aware contan the EAS Audit Client objects. They are the source of logged events. Clients are required to inheret from the IAuditClient object which exposes the ISetLOD interface.

EAS Viewer Clients

These are the applications which can display the EAS logged data. They preferably have the following features: display of real time audit stream with filtering; searching of past audits; sorting of audits; import of exported log files for offline view; and installable custom data viewers.

Preferably, any and all filtering of log information will be done on the client side so to not impact the server side performance.

EAS Configuration Manager

This component is used by the clients to manage the base functions of EAS. It preferably has the ability to: set the log size in Megabytes; set the log Name; set the log Path; and control the Level of Detail (i.e., the extent of data that is logged). The following table shows pssible levels of detail which may be selected in the preently described embodiment.

| Level of detail | Description |
| --- | --- |
| 0 | No audit |
| 1 | Startup/Shutdown/Errors |
| 2 | Warnings |
| 3 | Detail (functions & data dumps) | vi. Manager Engine—Engine to Engine Communication Component

The purpose of this section is to describe the technical requirements and interfaces for the Engine to Engine Communication Component (E2E) used in the Management engine of the presently described embodiment.

The purpose of the E2E component is to send and receive messages from other Management engines that exist within the managed site. The component reads from a local MSMQ message queue and forwards messages to the local Message Switch component. Other components registered with the Message Switch then retrieve and read the message from the Switch and as when required.

The E2E component is also responsible for forwarding messages to other (external) Management engines operating with the environment. The E2E component reads messages from the local Message Switch which are signaled for distribution to external engines. Once signaled the message is extracted from the local Message Switch queue and the forwarded via MSMQ to the appropriate queue on the external target engine.

The E2E component is best viewed as a simple transport mechanism providing guaranteed message delivery this is does by implementing transacted queues.

Figure 38:
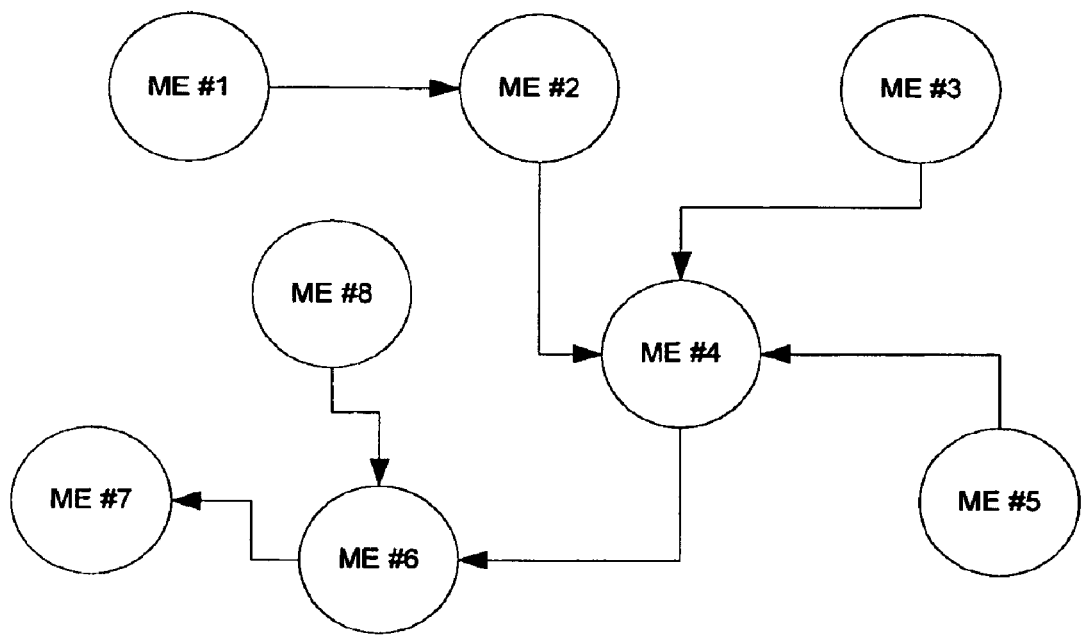
FIG. 38 shows an overview of Engine To Engine communication component of the manager engines shown in FIG. 1 in accordance with one embodiment of the present invention.

FIG. 38 shows an overview of possible E2E communication. The E2E component is the only method in the presently described embodiment of sending message to and receiving message from external Management engines, it is therefore responsible for communication between all Management engines with an Network environment.

Message Format

The message to be passed between Management engines will contain the complete set of data maintained within an IMsgSwitchMessage. The Message Switch component provides all the necessary methods to extract this data and to allow the creatation of an identical IMsgSwtichMessage on the targeted machine. In addition it will provide all the information necessary to distribute the message to the appropriate targets (For further details see the Message Switch Componenen section).

In the presently described embodiment, engine to engine communicationis accomplished by transforming aata from the IMsgSwtichMessage object to an XML structure for distribution. The XML structure is as follows.

```
<XML>
<Msg cls="Msgclass"Num="MsgNumber"Obj="objected Dt="date"FormSrv="name of sender"ToSrv="server name">
<p n="PropertyName"vt="VariantType">data value</p>
<p n="PropertyName"vt="VariantType">date value</p>
<p n="PropertyName"vt="VariantType">data value</p>
</Msg>
</XML>
```

Further attributes can be added to the Msg (i.e., to this structure) as required. Each <p> in the structure entry represent a property-value pair as extracted from the IMsgSwtichMessage object. Again, the contents of the XML string will form the body of the MSMQ message. Prefeably, tPreferably, the Microsoft XMLDOM component is employed to parse any XML data. Thus, Microsoft XMLDOM will provide a consistent XML interface across components.

E2E Interface

The E2E component provides a single interface—that of the standard component interface required by all components in the Management engine. That is, the E2E component is a consumer of the Message Switch component and as such provides no other external interfaces other than that of the callback interface functions required to allow the Message Switch to implement a notification sink.

Component Interface

The component interface for the Engine to Engine communication component is used by all COM components in the Management engine. The owner of the process can uses this interface to control initialization, terminate, and pause the process as required.

```
class INetworkControl
{
    HRESULT Init(void);
    HRESULT Term(void);
    HRESULT Pause(BOOL fTrue);
};
```

Again, there are no other external interfaces on the E2E component.

INetworkControl Methods

Init

The "Init" method is used by the E2E to initialize internal structures and create and if necessary empty it locally based MSMQ queues. In addition it will register with the local Message Switch and provide it callback address/sink.

Term

The "Term" method is used by the E2E component to close any message queues and empty them. Any request for messages or processes will fail with a return status of "E_FAIL".

Pause

The "Pause" with the flag being true will cause any request to send a message to be returned with a S_FALSE.

The E2E component obtains a list of Active Engines from a message sent to the Message Switch by the Engine to Engine monitor. The E2E component expects this list to be in XML format and of the following structure:—

```
<XML>
<EngineMon>
<Engine>
<egn></egn>
<UUID></UUID>
<state></state>
</Engine>
<Engine>
<egn></egn>
<UUID><UUID>
<state></state>
</Engine>
</EngineMon>
</XML>
```

Additional values can be added as required.

The E2E component maintains a local copy of the active engine list and employs the XMLDOM component provided with 2000/IE5. The local copy will be overwritten on any engine list update event.

Internal Design—Receive Message Queue Handler and Send Messaeg Queue Handler

The internal design of the E2E component is preferably straightforward. It will consists of two main sections, and input queue handler (Receive Queue) and an output queue handler (Send Queue), the latter will require a list of all active Management engines. The Send process will not action a send until this list has been received.

Receive Message Queue Handler Section

At initialization the Receive handler creates the local message queue, this queue will be accessible by all other Management engines. The queue name will be read from the database, this will allow the MSMQ name to be configured at installation.

Once the queue has been creates a receive handler thread this will put up a MSMQ read with a timeout. When the Read is signaled, indicating a message in the receive queue, the queue will be read, the message consumed and passed to the Message Store component via its SendMsg( . . . ) function, all further messages in the queue will be consumed and forwarded at that point until the queue is emptied. The data contained within the MSMQ message will be transformed into a IMsgSwitchMessage object, (see MessageSwitch document for details) before being passed to the MessageSwitch via the SendMsg function. Note that the Receive handler does not itself register for messages and only calls the ImessageSwitch Send( ) function.

Send Message Queue Handler Section

At initialization the Send handler will register with the Message Switch providing it with the message types it has been defined to handle, it then calls its RegisterCallback function to register its own callback interface.

Once initialization has taken place it will then place itself into an Idle state until it has received a list of all Active Management engines, the Send process will not action a send until this list has been received, the send thread is suspended until a callback is received.

The callback, when signaled, will cause the Send thread to Resume and read and consume all messages in the Message Store which have been designated for distribution and have been registered for reception. Once the queue has been emptied the thread will suspend itself. The thread will be created once a list of active Management engines have been received.

Although the creation of threads is to be avoided where possible this would seem to be the most efficient and cost effective method since the Message Switch specification warns of implementing lengthy (time consuming) code within the callback function because of its detrimental effect on the whole of the Engine process.

vii. Manager Engine—Election Manager Component

The election manager component of the manager engine of the presently described embodiment provides the communication coordination and election process for promoting a specific component to a manager role. Election manager assignments can be site or sub-site based. The Election Manager component is a single COM component used in the Management engine. The election manananger has two parts: a site and sub-site master ELM. The site master is responsible for site election, and the sub-site master is responsible for sub-site elections.

Election processes are such that components subscribe to their local ELM for site or sub-site elections. Local ELMs, in turn, communicate with the site or sub site ELM master to elect masters for the component type, the results of which are sent around the site. The targeted component then promotes or demotes itself. All ELMs receiving the message update their configuration data accordingly, discarding sub-site election results when the engine is not in their sub-site.

Figure 34:
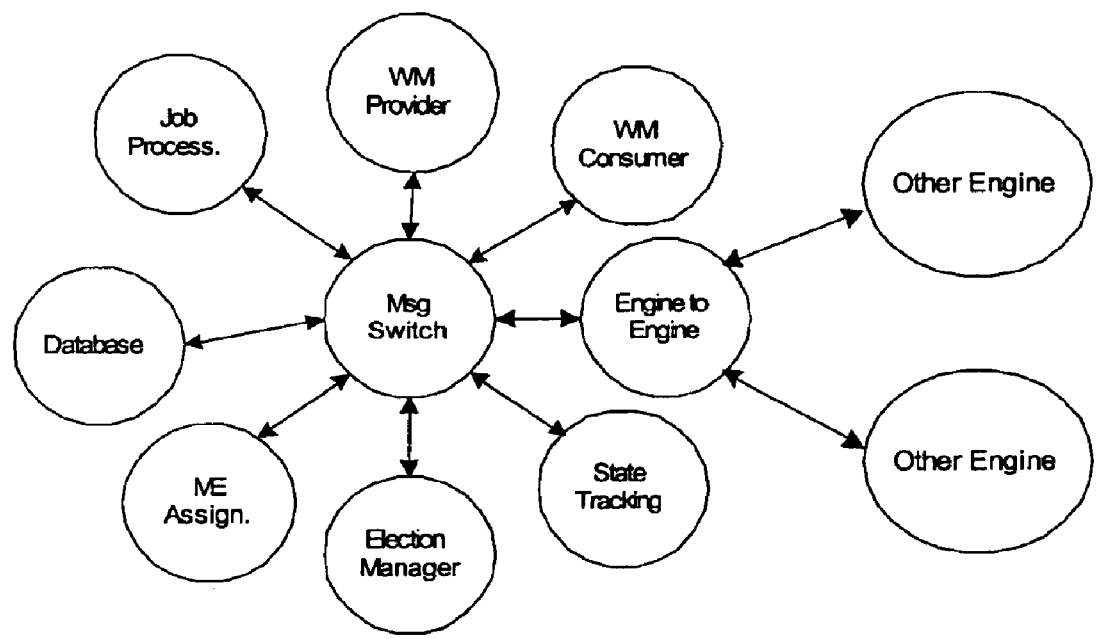
FIG. 34 shows the election manager component of the manager engines shown in FIG. 1 as well as certain software components with which it interacts in accordance with one emboidment of the present invention.

In the presently described embodiment, all ELMs consult the configuration data when they detect an engine off-line message, and if they detect it contained one or more master components it generates a GUID to send to the site/sub site master, who in turn chooses the ELM with the highest GUID and promotes its component(s) to take over as master. The Election Manager of the presently described embodiment is dependent on the following components: Message Switch component (to retrieve messages that affect the election manager); Managed Element Assignment Manager (to assign a master per subsite); DataBase Replication Manager to assign a primary and backup per site; the Engine Monitoring Manager (to assign a master per sub-site and to provide the engine state change messages that are sent to the message switch); and Engine 2 Engine communication component (to send and receive results of an election and communicate with other Election Managers as well as listen for other sub-site's engine events (set via the message switch)). FIG. 34 shows the election manager component as well as certain software components upon which it depeends as specified above.

Election Process Walk Through

Elections must be unique within the arena in which they are held. Where there are multiple elections for different reasons within an arena, the assignments may be distributed across any member of the arena concerned. The election manager functions to elect the following components to be promoted to manager status: DB Replication Manager (on a site level), a primary and a backup; Engine Monitor Manager (on a sub-site level); an ME Assignment Manager (on a sub-site level); and an Election Manager (on a sub-site & site level).

When an engine status change message is dete0cted (off-line or removed) the DNS and GUID of the engine are compared to those that election manager knows have one or more elected components. If a match is found then those component types, which must be re-elected, are identified and the component election process begins.

Note that Network conditions can produce situations where multiple masters can temporarily exist such as after a reconnection. This applies not only to the components that the Election Manager is responsible for controlling but the Election Manager itself. The Election Manager must therefore also detect and arbitrate multiple instances of itself and other components.

Election Manager Startup Process

The Election Manager startup process may consist of the following: (1) Local ELM waits for an 'Engine Ready Message'; (2)Local ELM waits time $T_1$ to receive the site & sub-site configuration from the site & sub-site masters; (3)After $T_1$ the local ELM looks at its configuration data; (4)If there is no sub site master it promotes itself to sub site master and broadcast the result so to other ELMs so they can update their configuration data.; and (5)If there is no the site ELM master goes onto Site ELM election (see below).

Election Manager Sub Site ELM Election Process

The Election Mananger SubSite ELM election process may consist of the following: (1) all ELMs in a sub site listen for engine off line messages, and if the engine that goes off line contained the sub-site ELM master the election takes place to elect the election manager; (2)Local ELMs generate a random GUID and send it to other ELMs on the sub site, and wait time T during which they may receive other GUIDs from other ELMs; (3)after time T a local ELM compares it's own random GUID with the received GUIDs and if it has the highest it elects itself as master; (4) the Elm then Sends a sub-site message announcing the result which all receiving ELMs record; (5) the master ELM then checks if the downed engine was recorded in configuration data is site master, and so goes onto Site ELM Election (see below).

Election Manager Site ELM Election Process

Site ELM elections take place when a new sub-site ELM master comes on-line and finds no site. Before site elections can take place, all sub-sites must have elected a sub-site master.

Once these pre-requisites are satisfied, the site ELM election process may consist of the following: (1) the master subsite ELM generates a random GUID and sends it to all other subsite master ELMs on the site and waits time T during which it may receive other GUIDs from other master ELMs; (2) after time T, the master subsite ELM compares it's random GUID with the received GUIDs and if it has the highest it elects itself as site master; and (3) the master subsite ELM then sends site message announcing the result which all-receiving sub-sites master ELM record.

Election Manager Component Starts Running Process

When an engine is started, the components must wait until the local ELM is running, then as the copmponents start running they the following process: (1)component $C_1$ waits for an 'Engine Ready Message'; (2)$C_1$ then sends a 'Subscribe site/subsite' message which the local ELM who would have registered to receive it; (3) on receiving the message, the ELM adds C/ to its list of subscribers; (4) the ELM then checks it configuration data to see if there is already a master for this type; (5) If there is a master thre ELM does nothing and the process ends, otherwise, if a master is not elected, the local ELM generates a GUID and sends a "Site/subsite Election GUID" message for elections to take place; and (6) finally all ELMs receiving the 'Promote Self' message update their configuration data to reflect the change.

Election Manager Stop/Removing/Engine Off-line Process

The Stop/Removing/Engine off-line process may consist of the following: (1) all ELM receive a 'Engine off-line notification'; (2) the ELM then checks if the engine contained any component(s) that where master(s); (3) If the engine contained none, the ELM does nothing and the process ends, otherwise, if the offline engine contained any elected master(s), the ELM generates a GUID and sends it to the ELM (site or sub site) master and then waits time $T_1$;

(4) after time $T_1$, if the ELM is the master it picks the highest GUID and sends a 'Promote Self' message to the component (s) in the winning engine and waits time $T_2$; (5) trhe component to which the message was sent promotes itself and sends a 'Promotion Successful' message.; (6) next, all ELMs receiving the 'Promote Self' message update their configuration data to reflect the change.; and (7) Finally, if after $T_2$, no 'Promotion Successful' message is received, the master ELM chooses the next highest GUID and repeats from step 4.

Election Manager Reconnecting an Engine Process

The first task on engine reconnection is to resolve the sub site ELM master arbitration that results in resolving all other component contentions. The following, which assumes there are two masters, may be performed: (1) Sub-site Master ELM, receives the 'Engine on-line notification'; (2)Sub-site Master $ELM_2$ receives the 'Engine on-line notification'; (3)ELM, generates a random GUID and sends a 'Election GUID' message to the message switch; (4)$ELM_2$ generates a random GUID and sends a 'Election GUID' message to the message switch; (4) Master $ELM_2$'s receives $ELM_1$'s message and if its GUID is lower it demotes itself, and all its master as per site/and subsite configuration.; (5)$ELM_1$'s receives $ELM_2$'s message and if its GUID is lower it demotes itself, and all its master as per site/and subsite configuration.; (6)If either ELM doesn't receive a 'Election GUID' message within time $T_1$ they assume no other masters are present and continues as master; and (7) finally, the sub-site ELM master then looks at its configuration data and if there is no site ELM master goes onto site ELM Election (above).

Election Manager Messages Sent

| Message | Description |
| --- | --- |
| "Promote Self" | Tells the local component to promote itself to master status |
| "Demote Self" | Tells the local component to demote itself from master status |

Election Manager Component Messages Received

| Message | Description | SendingComponent |
| --- | --- | --- |
| "Engine Off Line Notify" | The engine has not been detected for the timeout period | Engine Monitor |
| "Engine Recovered" | The engine has been detected since the timeout period, but before the engine is evicted. | Engine Monitor |
| "Engine Is Running" | The engine has been added to the list in 'Off-Line' state | Engine Monitor |
| "Subscribe Site Election with back up" | The sender wishes to subscribe to the ELM services | Any component requiring sub-site elections |
| "Subscribe Sub-Site Election" | The sender wishes to subscribe to the ELM services | Any component requiring site elections |
| "Site Election GUID" | The sender is sending a GUID to be used in an election | Any component requiring site/sub-site elections |
| "Sub site Election GUID" | | |

Component Site Based Election Processes

Adding Engine Process

The following election manager process for adding an engine assumes there is already a site master: (1) Component $C_1$ waits for an 'Engine Ready Message'; (2) $C_1$ sends a 'Subscribe site' message which the local ELM which would have registered for it receives it; (3) on receiving the message, the ELM adds $C_1$ to its list of subscribers; (4) the ELM then checks it's configuration data to see if there is already a master for this type; (5) if there is a master the ELM does nothing and the process ends.

Stopping/Removing/Disconnecting and Engine Process

The process should cover states where: an engine containing site master is stopped; an engine containing site master is removed; and an engine containing site master is disconnected.

Reconnecting an Engine

The process should cover states where an engine containing site master or is reconnected.

Component Sub Site Based Election Processes

Adding Engine Process

The process should cover states where: there is already a sub-site master and where there is no sub-site master.

Stopping/Removing/Disconnecting and Engine Process

The process should cover states where: an engine containing sub-site master is stopped; an engine containing sub-site master is removed; and an engine containing sub-site master is disconnected.

Reconnecting a Engine Process

The process should cover the state where an engine containing sub-site master is reconnected.

Election Manager Election Processes

Adding Engine Process

The process should cover the states where: there is already a sub-site master; there is already a site master; there is no sub-site master; and there is no site master.

Stopping/Removing/Disconnecting and Engine Process

The process should cover the states where: an engine containing sub-site master is stopped; an engine containing sub-site master is removed; an engine containing site master is disconnected; ann engine containing site master is stopped; an engine containing site master is removed; and an engine containing site master is disconnected.

Reconnecting an Engine Process

The process should cover the following states: an engine containing sub-site master or is reconnected; and an engine containing site master or is reconnected.

Election Manager Component Interface

The component interface for the Election Manager component is used by all COM components in the Management engine. The owner of the process uses this interface to control the initialization, termination, and pause process for the service. The following is a class correpsonding to this interface:

class INetworkControl
{
    HRESULT Init(void);
    HRESULT Term(void);
    HRESULT Pause(BOOL fTrue);
};

Inetwork Control Classes

Method: Init

The "Init" method is used by the State Tracking component to initialize its internal structures.

Method: Term

The "Term" method is used by the State Tracking component to clean up its internal structures.

Method: Pause

The "Pause" with the flag being true will cause any state change to be ignored.

viii. Manager Engine—Engine Monitoring Manager Component

The Engine Monitoring Manager component of the present invention provides the following functions: (1)provide a heartbeat message to signal all other engines of its existence within a sub site; (2)listen for heartbeats from other engines of their existence; (3) detect the appearance and disappearance of engines; (4)notify all other components of 'failed' engines; (5) provide a list of available engines through a COM Dual interface; and (6)implement features necessary to support becoming the sub site EMM monitor master (in this mode it is responsible for broadcasting engine failures, evictions, and engine recovery notifications);

Components Upon Which Engine Manager Depends

There are several components, which provide the Engine Monitoring Manager with information: (1) the SQL Server database will be used to provide an initial list of engines, and configuration data; (2) the replication Manager is required only to provide information that the database is ready; (3) the wizard, which is used to remove an engine from the Network system, sends a message to the Message Switch component of this action; which in turn is received by the Engine Monitoring Manager Component Manager Engine Components Dependent Upon the Engine Monitoring Manager Component.

There are several components which require information and functionality provided by the Engine Monitoring Manager. The components dependent upon the Engine Monitoring Manager component in the embodiment discussed include the following: engine-to-Engine Communication component; Managed Element Assignment Manager; and Database Replication Manager.

As noted above, the Engine Monitoring Manager component provides a signal to other manager engines to notify the other engines' of the existence of the manager engine issuing the heartbeat. To make a successful identification of the engine, the heartbeat message includes, the fully qualified DNS name that the engine is running on, and the GUID of the engine. In addition, aa configured value for the UDP port number is required for the heartbeat to function. Heartbeat timing values are also required for proper configuration. These include the polling interval at which the heartbeat is sent, the timeout value to wait for the heartbeat, and the eviction timeout, which will be the timeout period before the Engine Monitoring Manager component responds by removing the engine from its list. The following is a table allowing

| Config Item | Description | Location | Example/Default Value |
|---|---|---|---|
| DNS Name | The fully qualified DNS Name of the machine | API Call | Machine.Domain.net |

-continued

| Config Item | Description | Location | Example/Default Value |
|---|---|---|---|
| GUID | The Engine's GUID | Database (Engine) | {123456789 . . . } |
| Polling Interval | Interval between Heartbeats | Database (Config) | 5 secs |
| Timeout | Time before the non-Responding engine is Set to 'off-line'. | Database (Config) | 2 mins |
| Eviction Timeout | Timeout period before the engine is removed from the list. | Database (Config) | 15 mins |
| UDP Port | The UDP Port used for the Heartbeat. | Database (Config) | 4000 |

Preferably, the Engine Monitoring Manager is a COM component running as part of a Microsoft Windows service. The Engine Monitoring Manager component therefore can be initialized by the Windows operating system startup process of starting automatic services. During initialization, the heartbeat and listener functions are thus initiated.

The heartbeat is a message that is sent to all available engines to inform them of its existence. The message will be sent via a messaging protocol (UDP) at a configurable interval. This process will continue as long as the Engine Monitoring Manager is running. The heartbeat message preferably has a format comprising fileds similar to those specified in the following row:

| Heartbeat ID | Fully Qualified Computer Name | Engine GUID | Managed Site GUID | Sub Site GUID |
|---|---|---|---|---|

The significance of these fields is as follows: Heartbeat ID (indicates to the listener that the message is an Network heartbeat); Fully Qualified Computer Name (is the DNS name of the engine); Engine GUID (the GUID for this engine (obtained from database)); Managed Site GUID (this GUID is for the managed site (obtained from the database)); Sub Site GUID (this GUID is for the sub site (obtained from the database));

Listen for Heartbeats Process

This process will continually listen for heartbeats from other engines in the same sub site, and keep the list of engines up-to-date. All engines in the list will be engines that are still providing a heartbeat, or 'off-line'. It will use the Network ID in the message header to determine that the message is a heartbeat.

Process for Engine Being Added to a Sub Site in the Network System: (EMM of Engine Added)

On startup the Engine Monitoring Manager(EMM) will carry out the following steps: (1) wait for "Engine has started" message from database replication(this message is sent to all engines); (2) on retrieval of this message EMM will establish a list of engines in the sub-site (all these engines are initially set to 'Off-Line' until the heartbeats from the sub-site engines are received) (3) once this list is created, the heartbeat process is started in its own thread, providing a heartbeat to each engine in its list; (4) the 'Listener' process is also started in its own thread to receive heartbeats from other engines; (5) if the "Promote Self" message is received from the Election Manager, then the engine marks itself as EMM Master.Process for Engine Being Added to Subsite (EMM for other Engines at Subsite).

Upon add of an engine to the subsite, the other engines at the subsite perform the following task: (1) the EMM receives the "Engine has Started" message; (2) the EMM adds the engine to its list, set to 'Off-Line'; (3) when EMM receives it's the new engine heartbeat, it sets the engine to 'On-Line'.

Engine Removed from a Subsite Process

When an engine is removed from the system, a "Stop Engine" message is sent from the wizard, and the Engine Monitoring Manager (EMM) of the engines in the subiste will carry out the following steps: (1) on retrieval of this message, the engine will be removed from the list; (2) if the engine is this engine, then the heartbeat and Listener process are stopped; and (3)if the engine that has been removed was the EMM Master, then a re-election will be triggered.

Engine Removed from Subsite (Engines at Other Subsites)

Upon removal of an engine from a subsite, the EMM of the Engins at other subsites perform the following step: the state tracking component will receive the "Stop engine" message and removes it from its list.

Partial Engine Failure Process

A partial engine failure is defined by engines not detecting an engine for the 'timeout' period (default 2 mins), but recovers before the 'eviction timeout' period (default 15 mins). Following are the steps taken by EMM in the event of a partial engine failure: (1) the 'Listener' process detects that the heartbeat hasn't been received for the 'timeout' period (default 2 mins); (2) the engine in the list is set to 'Off-Line'; (3) an local "Engine has Failed" message is sent to the message switch, to notify components interested in this information; (4)if the engine which has gone 'Off-Line' is a EMM Master, then a re-election occurs. A "Promote Self" message is received by the new EMM Master; (5) the EMM that is elected as the master will broadcast an "Engine has Failed" message to all engines in the site; (6) the 'Listener' process detects the heartbeat from the engine; (7) the engine in the list is set to 'On-Line'; (8) EMM sends a local "Engine has Recovered" message to the message switch, to notify components interested in the information; (9) the EMM that is elected as the master will broadcast an "Engine has Recovered" message to all engines in the site; (10) if the engine that has been detected is an EMM Master then there could be 2 masters. At this stage, ELM will detect this fact and send a "Demote Message". Seeing this message will cause the Master EMM to stand down as master; and (11) the EMM that is elected as the master will broadcast an "Engine Recovered" message to all engines in the site.

Partial Engine Failure Process (Engines in Other Sub Sites)

Upon partial engine failure, the EMM's of engines at other sub-sites performt eh following steps: (1)the engine will receive the "Engine has Failed" message, and confirm that the engine is from another sub-site; (2) the state-tracking component will mark this engine critical; (3) before the 'eviction timeout', the engine will receive the "Engine has Recovered" message, and confirm that the message is from another sub-site; and (4) the state-tracking component will mark this engine running.

Complete Engine Failure Process

A complete engine failure is defined as an engine that has passed the 'timeout' period (default 2 mins), and has reached the 'eviction timeout' period (default 15 mins). The following are the steps taken by the EMM component in the event of a complete engine failure: (1) the 'Listener' process detects that the heartbeat hasn't been detected for the 'timeout' period (default 2 mins); (2) a local "Engine has Failed" message is sent to the message switch, to notify components interested in this information; (3) the elected master will broadcast this message to all engines; (4) the 'Listener' process of the EMM master detects that the heartbeat hasn't been received for the 'eviction timeout' period (default 15 mins). The engine will be removed from the Master EMM's list. (5) the elected master EMM sends the "Engine has been evicted" message to the message switch, to notify all engines and their components interested in the information; and (6) all engines in the sub site receiving this message will remove the engine from the EMM list.

Complete Engine Failure Process (Engines at Other Sub-sites)

Upon complete failure of an engine, the the engines in other sub-sites perform the following steps: (1)EMM will receive the "Engine has been evicted" message, and confirm that the engine is from another sub-site (no further action will be taken by EMM); and (2) the ME will be removed from the state-tracking component internal data.

Engine Recovers Since Eviction or Timeout Process (New Engine EMM Steps)

This process is defined by an engine that has been evicted or timed-out ('OffLine'), but the engine restarts or reappears into the Network system. The following are the steps taken by EMM in this event: (1) An Administrative component issues a command to add engine to sub site (This will cause the replication manager to bring the new engine's database up to date); (2) The EMMwaits for "Engine has Started" message from database replication (all engines will receive this message); (3) on retrieval of this message EMM will establish a list of engines in the sub-site from the database; (4) once this list is created, the heartbeat process is started in its own thread, providing a heartbeat to each engine in its list; and (5) the 'Listener' process is also started in its own thread.

Engine Recovers Since Eviction or Timeout Process (Other Engines in the Sub Site)

In the event of recovery of an engine sicne eviction or timeout process, the EMM component of other engine at the subsite perform the following steps: (1)EMM receives the "Engine is Running" message; (2) the EMM will add the new engine to its list, if it was evicted; (3) if the engine was set to 'Off-Line', but not evicted when the heartbeat is received, the engine will be set to 'On-Line', a local "Engine has Recovered" message is sent, and (4) EMM master will send the same message to all engines.

Engine Re-Appears Process

A typical scenario would be if the engine was disconnected from the network (e.g. cable was removed). The engine disconnected would do the following: (1) because power is maintained, a heartbeat process would continue; (2) other engines would start to be set to 'Off-Line' in its list when the timeout period expires; (3) a local "Engine has Failed" message is sent to the message switch, to notify components interested in this information, and the master EMM sends the same message to all engines; (4) if any engines, reach the 'eviction timeout' period, the message "Engine has been evicted", will be sent at this point if this engine is the EMM master, and will be removed from EMM's list (other engines will receive this message and remove the engine from the EMM list); (5) when the engine is reestablished, heartbeats will be sent to the sub-site engines and then its queued messages will be processed; (6) if it has been evicted then the engine will shut down; (7) otherwise, if it has not been evicted then it will follow the necessary steps to recover; (8) that is, any heartbeats received will be treated as normal; (9)a heartbeat from an engine is set to 'On-Line', and the "Engine has Recovered" message is sent; (10) and when the connection is reestablished, EMM on other engines will take the following steps: (a) the elected EMM master, and other EMM's will receive the heartbeat of the failed engine; (b) if the engine was set to 'OffLine', the engine will be set to 'On-Line', and a local "Engine has Recovered" message is sent (the EMM Master will send the same message to all engines); (b) at this point there could be 2 EMM masters. ELM will detect this fact and send a "Demote Message"; seeing this message will cause the Master EMM to stand down as master; and (d) EMM's in other sub-sites, will receive the "Engine Recovered" message, and set the engine to 'On-Line'.

Provide a List of Available Engines Process

An update-to-date list of available engines in the site, will be provided via a COM interface. The following information will be available for each engine.

| Item | Description | Example |
|---|---|---|
| DNS Name | The engines DNS Name | Mchine.Domain.net |
| Name | The engines Name | Machine |
| GUID | The engines GUID | {123456789 . . . } |
| State | The engines State | 1 (On-Line) |

Possible states are

| State Value | Description |
|---|---|
| 0 | Off-Line - Engine not currently detected. |
| 1 | On-Line - Detected and running. |

The message that is sent to the message switch containing the state of a particular engines will contain the information in the table below.

| Item | Description |
|---|---|
| DNS Name | The engines DNS Name |
| GUID | The engines GUID |

EMM Messages

The following table shows the messages that will be provided by the Engine Monitoring Manager.

| Message | Message ID | Description |
|---|---|---|
| "Engine has Failed" | 20 | The engine has not been detected for the timeout period (default = 2 mins) |
| "Engine has Recovered" | 21 | The engine has been detected since the timeout period, but before the engine is evicted. |
| "Engine has been evicted" | 10 | The engine has expired the eviction timeout period (default = 15 mins) and has been removed from the list. |
| "ELM Subscription" | 26 | Subscribe EMM to ELM. |

-continued

| Message | Message ID | Description |
|---|---|---|
| "ELM Acknowledge promotion" | 27 | EMM promotion is acknowledged. |
| "ELM Acknowledge demotion" | 29 | EMM demotion is acknowledged. |

EMM Messages Received

The following table shows the messages that are requested by the Engine Monitoring Manager.

| Message | Message ID | Description | Sending Component |
|---|---|---|---|
| "Engine has started" | 7 | Replication initialized | Database Replication |
| "Stop Engine" | 23 | This engine is being removed from the Newtwork system. | Wizard |
| "Engine has been evicted" | 10 | An engine has been evicted. | EMM Master |
| "Promote Self" | 24 | EMM is elected as master. | Election Manager |
| "Demote Self" | 25 | EMM must demote itself from master to normal. | Election Manager |

EMM Components

In the presently described embodiment, the Engine Monitoring Manager will comprise of the following: (1)COM interface; (2)Callback Interfaces; (3)Heartbeat process; (4)Listener Process; and (5)Engine List. (6).

The COM Interface

The Engine Monitoring Managers COM interface will comprise of an interface to initialize and start the monitoring manager.

Callback Interfaces

There is a callback interfaces used for communication with the message switch for message retrieval.

Heartbeat Process

A process which will continually provide a heartbeat to all engines in the sub site.

Listener Process

A process which will continue to listen for heartbeats from other engines. The list will be updated as necessary.

Engine List

A list of active engines in the sub site, which is used to provide other components, a list of working engines.

EMM Code Classes

Below are the classes and interfaces making up the Engine Monitoring Manager.

INTERFACE & Class DEFINITIONS

CEMM Class

The Engine Monitoring Managers main class. Starts the heartbeat and listener components.

Class CEMM: IEMM, InetworkControl
{
HRESULT Init( . . . . );
HRESULT Term( . . . .);

HRESULT Pause( . . . .);
BOOL StartHeartbeat( . . . .);
BOOL StartListener( . . . . );
}

Method: Init

The 'Phase' is used to split the initialization into phases. EMM will have 3 phases. The first phase is used for general initialization. The second is used to register the messages. The third phase is used to create the engine list, start the heartbeat and listener. Iheartbeat :: Init( ), and IengineList:: Init( ) are also executed in the third phase. The third phase will be executed when the "Engine has started" message has been sent by database replication.

HRESULT Init(Short Phase);

| Parameter | Description |
|---|---|
| Return | S_OK for OK<br>S_FALSE Unable to initialise<br>E_FAIL for critical error |

Method: Term

Ends the threads, and any other necessary clean up.

HRESULT Term(void);

| Parameter | Description |
|---|---|
| Return | S_OK for OK |

Method: Pause

If fTrue=FALSE, then the heartbeat and listener processes are restarted. If fTrue= TRUE, then the heartbeat and listener processes are paused.

HRESULT Pause(BOOL fTrue);

| Parameter | Description |
|---|---|
| Return | S_OK for OK<br>S_FALSE Unable to pause<br>E_FAIL for critical error |
| Ftrue | Pause flag |

Private Method: StartListener

Called by Pause( ), to create the thread which will start the listener.

BOOL StartListener(void);

| Parameter | Description |
|---|---|
| Return | TRUE for listener started.<br>FALSE error starting listener. |

Private Method: StartHeartbeat

Called by Pause( ), to create the thread which will start the heartbeat (IHeartbeat:: PollMsg( )).

BOOL StartHeartbeat(void);

| Parameter | Description |
|---|---|
| Return | TRUE for heartbeat started.<br>FALSE error starting heartbeat. |

Sheartbeat Class

The structure of this class defines the heartbeat.

Class SHeartbeat
{
  long ID;
  LPTSTR DNSName;
  LPTSTR GUID;
  LPTSTR SubSiteGUID;
  LPTSTR SiteGUID;
}

ID

A unique Heartbeat ID, for other Engine Monitoring Managers to recognize.

DNSName

Engines DNS Name.

GUID

Engines GUID.

SubSiteGUID

The GUID of the sub-site, this engine is in.

SiteGUID

The GUID of the site, this engine is in.

Iheartbeat Class

This will be used by the process, which provides a heartbeat to all other engines in the list.

Interface IHeartbeat
{
  HRESULT Init( . . . . );
  HRESULT CreateMsg( . . . . );
  HRESULT PollMsg( . . . .);
};
  Class Cheartbeat : IHeartbeat
  {
    IEngineList pCurrentEngines;
  SHeartbeat sHeartbeat;
  {

Method: Init

Reads the message interval configurable value. The heartbeat is prepared. The engine list is passed to provide the engines that the heartbeat will be sent to.

HRESULT Init(IEngineList *pEngineList);

| Parameter | Description |
|---|---|
| Return | S_OK for OK<br>S_FALSE Unable to initialise<br>E_FAIL for critical error |
| PengineList | Pointer to the list of engines, to send the heartbeat to. |

Method: CreateMsg

Creates the message which will represent the heartbeat.

HRESULT CreateMsg(void);

| Parameter | Description |
|---|---|
| Return | S_OK for OK<br>S_FALSE Unable to create message<br>E_FAIL for critical error |

Method: PollMsg

Continually sends the heartbeat message to all engines in the engine list.

HRESULT PollMsg(void);

| Parameter | Description |
|---|---|
| Return | S_OK for OK<br>S_FALSE Unable to send heartbeat<br>E_FAIL for critical error |

CListener

This will be used to continually listen for heartbeats from other engines. The engine list will be updated by any new engines.

Class CListener
{
  BOOL Init( . . . . );
  BOOL WaitForMsg( . . . . )
};

Method: Init

Reads the UDP socket number from the database. The engine list is passed to allow the 'heard' engine to be queried using UpdateEngineList( ).

HRESULT Init(IEngineList *pEngineList);

| Parameter | Description |
|---|---|
| PengineList | Pointer to the Engine List interface. |
| Return | S_OK for OK<br>S_FALSE Unable to initialise<br>E_FAIL for critical error |

Method: WaitForMsg

Continually waits for heartbeat messages from other Engines. Any 'heard' engines are passed to IEngineList :: UpdateEngineList( ).

BOOL WaitForMsg(void);

| Parameter | Description |
|---|---|
| Return | S_OK for OK<br>E_FAIL for critical error |

IengineList Class

This class will be used to store a list of live engines.

Interface IEngineList
{
    HRESULT _NewEnum( . . . . );
    HRESULT Add( . . . . );
    HRESULT Remove( . . . . )
    HRESULT RemoveAll( . . . . );
    HRESULT Item( . . . . );
    HRESULT EngineReady( . . . . )
    HRESULT CreateInitList( . . . . );
    HRESULT Init( . . . . );
    HRESULT RemoveEngine( . . . . );
    HRESULT UpdateEngineList( . . . . );
    HRESULT EvictEngine( . . . . );
    HRESULT ManageMaster( . . . . )
    HRESULT RegisterMessages( . . . . );
    HRESULT get_Master( . . . . );
    HRESULT put_Master( . . . . );
};
    Class CEngineList : IEngineList
    {
    ISEngine *coll[ ];
    BOOL EngineExist( . . . . );
    BOOL CheckState( . . . . );
    BOOL CheckTimeout( . . . . );
    BOOL IsMe( . . . . );
    BOOL IsSubSiteEngine( . . . . );
    BOOL LockList( . . . . );
    BOOL UnLockList( . . . . );
    }

Method: Init

This class method sets up the "Engine has Started", "Stop Engine", "Engine has been evicted", "Promote Self", and "Demote Self" messages retrieval. It reads the heartbeat and introduction timeout configurable values from the database. CheckTimeout( ) is executed in its own thread.

HRESULT Init(IEMM pEMM);

| Parameter | Description |
|---|---|
| PEMM | Pointer to the Engine Monitoring Manager Interface |
| Return | S_OK for OK<br>S_FALSE Unable initialise<br>E_FAIL for critical error |

Method: _NewEnum

Thi smethod is used to enumerate through the collection.

HRESULT _NewEnum(Iunknown **ppEngine);

| Parameter | Description |
|---|---|
| Return | S_OK for OK<br>E_FAIL for critical error |
| PpEngine | Rturns an IEnumVariant interface on an enumeration object for the collection |

Method: Add

This class method adds an engine to the collection.

HRESULT Add(IEngine *pEngine);

| Parameter | Description |
|---|---|
| Return | S_OK for OK |
|  | S_FALSE Engine not added |
|  | E_FAIL for critical error |
| Pengine | Pointer to an engine to be added |

Method: Remove

This class method removes an engine from the collection.

HRESULT Remove(VARIANT Item);

| Parameter | Description |
|---|---|
| Return | S_OK for OK |
|  | S_FALSE Engine not removed |
|  | E_FAIL for critical error |
| Item | An index representing the engine to be removed from the collection |

Method: RemoveAll

This method Clears the list of engines.

HRESULT RemoveAll(void);

| Parameter | Description |
|---|---|
| Return | S_OK for OK |
|  | E_FAIL for critical error |

Method: Item

This method returns an engine from the collection.

HRESULT Item(VARIANT Item, IEngine **ppEngine);

| Parameter | Description |
|---|---|
| Return | S_OK for OK |
|  | S_FALSE Failed to return the specified engine |
|  | E_FAIL for critical error |
| Item | An index representing the engine interface to be retreived |
| PpEngine | The retrieved engine |

Method: CreateInitList

This method creates an initial list of engines. The method is called by EngineReady( ) which is called when the "Engine has Started" message is ready to be delivered. Upon list creation, the event that was created by CEMM :: Init( ) is signaled (IEMM :: SignalStartupEvent( )) to start the heartbeat, to those engines in the list. All engines in the list will initially be set to 'Off-Line' in the presently described embodiment.

HRESULT CreateInitList(void);

| Parameter | Description |
|---|---|
| Return | S_OK for OK |
|  | S_FALSE Unable initialize list |
|  | E_FAIL for critical error |

Method: IsMe

Receives the name of the engine to check. A check is then made against this engine.

BOOL IsMe(LPTSTR pEngineName);

| Parameter | Description |
|---|---|
| Return | TRUE Is this engine. |
|  | False is another engine |

Method: EngineReady

This method is called by IEReady :: Notify( ) which is called when the "Engine has Started" message is ready to be delivered. If this message is sent by another engine (IsMe( )), UpdateEngineList( ) is executed.

HRESULT EngineReady(void);

| Parameter | Description |
|---|---|
| Return | S_OK for OK |
|  | E_FAIL for critical error |

Method: UpdateEngineList

This method receives an ISEngine, calls EngineExist( ) to check for existence, and if the engine doesn't exist, it adds the engine to the list.

If the engine did exist then a call is made to CheckState( ), to determine if the state is 'Off-Line'. If the engine was 'Off-Line' then the state is changed to 'On-Line', and the "Engine has Recovered" message is sent to the switch for any clients requesting it. If this engine is the EMM Master then the "Engine has Recovered" is sent to all engines.

HRESULT UpdateEngineList(ISEngine *pEngine);

| Parameter | Description |
|---|---|
| Return | S_OK for OK |
|  | S_FALSE Unable to add to the list |
|  | E_FAIL for critical error |
| Pengine | Engine to be added |

Private Method: EngineExist

Receives an ISEngine, and check if it exists in the list, if it exists then the date/time is updated.

BOOL EngineExist(ISEngine *pEngine);

| Parameter | Description |
|---|---|
| Return | TRUE for engine exists |
| | FALSE engine doesn't exist |
| Pengine | Pointer to an engine to look for in the list. |

Private Method: CheckState

Receives an ISEngine, and checks if the state is 'Off-Line', if the state is 'OffLine', it is changed to 'On-Line'.

BOOL CheckState(ISEngine *pEngine);

| Parameter | Description |
|---|---|
| Return | TRUE for state was 'Off-Line' |
| | FALSE for state was 'On-Line' |
| Pengine | Pointer to an engine to check the state on. |

Method: RemoveEngine

The "Stop Engine" message is to be read from the Message Switch (notified by the Wizard). If the engine is being shut down is this one (IsMe( )), then the heartbeat and listener are stopped. Otherwise, the engine is immediately removed from its list.

HRESULT RemoveEngine(void);

| Parameter | Description |
|---|---|
| Return | S_OK for OK |
| | S_FALSE Unable to remove engine |
| | E_FAIL for critical error |

Private Method: CheckTimeout

This method continuously runs in its own thread, and checks the engines in the list to see if they have expired the Timeout and Eviction Timeout values. Any engines past the 'Timeout' period are set to 'Off-Line'. Any engines that have expired the 'Eviction Timeout' period are removed from the list, provided this EMM is the master. The "Engine has Failed" message is sent when the 'Timeout' period has expired locally, and if this is the EMM master then the message is sent to all engines. The "Engine has been evicted" message is sent when the 'Eviction Timeout' has expired, if this engine is the master EMM.

HRESULT CheckTimeout(void);

| Parameter | Description |
|---|---|
| Return | S_OK for OK |
| | E_FAIL for critical error |

Private Method: IsSubSiteEngine

Checks if the engine belongs to the sub-site.

BOOL IsSubSite(ISEngine *pEngine)

| Parameter | Description |
|---|---|
| Return | TRUE — belongs to the sub-site. |
| | FALSE — belongs to another sub-site. |
| Pengine | Pointer to an engine to check for exist. |

Method: EvictEngine

This is called by IEEvict :: Notify( ). The "Engine has been Evicted" message is read from the switch, and a check is made that the engine is in this sub-site. If the engine is in this sub-site, it is immediately removed from the list.

HRESULT EvictEngine(void)

| Parameter | Description |
|---|---|
| Return | S_OK for OK |
| | S_FALSE A remote engine. |
| | E_FAIL for critical error |

Method: ManageMaster

The message "Promote Self" or "Demote Self" is ready to be read from the switch. Depending on the message, EMM is set to master if "Promote Self", or set to normal if "Demote Self". On receipt of these messages, an acknowledgement message is sent.

HRESULT ManageMaster (void);

| Parameter | Description |
|---|---|
| Return | S_OK for OK |
| | E_FAIL for critical error |

Method: get/put_Master

This method is used to set the EMM as master, and retrieve whether it is the master.

HRESULT get_Master(BOOL *pbMaster)

HRESULT put_Master(BOOL bMaster)

| Parameter | Description |
|---|---|
| Return | S_OK for OK |
| | E_FAIL for critical error |
| PbMaster | Pointer to receive if a master |
| Bmaster | TRUE = Promote to master |
| | FALSE = Demote from master. |

Private Method: LockList

ISEngine Class

Interface ISEngine
{
    HRESULT get_DNSName( . . . . );
    HRESULT put_DNSName( . . . . );

```
HRESULT get_Name( .... );
HRESULT put_Name( .... );
HRESULT get_GUID( .... );
HRESULT put_GUID( .... );
HRESULT get_State( .... );
HRESULT put_State( .... );
HRESULT get_GeneratedTime( .... );
HRESULT put_GeneratedTime( .... );
};
```

| Type | Description |
| --- | --- |
| DNSName | Engines DNS name |
| Name | Engines name |
| GUID | Engines GUID |
| State | Engines state |
| GeneratedTime | Time added |

Method: get/put_DNSName
  Thi smethod sets and gets the Engines DNS name.

HRESULT get_DNSName(BSTR *ppDNSName);

HRESULT put_DNSName(BSTR pDNSName);

| Parameter | Description |
| --- | --- |
| Return | S_OK for OK |
|  | E_FAIL for critical error |
| PpDNSName | Pointer to receive the Engine DNSName. |
| PDNSName | Engine DNSName to set. |

Method: get/put_Name
  This method sets and gets the Engines name.

HRESULT get_Name(BSTR *ppName);

HRESULT put_Name(BSTR pName);

| Parameter | Description |
| --- | --- |
| Return | S_OK for OK |
|  | E_FAIL for critical error |
| PName | Pointer to receive the Engine Name. |
| Pname | Engine Name to set. |

Method: get/put_GUID
  This method sets and gets the Engines GUID.

HRESULT get_GUID(BSTR *pGUID);

HRESULT put_GUID(BSTR pGUID);

| Parameter | Description |
| --- | --- |
| Return | S_OK for OK |
|  | E_FAIL for critical error |
| PpGUID | Pointer to receive the Engine GUID. |
| PGUID | Engine GUID to set. |

Method: get/put_State
  This method sets and gets the current state of the engine.

| State Value | Description |
| --- | --- |
| 0 | Off-Line — Engine not currently detected. |
| 1 | On-Line — Detected and running. |

HRESULT get_State(int *piState);

HRESULT put_State(int istate);

| Parameter | Description |
| --- | --- |
| Return | S_OK for OK |
|  | E_FAIL for critical error |
| PiState | Pointer to receive the Engine state. |
| Istate | Engine state to set. |

Method get/put_GeneratedTime
  This method sets and gets the date/time the engine was added/updated to the list.

HRESULT get_GeneratedTime(long *plGeneratedTime);

HRESULT put_GeneratedTime(long lGeneratedTime);

| Parameter | Description |
| --- | --- |
| Return | S_OK for OK |
|  | E_FAIL for critical error |
| PlGeneratedTime | Pointer to receive the Engines time it was added to the list. |
| LgeneratedTime | Engines time added to set. |

EMMMessage

```
Class EMMMessage
{
  BOOL RetrieveMessage( .... );
  BOOL SendMessage( .... );
}
```

Method: RetrieveMessage
  This method function is self-explanatory.

Method: SendMessage
  This method function is self-explanatory.

NetworkDB Class

```
Class NetworkDB
{
  BOOL ExecStoredProc( .... );
  BOOL LookupConfigValue( .... );
}
```

CALLBACK Interfaces Classes

IEReady Class
  The objects of this class serve as the Interface for the Engine Monitoring Manager call back function for the message switch. This notification from the message switch will be used to determine that database replication is complete.

Interface IEReady
{
  HRESULT Init( . . . . )
};
  Class CEReady: IEReady, IMsgRegisterCallback
  {
    HRESULT Notify( . . . . );
  }

Method: Init

This method receives the Engine List Object, to be used to call CreateInitList( ). Any other necessary initialization is also performed.

HRESULT Init(IEngineList *pEngineList);

| Parameter | Description |
|---|---|
| Return | S_OK for OK |
|  | E_FAIL for critical error |
| PMsgCmd | Pointer to the replication state message command object. |

Method: Notify

The method serves as the call back function which is called when a "Engine has started" message is ready to be delivered. IEngineList :: EngineReady( ) is executed when Notify( ) is called.

HRESULT Notify(void);

| Parameter | Description |
|---|---|
| Return | S_OK for OK |
|  | E_FAIL for critical error |

IERemove Class

The objedcts of this class serve as an Interface for the Engine Removal callback function for the message switch. This notification from the message switch will be used to determine that this engine is being removed from the Network system.

Interface IERemove
{
  HRESULT Init( . . . . );
};
  Class CERemove: IERemove, IMsgRegisterCallback
  {
  HRESULT Notify( . . . . );
  }

Method: Init

This method receives the Engine List Object, to be used to call RemoveEngine( ) when the "Stop Engine" message is ready to be delivered. Any other necessary initialization is performed.

HRESULT Init(IEngineList *pEngineList);

| Parameter | Description |
|---|---|
| Return | S_OK for OK |
|  | E_FAIL for critical error |
| PengineList | Pointer to the Engine List. |

Method: Notify

The call back function which is called when a "Stop Engine" message is ready to be delivered. IEngineList :: RemoveEngine( ) will be executed when Notify( ) is called.

HRESULT Notify(void);

| Parameter | Description |
|---|---|
| Return | S_OK for OK |
|  | E_FAIL for critical error |

IEEvict Class

The objects of this class serve as the Interface for the Engine Eviction callback function for the message switch. This will be used to remove the engine that has been evicted in the sub-site.

Interface IEEvict
{
  HRESULT Init( . . . . );
};
  Class CEEvict: IEEvict, IMsgRegisterCallback
  {
    HRESULT Notify( . . . . );
  }

Method: Init

This method receives the Engine List Object, to be used to call EvictEngine( ) when the "Engine has been evicted" message is ready to be delivered. Any other necessary initialisation is performed.

HRESULT Init(IEngineList *pEngineList);

| Parameter | Description |
|---|---|
| Return | S_OK for OK |
|  | E_FAIL for critical error |
| PengineList | Pointer to the Engine List. |

Method: Notify

The method is also the callback function which is called when the "Engine has been evicted" message is ready to be delivered. IengineList :: EvictEngine( ) will be executed when Notify( ) is called.

HRESULT Notify(void);

| Parameter | Description |
|---|---|
| Return | S_OK for OK |
|  | E_FAIL for critical error |

IEMMElection Class

The objects of this class serve as the Interface for the EMM Master callback function for the message switch. This will be used to either promote the engine to master, or demote the engine from master.

Interface IEMMElection
{
  HRESULT Init( . . . . );
};

```
Class CEEMMElection : IEMMElection, IMsgRegister-
   Callback
{
   HRESULT Notify( . . . . );
}
```

Method: Init

This method receives the Engine List Object, to be used to call ManageMaster( ) when the "Promote Self", or "Demote Self" message is ready to be delivered. Any other necessary initialization is performed.

HRESULT Init(IEngineList *pEngineList);

| Parameter | Description |
|---|---|
| Return | S_OK for OK |
|  | E_FAIL for critical error |
| PengineList | Pointer to the Engine List. |

Method: Notify

The callback function which is called when a "Promote Self", or "Demote Self" message is ready to be delivered. IengineList :: ManageMaster( ) will be executed when Notify( ) is called.

HRESULT Notify(void);

| Parameter | Description |
|---|---|
| Return | S_OK for OK |
|  | E_FAIL for critical error | ix. Manger Engine—Network Message Switch Component

The purpose of this section is to detail the technical aspects and interfaces for the Message Switch Component used in the Network Management Engine of the presently described embodiment. The Message Switch component is primarily responsible for moving messages from one manager engine component to another. It will route messages based on a routing table that is created when a client component registers.

Figure 35:
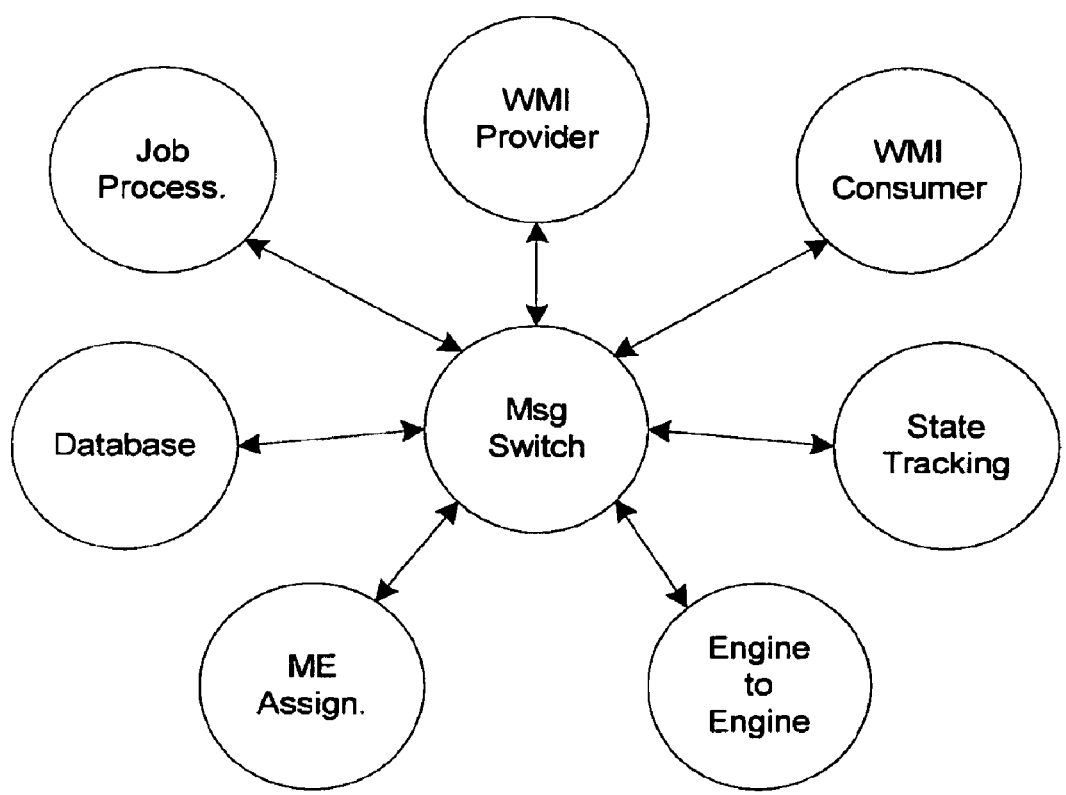
FIG. 35 illustrates a Message Switch Component as the interface between other Manager Engine Components in accordance with one embodiment of the present invention.

The Message Switch component is a single COM component that will be used in the Management engine. The message switch component will route messages from one source to one or many destinations. Each client can send and/or receive messages. FIG. 35 illustrates the Message Switch Component as the inteface between other Manager Engine Components. It shows the Message Switch component is the central pieces of the Management engine that is responsible for communication between each of the other components that provides important services for the engine.

Message Properties

Each message of the Message Switch is composed with named properties and values. Some of the properties are implicit and other can be added and reviewed.

Implicit/Required Properties

| Property | Data Type | Description |
|---|---|---|
| MsgClass | String | Message class used to control the name space. |
| MsgNumber | Long | Message number |
| DateCreated | Date | Read-Only value that is created when the message is posted. |
| FromComponent | String | String identifier of the source |
| FromServer | String | String identifier of the server (engine) |
| ObjectID | GUID | The GUID for the object that the message is describing. |
| Priority | Short | Describes the priority of the message. This value can between 1 and 7 with 4 being normal. 1 = highest, 7 = lowest. |

The message switch fills in the following properties "DateCreated", "FromComponent", and "FromServer" before it is sent.

The message is stored as a blob with tokens used to separate each element. The client uses the Message object to add, modify, delete, and retrieve the properties. Each named value property is of a specific type and is returned via VARIANT.

FIG. 43 is an exemplary message master list which a management system may use in accordance with one aspect of the present invention.

Message Format

The message block that is passed between each client is formatted as follows. The data section will store the properties streamed from the message class.

| Field | Description |
|---|---|
| WCHAR m_szMsgClass[ 31 ] | Message class (30 characters max) |
| long m_nMsgNumber | Message number |
| SYSTEMTIME m_tmDateCreated | Date the message was created |
| WCHAR m_szFromServer[ 31 ] | The name of the server that the message was received from. (30 characters max) |
| WCHAR m_szFromComponent[ 31 ] | Component name or ID that the message was received from. (30 characters max) |
| WCHAR m_szObjectID[ 41 ] | ME Object ID (GUID) that the message is addressing |
| Short m_nPriority | Priority of the message (1–7) |
| long m_nSeqNumber | Message sequence number. |
| bool m_fLocal | Indicates that this message is local. |
| BYTE * m_pbData | Pointer to the message's data, which is streamed from the message class. |
| long m_nDataSize | Size of the data. |

Interface Classes

The Message Switch component provides four interfaces. The first is the standard component interface that is required by all components in the Management engine. The second is the primary interface for registering, sending, and retrieving messages. The third is the message object that is used to create and read messages. The last is an interface that is used by the Message Switch to call the client when the client has a message.

Component Interface

As mentioned earlier in this specification, the component interface is used by all COM components in the Management engine. The owner of the process uses this interface to control the initialization, termination, and pause process for the service.

```
class INetworkControl
{
    HRESULT Init(void);
    HRESULT Term(void);
    HRESULT Pause(BOOL fTrue);
};
```

Method: Init

The "Init" method is used by the Message Switch to initialize internal its structures.

Method: Term

The "Term" method is used by the Message Switch to shut down any message queues and clear up storage. Any request for messages or processes will fail with a return status of "E_FAIL".

Method: Pause

The "Pause" with the flag being true will cause any request to send a message to be returned with a S_FALSE.

Message Interface Class

To create or read a message the Message object must be created or retrieved from the system. This is a simple object that is used to encode or decode a message and is based on named properties.

IMsgSwitchMessage Methods & Properties

| Symbol | Type | Read Only |
|---|---|---|
| MsgClass | Property | |
| MsgNumber | Property | |
| ObjectID | Property | |
| Priority | Property | |
| Local | Property | |
| MsgSeqNumber | Property | Yes |
| Count | Property | Yes |
| FromServer | Property | Yes |
| DateCreated | Property | Yes |
| FromComponent | Property | Yes |
| SendToServer | Property | |
| SetProperty | Function | |
| GetProperty | Function | |
| DeleteProperty | Function | |
| GetPropertyByIndex | Function | |

Method: put/get MsgClass

These methods get and set the required Message Class property. The property is used to control the name space. Network uses "MS".

HRESULT put_MsgClass(BSTR newVal);

HRESULT get_MsgClass(BSTR *pVal);

| Parameter | Description |
|---|---|
| Return | S_OK for OK |
| | E_FAIL for critical error |
| NewVal | Message class (name space) |
| Pval | Pointer to a BSTR to receive the message class |

Method: put/get MessageNumber

These methods get and set the required Message Number property.

HRESULT put_MsgNumber(long newVal);

HRESULT get_MsgNumber(long *pVal);

| Parameter | Description |
|---|---|
| Return | S_OK for OK |
| | E_FAIL for critical error |
| NewVal | Message number to set |
| Pval | Pointer to a long to receive the message number |

Method: put/get ObjectID

These methods get and set the required Object ID property. This is the ID that the message is about and is usually the ME GUID.

HRESULT put_ObjectID(BSTR newVal);

HRESULT get_ObjectID(BSTR *pVal);

| Parameter | Description |
|---|---|
| Return | S_OK for OK |
| | E_FAIL for critical error |
| NewVal | Object ID to set |
| Pval | Pointer to the BSTR to receive the Object ID |

Method: SetProperty

The method set property will set a named property with the supplied value. It can be any VARIANT type including SAFEARRAYS.

HRESULT SetProperty(BSTR Name, VARIANT Value);

| Parameter | Description |
|---|---|
| Return | S_OK for OK |
| | E_FAIL for critical error |
| Name | Name of the property |
| Value | Value for the property to test |

Method: GetProperty

The method get property will return the value for the specified property. It maybe any VARIANT type including SAFEARRAYS.

HRESULT GetProperty(BSTR Name, VARIANT *Value);

| Parameter | Description |
|---|---|
| Return | S_OK for OK |
| | E_FAIL for critical error |
| Name | Name of the property |
| Value | Pointer to the VARIANT to receive the value. |

Method: DeleteProperty

The method delete property removes a property from the message.

HRESULT DeleteProperty(BSTR Name);

| Parameter | Description |
|---|---|
| Return | S_OK for OK |
| | E_FAIL for critical error |
| Name | Name of the property |

Method: Count

The get property count method returns the number of properties that the message contains.

HRESULT get_Count(long *pVal);

| Parameter | Description |
|---|---|
| Return | S_OK for OK |
|  | E_FAIL for critical error |
| Pval | Pointer to a long to receive the number of properties in the message. |

Method: GetPropertyByIndex

The get property by index method provides the ability to enumerate the properties in the message. Once the number of properties is known, this method will allow the caller to return a method by an index value. The index value is zero offset so the first index is 0 and the last is n−1.

HRESULT GetPropertyByIndex(long Index,
   BSTR *Name,
   VARIANT *Value
);

| Parameter | Description |
|---|---|
| Return | S_OK for OK |
|  | E_FAIL for critical error |
| Index | The index value for the property (0 offset) |
| Name | A pointer to a BSTR to receive the property name |
| Value | A pointer to a VARIANT to receive the data |

Method: get FromServer

This method returns the server's network name that originated the message.

HRESULT get_FromServer(BSTR *pVal);

| Parameter | Description |
|---|---|
| Return | S_OK for OK |
|  | E_FAIL for critical error |
| Pval | Pointer to BSTR to return value |

Method: get DateCreated

This method returns the date the message was created.

HRESULT get_DateCreated(DATE *pVal);

| Parameter | Description |
|---|---|
| Return | S_OK for OK |
|  | E_FAIL for critical error |
| Pval | Pointer to DATE to return value |

Method: get FromComponent

This method returns the component's name the message was originated from.

HRESULT get_FromComponent(BSTR *pVal);

| Parameter | Description |
|---|---|
| Return | S_OK for OK |
|  | E_FAIL for critical error |
| Pval | Pointer to BSTR to return value |

Method: put/get SendToServer

These methods set and return the network name of the server to send the message to. Thus the methods are used to directly address a message to a specific server.

HRESULT put_SendToServer(BSTR newVal);
HRESULT get_SendToServer(BSTR *pVal);

| Parameter | Description |
|---|---|
| Return | S_OK for OK |
|  | E_FAIL for critical error |
| New Val | Server name to set |
| Pval | Pointer to a BSTR to receive server's name |

Method: put/get Priority

These methods set and get the priority for the message. A priority is a value between 1 and 7 with 1 being the highest and 7 being the lowest. Normal is represented as 4 and is the default on all messages. When a message is sent to the client(s) that have registered for the message, the pointer to the message will be inserted into their input queue based on this value so that the highest priority message are retrieved first.

HRESULT put_Priority(short newVal);
HRESULT get_Priority(short *pVal);

| Parameter | Description |
|---|---|
| Return | S_OK for OK |
|  | S_FALSE if value is out of range. |
|  | E_FAIL for critical error |
| NewVal | Priority to set |
| Pval | Pointer to a short to receive the current priority |

Method: get MsgSeqNumber

This method returns the message sequence number for the message. This number is set when the message is sent to the registered clients. Every time a message is sent this value is incremented.

HRESULT get_MsgSeqNumber(long *pVal);

| Parameter | Description |
|---|---|
| Return | S_OK for OK |
|  | E_FAIL for critical error |
| Pval | Pointer to a long to receive the value |

Method: put/get Local

These methods set and get the local flag for the message. The message is marked as a local message if this flag is set to true. Only clients that don't have the property "NoLocalMessage" set receive a local message.

HRESULT put_Local(BOOL newVal);

HRESULT get_Local(BOOL *pVal);

| Parameter | Description |
|---|---|
| Return | S_OK for OK |
| | E_FAIL for critical error |
| NewVal | None zero for true, zero for false |
| Pval | Pointer to a BOOL to receive the flag value |

Command Interface Class

The clients primarily use the command interface to register, send, and retrieve messages.

IMsgSwitchCommand Methods & Properties

| Symbol | Type | Read Only |
|---|---|---|
| Callback | Property | Put only |
| OutstandingMsgCount | Property | Yes |
| ClientID | Property | |
| NoLocalMessages | Property | |
| RegisterMsg | Function | |
| UnRegisterMsg | Function | |
| SendMsg | Function | |
| RetrieveMsg | Function | |
| PeekMsg | Function | |
| Disconnect | Function | |
| ClearQueue | Function | |

Method: RegisterMsg

The register message method allows a client to register for specific messages. This informs the Message Switch that it want to receive a specific message. From this point on any messages received that matches this request will be posted to the client's queue.

HRESULT RegisterMsg(BSTR MsgClass,
long MsgNumber
};

| Parameter | Description |
|---|---|
| Return | S_OK for OK |
| | S_FALSE for duplicate |
| | E_FAIL for critical error |
| MsgClass | Message class GUID (name space) |
| MsgNumber | Message number |

Method: UnRegisterMsg

The un-register message method allows a client to tell the message switch to stop sending the specified message to it. Any message already in its queue is removed.

HRESULT UnRegisterMsg(BSTR MsgClass,
long MsgNumber
};

| Parameter | Description |
|---|---|
| Return | S_OK for OK |
| | S_FALSE for message is not registered |
| | E_FAIL for critical error |
| MsgClass | Message class GUID (name space) |
| MsgNumber | Message number |

Method: Callback

The register call back function informs the message switch of the interface to call when it has a message for the client. The notify method is invoked when a message is received and the client can use this thread to perform what ever notification action should be taken (sich as, raising an event or placing a message on a I/O completion port). Note however that care should be taken regarding the amount of processing time this call takes because it will have an impact on the rest of the service.

HRESULT put_Callback(LPUNKNOWN newVal);

| Parameter | Description |
|---|---|
| Return | S_OK for OK |
| | E_FAIL for critical error |
| NewVal | Pointer to call back interface |

Method: SendMsg

The send message method sends a message to registered clients. The implicit properties such as "FromServer", "DateSent", and "FromComponent" are inserted when the message is sent.

HRESULT SendMsg(LPUNKNOWN Msg);

| Parameter | Description |
|---|---|
| Return | S_OK for OK |
| | E_FAIL for critical error |
| Msg | Instance of a message class to send |

Method: RetrieveMsg

The retrieve message function will remove the message from the client's input queue.

HRESULT RetrieveMsg(LPUNKNOWN *Msg);

| Parameter | Description |
|---|---|
| Return | S_OK for OK |
| | S_FALSE for queue is empty |
| | E_FAIL for critical error |
| Msg | Address of a class pointer to return an instance of the message class. |

Method: PeekMsg

The peek message function allows the client to look at the current message but not remove it from the queue.

HRESULT PeekMsg(LPUNKNOWN *Msg);

| Parameter | Description |
|---|---|
| Return | S_OK for OK |
| | S_FALSE for queue is empty |
| | E_FAIL for critical error |
| Msg | Address of a class pointer to return an instance of the message class. |

Method: OutstandingMsgCount

The outstanding message count method returns the number of queued up message for the specific client.

HRESULT get_OutstandingMsgCount(long *pVal);

| Parameter | Description |
|---|---|
| Return | S_OK for OK |
| | E_FAIL for critical error |
| Pval | Return the number of queued up messages. |

Method: Disconnect

The disconnect method informs the message switch that this client is disconnecting from the system and will no longer be receiving messages. All outstanding messages for this client are deleted and the client's entries in the routing table are deleted. Note however, that releasing the interface also causes the message switch to clean up for the client. Disconnect is really useful when the client does not want to receive any more message but wants to keep the interface so that the message switch is not unloaded from the process.

HRESULT Disconnect( );

| Parameter | Description |
|---|---|
| Return | S_OK for OK |
| | E_FAIL for critical error |

Method: get/put ClientID

The get and put client ID methods allow the client to specify their ID that will be inserted into all messages sent.

HRESULT put_ClientID(BSTR newVal);

HRESULT get_ClientID(BSTR *pVal);

| Parameter | Description |
|---|---|
| Return | S_OK for OK |
| | E_FAIL for critical error |
| NewVal | Client's ID string |
| Pval | Pointer to BSTR to receive the client's ID |

Method: ClearQueue

This method clears the client's input queue.

HRESULT ClearQueue( );

| Parameter | Description |
|---|---|
| Return | S_OK for OK |
| | E_FAIL for critical error |

Method: get/put NoLocalMessages

These methods set and get the flag that indicates if the client will receive messages that have been marked as local.

HRESULT put_NoLocalMessages(BOOL newVal);

HRESULT get_NoLocalMessages(BOOL *pVal);

| Parameter | Description |
|---|---|
| Return | S_OK for OK |
| | E_FAIL for critical error |
| NewVal | None zero for true, zero for false |
| Pval | Pointer to a BOOL to return this flag |

Call Back Interface Class

The call back interface is used to signal the client that message switch has a message to deliver. This interface is created by the client and is passed through to the message switch using the RegisterCallback method.

Interface IMsgRegisterCallback
{
    HRESULT Notify( );
};

Message Switch Internal Design

Figure 36:
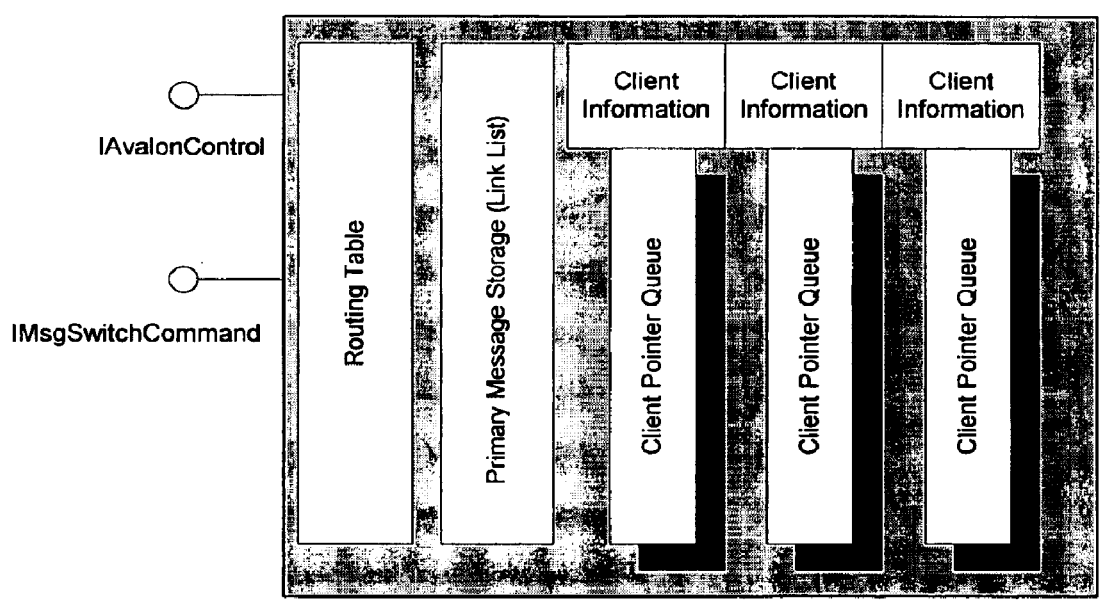
FIG. 36 illustrates three components comprising the Message Switch component of the Manager Engine depicted in FIG. 1 in accordance with one embodiment of the present invention.

The internal design of this component is pretty straightforward. It will have three sections, message routing table, primary message queue, and pointer queues for each client. FIG. 36 illustrates three components comprising the Message Switch componenet of the Manager Engine: the routing table, primary message storage list and client informationm compoment.

Routing Table

The routing table stores what messages and where these message should be delivered. The routing table is composed of two classes, one for the name space and another for the routing instructions.

Primary Message Storage

The primary message storage provides the actual storage of the message(s). When a message is sent a copy of the message is inserted into this storage. Only one copy of the message is actually stored in the presently described embodiment. The structure is a link list of a storage class with a usage counter. When the counter is zeroed the element is deleted.

Client Information

For every client that registers with the message switch a client information class will be created. It will store the address of the call back interface as well as client's input pointer queue.

Client's Pointer Queue

The client's pointer queue is a queue of pointers to the primary message storage's messages. When a message is added to a client's pointer queue the message's reference counter is incremented. Likewise when the pointer is removed from the client's queue, this counter is decremented. The Network system has a standard set of messages that other components can send and subscribe to.

| Msg # | Object ID | Data | Description |
| --- | --- | --- | --- |
| 1 | ME GID | | ME has been added |
| 2 | ME GID | | ME has been deleted |
| 3 | ME GID | | ME has been updated |
| 4 | ME GID | state value (short) | ME has changed state | x. Manager Engine—Node Monitor Component

Figure 37:
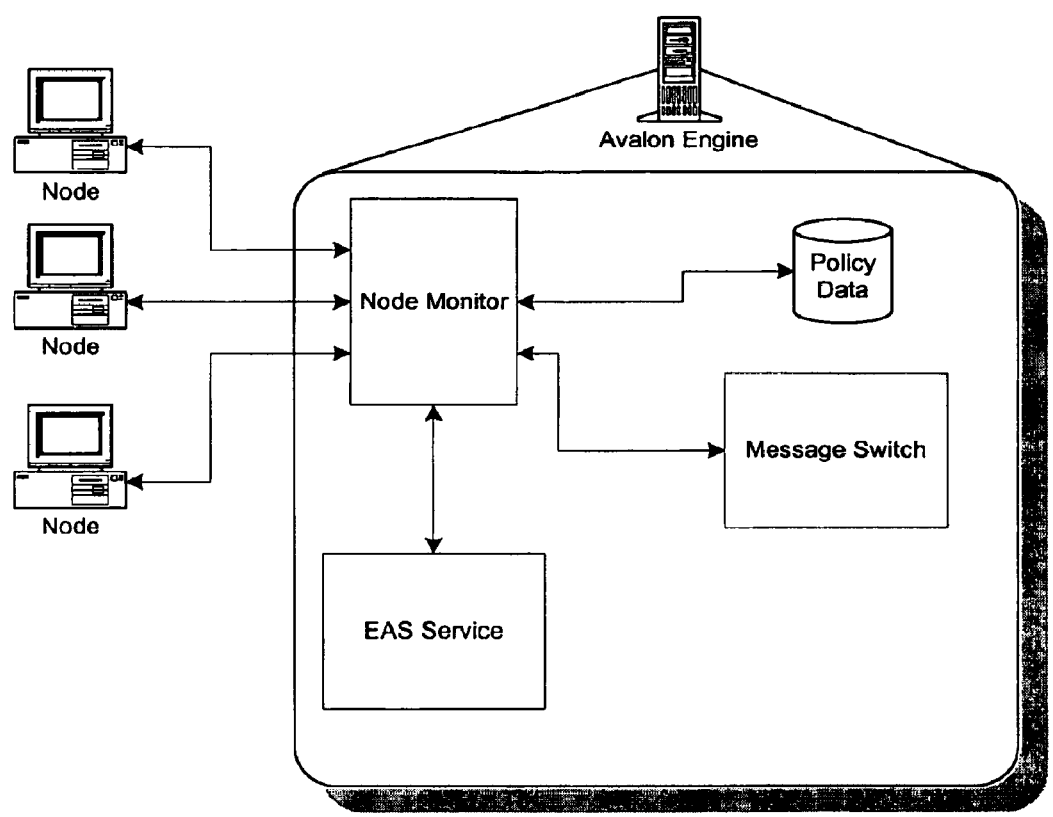
FIG. 37 shows the node monitor component of the manager engines shown in FIG. 1 and how it interacts with other components of the management engine.

The purpose of the Node Monitor component is to provide a central collection point for WMI events which occur on remote nodes. A configuration server is a management engine server where the Node Monitor gets its configuration information. A determination policy is a WMI query used to determine a Managed Element's current state. A Monitor Policy is a WMI query used to watch for a change in a Managed Element's state. The Node Monitor component sreves the follwing functions: a) it is a central collection point for all Managed Element's state changes notifications; b) it obtains configuration information stored on management Engine server and accessed through General Services and direct SQL connection; c) it is able to monitor up to 100,000 simultaneous events for state change; and d) it is capable of adapting to network connectivity issues. In short, the the Node Monitor provides a central collection point for ME status events remotely generated by WMI Policy. FIG. 37 shows the node monitor component of the management engine and how it interacts with other components of the management engine. In an exemplary embodiment, the Node Monitor Component uses Network General Services for initial configuration information, Management engine (SQL server) for detailed configuration information, EAS Service audit component for audit services (Pending EAS completion), the Network Message Switch for control state input information (ME online/offline, etc) and Managed Element state output information (Running, Critical, etc).

Component Ineraction with the Node Monitor

Interaction with General Services

The Node Monitor may use the Network General Services GetProperty interface to get initial configuration information about the engine the monitor is a part of. This is then used as part of the DB connection information to access runtime data.

The properties queried are:

| Property | Description |
| --- | --- |
| Engine_Name | The name of the Management engine. |
| DB_Server | The server where the Network DB is |
| DB_Database | Network DB name |
| NodeMonitor PingSeconds | How many seconds between pings to nodes |
| NodeMonitor ThreadPool | How large of a pool of worker threads to create |

Interaction with Message Switch

The Node Monitor uses a number of Network internal messages. These are routed through the Message Switch registration and callback interfaces.

| Message | Direction |
| --- | --- |
| ME has been activated | In |
| ME has been de-activated | In |
| ME has changed state | Out |
| Monitoring policy has been updated | In |
| Node has been assigned to engine | In |
| Engine has failed | In |
| Engine has recovered | In |
| Stop Engine | In |
| Node is being processed by backup engine | In, Out |
| Node is being processed by the primary engine | In, Out |

ME Has Been Activated Message (Incoming Message)
Upon receipt of this message the Node Monitor calls the stored procedure ListMonitorPolicyForWMI with the engine id and ME id. If the stored procedure returns any data the node monitor adds it to the active ME list. Note that ME has been de-activated Message (Incoming Message).
If the ME id is in the NM active list, monitoring is stopped and the ME will is removed.

ME has changed state Message (Outgoing Message)
When the node monitor determines that a Managed Element being monitored has changed state this message is sent for routing to the other components.

Monitoring policy has been updated Message (Incoming Message)
If the Managed Element id is in the NM active list it is shut down and removed (as per ME de-activated) then the DB is queried to get the current information (as per ME activated).

Node has been assigned to engine Message (Incoming Message)
When this message is received the Node Montior calls the stored procedure ListMonitorPolicyForWMI with the engine id and Node id. If the stored procedure returns any data the node monitor steps through the ME's and adds them to the active ME list.

Engine has failed Message (Incoming)
The Node Monitor calls the ListBackupNodes stored procedure with the Node Monitor engine ID and the ID of the engine which has failed. This call returns a list of all the nodes which this engine is assigned as backup. These are stored in an internal Pending Startup list. The Pending Startup list is then iterated and processed per ME Activated.
When each node comes up, the "Node is being processed by backup engine" message is sent out.

Engine has recovered Message (Incoming Message)Upon receipt of this message, if there are any nodes for this engine in the Pending Startup list, they are removed.

Stop Engine (Incoming Message)
All event sinks are shutdown and internal objects deleted upon receipt of the message.

Node is Being Processed by Backup Engine Message (In and Outgoing Message)
This is sent once the backup node monitor has brought the node fully on line. If this message is received, and if this node being processed is a node that is in the NM active list, Node Manager pings the node to verify that that the connection is still valid then sends "Node is being processed by the primary engine" message.

If this node being processed is in the Pending Startup, list nothing is done until the node has been brought up and put into the active list. At that point, Node Manager verifies that the connection is valid and sends the primary engine processing message as above.

Node is Being Processed by the Primary Engine Message (In/Outgoing Message)

When the primary engine NM has been notified that a node is being handled by the backup engine, the primary engine attempts to restart the nodes monitoring. If successful, this message is sent to by the primary engine to notify the backup that it may release monitoring. If this message is received, then if the node being processed is in the active list, the NM shuts it down and relevant internal objects are deleted.

Interaction with Network DB

The Node Monitor uses a number of stored procedures in the Network DB for run time data retrieval. These are set forth below.

ListMonitorPolicyForWMI

This stored proc is used to get a list of all the Managed Element's and policies by engine or Managed Element GID.

| Parameter | Data Type | Default |
|---|---|---|
| @ENGINE_GID | GUID_ID | NULL |
| @ME_GID | GUID_ID | NULL |
| @ENGINE_NAME | NAME_Type | NULL |

ListBackupNodes

This stored proc is used to get a list of all the nodes which this engine has been assigned to as a backup.

| Parameter | Data Type | Default |
|---|---|---|
| @ENGINE_GID | GUID_ID | |
| @BACKUP_ENGINE_GID | GUID_ID | |

Interface Classes

The following classes may serve as interfaces into the Node Monitor. All interfaces have a return data type of HRESULT.

INodeMonitorCmd
{
// No additional interfaces
};

INodeMonitorControl
{
// The following three interfaces are for use by the Network Service
Init(void);
Term(void);
Pause(/* [in]*/BOOL fTrue);
// This is a testing interface.
EnableUIMessages(/* [in]*/ BOOL Enable);
};

If the EnableUIMessages interface is called with a TRUE value the inerface turns on the debugging mode of the Node Monitor. As result of the mode change, the following messages, set forth below, are sent to the Network Message Switch during processing. (The messages below are all in a NODE_MONITORUI_NAMESPACE message namespace).

| Message | Object ID | Opt Param | Description |
|---|---|---|---|
| UIMsg_EngineName | | BSTR | Name of the Management engine |
| UIMsg_ConfigServer | | | Config server name |
| UIMsg_ConfigDB | | | Config DB name |
| UIMsg_ServerAdded | Node GID | CServer* | A new node is being started |
| UIMsg_ServerDeleted | Node GID | CServer* | Not yet implemented |
| UIMsg_PolicyAdded | ME GID | CMEPolicy* | A new ME is being started |
| UIMsg_PolicyDeleted | ME GID | CMEPolicy* | Not yet implemented |
| UIMsg_DeterminationAdded | ME GID | CDeterminationPolicy* | A new determination policy has been added to this ME |
| UIMsg_MonitorAdded | ME GID | CMonitorPolicy* | A new monitor policy has been added to this ME |
| UIMsg_StatusUpdated | ME GID | | State change has been detected |

-continued

| Message | Object ID | Opt Param | Description |
|---|---|---|---|
| UIMsg_AuditMessage | | CStr* | Descriptive string |
| UIMsg_EventFired | | CStr* | Descriptive string relating to the event that has occured. |
| UIMsg_ThreadPool | | DWORD | Number of threads in pool. |
| UIMsg_PingSeconds | | DWORD | Number of seconds between node ping attempts. | xi. Manager Engine—State Tracking Component

The purpose of this section is to detail the technical aspects and interfaces for the State Tracking Component used in the Management engine. The State Tracking Component's primary responsibility is to track Managed Element states and react to state changes based on dependencies (parents) and state propagation policy (i.e., what is the highest state allowed to effect the parent). The State Tracking Component receives messages that can initial effect a Managed Element's state. If the change affects parents then the State Tracking component may also send a message.

Figure 39:
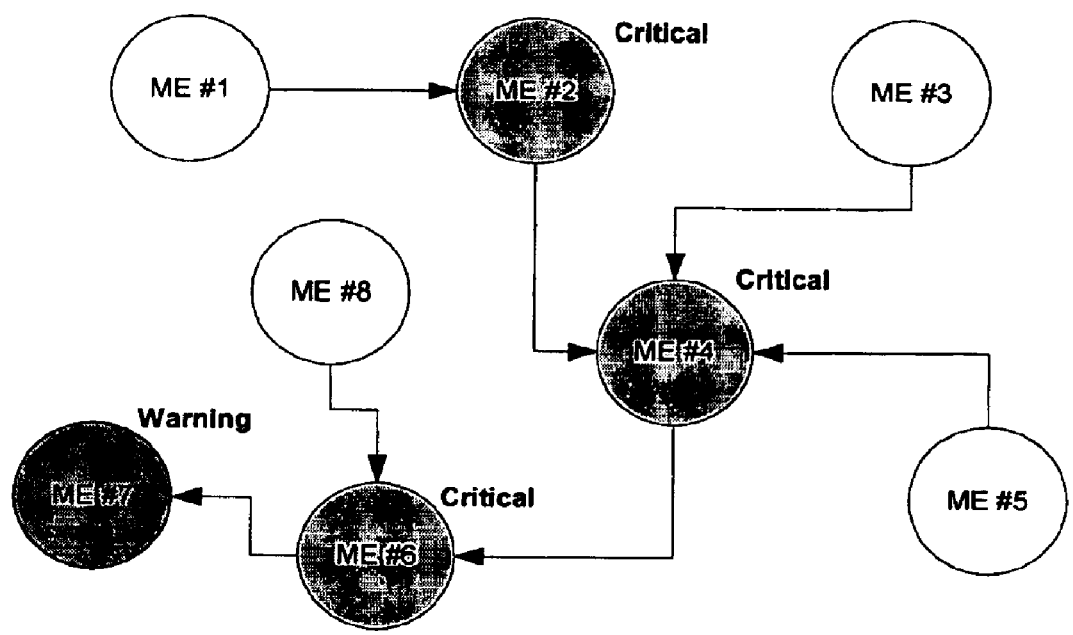
FIG. 39 also illustrates an exemplary relationship among a set of arbitrarily chosen Managed Element's.

The State Tracking component is also primarily responsible for understanding Managed Element inter-dependences and how state changes will affect those inter-dependencies. An Managed Element state can change based on a message that is received from the Message Switch component. When a Managed Elements state is changed based on a dependent Managed Elements state change, then the state tracking component also generates a new message. For example, FIG. 38 shows an exemplary relationship among a set of arbitrarily chosen MEs. Circular dependencies are not allowed in the presently described embodiment. Therefore, state propagation has a starting point and an ending point. FIG. 39 also illustrates an exemplary relationship among a set of arbitrarily chosen ME's. Turning now to FIG. 39, assume that all the above MEs are in the running state when a message is received that states the ME #2 is critical. This message will change the state of ME #2 to critical and all the dependent MEs will also change their state to critical. To show how state propagation policies work lets also assume that ME #6 has a policy that state the highest state it can propagate is "Warning".

Interfaces

The State Tracking cpmponent may have two interfaces. The first is the standard component interface that is required by all components in the Management Engine. The second interface is used add and delete ME components and their dependencies. This interface can also be used to interrogate the current state of a ME.

ME State Designations

In accordance with the functionality of the state tracking component of the presently described embodiment, an ME can have one of five different states. When a state of an ME is changed, the states of the ME that are dependent on it may also change.

| State | Value | Description |
|---|---|---|
| Setup | 0 | ME is being setup by the system |
| NoInfo | 1 | No information is known at the current time. This is the same as critical. |
| Critical | 2 | Critical state indicates a non-running state. |
| Warning | 3 | Warning state indicates a running state but there is a problem(s) or the potential of a problem(s). |
| Running | 4 | Running indicates that all is well and is operating. |
| Paused | 5 | Paused indicates that this ME is not being monitored at the current time. To its parents it is the same as running. |

State Policy

The state propagation policy instructs the state tracking system what is the lowest level a ME can publish. In some cases the failure of a given component will not adversely affect its parents. All new MEs have the initial state of Setup. This allows the system to start organizing its internal data and requires that some outside force start the tracking of the ME state. Once the ME is ready to be processed, it state is changed to paused.

Published State

In the presently described embodiment, each ME has its own state and a propagation state of its children. The state that the ME publishes is this lowest of these two values. In addition the published state can also be modified by the state propagation policy. This policy states the lowest value that can be published.

EXAMPLE

| | |
|---|---|
| Current State is Running | 3 |
| Children state is Warning | 2 |
| Propagation policy is Warning | Min 2 |
| = Published state | 2 |
| Current State is Running | 2 |
| Children state is Warning | 1 |
| Propagation policy is Warning | Min 2 |
| = Published state | 2 |
| Current State is Running | 3 |
| Children state is Warning | 3 |
| Propagation policy is Warning | Min 2 |
| = Published state | 3 |

Note that the paused state is treated as the same as running when calculating the current statue of a ME.

Resource Policy

An ME can be configured to handle multiple ME's of the same type and which are viewed as a set of resources. Redundant resources are configured when the State Tracking component is receives input relating to how many resources must be running for the resource to be healthy. Additional the State Tracking component should be told what is the lowest level of redundant resources allowable before am ME becomes critical. Any value in between will cause the ME to publish a warning state.

For example, assuming there are 6 redundant services and 5 are required to be running at any point in time, and also assuming that anything less then 3 will not handle the processing load, then in this case the running value would be 4 and the critical value would be 2, as illustrated in the table below.

| Critical | Warning | Running |
|----------|---------|---------|
| 0, 1, 2  | 3, 4    | 5, 6    |

State Tracking Component Operations

When the State Tracking component is initialized, it will create a client queue in the Message Switch so that it can receive and send messages to and from the other components in the system. (See Message Switch Componet section for a detailed desription of the Message Switch Component).

Subscribtion to Messages

| Msg # | Msg Description | Action |
|-------|-----------------|--------|
| 1 | Add ME | Add ME to matrix. This will also cause this component to query the database regarding dependencies. |
| 2 | Delete ME | Remove the ME from the matrix. |
| 3 | ME Updated | ME has been updated (refresh) |
| 4 | ME State change | The state of the ME has changed. |

Send Messages

| Msg # | Msg Description | Action |
|-------|-----------------|--------|
| 4 | ME State change | The state of the ME has changed. |

The component interface is used by all COM components in the Management engine. The owner of the process uses this interface to control the initialization, termination, and pause process for the service. Below is the class corresponding to this interface.

class INetworkControl
{
    HRESULT Init(void);
    HRESULT Term(void);
    HRESULT Pause(BOOL fTrue);
};

Method: Init

The "Init" method is used by the State Tracking component to initialize its internal structures.

Method: Term

The "Term" method is used by the State Tracking component to clean up its internal structures.

Method: Pause

The "Pause" with the flag being true will cause any state change to be ignored.

The service support routine uses the command interface below to add and delete ME components and their dependencies. It can also be used to request information about an ME including its current state propagation policy and its state. The class corresponding to this interface is set forth below.

Interface IStateTrackingCommand
{
    HRESULT AddMe( ... );
    HRESULT GetMePolicy( ... );
    HRESULT AddDependency( ... );
    HRESULT DeleteDependency( ... );
    HRESULT DeleteMe( ... );
    HRESULT GetState( ... );
    HRESULT SetMeState( ... );
    HRESULT GetMeState( ... );
    HRESULT GetInheritedState( ... );
    HRESULT SetResourcePolicy( ... );
    HRESULT GetResourcePolicy( ... );
};

Method: AddMe

The Add ME method will add a ME node to the matrix with its state propagation policy.

HRESULT AddMe(LPCWSTR pszMeID, short nStatePolicy);

| Parameter | Description |
|-----------|-------------|
| Return | S_OK for OK |
|  | S_FALSE indicates that the ME has already been added |
|  | E_FAIL for critical error |
| PMeID | ME GUID ID in a string format |
| NStatePolicy | State value for the state propagation policy. Normally this value would be zero. |

Method: GetMePolicy

The "Get ME Policy" function will return the current state propagation policy for the ME.

HRESULT GetMePolicy(LPCWSTR *pszMeID, short *nStatePolicy);

| Parameter | Description |
|-----------|-------------|
| Return | S_OK for OK |
|  | S_FALSE for ME does not exist |
|  | E_FAIL for critical error |
| PMeID | ME GUID ID in a string format |
| NStatePolicy | Return the current state propagation policy value. |

Method: AddDependency

The add dependency method will provide the ability to add a child dependency to the ME. This means that a state will propagate to this parent based on the state of its children and their state propagation policy.

HRESULT AddDependency(LPCWSTR pMeID, LPCWSTR pChildMeID);

| Parameter  | Description                                           |
|------------|-------------------------------------------------------|
| Return     | S_OK for OK                                           |
|            | S_FALSE for dependency that already exists or ME or child does not exist |
|            | E_FAIL for critical error                             |
| PMeID      | ME GUID ID in a string format                         |
| PChildMeID | Child ME GUID ID in string format                     |

Method: DeleteDependency

The delete dependency method will provide the ability to delete a child dependency to the ME.

HRESULT DeleteDependency(LPCWSTR pMeID,
  LPCWSTR pChildMeID
);

| Parameter  | Description                                           |
|------------|-------------------------------------------------------|
| Return     | S_OK for OK                                           |
|            | S_FALSE for dependency or ME or Child does not exists |
|            | E_FAIL for critical error                             |
| PMeID      | ME GUID ID in a string format                         |
| PChildMeID | Child ME GUID ID in string format                     |

Method: DeleteMe

The delete ME method will remove a ME from the matrix and any dependences that it participates in.

HRESULT DeleteMe(LPCWSTR pMeID);

| Parameter | Description                   |
|-----------|-------------------------------|
| Return    | S_OK for OK                   |
|           | S_FALSE for ME does not exist |
|           | E_FAIL for critical error     |
| PMeID     | ME GUID ID in a string format |

Method: GetState

The get state method will return the current published state of the ME. This is a value based on the publishing rules listed in the previous section.

HRESULT SetState(LPCWSTR pMeID, short *nState);

| Parameter | Description                   |
|-----------|-------------------------------|
| Return    | S_OK for OK                   |
|           | S_FALSE for ME does not exist |
|           | E_FAIL for critical error     |
| PMeID     | ME GUID ID in a string format |
| NState    | Current state value           |

Method: SetMeState

The set state method will set the current state of the ME.

HRESULT SetMeState(LPCWSTR pMeID, short nState);

| Parameter | Description                   |
|-----------|-------------------------------|
| Return    | S_OK for OK                   |
|           | S_FALSE for ME does not exist |
|           | E_FAIL for critical error     |
| PmeID     | ME GUID ID in a string format |
| NState    | State value to set            |

Method: GetMeState

The get ME state function will return the current state of the ME.

HRESULT GetMeState(LPCWSTR pMeID, short *nState);

| Parameter | Description                   |
|-----------|-------------------------------|
| Return    | S_OK for OK                   |
|           | S_FALSE for ME does not exist |
|           | E_FAIL for critical error     |
| PmeID     | ME GUID ID in a string format |
| Nstate    | Return the current ME's state |

Method: GetInheritedState

The get inherited state method will return the inherited state as received from its children.

HRESULT GetInheritedState(LPCWSTR pMeID, short *nState);

| Parameter | Description                   |
|-----------|-------------------------------|
| Return    | S_OK for OK                   |
|           | S_FALSE for ME does not exist |
|           | E_FAIL for critical error     |
| PmeID     | ME GUID ID in a string format |
| Nstate    | Return the inherited state    |

Method: SetResourcePolicy

The set resource policy method informs the ME how many children must be at a running to publish a running, warning, or critical state. This method also informs the state tracking manager how many resources must be running for it to publish a running or critical. The middle values (less the nRun and greater then nCritical) will set a state of "Warning".

Note that in the presently described embodiment, to turn off resource policy and revert to normal ME operation, a zero for both nRun and nCritical is specified.

HRESULT SetResourcePolicy(LPCWSTR pMeID,
  short nRun,
  short nCritical
);

| Parameter | Description                   |
|-----------|-------------------------------|
| Return    | S_OK for OK                   |
|           | S_FALSE for ME does not exist |
|           | E_FAIL for critical error     |

-continued

| Parameter | Description |
|---|---|
| PmeID | ME GUID ID in a string format |
| Nrun | How many children or greater must be running to publish a "Running" state. |
| Ncritical | How many children or less than must be running to publish a "Critical" state. |

Method: GetResourcePolicy

The get resource policy method will return the policy numbers for running and critical.

HRESULT GetResourcePolicy(LPCWSTR *pMeID,
   short *nRun,
   short *nCritical
);

| Parameter | Description |
|---|---|
| Return | S_OK for OK |
|  | S_FALSE for ME does not exist |
|  | E_FAIL for critical error |
| PMeID | ME GUID ID in a string format |
| NRun | Return the nRun value. |
| NCritical | Return the nCritical value. |

ME Information

Class

The ME class is the primary storage unit for the Managed Element class. The ME Relationships class is the primary stoarge unit for relationships among ME's. It exposes methods that implement all the activities for dealing with ME's.

class ME Relationship:

class MeRelationship

Master Link List

All the ME are stored in a master link list.

Master Index

A master index will be created with pointers to each ME class based on ME GUID. This index will allow a ME to be located quickly.

CMap<CStr, LPCWSTR, ME *, ME *>

Initialization

The following are the steps used to initialize the State-Tracking component. These steps are processed when the "Init( )" function is called by the Network service shell.

First, the ME relationship information will be queried and its result will be used to create ME classes that will be added to the master link list. At this point the parent and child list on the ME class are not complete. This first pass will also read the ME current state for ME that are not owned by the engine. All other ME will have the current state set to unknown. After all the ME information has been read in from the database a second pass is done on the ME lists. This pass resolves all the parent and child references. It also updates the running, warning, and critical counters. Next, the he Management engine information will be queried and an ME will be setup for each Management Engine. Finally, the State Tracking component subscribes to the standard ME & Engine state message featured by the Message Switch component.

Processing Messages

Again, the State-Tracking component when initialized is registered with the Message Switch component to receive any message regarding the ME and Engine state changes. The following outlines the impact these messages have on the internal ME class and their states.

Message is Received that Indicate a ME's State has Changed.

First, the he ME is searched in a master index athe pointer is used to reference the ME class representing it. The new state is compared with the current and if the states are the same no action is taken. Next the new state on the ME is set.

```
{
    CStr m_csMeID;      // ME CLSID that is the reference
    ME * m_MeID;        // ME that is referenced
    bool m_fUses;// ME uses w/ this reference
    bool m_fTwoWay;     // ME 2-way dependency w/ this reference
};
#define list<MeRelationship> MeRelationship;
class ME
{
    CStrm_MeID;         // ME GUID
    short m_nCurrentState;       // Current ME state
    long m_nChildRunningCnt;     // # of children w/ running & paused state
    long m_nChildWarningCnt;     // # of children w/ warning state
    long m_nChildCriticalCnt;    // # of children w/ critical & unknown state
    short m_nStatePolicy;// Min state that can be published
    short m_nResRunningLimit;    // >= # of res required for running
    short m_nResCriticalLimit;   // <= # of res for critical
    MeRelationship m_listParent;// Pointers to parents
    MeRelationship m_listChild;  // Pointers to children
    HRESULT SetMeState(short nState);
    HRESULT GetMeState(short &nState);
    HRESULT AddDependency(MeRelationship &rel, bool fChild);
    HRESULT DeleteDependency(MeRelationship &rel, bool fChild);
};
```

Next, the State Tracking componentiteratea through all the parents of the ME and changes their state counters, decrementing the old state incrementing the new.

For every parent that is referenced, its state must be re-calculated based on the state change. If the parent's state is changed, the State Tracking Component sends a state change message to internal components informing them of the new state and then processes its parents.

Managed Element State Tracking and Process Flows

Again, as noted earlier, each ME has a state and it is governed by a life cycle. Based on this life cycle it is possible to describe where and what the current state of an ME is. Possible ME states and lifecycles in the presently described embodiment are set forth below.

Possible States

| State | Value | Description |
|---|---|---|
| Setup | 0 | ME is being setup by the system |
| No Information | 1 | No information is known at the current time. In some cases this will be interpreted critical. |
| Critical | 2 | Critical state indicates a non-running state. |
| Warning | 3 | Warning state indicates a running state but there is a problem(s) or the potential of a problem(s). |
| Running | 4 | Running indicates that all is well and is operating. |
| Paused | 5 | Paused indicates that this ME is not being monitored at the current time. To its parents it is the same as running. In some cases this will be interpreted as running. |

Lifecycle

| Description | State |
|---|---|
| ME is created and added to the database. | Setup |
| ME is completed specified (sub site, assigned to an engine, has monitoring policies, etc . . . ) | Paused |
| A user or a process starts the monitoring of the ME | No Information |
| The WMI Consumer figures out the real current ME state and sets it to either critical, warning, or running | Critical, Warning, or Running |
| User or a process wants to stop monitoring the | Paused |

What is claimed is:

1. A computer network, the computer network including a plurality of managed sites, wherein each of the managed sites comprises:
   a. at least one manager engine computer coupled to a plurality of managed nodes, the at least one manager engine computer including a management software component, the management software component being capable of retrieving and storing data representative of network system state information, the network system state information comprising relationships among a plurality of managed network elements, wherein at least one of the plurality of managed network elements corresponds to one of the plurality of managed nodes, and wherein the plurality of managed network elements comprise at least one physical element and at least one of a software application, and a software subroutine; and
   b. at least one client computer coupled to the at least one manager engine computer, the at least one client computer including a data retrieval software component, the data retrieval software component being capable of retrieving the data representative of network system state information from the at least one manager engine computer and of presenting the data representative of network system state information to a user.

2. The computer network of claim 1 wherein the data representative of network system state information is stored in a database on the at least one manager engine computer, the data base comprising data representing information about the plurality of managed network elements, the information about the plurality of network elements including, for each element of the plurality of managed network elements, an element type, possible parents of the element, a corresponding assigned manager engine computer for the element, a corresponding command list, if any, for the element, any security restrictions for the managed element and information relating the element to others of the plurality of managed network elements.

3. The computer network of claim 1 wherein the data retrieval software component includes a snap-in application.

4. The computer network of claim 1 wherein the relationships among the plurality of managed network elements include one-way relationships.

5. The computer network of claim 1 wherein the relationships among the plurality of managed network elements include two way relationships.

6. The computer network of claim 1 wherein the data retrieval software component includes a user interface software component, the user interface software component presenting the data representative of network state information to the user by representing each of the plurality of managed network elements with a corresponding icon and by representing the relationships among the plurality of managed network elements with corresponding connectors visibly connecting icons.

7. The computer network of claim 6 wherein the user interface software component features drill down capability.

8. The computer network of claim 6 wherein the icons convey property information.

9. The computer network of claim 6 wherein the icons include actions icons which facilitate user initiation of actions.

10. The computer network of claim 6 wherein the plurality of managed network elements include base managed network elements.

11. The computer network of claim 6 wherein the plurality of managed network elements include derived managed network elements.

12. The computer network of claim 6 wherein the plurality of managed network elements include application managed network elements.

13. The computer network of claim 6 wherein the plurality of managed network elements include resource managed network elements.

14. The computer network of claim 6 wherein the plurality of managed network elements include reference managed network elements.

15. The computer network of claim 6 wherein the plurality of managed network elements include external interface managed network elements.

16. A manager engine computer coupled to at least one client and a plurality of managed nodes, the plurality of managed nodes located in one of a plurality of managed sites comprising a network, the manager engine computer communicating with the plurality of managed nodes and storing data representative of network state information, the network state information being organized as a series of relationships among managed elements of the network, the manager engine computer comprising:

a. a management software component, the management software component being capable of retrieving, analyzing and storing the data representative of network state information organized as a series of relationships among managed elements of the network, and b. a client interface software component, the client interface software component facilitating retrieval from the manager engine computer by the client of the stored data representative of network state information organized as a series of relationships among managed elements of the network, wherein the plurality of managed elements comprise at least one physical element and at least one of software application, and a software subroutine.

17. The manager engine computer of claim 16 wherein the management software component further comprises a root cause evaluation component, the root cause evaluation component facilitating detection of network problems using dependencies incorporated into the series of relationships among managed elements of the network.

18. The manager engine computer of claim 17 wherein the management software component further comprises a policy enforcement component, the policy enforcement component facilitating enforcement of network policies in response to a state change in a corresponding one of the managed elements of the network.

19. The manager engine computer of claim 18 wherein the managed elements of the network include base managed elements.

20. The manager engine computer of claim 19 wherein the base managed elements include data representing an SQL server in the network.

21. The manager engine computer of claim 18 wherein the managed elements of the network include derived managed elements.

22. The manager engine computer of claim 18 wherein the managed elements of the network include application managed elements.

23. The manager engine computer of claim 22 wherein the application managed elements include data representing a Customer Information Tracking System in the network.

24. The manager engine computer of claim 18 wherein the managed elements of the network include resource managed elements.

25. The manager engine computer of claim 24 wherein the resource managed elements include data representing a group of SQL servers in the network.

26. The manager engine computer of claim 18 wherein the managed elements of the network include reference managed elements.

27. The manager engine computer of claim 26 wherein the reference managed elements include data representing a root cause isolation.

28. The manager engine computer of claim 18 wherein the managed elements of the network include external interface managed elements.

29. The manager engine computer of claim 28 wherein the external interface managed elements include data representing a web application in the network.

30. A method of managing a computer network, the computer network including a plurality of managed sites, comprising:

retrieving and storing data representative of network state information using at least one manager engine computer coupled to a plurality of managed nodes, the at least one manager engine computer including a management software component, the management software component being capable of retrieving and storing data representative of network system state information, the network system state information comprising relationships among a plurality of managed network elements, wherein at least one of the plurality of managed network elements corresponds to one of the plurality of managed nodes, and wherein the plurality of managed network elements comprise at least one physical element and at least one of software application, and a software subroutine; and retrieving the data representative network system state information using at least one client computer coupled to the at least one manager engine computer, the at least one client computer including a data retrieval software component, the data retrieval software component being capable of retrieving the data representative of network system state information from the at least one manager engine computer and of presenting the data representative of network system state information to a user.

31. The method of claim 30, wherein the data representative of network system state information is stored in a database on the at least one manager engine computer, the data base comprising data representing information about the plurality of managed network elements, the information about the plurality of network elements including, for each element of the plurality of managed network elements, an element type, possible parents of the element, a corresponding assigned manager engine computer for the element, a corresponding command list, if any, for the element, any security restrictions for the managed element and information relating the element to others of the plurality of managed network elements.

32. The method of claim 30, wherein the data retrieval software component includes a snap-in application.

33. The method of claim 30, wherein the relationships among the plurality of managed network elements include one-way relationships.

34. The method of claim 30, wherein the relationships among the plurality of managed network elements include two way relationships.

35. The method of claim 30, further comprising presenting the data representative of network state information to the user, wherein the data retrieval software component includes a user interface software component, the user interface software component adapted to present the data representative of network state information to the user by representing each of the plurality of managed network elements with a corresponding icon and by representing the relationships among the plurality of managed network elements with corresponding connectors visibly connecting icons.

36. The method of claim 35, wherein the user interface software component features drill down capability.

37. The method of claim 35, wherein the icons convey property information.

38. The method of claim 35, wherein the icons include actions icons which facilitate user initiation of actions.

39. The method of claim 35, wherein the plurality of managed network elements include base managed network elements.

40. The method of claim 35, wherein the plurality of managed network elements include derived managed network elements.

41. The method of claim 35, wherein the plurality of managed network elements include application managed network elements.

42. The method of claim 35, wherein the plurality of managed network elements include resource managed network elements.

43. The method of claim 35, wherein the plurality of managed network elements include reference managed network elements.

44. The method of claim 35, wherein the plurality of managed network elements include external interface managed network elements.

45. A method of managing a computer network comprising a manager engine computer coupled to at least one client and a plurality of managed nodes, the plurality of managed nodes located in one of a plurality of managed sites comprised in the network, the manager engine computer communicating with the plurality of managed nodes and storing data representative of network state information, the network state information being organized as a series of relationships among managed elements of the network, the method comprising:

retrieving, analyzing, and storing the data representative of the network state information using a management software component, the management software component being capable of retrieving, analyzing and storing the data representative of network state information organized as a series of relationships among managed elements of the network; and facilitating retrieval of the stored data representative of network state information using a client interface software component, the client interface software component facilitating retrieval from the manager engine computer by the client of the stored data representative of network state information organized as a series of relationships among managed elements of the network, and wherein the plurality of managed network elements comprise at least one physical element and at least one of software application, and a software subroutine.

46. The method of claim 45, further comprising facilitating detection of network problems, wherein the management software component further comprises a root cause evaluation component, the root cause evaluation component facilitating detection of network problems using dependencies incorporated into the series of relationships among managed elements of the network.

47. The method of claim 46, further comprising facilitating enforcement of network policies, wherein the management software component further comprises a policy enforcement component, the policy enforcement component facilitating enforcement of network policies in response to a state change in a corresponding one of the managed elements of the network.

48. The method of claim 47, wherein the managed elements of the network include base managed elements.

49. The method of claim 48, wherein the base managed elements include data representing an SQL server in the network.

50. The method of claim 47, wherein the managed elements of the network include derived managed elements.

51. The method of claim 47, wherein the managed elements of the network include application managed elements.

52. The method of claim 51, wherein the application managed elements include data representing a Customer Information Tracking System in the network.

53. The method of claim 47, wherein the managed elements of the network include resource managed elements.

54. The method of claim 53, wherein the resource managed elements include data representing a group of SQL servers in the network.

55. The method of claim 47, wherein the managed elements of the network include reference managed elements.

56. The method of claim 55, wherein the reference managed elements include data representing a root cause isolation.

57. The method of claim 47, wherein the managed elements of the network include external interface managed elements.

58. The method of claim 57, wherein the external interface managed elements include data representing a web application in the network.

* * * * *

UNITED STATES PATENT AND TRADEMARK OFFICE
CERTIFICATE OF CORRECTION

| | | |
|---|---|---|
| PATENT NO. | : 6,983,317 B1 | |
| APPLICATION NO. | : 09/586740 | |
| DATED | : January 3, 2006 | |
| INVENTOR(S) | : David A. Bishop et al. | |

It is certified that error appears in the above-identified patent and that said Letters Patent is hereby corrected as shown below:

On Sheet 5 of 52, FIG. 5 (Box 4), line 5, delete "Information" and insert -- information --, therefor.

On Sheet 6 of 52, FIG. 6, line 1, delete "FIG 6" and insert -- FIG. 6 --, therefor.

On Sheet 11 of 52, FIG. 11 (Circle towards Left hand side of YES Option), line 2, delete "waming" and insert -- warning --, therefor.

On Sheet 11 of 52, FIG. 11 (Circle towards Right hand side of NO Option), line 2, delete "critial" and insert -- critical --, therefor.

On Sheet 11 of 52, FIG. 12 (Circle 1), line 1, delete "Tum" and insert -- Turn --, therefor.

On Sheet 12 of 52, FIG. 13 (Point 6), line 3, delete "propogation" and insert -- propagation --, therefor.

On Sheet 13 of 52, FIG. 14 (Point 4), line 3, delete "propogation" and insert -- propagation --, therefor.

On Sheet 33 of 52, FIG. 34 (Circle Adjacent to Circle Job Process.), line 1, delete "WM" and insert -- WMI --, therefor.

On Sheet 33 of 52, FIG. 34 (Circle Adjacent to Circle WM Provider), line 1, delete "WM" and insert -- WMI --, therefor.

On Sheet 42 of 52, FIG. 43A (Col. 4), line 18, delete "initilization" and insert -- initialization --, therefor.

On Sheet 43 of 52, FIG. 43B (Col. 4), line 1, delete "initilization" and insert -- initialization --, therefor.

On Sheet 44 of 52, FIG. 43C (Col. 3), line 6, delete "ELEC_GUID" and insert -- ELECT_GUID --, therefor.

UNITED STATES PATENT AND TRADEMARK OFFICE
CERTIFICATE OF CORRECTION

PATENT NO. : 6,983,317 B1
APPLICATION NO. : 09/586740
DATED : January 3, 2006
INVENTOR(S) : David A. Bishop et al.

It is certified that error appears in the above-identified patent and that said Letters Patent is hereby corrected as shown below:

On Sheet 47 of 52, FIG. 46 (Left hand side), line 4, delete "Cliant" and insert -- Client --, therefor.

In column 1, line 8, delete "applciation" and insert -- Application --, therefor.

In column 1, line 40, delete "criticial" and insert -- critical --, therefor.

In column 2, line 23, delete "peformed" and insert -- performed --, therefor.

In column 2, line 56, delete "adavantage" and insert -- advantage --, therefor.

In column 2, line(s) 63-64, delete "mangement" and insert -- management --, therefor.

In column 3, line 25, delete "illusrates" and insert -- illustrates --, therefor.

In column 3, line 46, delete "initilization" and insert -- initialization --, therefor.

In column 3, line 46, delete "mangement" and insert -- management --, therefor.

In column 4, line 24, delete "accordanc" and insert -- accordance --, therefor.

In column 4, line 25, delete "emboidment" and insert -- embodiment --, therefor.

In column 4, line 28, delete "accordanc" and insert -- accordance --, therefor.

In column 4, line 32, delete "emboidment" and insert -- embodiment --, therefor.

In column 5, line 8, delete "accordanc" and insert -- accordance --, therefor.

In column 5, line 27, delete "1) Win32" and insert -- I) Win32 --, therefor.

In column 7, line 9, delete "I) Printer" and insert -- i) Printer --, therefor.

In column 10, line 52, delete "1) provide" and insert -- I) provide --, therefor.

UNITED STATES PATENT AND TRADEMARK OFFICE
CERTIFICATE OF CORRECTION

PATENT NO.        : 6,983,317 B1
APPLICATION NO.   : 09/586740
DATED             : January 3, 2006
INVENTOR(S)       : David A. Bishop et al.

It is certified that error appears in the above-identified patent and that said Letters Patent is hereby corrected as shown below:

In column 12, line 66, delete " [icon] " and insert -- [icon] --, therefor.

In column 13, line 61, delete "embodiemnt" and insert -- embodiment --, therefor.

In column 13, line 62, after "DDS" insert -- . --.

In column 14, line 55, delete "Elemement" and insert -- Element --, therefor.

In column 14, line 63, delete "m_nCustomIcon1;" and insert -- m_nCustomIcon1; --, therefor.

In column 14, line 65, delete "m_nCustomIcon3;" and insert -- m_nCustomIcon3; --, therefor.

In column 15, line 54, delete "(short nIindex);" and insert -- (short nIndex); --, therefor.

In column 16, line 55, after "menu" insert -- . --.

In column 16, line 67, after "list" insert -- . --.

In column 17, line 11, delete "may" before "consume". (Repeated Occurrence)

In column 17, line 15, delete "Palnning" and insert -- Planning --, therefor.

In column 20, line 58, delete "in" and insert -- In --, therefor.

In column 20, line 61, delete "maanger" and insert -- manager --, therefor.

In column 20, line 62, delete "installtion" and insert -- installation --, therefor.

In column 21, line 2, delete "insatllation" and insert -- installation --, therefor.

In column 22, line 8, delete "interacton" and insert -- interaction --, therefor.

In column 22, line 10, delete "acordance" and insert -- accordance --, therefor.

UNITED STATES PATENT AND TRADEMARK OFFICE
CERTIFICATE OF CORRECTION

PATENT NO. : 6,983,317 B1
APPLICATION NO. : 09/586740
DATED : January 3, 2006
INVENTOR(S) : David A. Bishop et al.

It is certified that error appears in the above-identified patent and that said Letters Patent is hereby corrected as shown below:

In column 22 (Table 1, Col. 2), line 7, delete "Mes" and insert -- MEs --, therefor.

In column 22, line 43, delete "stat" and insert -- state --, therefor.

In column 22, line 51, delete "proccesing" and insert -- processing --, therefor.

In column 22 (Table 2, Col. 2), line 8, after "engines" insert -- . --.

In column 23, line 22, delete "appicable" and insert -- applicable --, therefor.

In column 23 (Table 2, Col. 2), line 17, delete "Mes" and insert -- MEs --, therefor.

In column 23, line 52, delete "eveidenced" and insert -- evidenced --, therefor.

In column 23, line 53, delete "satet" and insert -- state --, therefor.

In column 23, line 53, delete "maneer" and insert -- manager --, therefor.

In column 23, line 54, delete "exeucuting" and insert -- executing --, therefor.

In column 23, line 54, delete "remdial" and insert -- remedial --, therefor.

In column 23, line(s) 54-55, delete "particiular" and insert -- particular --, therefor.

In column 23-24, line(s) 67 and 1-3, delete "FIG. 9 depicts a storage capacity management job schema associated with an a managed element in accordance with an embodiment of the present invention." and insert -- FIG. 9 depicts a storage capacity management job schema associated with an a managed element in accordance with an embodiment of the present invention. --, therefor, on line 67 (Col. 23) after "these files.". (as the continuation of paragraph)

In column 24, line 2, after "associated with" delete "an".

In column 25, line 16, delete "systemin" and insert -- system in --, therefor.

In column 28 (Table, Col. 2), line 46, after "what" insert -- needs --.

UNITED STATES PATENT AND TRADEMARK OFFICE
CERTIFICATE OF CORRECTION

PATENT NO. : 6,983,317 B1 Page 5 of 16
APPLICATION NO. : 09/586740
DATED : January 3, 2006
INVENTOR(S) : David A. Bishop et al.

It is certified that error appears in the above-identified patent and that said Letters Patent is hereby corrected as shown below:

In column 37 (Table 2), line 3, insert -- | Des | Nvarchar(60) | NOT NULL | No | No | --.

In column 38 (Table 2) line 3, insert -- | Monitor ID | Int | NOT NULL | No | Yes | --.

In column 40 (Table 1), line 1, insert -- | Column Name | Data Type | Null Option | BK | PK | --.

In column 42, line 3, after "prefixed" delete ".".

In column 42, line 55, delete "proce1dure" and insert -- procedure --, therefor.

In column 45, line 28, delete "paramters" and insert -- parameters --, therefor.

In column 45 (Table 4, Col. 3-4), line 2, below "Default" delete "Yes" and below "Req" insert -- Yes --, therefor.

In column 46, line 26, delete "ME(ME_URL or ME_GID)" and
insert -- ME (ME_URL or ME_GID) --, therefor.

In column 47 (Table 1, Col. 2), line 5, delete "ME'sID" and insert -- ME's ID --, therefor.

In column 48 (Table 2, Col. 5), line 2, delete "GROUP URL" and insert -- GROUP GID --, therefor.

In column 48, line 45, delete "paramter" and insert -- parameter --, therefor.

In column 50, line 43, delete "(Thread)" and insert -- (thread) --, therefor.

In column 50, line 57, delete "nonzero" and insert -- non-zero --, therefor.

In column 52, line 12, delete "Windo1ws" and insert -- Windows --, therefor.

In column 53, line 37, after "Flow" delete ".".

In column 55, line 40, after "Below the" delete "the". (Repeated Occurrence)

UNITED STATES PATENT AND TRADEMARK OFFICE
CERTIFICATE OF CORRECTION

PATENT NO. : 6,983,317 B1
APPLICATION NO. : 09/586740
DATED : January 3, 2006
INVENTOR(S) : David A. Bishop et al.

It is certified that error appears in the above-identified patent and that said Letters Patent is hereby corrected as shown below:

In column 56, line 11, delete "sme" and insert -- same --, therefor.

In column 56, line 20, delete "follwong" and insert -- following --, therefor.

In column 56, line 65, delete "decribed" and insert -- described --, therefor.

In column 56, line 67, delete "ivention" and insert -- invention --, therefor.

In column 58, line 66, delete "EndifIF Engines.Count>0" and insert -- Endif --, therefor.

In column 58, line 67, below "Endif" insert -- IF Engines.Count>0 --.

In column 59, line 60, delete "emboidment" and insert -- embodiment --, therefor.

In column 60, line 5, below "// If NULL !=DeletedEngines.Item(ThisEngine)" insert -- // --.

In column 60, line 13, below "The following is pseudocode for the Engine Started Procedure" insert -- // --.

In column 60, line 17, below "// effect" insert -- // --.

In column 60, line 58, delete "followng" and insert -- following --, therefor.

In column 60, line 58, delete "failovre" and insert -- failover --, therefor.

In column 62, line 37, delete "Managre" and insert -- Manager --, therefor.

In column 63, line 19, delete "pre-rquisite" and insert -- pre-requisite --, therefor.

In column 64, line 2, delete "Backup 1" and insert -- Backup1 --, therefor.

In column 67, line 15, delete "Rearrages" and insert -- Rearranges --, therefor.

In column 68, line 59, delete "Static" and insert -- static --, therefor.

In column 69, line 49, delete "Thi smethod" and insert -- This method --, therefor.

UNITED STATES PATENT AND TRADEMARK OFFICE
CERTIFICATE OF CORRECTION

PATENT NO. : 6,983,317 B1
APPLICATION NO. : 09/586740
DATED : January 3, 2006
INVENTOR(S) : David A. Bishop et al.

It is certified that error appears in the above-identified patent and that said Letters Patent is hereby corrected as shown below:

In column 71, line 61, delete "inlcude" and insert -- include --, therefor.

In column 72 (Table 2, Col. 1), line 1, delete "Parameter" and insert -- Exceptions --, therefor.

In column 72 (Table 2, Col. 1), line 2, delete "com_error" and insert -- _com_error --, therefor.

In column 72 (Table 4, Col. 1), line 2, delete "com_error" and insert -- _com_error --, therefor.

In column 72 (Table 6, Col. 1), line 2, delete "com_error" and insert -- _com_error --, therefor.

In column 73 (Table 2, Col. 1), line 2, delete "com_error" and insert -- _com_error --, therefor.

In column 73 (Table 4, Col. 2), line 2, delete "com_error" and insert -- _com_error --, therefor.

In column 73, line 40, delete "Assignmen" and insert -- Assignment --, therefor.

In column 73, line 41, delete "nameis" and insert -- name is --, therefor.

In column 73, line 41, delete "Wondows" and insert -- Windows --, therefor.

In column 73, line 54, delete "InetworkControl" and insert -- INetworkControl --, therefor.

In column 74 (Table 1, Col. 1), line 2, delete "com_error" and insert -- _com_error --, therefor.

In column 74 (Table 3, Col. 1), line 2, delete "com_error" and insert -- _com_error --, therefor.

In column 74, line 33, delete "Thi smethod" and insert -- This method --, therefor.

UNITED STATES PATENT AND TRADEMARK OFFICE
CERTIFICATE OF CORRECTION

PATENT NO.       : 6,983,317 B1
APPLICATION NO.  : 09/586740
DATED            : January 3, 2006
INVENTOR(S)      : David A. Bishop et al.

It is certified that error appears in the above-identified patent and that said Letters Patent is hereby corrected as shown below:

In column 74 (Table 5, Col. 1), line 2, delete "com_error" and insert -- _com_error --, therefor.

In column 74 (Table 7, Col. 1), line 2, delete "com_error" and insert -- _com_error --, therefor.

In column 74 (Table 8, Col. 1), line 1, delete "Paramete" and insert -- Parameter --, therefor.

In column 75 (Table 1, Col. 1), line 2, delete "com_error" and insert -- _com_error --, therefor.

In column 75, line 12, delete "Manged" and insert -- Managed --, therefor.

In column 75, line 22, delete "th" and insert -- the --, therefor.

In column 75, line 28, delete "InetworkControl" and insert -- INetworkControl --, therefor.

In column 75 (Table 3, Col. 1), line 2, delete "com_error" and insert -- _com_error --, therefor.

In column 75, line 50, delete "FixAssignmentsOn TransferedMEs" and insert -- FixAssignmentsOnTransferedMEs --, therefor.

In column 75 (Table 5, Col. 1), line 2, delete "com_error" and insert -- _com_error --, therefor.

In column 76 (Table 2, Col. 1), line 2, delete "com_error" and insert -- _com_error --, therefor.

In column 76 (Table 4, Col. 1), line 2, delete "com_error" and insert -- _com_error --, therefor.

In column 76 (Table 6, Col. 1), line 2, delete "com_error" and insert -- _com_error --, therefor.

UNITED STATES PATENT AND TRADEMARK OFFICE
CERTIFICATE OF CORRECTION

PATENT NO. : 6,983,317 B1
APPLICATION NO. : 09/586740
DATED : January 3, 2006
INVENTOR(S) : David A. Bishop et al.

It is certified that error appears in the above-identified patent and that said Letters Patent is hereby corrected as shown below:

In column 77 (Table 1, Col. 1), line 2, delete "com_error" and insert -- _com_error --, therefor.

In column 77, line 25, delete "usd" and insert -- used --, therefor.

In column 80, line 1, delete "put SubSites" and insert -- put_SubSites --, therefor.

In column 80 (Table 4, Col. 2), line 4, delete "Assignements" and insert -- Assignments --, therefor.

In column 81 (Table 1, Col. 2), line 3, delete "obect" and insert -- object --, therefor.

In column 82 (Table 7, Col. 2), line 4, delete "Assignements" and insert -- Assignments --, therefor.

In column 83 (Table 1, Col. 2), line 5, delete "paremt" and insert -- parent --, therefor.

In column 83, line 27, delete "get_LGUID" and insert -- get_GUID --, therefor.

In column 88 (Table 1, Col. 1), line 2, delete "com error" and insert -- _com_error --, therefor.

In column 88 (Table 4, Col. 1), line 2, delete "com error" and insert -- _com_error --, therefor.

In column 88 (Table 6, Col. 1), line 2, delete "com error" and insert -- _com_error --, therefor.

In column 89 (Table 1, Col. 1), line 2, delete "com error" and insert -- _com_error --, therefor.

In column 89 (Table 4, Col. 1), line 1, delete "Param:" and insert -- Parameter --, therefor.

In column 90, line 48, delete "prferably" and insert -- preferably --, therefor.

UNITED STATES PATENT AND TRADEMARK OFFICE
CERTIFICATE OF CORRECTION

| | |
|---|---|
| PATENT NO. | : 6,983,317 B1 |
| APPLICATION NO. | : 09/586740 |
| DATED | : January 3, 2006 |
| INVENTOR(S) | : David A. Bishop et al. |

It is certified that error appears in the above-identified patent and that said Letters Patent is hereby corrected as shown below:

In column 90, line 54, delete "allowsEAS" and insert -- allows EAS --, therefor.

In column 90, line 56, delete "allowsEAS" and insert -- allows EAS --, therefor.

In column 90, line 57, delete "alow" and insert -- a low --, therefor.

In column 90, line 62, delete "emboidment" and insert -- embodiment --, therefor.

In column 91, line 4, delete "specfiically" and insert -- specifically --, therefor.

In column 91, line 6, delete "emboidment" and insert -- embodiment --, therefor.

In column 91, line 8, after "data" insert -- . --.

In column 91, line 9, delete "wirth" and insert -- with --, therefor.

In column 91, line 29, delete "i.e," and insert -- i.e., --, therefor.

In column 91, line 48, delete "marhsalling" and insert -- marshalling --, therefor.

In column 91, line 57, delete "Eas" and insert -- EAS --, therefor.

In column 92 (Table 2, Col. 3), line 2, delete "begining" and insert -- beginning --, therefor.

In column 93, line 5, delete "aong wioth" and insert -- along with --, therefor.

In column 93, line 64, delete "contan" and insert -- contain --, therefor.

In column 93, line 66, delete "inheret" and insert -- inherit --, therefor.

In column 94, line 16, delete "pssible" and insert -- possible --, therefor.

In column 94, line 17, delete "preently" and insert -- presently --, therefor.

In column 94, line 63, delete "creatation" and insert -- creation --, therefor.

UNITED STATES PATENT AND TRADEMARK OFFICE
CERTIFICATE OF CORRECTION

PATENT NO. : 6,983,317 B1
APPLICATION NO. : 09/586740
DATED : January 3, 2006
INVENTOR(S) : David A. Bishop et al.

It is certified that error appears in the above-identified patent and that said Letters Patent is hereby corrected as shown below:

In column 94, line 67, delete "Componenen" and insert -- Component --, therefor.

In column 95, line 2, delete "communicationis" and insert -- communication is --, therefor.

In column 95, line 2, delete "aata" and insert -- data --, therefor.

In column 95, line 6, after "objected" insert -- " --, therefor.

In column 95, line 7, delete "FormSrv" and insert -- FrmSrv --, therefor.

In column 95, line 18, delete "Prefeably" and insert -- Preferably --, therefor.

In column 95, line 62, delete "compoment" and insert -- component --, therefor.

In column 96, line 8, delete "<UUID><UUID>" and insert -- <UUID></UUID> --, therefor.

In column 96, line 20, delete "Messaeg" and insert -- Message --, therefor.

In column 97, line 10, delete "mananager" and insert -- manager --, therefor.

In column 97, line 41, delete "depeends" and insert -- depends --, therefor.

In column 97, line 55, delete "dete0cted" and insert -- detected --, therefor.

In column 98, line 9, delete "data.;" and insert -- data; --, therefor.

In column 98, line 12, delete "Mananger" and insert -- Manager --, therefor.

In column 98, line 22, delete "Elm" and insert -- ELM --, therefor.

In column 98, line 45, delete "copmponents" and insert -- components --, therefor.

In column 98, line 50, delete "C/" and insert -- $C_1$ --, therefor.

UNITED STATES PATENT AND TRADEMARK OFFICE
CERTIFICATE OF CORRECTION

PATENT NO.         : 6,983,317 B1
APPLICATION NO. : 09/586740
DATED                  : January 3, 2006
INVENTOR(S)        : David A. Bishop et al.

It is certified that error appears in the above-identified patent and that said Letters Patent is hereby corrected as shown below:

In column 98, line 52, delete "thre" and insert -- the --, therefor.

In column 99, line 3, delete "trhe" and insert -- the --, therefor.

In column 99, line 17, delete "ELM," and insert -- $ELM_1$ --, therefor.

In column 99, line 19, delete "ELM," and insert -- $ELM_1$ --, therefor.

In column 99, line 22, delete "(4)" and insert -- (5) --, therefor.

In column 99, line 24, delete "(5)" and insert -- (6) --, therefor.

In column 99, line 27, delete "(6)" and insert -- (7) --, therefor.

In column 99, line 29, delete "(7)" and insert -- (8) --, therefor.

In column 100, line 46, delete "ann" and insert -- an --, therefor.

In column 100, line 59, delete "correpsonding" and insert -- corresponding --, therefor.

In column 101, line 42, delete "engine-to-Engine" and insert -- Engine-to-Engine --, therefor.

In column 101, line 51, delete "aa" and insert -- a --, therefor.

In column 102, line 29, delete "fileds" and insert -- fields --, therefor.

In column 103, line 13, delete "subiste" and insert -- subsite --, therefor.

In column 103, line 21, delete "Engins" and insert -- Engines --, therefor.

In column 103, line 55, delete "performt eh" and insert -- perform the --, therefor.

In column 104, line 9, after "mins)" delete "." and insert -- ; --, therefor.

In column 104, line 18, delete "the" before "engines". (second occurrence)

UNITED STATES PATENT AND TRADEMARK OFFICE
CERTIFICATE OF CORRECTION

| | |
|---|---|
| PATENT NO. | : 6,983,317 B1 |
| APPLICATION NO. | : 09/586740 |
| DATED | : January 3, 2006 |
| INVENTOR(S) | : David A. Bishop et al. |

It is certified that error appears in the above-identified patent and that said Letters Patent is hereby corrected as shown below:

In column 104, line 32, delete "EMMwaits" and insert -- EMM Waits --, therefor.

In column 104, line 43, delete "sicne" and insert -- since --, therefor.

In column 105, line 12, delete "(b)" and insert -- (c) --, therefor.

In column 105, line 14, after "Message";" insert -- (d) --.

In column 105, line 15, delete "(d)" and insert -- (e) --, therefor.

In column 105 (Table 1, Col. 3), line 2, delete "Mchine" and insert-- Machine --, therefor.

In column 105, line 32, after "states are" insert -- : --.

In column 106 (Table 2, Col. 3), line 4, delete "Newtwork" and insert -- Network --, therefor.

In column 106, line 36, after "Engine List" delete "." and insert -- ; --, therefor.

In column 108, line 52, delete "{" and insert -- } --, therefor.

In column 109, line 36, after "WaitForMsg(. . . .)" insert -- ; --.

In column 110, line 8, after "Remove(. . . .)" insert -- ; --.

In column 110, line 11, after "EngineReady(. . . .)" insert -- ; --.

In column 110, line 18, after "ManageMaster(. . . .)" insert -- ; --.

In column 110, line 44, delete "IEMM pEMM" and insert -- IEMM **\*pEMM** --, therefor.

In column 110, line 55, delete "Thi smethod" and insert -- This method --, therefor.

In column 110 (Table 2, Col. 2), line 4, delete "Rturns" and insert -- Returns --, therefor.

UNITED STATES PATENT AND TRADEMARK OFFICE
CERTIFICATE OF CORRECTION

| | | |
|---|---|---|
| PATENT NO. | : 6,983,317 B1 | |
| APPLICATION NO. | : 09/586740 | |
| DATED | : January 3, 2006 | |
| INVENTOR(S) | : David A. Bishop et al. | |

It is certified that error appears in the above-identified patent and that said Letters Patent is hereby corrected as shown below:

In column 111 (Table 4, Col. 2), line 5, delete "retreived" and insert -- retrieved --, therefor.

In column 113, line 17, delete "OffLine" and insert -- Off-Line --, therefor.

In column 114, line 3, after "*pEngine)" insert -- ; --.

In column 114, line 19, after "EvictEngine(void)" insert -- ; --.

In column 114, line 47, after "*pbMaster)" insert -- ; --.

In column 114, line 49, after "bMaster)" insert -- ; --.

In column 115, line 23, delete "Thi smethod" and insert -- This method --, therefor.

In column 116, line 12, delete "(int istate);" and insert -- (int iState); --, therefor.

In column 116, line 23, after "Method" insert -- : --.

In column 117, line 2, after "Init(. . . .)" insert -- ; --.

In column 117, line 39, delete "objedcts" and insert -- objects --, therefor.

In column 119, line 50, delete "inteface" and insert -- interface --, therefor.

In column 125, line 48, delete "};" and insert --);--, therefor.

In column 125, line 67, delete "};" and insert --);--, therefor.

In column 126, line 19, delete "sich" and insert -- such --, therefor.

In column 128, line 45, delete "componenet" and insert -- component --, therefor.

In column 128, line(s) 46-47, delete "informationm compoment" and insert -- information component --, therefor.

UNITED STATES PATENT AND TRADEMARK OFFICE
CERTIFICATE OF CORRECTION

PATENT NO. : 6,983,317 B1
APPLICATION NO. : 09/586740
DATED : January 3, 2006
INVENTOR(S) : David A. Bishop et al.

It is certified that error appears in the above-identified patent and that said Letters Patent is hereby corrected as shown below:

In column 129, line 27, delete "sreves" and insert -- serves --, therefor.

In column 129, line 27, delete "follwing" and insert -- following --, therefor.

In column 129, line 34, delete "the" before "Node". (Repeated Occurrence)

In column 129, line 47, delete "Ineraction" and insert -- Interaction --, therefor.

In column 130, line 19, delete "Has Been Activated" and insert -- has been activated --, therefor.

In column 130, line 26, delete "will is" and insert -- will be --, therefor.

In column 130, line 40, delete "Montior" and insert -- Monitor --, therefor.

In column 132, line 33, delete "inerface" and insert -- interface --, therefor.

In column 133 (Table 1, Col. 4), line 7, delete "occured" and insert -- occurred --, therefor.

In column 133, line 55, delete "cpmponent" and insert -- component --, therefor.

In column 135, line 29, delete "Componet" and insert -- Component --, therefor.

In column 135, line 30, delete "desription" and insert -- description --, therefor.

In column 135, line 31, delete "Subscribtion" and insert -- Subscription --, therefor.

In column 139, line 18, delete "*nCritical" and insert -- nCritical --, therefor.

In column 139, line 36, delete "stoarge" and insert -- storage --, therefor.

In column 139 (Table 3), line 10, delete "CStrm_MeID" and insert -- CStr m_MeID --, therefor.

UNITED STATES PATENT AND TRADEMARK OFFICE
CERTIFICATE OF CORRECTION

PATENT NO. : 6,983,317 B1
APPLICATION NO. : 09/586740
DATED : January 3, 2006
INVENTOR(S) : David A. Bishop et al.

It is certified that error appears in the above-identified patent and that said Letters Patent is hereby corrected as shown below:

In column 140, line 23, after "the" delete "he".

In column 140, line 37, after "the" delete "he".

In column 140, line 37, delete "athe" and insert -- a --, therefor.

In column 141, line 1, delete "componentiteratea" and insert -- component iteratea --, therefor.

In column 141 (Table 2), line 11, insert -- ME --.

In column 143, line 16, in Claim 16, after "one of" insert -- a --.

In column 144, line 12, in Claim 30, after "one of" insert -- a --.

In column 145, line 39, in Claim 45, after "one of" insert -- a --.

Signed and Sealed this

Fourth Day of August, 2009

JOHN DOLL
*Acting Director of the United States Patent and Trademark Office*